US011078093B2

(12) United States Patent
Cwiertny et al.

(10) Patent No.: US 11,078,093 B2
(45) Date of Patent: Aug. 3, 2021

(54) SURFACTANT-ASSISTED SYNTHESIS OF SURFACE-FUNCTIONALIZED NANOPARTICLE-POLYMER ELECTROSPUN COMPOSITES

(71) Applicants: THE REGENTS OF THE UNIVERSITY OF CALIFORNIA, Oakland, CA (US); UNIVERSITY OF IOWA RESEARCH FOUNDATION, Iowa City, IA (US)

(72) Inventors: David Cwiertny, Iowa City, IA (US); Nosang Myung, Riverside, CA (US); Katherine T. Peter, Iowa City, IA (US); Gene Francis Parkin, Iowa City, IA (US)

(73) Assignee: UNIVERSITY OF IOWA RESEARCH FOUNDATION, Iowa City, IA (US)

( * ) Notice: Subject to any disclaimer, the term of this patent is extended or adjusted under 35 U.S.C. 154(b) by 4 days.

(21) Appl. No.: 16/023,808

(22) Filed: Jun. 29, 2018

(65) Prior Publication Data
US 2019/0002309 A1    Jan. 3, 2019

Related U.S. Application Data

(60) Provisional application No. 62/527,941, filed on Jun. 30, 2017.

(51) Int. Cl.
*D04H 3/007*    (2012.01)
*D04H 1/728*    (2012.01)
(Continued)

(52) U.S. Cl.
CPC .......... *C02F 1/288* (2013.01); *B01D 39/1623* (2013.01); *B01J 20/0229* (2013.01);
(Continued)

(58) Field of Classification Search
CPC .......... C02F 1/281; C02F 1/288; C02F 1/003; C02F 1/50; C02F 1/505; C02F 2101/103; C02F 2101/20; C02F 2101/22; C02F 2303/04; C02F 2305/08; B01D 39/1623; B01D 2239/025; B01D 2239/0258; B01D 2239/0407; B01D 2239/0618; B01D 2239/0631; B01D 2239/10; B01J 20/0229;
(Continued)

(56) References Cited

PUBLICATIONS

Lee, H., et al., "One-step preparation of ultrafine poly(acrylonitrile) fibers containing silver nanoparticles", Materials Letters, 59, pp. 2977-2980. (Year: 2005).*
(Continued)

*Primary Examiner* — Benjamin L Lebron
(74) *Attorney, Agent, or Firm* — Viksnins Harris Padys Malen LLP

(57) ABSTRACT

A method is disclosed for synthesizing nanofilters for water treatment. The method includes: dispersing an active binding agent in an organic solvent solution to create a suspension of the active binding agent and the solution of the solvent; dissolving an organic polymer resin and an anionic surfactant in the suspension of the active binding agent and the solvent solution to create a sol gel; and electrospinning the sol gel to form electrospun nanofiber composites with embedded, surface-active nanoparticles.

15 Claims, 85 Drawing Sheets

(51) Int. Cl.
| | |
|---|---|
| D01F 6/18 | (2006.01) |
| D01F 1/10 | (2006.01) |
| D01D 5/00 | (2006.01) |
| C02F 1/50 | (2006.01) |
| C02F 1/28 | (2006.01) |
| B01J 20/28 | (2006.01) |
| B01J 20/26 | (2006.01) |
| B01J 20/02 | (2006.01) |
| C02F 1/00 | (2006.01) |
| B01D 39/16 | (2006.01) |
| C02F 101/10 | (2006.01) |
| C02F 101/20 | (2006.01) |
| C02F 101/22 | (2006.01) |

(52) U.S. Cl.
CPC ....... *B01J 20/261* (2013.01); *B01J 20/28007* (2013.01); *B01J 20/28023* (2013.01); *C02F 1/003* (2013.01); *C02F 1/50* (2013.01); *C02F 1/505* (2013.01); *D01D 5/003* (2013.01); *D01F 1/10* (2013.01); *D01F 1/103* (2013.01); *D01F 6/18* (2013.01); *D04H 1/728* (2013.01); *D04H 3/007* (2013.01); *B01D 2239/025* (2013.01); *B01D 2239/0208* (2013.01); *B01D 2239/0258* (2013.01); *B01D 2239/0407* (2013.01); *B01D 2239/0618* (2013.01); *B01D 2239/0631* (2013.01); *B01D 2239/10* (2013.01); *C02F 1/281* (2013.01); *C02F 2101/103* (2013.01); *C02F 2101/20* (2013.01); *C02F 2101/22* (2013.01); *C02F 2303/04* (2013.01); *C02F 2305/08* (2013.01); *D10B 2505/04* (2013.01)

(58) Field of Classification Search
CPC ................ B01J 20/261; B01J 20/28007; B01J 20/28023; D01D 5/003; D01F 1/10; D01F 1/103; D01F 6/18; D04H 1/728; D04H 3/007; D10B 2505/04
See application file for complete search history.

(56) References Cited

PUBLICATIONS

Ray, S., et al., "Uniform hydrophobic electrospun nanofibrous layer composed of polysulfone and sodium dodecyl sulfate for improved desalination performance", Separation and Purification Technology, 186, pp. 352-365. (Year: 2017).*
Botes, M., and Cloete, T., "The potential of nanofibers and nanobiocides in water purification", Critical Reviews in Microbiology, 36(1), pp. 68-81. (Year: 2010).*
Machala, L., et al., "Amorphous iron(III) oxide—a review", J Phys Chem, 111, pp. 4003-4018. (Year: 2007).*
Zhang, C., et al., "Phase transformation of crystalline iron oxides and their adsorption abilities for Pb and Cd", Chemical Engineering Journal, 284, pp. 247-259. (Year: 2016).*
Li, L. H., et al, "Super adsorption capability from amorphousization of metal oxide nanoparticles for dye removal", Scientific Reports, 5: 9028, pp. 1-6. (Year: 2015).*
Fidalgo de Cortalezzi, M., et al, "Virus removal by iron oxide ceramic membranes", Journal of Environmental Chemical Engineering, 2, pp. 1831-1840. (Year: 2014).*
Gliscinska, E., et al, "Electrospun polyacrylonitirle nanofibers modified by quaternary ammonium salts", Journal of Applied Polymer Science, pp. 767-775. (Year: 2013).*
Theis et al., "Evaluating a New Granular Iron Oxide for Removing Lead from Drinking Water", Distribution Systems, Jul. 1992, pp. 101-105, vol. 84, No. 7, American Water Works Association.

McComb et al., "Preparation of Polyacryloamidoxime Chelating Cloth for the Extraction of Heavy Metals from Water", 1997, pp. 1175-1192, John Wiley & Sons, Inc.
Hu et al., "Adsorptive Characteristics of Ionogenic Aromatic Pesticides in Water on Powdered Activated Carbon", Wat. Res., 1998, pp. 2593-2600, vol. 32, No. 9, Elsevier Science Ltd., Great Britain.
Raven et al., "Arsenite and Arsenate Adsorption on Ferrihydrite: Kinetics, Equilibrium, and Adsorption Envelopes", Environmental Science & Technology, 1998, pp. 344-349, vol. 32, No. 3, American Chemical Society.
Schadler et al., "Load Transfer in Carbon Nanotube Epoxy Composites", Applied Physics Letters, Dec. 28, 1998, pp. 3842-3844, vol. 73, No. 26, American Institute of Physics.
Deitzel et al., "The Effect of Processing Variables on the Morphology of Electrospun Nanofibers and Textiles", Polymer, 2001, pp. 261-272, vol. 42, Elsevier Science Ltd.
Koplin et al., "Pharmaceuticals, Hormones, and other Organic Wastewater Contaminants in U.S. Streams, 1999-2000: A National Reconnaissance", Environmental Science & Technology, 2002, pp. 1202-1211, vol. 36, No. 6, American Chemical Society.
Ternes et al,. "Removal of Pharmaceuticals during Drinking Water Treatment", Environmental Science & Technology, 2002, pp. 3855-3863, vol. 36, No. 17, American Chemical Society.
Cumbal et al., "Polymer Supported Inorganic Nanoparticles: Characterization and Environmental Applications", Reactive & Functional Polymers, 2003, pp. 167-180, vol. 54, Elsevier Science B.V.
Demarco et al., "Arsenic Removal Using a Polymeric/Inorganic Hybrid Sorbent", Water Research, 2003, pp. 164-176, vol. 37, Elsevier Science Ltd.
Yu et al., "Polyacrylonitrile Nanofibers Coated with Silver Nanoparticles Using a Modified Coaxial Electrospinning Process", International Journal of Nanomedicine, 2012, pp. 5725-5732, vol. 7, Dove Medical Press Ltd.
Dror et al., "Carbon Nanotubes Embedded in Oriented Polymer Nanofibers by Electrospinning", Langmuir, 2003, pp. 7012-7020, vol. 19, American Chemical Society.
Huang et al., "A Review on Polymer Nanofibers by Electrospinning and their Applications in Nanocomposites", Composites Science and Technology, 2003, pp. 2223-2253, vol. 63, Elsevier Ltd.
Ko et al., "Electrospinning of Continuous Carbon Nanotube-Filled Nanofiber Yarns", Advanced Materials, Jul. 17, 2003, pp. 1161-1165, vol. 15, No. 14, Wiley-VCH Verlag GmbH & Co. KGaA, Weinheim.
Snyder et al., Pharmaceuticals, Personal Care Products, and Endocrine Disruptors in Water: Implications for the Water Industry, Environmental Engineering Science, Nov. 5, 2003, pp. 449-469, vol. 20. No. 5, Mary Ann Liebert, Inc.
Lin et al., Change Effect of Cationic Surfactants on the Elimination of Fibre Beads in the Electrospinning of Polystyrene, 2004, pp. 1-17, IOP Publishing Ltd.
Cumbal et al., "Arsenic Removal Using Polymer-Supported Hydrated Iron (III) Oxide Nanoparticles: Role of Donnan Membrane Effect", Environmental Science & Technology, 2005, pp. 6508-6515, vol. 39, No. 17, American Chemical Society.
Hlavay et al., "Determination of Surface Properties of Iron Hydroxide-Coated Alumina Adsorbent Prepared for Removal of Arsenic from Drinking Water", Journal of Colloid and Interface Science, 2005, pp. 71-77, vol. 284, Elsevier Inc.
Hou et al., "Electrospun Polyacrylonitrile Nanofibers Containing a High Concentration of Well-Aligned Multiwall Carbon Nanotubes", Chem. Mater., 2005, pp. 967-973, vol. 17, No. 5, American Chemical Society.
Lu et al., "Adsorption of Trihalomethanes from Water with Carbon Nanotubes", Water Research, 2005, pp. 1183-1189, vol. 39, Elsevier Ltd.
Savage et al., "Nanomaterials and Water Purification: Opportunities and Challenges", Journal of Nanoparticle Research, 2005, pp. 331-342, vol. 7, Springer.
Waychunas et al., "Nanoparticulate Iron Oxide Materials in Soils and Sediments: Unique Properties and Contaminant Scavenging Mechanisms", Journal of Nanoparticle Research, 2005, pp. 409-433, vol. 7, Springer.

(56) References Cited

PUBLICATIONS

Westerhoff et al., "Fate of Endocrine-Disruptor, Pharmaceutical, and Personal Care Product Chemicals during Simulated Drinking Water Treatment Processes", Environmental Science & Technology, 2005, pp. 6649-6663, vol. 39, No. 17, American Chemical Society.

Zussman et al., "Mechanical and Structural Characterization of Electrospun PAN-derived Carbon Nanofibers", Carbon, 2005, pp. 2175-2185, vol. 43, Elsevier Ltd.

Greenleaf et al., "Two Novel Applications of Ion Exchange Fibers: Arsenic Removal and Chemical-Free Softening of Hard Water", Environmental Progress, Dec. 2006, pp. 300-311, vol. 25, No. 4, American Institute of Chemical Engineers.

Kuzawa et al., "Phosphate Removal and Recovery with a Synthetic Hydrotalcite as an Adsorbent", Chemosphere, 2006, pp. 45-52, vol. 62, Elsevier Ltd.

Puttamraju et al., "Evidence of Tunable On-Off Sorption Behaviors of Metal Oxide Nanoparticles: Role of Ion Exchanger Support", Ind. Eng. Chem. Res., 2006, pp. 7737-7742, vol. 45, No. 22, American Chemical Society.

Wiesner et al., "Assessing the Risks of Manufactured Nanomaterials", Environmental Science & Technology, Jul. 15, 2006, pp. 4337-4345, American Chemical Society.

Kim et al., "Synthesis and Characterization of Porous Carbon Nanofibers with Hollow Cores Through the Thermal Treatment of Electrospun Copolymeric Nanofiber Webs", Small, 2007, pp. 91-95, vol. 3, No. 1, Wiley-VCH Verlag GmbH & Co. KGaA, Weinheim.

Rahaman et al., "A Review of Heat Treatment on Polyacrylonitrile Fiber", Polymer Degradation and Stability, 2007, pp. 1421-1432, Elsevier Ltd.

Tan et al., "Fabrication and Evaluation of Electrospun Nanofibrous Antimicrobial Nylon 6 Membranes", Journal of Membrane Science, 2007, pp. 287-298, vol. 305, Elsevier B.V.

Guan et al., "Removal of Arsenic from Water Using Granular Ferric Hydroxide: Macroscopic and Microscopic Studies", Journal of Hazardous Materials, 2008, pp. 178-185, vol. 156, Elsevier B.V.

Hochella, Jr., et al., "Nanominerals, Mineral Nanoparticles, and Earth Systems", Science, Mar. 21, 2008, pp. 1631-1635, vol. 319.

Hota et al., "Fabrication and Characterization of a Boehmite Nanoparticle Impregnated Electrospun Fibre Membrane for Removal of Metal Ions", J Mater Sci, 2008, pp. 212-217, vol. 43, Springer.

Hu et al., "Synthesis of Hierarchically Structured Metal Oxides and their Application in Heavy Metal Ion Removal", Advanced Materials, 2008, pp. 2977-2982, vol. 20, Wiley-VCH Veralg GmbH & Co. KGaA, Weinheim.

Jang et al., "Preloading Hydrous Ferric Oxide into Granular Activated Carbon for Arsenic Removal", Environmental Science & Technology, 2008, pp. 3369-3374, vol. 42, No. 9, American Chemical Society.

Li et al., "Antimicrobial Nanomaterials for Water Disinfection and Microbial Control: Potential Applications and Implications", Water Research, Nov. 2008, pp. 4591-4602, vol. 42, No. 18, Elsevier Ltd.

Mauter et al., "Environmental Applications of Carbon-Based Nanomaterials", Environmental Science & Technology, 2008, pp. 5843-5859, vol. 42, No. 16, American Chemical Society.

Pan et al., "Adsorption Mechanisms of Organic Chemicals on Carbon Nanotubes", Environmental Science & Technology, 2008, pp. 9005-9013 vol. 42, No. 24, American Chemical Society.

Prilutsky et al., "The Effect of Embedded Carbon Nanotubes on the Morphological Evolution during the Carbonization of Poly(acrylonitrile) Nanofibers", Nanotechnology, 2008, pp. 1-9, vol. 19, IOP Publishing.

Radjenovic et al., "Rejection of Pharmaceuticals in Nanofiltration and Reverse Osmosis Membrane Drinking Water Treatment", Water Research, 2008, pp. 3601-3610, vol. 42, Elsevier Ltd.

Saeed et al., "Preparation of Amidoxime-modified Polyacrylonitrile (PAN-oxime) Nanofibers and their Applications to Metal Ions Adsorption", Journal of Membrane Science, 2008, pp. 400-405, vol. 322, Elsevier B.V.

Soldatov, "Syntheses and the Main Properties of Fiban Fibrous Ion Exchangers", Solvent Extraction and Ion Exchange, 2008, pp. 457-513, vol. 26, Taylor & Francis Group, LLC.

Yao et al., "Surface Modification and Antibacterial Activity of Electrospun Polyurenthane Fibrous Membranes with Quaternary Ammonium Moieties", Journal of Membrane Science, 2008, pp. 259-267, vol. 320, Elsevier B.V.

Yu et al., "Adsorption Characteristics of Selected Pharmaceuticals and an Endocrine Disrupting Compound Naproxen, Carbamazepine and Nonlyphenol on Activated Carbon", Water Research, 2008, pp. 2873-2882, vol. 42, Elsevier Ltd.

Zhang et al., "Arsenate Removal from Aqueous Media by Nanosized Hydrated Ferric Oxide (HFO)-Loaded Polymeric Sorbents: Effect of HFO Loadings", Ind. Eng. Chem. Res., 2008, pp. 3957-3962, vol. 47, American Chemical Society.

Chen et al., "Electrospinning Fabrication of High Strength and Toughness Polyimide Nanofiber Membranes Containing Multiwalled Carbon Nanotubes", J. Phys. Chem. B, 2009, pp. 9741-9748, vol. 113, American Chemical Society.

Jang et al., "Combined Hydrous Ferric Oxide and Quaternary Ammonium Surfactant Tailoring of Granular Activated Carbon for Concurrent Arsenate and Perchlorate Removal", Water Research, 2009, pp. 3133-3143, vol. 43, Elsevier Ltd.

Ji et al., "In-Situ Encapsulation of Nickel Particles in Electrospun Carbon Nanofibers and the Resultant Electrochemical Performance", Chemistry A European Journal, 2009, pp. 10718-10722, vol. 15, Wiley-VCH Verlag GmbH & Co. KGaA, Weinheim.

Ji et al., "Porous Carbon Nanofibers Loaded with Manganese Oxide Particles: Formation Mechanism and Electrochemical Performance as Energy-Storage Materials", Journal of Materials Chemistry, 2009, pp. 5593-5601, vol. 19, The Royal Society of Chemistry.

Liu et al., "Flexible Macroporous Carbon Nanofiber Film with High Oil Adsorption Capacity", Journal of Materials Chemistry A, 2014, 3557-3562, vol. 2, The Royal Society of Chemistry.

Lundin et al., "Relationship between Surface Concentration of Amphiphilic Quaternary Ammonium Biocides in Electrospun Polymer Fibers and Biocidal Activity" Reactive & Functional Polymers, 2014, pp. 36-46, vol. 77, Elsevier B.V.

Manda et al., "Innovative Membrane Filtration System for Micropollutant Removal from Drinking Water—Prospective Environmental LCA and Its Integration in Business Decisions" Journal of Cleaner Production, 2014, pp. 153-166, vol. 72, Elsevier Ltd.

Taha et al., "Direct Synthesis of Novel Vanadium Oxide Embedded Porous Carbon Nanofiber Decorated with Iron Nanoparticles as a Low-Cost and Highly Efficient Visible-Light-Driven Photocatalyst" Journal of Colloid and Interface Science, 2014, pp. 199-205, vol. 417, Elsevier Inc.

Tai et al., "Highly Efficient and Flexible Electrospun Carbon-Silica Nanofibrous Membrane for Ultrafast Gravity-Driven Oil-Water Separation", Applied Materials & Interfaces, 2014, pp. 9393-9401, American Chemical Society.

Tesh et al., "Nano-Composites for Water Remediation: A Review", Advanced Materials, 2014, pp. 6056-6068, vol. 26, Wiley-VCH Verlag GmbH & Co. KGaA, Weinheim.

Weng et al., "Mass Production of Carbon Nanotube Reinforced Poly(methyl methacrylate) Nonwoven Nanofiber Mats", Carbon, 2014, pp. 217-226, vol. 75, Elsevier Ltd.

Zhi et al., "Electrospun Activated Carbon Nanofibers for Supercapacitor Electrodes", RSC Advances, 2014, pp. 43619-43623, vol. 4, The Royal Society of Chemistry.

Alcaraz-Espinoza et al., "Hierarchical Composite Polyaniline-(Electrospun Polystyrene) Fibers Applied to Heavy Metal Remediation", Applied Materials & Interfaces, 2015, pp. 7231-7240, vol. 7, American Chemical Society.

Faccini et al., "Electrospun Carbon Nanofiber Membranes for Filtration of Nanoparticles from Water", Journal of Nanomaterials, 2015, pp. 1-9, vol. 2015, Hindawi Publishing Corporation.

Kennedy et al., "Full- and Pilot-Scale GAC Adsorption of Organic Micropollutants", Water Research, 2015, pp. 238-248, vol. 68, Elsevier Ltd.

(56) References Cited

PUBLICATIONS

Luo et al., "Hierarchically Structured Polyacrylonitrile Nanofiber Mat as Highly Efficient Lead Adsorbent for Water Treatment", Chemical Engineering Journal, 2015, pp. 775-784, vol. 262, Elsevier B.V.

Min et al., "Preparation of Chitosan Based Electrospun Nanofiber Membrane and Its Adsorptive Removal of Arsenate from Aqueous Solution", Chemical Engineering Journal, 2015, pp. 132-141, vol. 267, Elsevier B.V.

Oulton et al., "Hydroxyl Radical Formation during Ozonation of Multiwalled Carbon Nanotubes: Performance Optimization and Demonstration of a Reactive CNT Filter", Environmental Science & Technology, 2015, pp. 3687-3697, vol. 49, American Chemical Society.

Patino et al., "Performance of Different Carbonaceous Materials for Emerging Pollutants Adsorption", Chemosphere, 2015, pp. S124-S130, vol. 119, Elsevier Ltd.

Simeonidis et al., "Inorganic Engineered Nanoparticles in Drinking Water Treatment: A Critical Review", Environmental Science Water Research & Technology, 2015, pp. 1-28, The Royal Society of Chemistry.

Totaro et al., "Electrospun Fibers Containing Bio-Based Ricinoleic Acid: Effect of Amount and Distribution of Ricinoleic Acid Unit on Antibacterial Properties*", Macromolecular Materials and Engineering, 2015, pp. 1-11, Wiley-VCH Verlag GmbH & Co. KGaA, Weinheim.

Wang et al., "Carbon Nanotube Composite Membranes for Microfiltration of Pharmaceuticals and Personal Care Products: Capabilities and Potential Mechanisms", Journal of Membrane Science, 2015, pp. 165-174, vol. 479, Elsevier B.V.

Xie et al., "Electrospun Nanofibers Adsorbents for Uranium Extraction from Seawater", Journal of Materials Chemistry A, 2015, pp. 2552-2558, vol. 3, The Royal Society of Chemistry.

Xu et al., "Adsorption Characteristics of a Novel Carbon-Nanotube-Based Composite Adsorbent toward Organic Pollutants" Industrial & Engineering Chemistry Research, 2015, pp. 2379-2384, vol. 54, American Chemical Society.

Zhang et al., "Preparation, Surface Properties, and Antibacterial Activity of a Poly(dimethyl siloxane) Network Containing a Quaternary Ammonium Salt Side Chain", Journal of Applied Polymer Science, 2015, pp. 1-8, Wiley Periodicals, Inc.

Zhao et al., "Preparation of Phosphorylated Polyacrylonitrile-Based Nanofiber Mat and Its Application for Heavy Metal Ion Removal", Chemical Engineering Journal, 2015, pp. 290-299, vol. 268, Elsevier B.V.

Patel et al., "Iron Oxide Nanoparticle-Immobilized PAN Nanofibers: Synthesis and Adsorption Studies", RSC Advances, 2016, pp. 15402-15414, vol. 6, The Royal Society of Chemistry.

Peter et al., "Synthesis, Optimization, and Performance Demonstration of Electrospun Carbon Nanofiber-Carbon Nanotube Composite Sorbents for Point-of-Use Water Treatment", Applied Materials & Interfaces, 2016, pp. 11431-11440, vol. 8, American Chemical Society.

Wang et al., "Muti-Walled Carbon Nanotubes with Selected Properties for Dynamic Filtration of Pharmaceuticals and Personal Care Products", Water Research, 2016, pp. 104-112, vol. 92, Elsevier Ltd.

Edwards et al., "Elevated Blood Lead in Young Children Due to Lead-Contaminated Drinking Water: Washington, DC, 2001-2004", Environmental Science & Technology, 2009, pp. 1618-1623, vol. 43, No. 5, American Chemistry Society.

Hanna-Attisha et al., "Elevated Blood Lead Levels in Children Associated with the Flint Drinking Water Crisis: A Spatial Analysis of Risk and Public Health Response", AJPH Research, Feb. 2016, pp. 283-290, vol. 106, No. 2, Peer Reviewed.

Brown et al., "Association between Children's Blood Lead Levels, Lead Service Lines, and Water Disinfection, Washington, DC, 1998-2006", Environmental Research, 2011, pp. 67-74, vol. 111, Elsevier Inc.

Edwards, "Fetal Death and Reduced Birth Rates Associated with Exposure to Lead-Contaminated Drinking Water", Environmental Science & Technology, 2014, pp. 739-746, vol. 48, American Chemical Society.

EPA, "Lead and Copper Rule: A Quick Reference Guide for Schools and Child Care Facilities that are Regulated Under the Safe Drinking Water Act", United States Environmental Protection Agency, Office of Water, Oct. 2005, pp. 1-5.

"WQA Technical Fact Sheet: Cadmium", Water Quality Association, 2013, pp. 1-4, National Headquarters & Laboratory, Lisle, Illinois.

EPA, "Lead and Copper Rule 2007 Short-Term Regulatory Revisions and Clarifications State Implementation Guidance" United States Environmental Protection Agency, Office of Water, Jun. 2008, pp. 1-70.

Isaac et al., "Corrosion in Drinking Water Distribution Systems: A Major Contributor of Copper and Lead to Wastewaters and Effluents", Environmental Science & Technology, 1997, pp. 3198-3203, vol. 31, No. 11, American Chemical Society.

Edwards et al., "Role of Chlorine and Chloramine in Corrosion of Lead-Bearing Plumbing Materials" Peer-Reviewed, Journal AWWA, Oct. 2004, pp. 69-81, vol. 96, No. 10, American Water Works Association.

Schock et al., "Occurrence of Contaminant Accumulation in Lead Pipe Scales from Domestic Drinking-Water Distribution Systems", Environmental Science & Technology, 2008, pp. 4285-4291, vol. 42, No. 12, American Chemical Society.

Francis et al., "National Statistical Assessment of Rural Water Conditions", The Office of Drinking Water US Environmental Protection Agency, 1-21.

Swistock et al., "Water Quality and Management of Private Drinking Water Wells in Pennsylvania", Journal of Environmental Health, Jan./Feb. 2013, pp. 60-66, vol. 75, No. 6.

Pieper et al., "Incidence of Waterborne Lead in Private Drinking Water Systems in Virginia", Journal of Water and Health, 2015, pp. 897-908, vol. 13, No. 3, IWA Publishing.

EPA, "Point-of-Use or Point-of-Entry Treatment Options for Small Drinking Water Systems", United States Environmental Protection Agency, Office of Water, Apr. 2006, pp. 1-132, The Cadmus Group, Inc. Arlington, VA.

Benjamin et al., "Sorption and Filtration of Metals Using Iron-Oxide-Coated Sand", Wat. Res. 1996, pp. 2609-2620, vol. 30, No. 11, Elsevier Science Ltd, Great Britain.

Trivedi et al., "Lead Sorption onto Ferrihydrite. 1. A Macroscopic and Spectroscopic Assessment", Environmental Science & Technology, 2003, pp. 908-914, vol. 37, No. 5, American Chemical Society.

Grover et al., "Adsorption and Desorption of Bivalent Metals to Hematite Nanoparticles", Environmental Toxicology and Chemistry, 2012, pp. 86-92, vol. 31, No. 1, SETCA, USA.

Edwards et al., "Adsorptive Filtration Using Coated Sand: A New Approach for Treatment of Metal-Bearing Wastes", Research Journal of The Water Pollution Control Federation, Sep. 1989, pp. 1523-1533, vol. 61, Nos. 9/10, Water Environment Federation.

Lee et al., "Iron Oxide Nano-Particles-Immobilized-Sand Material in the Treatment of Cu(II), Cd(II) and Pb(II) Contaminated Waste Waters", Chemical Engineering Journal, 2012, pp. 103-111, vols. 195-196, Elsevier B.V.

Han et al., "Characterization and Properties of Iron Oxide-Coated Zeolite as Adsorbent for Removal of Copper(II) from Solution in Fixed Bed Column", Chemical Engineering Journal, 2009, pp. 123-131, vol. 149, Elsevier B.V.

Qui et al., "Effect of Sulfate on Cu(II) Sorption to Polymer-Supported Nano-Iron Oxides: Behavior and XPS Study", Journal of Colloid and Interface Science, 2012, pp. 37-43, vol. 366, Elsevier Inc.

Mukh-Qasem et al., "Sonochemical Synthesis of Stable Hydrosol of $Fe_3O_4$ Nanoparticles", Journal of Colloid and Interface Science, 2005, pp. 489-494, vol. 284, Elsevier Inc.

Ma et al., "Stability of Dispersions of Iron Oxide in Mixed Solutions of Polyvinylpyrrolidone and Sodium Alkyl Sulfate", Colloids and Surfaces, 1990, pp. 117-123, vol. 47, Elsevier Science Publishers B.V., Amsterdam.

(56) References Cited

PUBLICATIONS

Tamura et al., "Spectrophotometric Determination of Iron(II) with 1,10-Phenanthroline in the Presence of Large of Amounts of Iron(III)", 1974, Talanta, pp. 314-318, vol. 21, Pergamon Press, Great Britain.
Ra et al., "Anisotropic Electrical Conductivity of MWCNT/PAN Nanofiber Paper", Chemical Physics Letters, 2005, pp. 188-193, vol. 412, Elsevier B.V.
Lin et al., "Hybrid Anion Exchange Fibers with Dual Binding Sites: Simultaneous and Reversible Sorption of Perchlorate and Arsenate", Environmental Engineering Science, 2009, pp. 1673-1683, vol. 26, No. 11, Mary Ann Liebert, Inc.
Liu et al., "Magnetic Chitosan Nanocomposites: A Useful Recyclable Tool for Heavy Metal Ion Removal", Langmuir, 2009, pp. 3-8, vol. 25, No. 1, American Chemical Society.
Long et al., "Electrospun Nanofibers Film Doped with a Conjugated Polymer for DNT Fluorescence Sensor", Macromolecules, 2009, pp. 6501-2509, vol. 42, No. 17, American Chemical Society.
Meyer et al., "An Examination of Existing Data for the Industrial Manufacture and Use of Nanocomponents and Their Role in the Life Cycle Impact of Nanoproducts", Environmental Science & Technology, 2009, pp. 1256-1263, vol. 43, No. 5, American Chemical Society.
Oleszczuk et al., "Adsorption and Desorption of Oxytetracycline and Carbamazepine by Multiwalled Carbon Nanotubes", Environmental Science & Technology, 2009, pp. 9167-9173, vol. 43, No. 24, American Chemical Society.
Ra et al., "High Power Supercapacitors Using Polyacrylonitrile-based Carbon Nanofiber Paper", Carbon, 2009, pp. 2984-2992, vol. 47, Elsevier Ltd.
Redding et al., "A QSAR-like Analysis of the Adsorption of Endocrine Disrupting Compounds, Pharmaceuticals, and Personal Care Products on Modified Activated Carbons", Water Research, 2009, pp. 3849-3861, vol. 43, Elsevier Ltd.
Teo et al., "Electrospun Nanofibers as a Platform for Multifunctional, Hierarchically Organized Nanocomposite", Composites Science and Technology, 2009, pp. 1804-1817, vol. 69, Elsevier Ltd.
Upadhyayula et al., "Application of Carbon Nanotube Technology for Removal of Contaminants in Drinking Water: A Review", Science of the Total Environment, 2009, pp. 1-13, vol. 408, Elsevier B.V.
Mishra et al., "Magnetite Decorated Multiwalled Carbon Nanotube Based Supercapacitor for Arsenic Removal and Desalination of Seawater", J. Phys. Chem. C, 2010, pp. 2583-2590, vol. 114, No. 6, American Chemical Society.
Oulton et al., "Pharmaceuticals and Personal Care Products in Effluent Matrices: A Survey of Transformation and Removal during Wastewater Treatment and Implications for Wastewater Management", Journal of Environmental Monitoring, 2010, pp. 1956-1978, vol. 12, The Royal Society of Chemistry.
Pan et al., "Highly Efficient Removal of Heavy Metals by Polymer-supported Nanosized Hydrated Fe(III) Oxides: Behavior and XPS Study", Water Research, 2010, pp. 815-824, vol. 44, Elsevier Ltd.
Pratson et al., "The Effectiveness of Arsenic Remediation from Groundwater in a Private Home", Ground Water Monitoring & Remediation, 2010, pp. 85-91, vol. 30, No. 1, National Ground Water Association.
Singh et al., "Removal of Disinfection Byproducts from Water by Carbonized Electrospun Nanofibrous Membranes", Separation and Purification Technology, 2010, pp. 202-212, vol. 74, Elsevier B.V.
Wan et al., "Selective Adsorption of Cd(II) and Zn(II) Ions by Nano-Hydrous Manganese Dioxide (HMO)-Encapsulated Cation Exchanger", Ind. Eng. Chem. Res., 2010, pp. 7574-7579, dated vol. 49, No. 16, American Chemical Society.
Wang et al., "Norfloxacin Sorption and Its Thermodynamics on Surface-Modified Carbon Nanotubes", Environmental Science & Technology, 2010, pp. 978-984, vol. 44, No. 3, American Chemical Society.
Zhang et al., "Adsorption of Aromatic Compounds by Carbonaceous Adsorbents: A Comparative Study on Granular Activated Carbon, Activated Carbon Fiber, and Carbon Nanotubes", Environmental Science & Technology, 2010, pp. 6377-6383, vol. 44, No. 16, American Chemical Society.
Zhang et al., "Contribution of Different Sulfamethoxazole Species to Their Overall Adsorption on Functionalized Carbon Nanotubes", Environmental Science & Technology, 2010, pp. 3806-3811, vol. 44, No. 10, American Chemical Society.
Abdelmelek et al., "Removal of Pharmaceutical and Personal Care Products from Reverse Osmosis Retentate Using Advanced Oxidation Processes", Environmental Science & Technology, 2011, pp. 3665-3671, vol. 45, American Chemical Society.
Huang et al., "Assesment of Potential Antibiotic Contaminants in Water and Preliminary Occurrence Analysis", 2011, pp. 30-40.
Huang et al., "Controlling Electrospun Nanofiber Morphology and Mechanical Properties Using Humidity", Journal of Polymer Science Part B: Polymer Physics, 2011, pp. 1734-1744, vol. 49, Wiley Periodicals, Inc.
Liang et al., "Robust and Highly Efficient Free-Standing Carbonaceous Nanofiber Membranes for Water Purification", Advanced Functional Materials, 2011, pp. 3851-3858, vol. 21, Wiley-VCH Verlag GmbH & Co. KGaA, Weinheim.
Neghlani et al., "Preparation of Aminated-Polyacrylonitrile Nanofiber Membranes for the Adsorption of Metal Ions: Comparison with Microfibers", Journal of Hazardous Materials, 2011, pp. 182-189, vol. 186, Elsevier B.V.
Xiao et al., "Excellent Copper(II) Removal Using Zero-Valent Iron Nanoparticle-Immoblized Hybrid Electrospun Polymer Nanofibrous Mats", Colloids and Surfaces A: Physiochemical Engineering Aspects, 2011, pp. 48-54, vol. 381, Elsevier B.V.
Yang et al., "Occurrence and Removal of Pharmaceuticals and Personal Care Products (PPCPs) in an Advanced Wastewater Reclamation Plant", Water Research, 2011, pp. 5218-5228, vol. 45, Elsevier Ltd.
Hischier et al., "Life Cycle Assessment of Engineered Nanomaterials: State of the Art and Strategies to Overcome Existing Gaps", Science and the Total Environment, 2012, pp. 271-282, vol. 425, Elsevier B.V.
Horzum et al., "Synthesis of Amidoximated Polyacrylonitrile Fibers and Its Application for Sorption of Aqueous Uranyl Ions Under Continuous Flow", Chemical Engineering Journal, 2012, pp. 41-49, vol. 213, Elsevier B.V.
Hua et al., "Heavy Metal Removal from Water/Wastewater by Nanosized Metal Oxides: A Review", Journal of Hazardous Materials, 2012, pp. 317-331, vols. 211-212, Elsevier B.V.
Inagaki et al., "Carbon Nanofibers Prepared via Electrospinning", Advanced Materials, 2012, pp. 2547-2566, vol. 24, Wiley-VCH Verlag GmbH & Co. KGaA, Weinheim.
Lee et al., "An Effective Method for Manufacturing Hollow Carbon Nanofibers and Microstructural Analysis", Macromolecular Research, 2012, pp. 605-613, vol. 20, No. 6, The Polymer Society of Korea.
Nilchi et al., "Evolution of PAN-based Manganese Dioxide Composite for the Sorptive Removal of Cesium-137 from Aqueous Solutions", Applied Radiation and Isotopes, 2012, pp. 369-374, vol. 70, Elsevier Ltd.
Simate et al., "Human Health Effects of Residual Carbon Nanotubes and Traditional Water Treatment Chemicals in Drinking Water", Environmental International, 2012, pp. 38-49, vol. 39, Elsevier Ltd.
Wu et al., "Optimization of Stabilization Conditions for Electrospun Polyacrylonitrile Nanofibers", Polymer Degradation and Stability, 2012, pp. 1511-1519, vol. 97, Elsevier Ltd.
Wu et al., "Influence of Surface Oxidation of Multiwalled Carbon Nanotubes on the Adsorption Affinity and Capacity of Polar and Nonpolar Organic Compounds in Aqueous Phase", Enivronmental & Science Technology, 2012, pp. 5446-5454, vol. 46, American Chemical Society.
Xu et al., "Anion Exchange Membranes Based on Poly(vinyl alcohol) and Quaternized Polyethyleneimine for Direct Methanol Fuel Cells", Journal of Applied Polymer Science, 2012, pp. 3853-3860, vol. 2013, Wiley Periodicals, Inc.
Benner et al., "Is Biological Treatment a Viable Alternative for Micropollutant Removal in Drinking Water Treatment Processes?", Water Research, 2013, pp. 5955-5976, vol. 47, Elsevier Ltd.

(56) References Cited

PUBLICATIONS

Feng et al., "Preparation and Characterization of Electro-Spun Nanofiber Membranes and Their Possible Applications in Water Treatment", Separation and Purification Technology, 2013, pp. 118-135, vol. 102, Elsevier B.V.

Gui et al., "Magnetic and Highly Recyclable Macroporous Carbon Nanotubes for Spilled Oil Sorption and Separation", Applied Materials & Interfaces, 2013, pp. 5845-5850, dated vol. 5, American Chemical Society.

Huang et al., "Preparation of Amidoxime Polyacrylonitrile Chelating Nanofibers and Their Application for Adsorption of Metal Ions", Materials, 2013, pp. 969-980, vol. 6.

Karra et al., "Power Generation and Organics Removal from Wastewater Using Activated Carbon Nanofiber (ACNF) Microbial Fuel Cells (MFCs)", International Journal of Hydrogen Energy, 2013, pp. 1588-1597, vol. 38, Elsevier Ltd.

Li et al., "PA6@FexOy Nanofibrous Membrane Preparation and Its Strong Cr (VI)-Removal Performance", Chemical Engineering Journal, 2013, pp. 294-301, vol. 220, Elsevier B.V.

Mahanta et al., "Functionalized Poly(vinyl alcohol) Based Nanofibers for the Removal of Arsenic from Water", RSC Advances, 2013, pp. 2776-2783, vol. 3, The Royal Society of Chemistry.

Mahapatra et al., "Electrospun Fe2O3-Al2O3 Nanocomposite Fibers as Efficient Adsorbent for Removal of Heavy Metal Ions from Aqueous Solution", Journal of Hazardous Materials, 2013, pp. 116-123, vols. 258-259, Elsevier B.V.

Manickam et al., "Activated Carbon Nanofiber Anodes for Microbial Fuel Cells", Carbon, 2013, pp. 19-28, vol. 53, Elsevier Ltd.

Persano et al., "Industrial Upscaling of Electrospinning and Applications of Polymer Nanofibers: A Review", Macromolecular Materials and Engineering, 2013, pp. 504-520, vol. 298, Wiley-VCH Verlag GmbH & Co. KGaA, Weinheim.

Tran et al., "Fabrication of Porous Carbon Nanofibers with Adjustable Pore Sizes as Electrodes for Supercapacitors", Journal of Power Sources, 2013, pp. 289-296, vol. 235, Elsevier B.V.

Chaudhary et al., "Preparation and Characterization of Homopolymer Polyacrylonitrile-Based Fibrous Sorbents for Arsenic Removal", Environmental Engineering Science, 2014, pp. 593-601, vol. 31, No. 11, Mary Ann Leibert, Inc.

Dastbaz et al., "Adsportion of TH4+, U6+, Cd2+, and Ni2+ from Aqueous Solution by a Novel Modified Polyacrylonitrile Composite Nanofiber Adsorbent Prepared by Electrospinning", Applied Surface Science, 2014, pp. 336-344, vol. 293, Elsevier B.V.

Gao et al., "Preparation and Characterization of Porous Carbon Based Nanocomposite for Supercapacitor", Fibers and Polymers, 2014, pp. 1236-1241, vol. 15, No. 6.

Li et al., "Study on Heavy Metal Ion Adsorption of PAN-Amidoxime Nanofiber Nonwoven Material", Advanced Materials Research, 2014, pp. 1072-1076, vols. 1033-1034,Trans Tech Publications, Switzerland.

Lin et al., "The Charge Effect of Cationic Surfactants on the Elimination of Fibre Beads in the Electrospinning of Polystryrene" Nanotechnology, 2004, pp. 1375-1381, vol. 15, Institute of Physics Publishing.

Perdeson, "Two-Dimensional Chemical-State Plot for Leading Using XPS", Journal of Electron Spectroscopy and Related Phenomena, 1982, pp. 203-209, vol. 28, Elsevier Scientific Publishing Company, Amsterdam.

Peacock et al., "Copper(II) Sorption onto Geothite, Hematite and Lepidocrocite: A Surface Complexation Model Based on AB Initio Molecular Geometrics and EXAFS Spectroscopy", Geochimica et Cosmochimica Acta, 2004, pp. 2623-2637, vol. 68, No. 12, Elsevier Ltd, USA.

Moon et al., "Adsorption of Cu(II) to Ferrihydrite and Ferrihydrite-Bacteria Composites: Importance of the Carboxyl Group for Cu Mobility in Natural Environments", Geochimica et Cosmochimica Acta, 2012, pp. 203-219, vol. 92, Elsevier Ltd.

Peter et al., "Functionalized Polymer-Iron Oxide Hybrid Nanofibers: Electrospun Filtration Devices for Metal Oxyanion Removal", Water Research, 2017, pp. 207-217, vol. 117, Elsevier Ltd.

Anschutz et al., "Reduction of Crystalline Iron(III) Oxyhydroxides Using Hydroquinone: Influence of Phase and Particle Size", Geochemical Transactions, Sep. 2005, pp. 60-66, vol. 6, No. 3, American Institute of Physics.

Arayanarakul et al., "Effects of Poly(ethylene glycol), Inorganic Salt, Sodium Dodecyl Sulfate, and Solvent System on Electrospinning of Poly(ethylene oxide)", Macromolecular Materials and Engineering, 2006, pp. 581-591, vol. 291, Wiley-VCH Verlag GmbH & Co. KGaA, Weinheim.

ATSDR, "Addendum to the Toxicological Profile for Arsenic", Agency for Toxic Substances and Disease Registry Division of Toxicology and Human Health Sciences, Feb. 2016, pp. 1-189.

Badruzzaman et al., "Inraparticle Diffusion and Adsorption of Arsenate onto Granular Ferric Hydroxide (GFH)", Water Research, 2004, pp. 4002-4012, vol. 38, Elsevier Ltd.

Harris et al., "Mechanism of the Reaction between Dichromate and Diphenylcarbazide", Aug. 2, 1952, pp. 213, Nature, No. 4318, Nature Publishing Group.

Cheec, "Iowa Statewide Rural Well Water Survey Phase 2 (SWRL2) Results and Analysis", Center for Health Effects of Environmental Contamination The University of Iowa, Aug. 2009, pp. 1-28.

Gong et al., "Surfactant-Assisted Processing of Carbon Nanotube/Polymer Composites", Chem. Mater., 2000, pp. 1049-1052, vol. 12, No. 4, American Chemical Society.

Gupta et al., "Synthesis and Surface Engineering of Iron Oxide Nanoparticles for Biomedical Applications", Biomaterials, 2005, pp. 3995-4021, vol. 26, Elsevier Ltd.

Harney et al., "Surface Self-Concentrating Amphiphilic Quaternary Ammonium Biocides as Coating Additives", Applied Materials & Interfaces, 2009, pp. 39-41, vol. 1, No. 1, American Chemical Society.

Jia et al., "Infrared Spectroscopic and X-ray Diffraction Characterization of the Nature of Adsorbed Arsenate on Ferrihydrite", Geochimica et Cosmochimica Acta, 2007, pp. 1643-1654, vol. 71, Elsevier Ltd.

Mazzera, "State Adoption of a Hexavalent Chromium MCL", California Department of Public Health Memorandum, Jul. 20, 2014, pp. 1-3.

McNeill et al., "State of the Science of Hexavalent Chromium in Drinking Water", May 2012, pp. 1-35, Water Research Foundation.

Potthoff et al., Santa Ynez Struggles with Severe New State Chromium Groundwater Standards, Noozhawk, Jul. 3, 2018, pp. 1-4, Malamute Ventures LLC.

"Purolite Ion Exchange Resins", Arsenic Removal Media, pp. 1-2, The Purolite Company, Division of Bro-Tech Corporation.

Sarkar et al., "Polymer-Supported Metals and Metal Oxide Nanoparticles: Synthesis, Characterization, and Applications", J Nanopart Res, 2012, pp. 1-24, vol. 14, No. 715, Springer Science+ Business Media B.V.

Singh et al., "Micelle Formation of Ionic Surfactants in Polar Nonaqueous Solvents", The Journal of Physical Chemistry, 1980, pp. 2191-2184, vol. 84, No. 17, American Chemical Society.

South Kern Sol, "EPA Orders Arvin CSD to Reduce Arsenic in Drinking Water", Oct. 9, 2015, pp. 1-3.

Spinelli et al., "Preparation and Characterization of Quaternary Chitosan Salt: Adsorption Equilibrium of Chromium (VI) Ion", Reactive & Functional Polymers, 2004, pp. 347-352, vol. 61, Elesevier B.V.

Sylvester et al., "A Hybrid Sorbent Utilizing Nanoparticles of Hydrous Iron Oxide for Arsenic Removal from Drinking Water", Environmental Engineering Science, 2007, pp. 104-112, vol. 24, No. 1, Mary Ann Leibert, Inc.

EPA, "Arsenic Virtual Trade Show", United States Environmental Protection Agency, Jul. 17, 2015, pp. 1-5.

EPA, "Technical Fact Sheet: Final Rule for Arsenic in Drinking Water", United States Environmental Protection Agency, Jan. 2001, pp. 1-3.

Vatutsina et al., "A New Hybrid (polymer/inorganic) Fibrous Sorbent for Arsenic Removal from Drinking Water", Reactive & Functional Polymers, 2007, pp. 184-201, vol. 67, Elsevier Ltd.

Ponder, et al., "Remediation of Cr(VI) and Pb(II) Aqueous Solutions Using Supported, Nanoscale Zero-valent Iron", Environ. Sci. Technol., 2000, vol. 34, pp. 2564-2569.

(56) References Cited

PUBLICATIONS

Puttamraju, et al., "Evidence of Tunable on-off Sorption Behaviors of Metal Oxide Nanoparticles: Role of Ion Exchanger Support", Ind. Eng. Chem. Res., 2006, vol. 45, pp. 7737-7742.
Qiu, et al., "Effect of Sulfate on Cu(II) Sorption to Polymer-supported Nano-iron Oxides: Behavior and XPS Study", Journal of Colloid and Interface Science, vol. 366, 2012, pp. 37-43.
Qu, et al., "Applications of Nanotechnology in Water and Wastewater Treatment", Water Research, Aug. 1, 2013, vol. 47(12), pp. 3931-3946.
Qu, et al., "Product-to-Parent Reversion of Trenbolone: Unrecognized Risks for Endocrine Disruption", Science, vol. 342, Oct. 18, 2013, pp. 347-351.
Rahaman, et al., "Electrochemical Carbon-nanotube Filter Performance Toward Virus Removal and Inactivation in the Presence of Natural Organic Matter", Environmental Science & Technology, 2012, vol. 46, pp. 1556-1564.
Raven, et al., "Arsenite and Arsenate Adsorption On Ferrihydrite: Kinetics, Equilibrium, and Adsorption Envelopes", Environ. Sci. Technol., 1998, vol. 32, pp. 344-349.
Rebitzer, et al., "Life Cycle Assessment Part 1: Framework, Goal and Scope Definition, Inventory Analysis, and Applications", Environment International, vol. 30, 2004, pp. 701-720.
Reed, et al., "As(III), As(V), Hg, and Pb Removal by Fe-Oxide Impregnated Activated Carbon", Journal of Environmental Engineering, vol. 126, No. 9, Sep. 2000, pp. 869-873.
Ren, et al., "Electrospun Polyacrylonitrile Nanofibrous Biomaterials", Journal of Biomedical Materials Research, Nov. 3, 2008, vol. 91A(2), pp. 385-390.
Ren, et al., "Polyacrylonitrile/polybenzoxazine-based Fe3o4@carbon Nanofibers: Hierarchical Porous Structure and Magnetic Adsorption Property", Journal of Materials Chemistry, Jun 20, 2012, vol. 22, pp. 15919-15927.
Reynolds, et al., "Risk of Waterborne Illness Via Drinking Water in the United States", Reviews of Environmental Contamination and Toxicology, 2008, vol. 192, pp. 117-158.
Rodriguez, et al., "Photoreactivation of Bacteriophages After Uv Disinfection: Role of Genome Structure and Impacts Of Uv Source", Water Research, May 15, 2014, vol. 55, pp. 143-149.
Samatya, et al., "Removal of Nitrate From Aqueous Solution by Nitrate Selective Ion Exchange Resins", Reactive & Functional Polymers, vol. 66, 2006, pp. 1206-1214.
Sarah, "Market Report on Emerging Nanotechnology Now Available", National Science Foundation, Feb. 25, 2014, 2 Pages.
Savage, et al., "Nanomaterials and Water Purification: Opportunities and Challenges", Journal of Nanoparticle Research, 2005, vol. 7, pp. 331-342.
Schwertmann, et al., "From Fe(III) Ions to Ferrihydrite and then to Hematite", Journal of Colloid and Interface Science, vol. 209, 1999, pp. 215-223.
Shannon, et al., "Science and TechnologyA for Water Purification in the Coming Decades", Nature, Mar. 20, 2008, vol. 452, pp. 301-310.
Sheng, et al., "Kinetics and Thermodynamics of Adsorption of Ionizable Aromatic Compounds From Aqueous Solutions by as-prepared and Oxidized Multiwalled Carbon Nanotubes", Journal of Hazardous Materials; Elsevier, 2010, vol. 178, pp. 505-516.
Shim, "Adsorption Characteristics of Benzene on Electrospun-Derived Porous Carbon Nanofibers", Journal of Applied Polymer Science, Aug. 23, 2006, vol. 102(3), pp. 2454-2462.
Simeonidis, et al., "Inorganic Engineered Nanoparticles in Drinking Water Treatment: a Critical Review", Environ. Sci.: Water Res. Technol., 2016, vol. 2, pp. 43-70.
Simeonidis, et al., "Optimizing Magnetic Nanoparticles for Drinking Water Technology: The Case of Cr(Vi)", Science of the Total Environment, 2015, vol. 535, pp. 61-68.
Singh, et al., "Adsorption Technique for the Treatment of as(V)-rich Effluents", Colloids and Surfaces, 1996, vol. 111, pp. 49-56.
Smith, et al., "Cancer Risks from Arsenic in Drinking Water", Environmental Health Perspectives, vol. 97, 1992, pp. 259-267.
Sobsey, et al., "Point of Use Household Drinking Water Filtration: a Practical, Effective Solution for Providing Sustained Access to Safe Drinking Water in the Developing World", Environmental Science & Technology, May 13, 2008, vol. 42(12), pp. 4261-4267.
Son, et al., "Antimicrobial Cellulose Acetate Nanofibers Containing Silver Nanoparticles", Carbohydrate Polymers, Mar. 30, 2006, vol. 65(4), pp. 430-434.
Sondi, et al., "Silver Nanoparticles as Antimicrobial Agent: A Case Study on E. coli as a Model for Gram-negative Bacteria", Journal of Colloid and Interface Science, vol. 275, 2004, pp. 177-182.
Sperlich, et al., "Breakthrough behavior of granular ferric hydroxide (GFH) fixed-bed adsorption filters: modeling and experimental approaches", Water Research, vol. 39, 2005, pp. 1190-1198.
Srivastava, et al., "Carbon Nanotube Filters", Nature Materials, Sep. 2004, vol. 3, pp. 610-614.
Su, et al., "Adsorption Kinetics, Thermodynamics and Desorption of Natural Dissolved Organic Matter by Multiwalled Carbon Nanotubes", Journal of Environmental Science and Health, Oct. 19, 2007, vol. 42(11), pp. 1543-1552.
Swallow, et al., "Sorption of Copper and Lead by Hydrous Ferric Oxide", Environmental Science & Technology, Nov. 1980, vol. 14, No. 11, pp. 1326-1331.
Taha, et al., "Preparation and application of amino functionalized mesoporous nanofiber membrane via electrospinning for adsorption of Cr3+ from aqueous solution", Journal of Environmental Sciences, vol. 24, No. 12, 2012, pp. 610-610.
Taha, et al., "Preparation and application of functionalized cellulose acetate/silica composite nanofibrous membrane via electrospinning for Cr(VI) ion removal from aqueous solution", Journal of Environmental Management, vol. 112, 2012, pp. 10-16.
Tarigh, et al., "Magnetic Multi-wallcarbon Nanotube Nanocomposite as an Adsorbent For Preconcentration and Determination of Lead(II) and Manganese(II) In Various Matrices", Talanta, 2013, vol. 115, pp. 744-750.
Teng, et al., "Electrospun Mesoporous Carbon Nanofibers Produced From Phenolic Resin and Their Use in the Adsorption of Large Dye Molecules", Carbon, Jul. 2012, vol. 50(8), pp. 2877-2886.
Teunis, et al., "Enteric Virus Infection Risk From Intrusion of Sewage Into a Drinking Water Distribution Network", Environmental Science & Technology, Oct. 22, 2010, vol. 44(22), pp. 8561-8566.
Theis, et al., "Evaluatiing a New Granular Iron Oxide for Removing Lead From Drinking Water", American Water Works Association, Jul. 1992, vol. 84, No. 7, pp. 101-105.
Thirunavukkarasu, et al., "Arsenic Removal From Drinking Water Using Iron Oxide-coated Sand", Water, Air, and Soil Pollution, vol. 142, 2003, pp. 95-111.
Tian, et al., "Electrospun Membrane of Cellulose Acetate for Heavy Metal Ion Adsorption in Water Treatment", Carbohydrate Polymers, Sep. 20, 2010, vol. 83(2), pp. 743-748.
Torres, et al., "Proton Transport Inside the Biofilm Limits Electrical Current Generation by Anode-Respiring Bacteria", Biotechnology and Bioengineering, vol. 100, No. 5, Aug. 1, 2008, pp. 872-881.
Vaishya, et al., "Arsenic(V) Removal by Sulfate Modified Iron Oxide-Coated Sand (SMIOCS) in a Fixed Bed Column", Water Quality Research Journal of Canada, vol. 41, No. 2, 2006, pp. 157-163.
Van Der Bruggen, et al., "Removal of pollutants from surface water and groundwater by nanofiltration: overview of possible applications in the drinking water industry", Environmental Pollution, vol. 122, 2003, pp. 435-445.
Vatutsina, et al., "A New Hybrid (Polymer/Inorganic) Fibrous Sorbent for Arsenic Removal From Drinking Water", Reactive & Functional Polymers, vol. 67, 2007, pp. 184-201.
Vecitis, et al., "Electrochemical Carbon Nanotube Filter for Adsorption, Desorption, and Oxidation of Aqueous Dyes and Anions", The Journal of Physical Chemistry C, vol. 115, Feb. 16, 2011, pp. 3621-3629.
Verdugo, et al., "N-Functionalized Carbon Nanotubes As a Source and Precursor of N-Nitrosodimethylamine: Implications for Environmental Fate, Transport, and Toxicity", Environ. Sci. Technol. vol. 48, 2014, pp. 9279-9287.

(56) References Cited

PUBLICATIONS

Volder, et al., "Carbon Nanotubes: Present and Future Commercial Applications", Science, Feb 1, 2013, vol. 339 (6119), pp. 535-539.

Wang, et al., "Adsorption of Fulvic Acids From Aqueous Solutions by Carbon Nanotubes", Journal of Chemical Technology & Biotechnology, vol. 82, Jul. 6, 2007, pp. 698-704.

Wang, et al., "Mechanism Study of Selective Heavy Metal Ion Removal Withpolypyrrole-functionalized Polyacrylonitrile", Applied Surface Science, Aug. 8, 2014, vol. 316, pp. 245-250.

Wang, et al., "Norfloxacin Sorption and Its Thermodynamics on Surface-modified Carbon Nanotubes", Environ. Sci. Technol., 2010, vol. 44, pp. 978-984.

Wang, et al., "Poly(Ethyleneimine) Nanofibrous Affinity Membrane Fabricated via One Step Wet-electrospinning From Poly(Vinyl Alcohol)-doped Poly(Ethyleneimine) Solution System and Its Application", Journal of Membrane Science, Jun. 25, 2011, vol. 379, pp. 191-199.

Ghosh, et al., "Arsenic Adsorption on Goethite Nanoparticles Produced Through Hydrazine Sulfate Assisted Synthesis Method", Korean J. Chem. Eng., 2012, vol. 29(1), pp. 95-102.

Gibson, "Viral Pathogens in Water: Occurrence, Public Health Impact, and Available Control Strategies", Current Opinion in Virology, Feb. 2014, vol. 4, pp. 50-57.

Gohari, et al., "Adsorptive Removal of Pb(II) From Aqueous Solution by Novel PES/HMO Ultrafiltration Mixed Matrix Membrane", Separation and Purification Technology, vol. 120, 2013, pp. 59-68.

Gong, et al., "Removal of Cationic Dyes From Aqueous Solution Using Magnetic Multi-wall Carbon Nanotube Nanocomposite as Adsorbent", Journal of Hazardous Materials, 2009, vol. 164, pp. 1517-1522.

Gotovac, et al., "Adsorption of Polyaromatic Hydrocarbons on Single Wall Carbon Nanotubes Of Different Functionalities and Diameters", Journal of Colloid and Interface Science; Elsevier, 2017, vol. 314, pp. 18-24.

Gotovac, et al., "Assembly Structure Control of Single Wall Carbon Nanotubes With Liquid Phase Naphthalene Adsorption", Colloids and Surfaces A: Physicochem. Eng. Aspects, 2007, vol. 300, pp. 117-121.

Grossl, et al., "Rapid Kinetics of Cu(Ii) Adsorption/desorption on Goethite", Environ. Sci. Technol., 1994, vol. 28, pp. 1422-1429.

Gu, et al., "Sorption and Binary Exchange of Nitrate, Sulfate, and Uranium on an Anion-Exchange Resin", Environ. Sci. Technol., vol. 38, 2004, pp. 3184-3188.

Guan, et al., "Removal of Arsenic From Water Using Granular Ferric Hydroxide: Macroscopic and Microscopic Studies", Journal of Hazardous Materials, 2008, vol. 156, pp. 178-185.

Gui, et al., "Carbon Nanotube Sponges", Advanced Materials, vol. 22, 2010, pp. 617-621.

Gui, et al., "Magnetic and Highly Recyclable Macroporous Carbon Nanotubes for Spilled Oil Sorption and Separation", ACS Appl. Mater. Interfaces, 2013, vol. 5, pp. 5845-5850.

Gui, et al., "Recyclable Carbon Nanotube Sponges for Oil Absorption", Acta Materialia, 2011, vol. 59, pp. 4798-4804.

Guo, et al., "Investigation of Mechanical Properties of Insulin Crystals by Atomic Force Microscopy", Langmuir, vol. 24, No. 3, 2008, pp. 880-887.

Guo, et al., "The size-dependent elastic properties of nanofilms with surface effects", J. Appl. Phys. vol. 98, 2005, 12 pages.

Gupta, et al., "Synthesis and Characterization of Alumina-Coated Carbon Nanotubes and Their Application for Lead Removal", Journal of Hazardous Materials, vol. 185, 2011, pp. 17-23.

Gusseme, et al., "Virus Disinfection in Water by Biogenic Silver Immobilized in Polyvinylidene Fluoride Membranes", Water Research, Dec. 7, 2010, vol. 45(4), pp. 1856-1864.

Haas, et al., "Risk Assessment of Virus in Drinking Water", Risk Analysis, 1993, vol. 13(5), pp. 545-552.

Haider, et al., "Electrospun Oxime-grafted-polyacrylonitrile Nanofiber Membrane and Its Application to the Adsorption of Dyes", Journal of Polymer Research, Feb. 25, 2014, vol. 21, Article No. 371, pp. 1-13.

Han, "Removal of Copper(II) and Lead(II) From Aqueous Solution by Manganese Oxide Coated Sand I. Characterization and Kinetic Study", Journal of Hazardous Materials B, vol. 137, 2006, pp. 384-395.

Handy, et al., "Toxic Effects of Nanoparticles and Nanomaterials: Implications for Public Health, Risk Assessment and the Public Perception of Nanotechnology", Health, Risk & Society, Jun. 2007, vol. 9(2), pp. 125-144.

Heijungs, et al., "Life Cycle Assessment and Sustainability Analysis of Products, Materials And Technologies. Toward a Scientific Framework for Sustainability Life Cycle Analysis", Polymer Degradation and Stability, vol. 95, 2010, pp. 422-428.

Hingston, et al., "Competitive Adsorption of Negatively Charged Ligands on Oxide Surfaces", vol. 52, Jun. 21, 1971, pp. 334-342.

Holt, et al., "Fabrication of a Carbon Nanotube-embedded Silicon Nitride Membrane for Studies of Nanometer-scale Mass Transport", Nano Letters, 2004, vol. 4, No. 11, pp. 2245-2250.

Hong et al., "Optimal Size of Gold Nanoparticles for Surface-enhanced Raman Spectroscopy Under Different Conditions", Journal of Nanomaterials, May 30, 2013, 9 pages.

Hsia, et al., "Characterization of Arsenate Adsorption on Hydrous Iron Oxide Using Chemical and Physical Methods", Colloids and Surfaces, 1994, vol. 85, pp. 1-7.

Hu, et al., "Removal and Recovery of Cr(VI) From Wastewater by Maghemite Nanoparticles", Water Research, 2005, vol. 39, pp. 4528-4536.

Hu, et al., "Synthesis of Hierarchically Structured Metal Oxides and Their Application in Heavy Metal Ion Removal", Wiley; InterScience; Adv. Matter, 2008, vol. 20, pp. 2977-2982.

Hua, et al., "Comparison of Disinfection Byproduct Formation From Chlorine and Alternative Disinfectants", Water Research, Apr. 2007, vol. 41(8), pp. 1667-1678.

Hua, et al., "Heavy Metal Removal From Water/wastewater by Nanosized Metal Oxides: a Review", Journal of Hazardous Materials, vol. 211-212, 2012, pp. 317-331.

Huber, et al., "Oxidation of Pharmaceuticals during Ozonation of Municipal Wastewater Effluents: A Pilot Study", Environ. Sci. Technol., vol. 39, 2005, pp. 4290-4299.

Hutchins, et al., "Nanocrystals of a Metal-Organic Complex Exhibit Remarkably High Conductivity that Increases in a Single-Crystal-to-Single-Crystal Transformation", J. Am. Chem. Soc., vol. 136, 2014, pp. 6778-6781.

Hutter, et al., "Calibration of atomic-force microscope tips", Rev. Sci. Instrum. vol. 64, No. 7, Jul. 1993, pp. 1868-1873.

Ignatova, et al., "Electrospun Nano-fibre Mats With Antibacterial Properties From Quaternised Chitosan and Poly (Vinyl Alcohol)", Carbohydrate Research, Jun. 5, 2006, vol. 341(12), pp. 2098-2107.

Jain, et al., "Arsenite and Arsenate Adsorption On Ferrihydrite: Surface Charge Reduction and Net Oh-Release Stoichiometry", Environ. Sci. Technol., 1999, vol. 33, pp. 1179-1184.

Jang, et al., "Preloading Hydrous Ferric Oxide Into Granular Activated Carbon for Arsenic Removal", Environ. Sci. Technol., 2008, vol. 42, pp. 3369-3374.

Jeong, et al., "Evaluation of Iron Oxide and Aluminum Oxide as Potential Arsenic(V) Adsorbents", Chemical Engineering and Processing, 2007, vol. 46, pp. 1030-1039.

Ji, et al., "Adsorption of Monoaromatic Compounds and Pharmaceutical Antibiotics on Carbon Nanotubes Activated by KOH Etching", Environmental Science & Technology, Jul. 27, 2010, vol. 44(16), pp. 6429-6436.

Ji, et al., "Porous Carbon Nanofibers From Electrospun Polyacrylonitrile/sio2 Composites as an Energy Storage Material", Carbon, Aug. 6, 2009, vol. 47(14), pp. 3346-3354.

Jia, et al., "Synthesis and antibacterial activities of quaternary ammonium salt of chitosan", Carbohydrate Research, Jun. 22, 2001, vol. 333(1), pp. 1-6.

Jones, et al., "Pharmaceuticals: a threat to drinking water?", TRENDS in Biotechnology vol. 23, No. 4, Apr. 2005, pp. 163-167.

(56) References Cited

PUBLICATIONS

Joshi, et al., "Removal of Arsenic From Ground Water by Iron Oxide-Coated Sand", Journal of Environmental Engineering, vol. 122, No. 8, Aug. 1996, pp. 769-771.

Jung, et al., "Characterization of PVOH Nonwoven Mats Prepared from Surfactant-Polymer System via Electrospinning", Macromolecular Research, vol. 13, No. 5, 2005, pp. 385-390.

Kampalanonwat, et al., "Preparation and Adsorption Behavior of Aminated Electrospun Polyacrylonitrile Nanofiber Mats for Heavy Metal Ion Removal", ACS Applied Materials & Interfaces, Nov. 30, 2010, vol. 2(12), pp. 3619-3627.

Kanel, et al., "Transport of Surface-modified Iron Nanoparticle in Porous Media and Application to Arsenic(III) Remediation", J Nanopart Res, vol. 9, 2007, pp. 725-735.

Kang, et al., "Antibacterial Effects of Carbon Nanotubes: Size Does Matter!", Langmuir, May 30, 2008, vol. 24(13), pp. 6409-6413.

Kang, et al., "Microbial Cytotoxicity of Carbon-based Nanomaterials: Implications for River Water and Wastewater Effluent", Environ. Sci. Technol., 2009, vol. 43, pp. 2648-2653.

Karn, et al., "Nanotechnology and in Situ Remediation: a Review of the Benefits and Potential Risks", Environmental Health Perspectives, Dec. 2009, vol. 117, No. 12, pp. 1823-1831.

Karunatilaka, et al., "Softening and Hardening of Macro- and Nano-Sized Organic Cocrystals in a Single-Crystal Transformation", Angew. Chem. Int. Ed., vol. 50, 2011, pp. 8642-8646.

Katsoyiannis, et al., "Removal of Arsenic From Contaminated Water Sources by Sorption Onto Iron-oxide-coated Polymeric Materials", Water Research, vol. 36, 2002, pp. 5141-5155.

Kim, et al., "Removal of Pb(II) From Aqueous Solution by a Zeolite-nanoscale Zero-valent Iron Composite", Chemical Engineering Journal, vol. 217, 2013, pp. 54-60.

Kim, et al., "Self-Sustained ThinWebs Consisting of Porous Carbon Nanofibers for Supercapacitors via the Electrospinning of Polyacrylonitrile Solutions Containing Zinc Chloride", Advanced Materials, Aug. 2, 2007, vol. 19 (17), pp. 2341-2346.

Klavarioti, et al., "Removal of residual pharmaceuticals from aqueous systems by advanced oxidation processes", Environment International, vol. 35, 2009, pp. 402-417.

Ko, et al., "Arsenic Removal by a Colloidal Iron Oxide Coated Sand", Journal of Environmental Engineering, vol. 133, No. 9, Sep. 2007, pp. 891-898.

Ku, et al., "The Adsorption of Fluoride Ion Fromaqueous Solution by Activated Alumina", Water, Air, and Soil Pollution, vol. 133, 2002, pp. 349-360.

Kuo, et al., "Dual Role of Activated Carbon Process for Water Reuse", Water Environment Research, vol. 70, No. 2, Mar./Apr. 1998, pp. 161-170.

Lai, et al., "Removal of Metal Ions and Humic Acid From Water by Iron-Coated Filter Media", Chemosphere, vol. 44, 2001, pp. 1177-1184.

Lambertini, et al., "Risk of Viral Acute Gastrointestinal Illness From Nondisinfected Drinking Water Distribution Systems", Environmental Science & Technology, Jul. 27, 2012, vol. 46(17), pp. 9299-9307.

Lapworth, et al., "Emerging organic contaminants in groundwater: A review of sources, fate and occurence", Environmental Pollution, vol. 163, 2012, pp. 287-303.

Laurent, et al., "Magnetic Iron Oxide Nanoparticles: Synthesis, Stabilization, Vectorization, Physicochemical Characterizations, and Biological Applications", Chem. Rev., 2008, vol. 108, pp. 2064-2110.

Lee, et al., "Ozone and biofiltration as an alternative to reverse osmosis for removing PPCPs and micropollutants from treated wastewater", Water Research, vol. 46, 2012, pp. 1005-1014.

Li, et al., "Adsorption of Ionizable Organic Contaminants on Multi-walled Carbon Nanotubes With Different Oxygen Contents", Journal of Hazardous Materials, 2011, vol. 186, pp. 407-415.

Li, et al., "PA6@FexOy nanofibrous membrane preparation and its strong Cr (VI)-removal performance", Chemical Engineering Journal, vol. 220, 2013, pp. 294-301.

Liao, et al. "The Adsorption of Resorcinol From Water Using Multi-walled Carbon Nanotubes", Science Direct, Jan. 15, 2008, vol. 312(2-3), pp. 160-165.

Lin, et al. "Effects of Polymer Concentration and Cationic Surfactant on the Morphology of Electrospun Polyacrylonitnle Nanotibres", J. Mater. Sci. Technol., vol. 21, Suppl.1, 2005, pp. 1-4.

Lin, et al. "Polyacrylonitrile/ferrous chloride composite porous nanofibers and their strong Cr-removal performance", Journal of Materials Chemistry, vol. 21, 2011, pp. 991-997.

Linos, et al., "Oral Ingestion of Hexavalent Chromium Through Drinking Water and Cancer Mortality in an Industrial Area of Greece—An Ecological Study", Environmental Health, vol. 10, No. 50, 2011, pp. 1-8.

Liu, et al. "Application Potential of Carbon Nanotubes in Water Treatment: a Review", Journal of Environmental Sciences, 2013, vol. 25(7), pp. 1263-1280.

Liu, et al. "Exceptional as(Iii) Sorption Capacity by Highly Porous Magnesium Oxide Nanoflakes Made From Hydrothermal Synthesis", J. Am. Ceram. Soc., 2011, vol. 94 [1], pp. 217-223.

Liu, et al., "Fabrication of Macroporous/Mesoporous Carbon Nanofiber Using CaCO3 Nanoparticles as Dual Purpose Template and Its Application as Catalyst Support", The Journal of Physical Chemistry C, Sep. 19, 2013, vol. 117(41), pp. 21426-21432.

Liu, et al., "Magnetic Chitosan Nanocomposites: a Useful Recyclable Tool for Heavy Metal Ion Removal", Langmuir, 2009, vol. 25, pp. 3-8.

Liu, et al., "Potential of Carbon Nanotubes in Water Treatment", Recent Progress in Carbon Nanotube Research, Book 2, Intech, 2012, pp. 1-30.

Liu, et al., "Recycling Mg(Oh)2 Nanoadsorbent During Treating the Low Concentration of CrVI", Environ. Sci. Technol., 2011, vol. 45, pp. 1955-1961.

Lo, et al., "Characteristics and Adsorption Properties of Iron-Coated Sand", Water Science and Technology, vol. 35, No. 7, 1997, pp. 63-70.

Long, et al., "Carbon Nanotubes as Superior Sorbent for Dioxin Removal", J. Am. Chem. Soc., 2001, vol. 123, pp. 2058-2059.

Lu, et al., "Adsorption of Trihalomethanes From Water With Carbon Nanotubes", Water Research, 2015, vol. 39, pp. 1183-1189.

Lu, et al., "Adsorption Thermodynamic and Kinetic Studies of Trihalomethanes on Multiwalled Carbon Nanotubes", Journal of Hazardous Materials, 2006, vol. B138, pp. 304-310.

Lu, et al., "Mechanisms of MS2 Bacteriophage Removal by Fouled Ultrafiltration Membrane Subjected to Different Cleaning Methods", Environmental Science & Technology, Oct. 31, 2013, vol. 47(23), pp. 13422-13429.

Lu, et al., "Surface Modification of Carbon Nanotubes for Enhancing Btex Adsorption From Aqueous Solutions", Applied Surface Science, Aug. 30, 2008, vol. 254(21), pp. 7035-7041.

Mackay, et al., "Polyfunctional Ionogenic Compound Sorption: Challenges and New Approaches To Advance Predictive Models", Environ. Sci. Technol., vol. 46, 2012, pp. 9209-9223.

Madden, et al., "Insights for Size-dependent Reactivity of Hematite Nanomineral Surfaces Through Cu2+ Sorption", Geochimica et Cosmochimica Acta, 2006, vol. 70, pp. 4095-4104.

Maitra, et al., "Improved graphitization and electrical conductivity of suspended carbon nanofibers derived from carbon nanotube/polyacrylonitrile composites by directed electrospinning", Carbon, vol. 50, 2012, pp. 1753-1761.

Malaeb, et al., "Reverse osmosis technology for water treatment: State of the art review", Desalination, vol. 267, 2011, pp. 1-8.

Manasse, et al., "Arsenic Adsorption on Nanocrystalline Goethite: the Natural Example of Bolar Earths From Mt Amiata (Central Italy)", Environ Geol, 2007, vol. 52, pp. 1365-1374.

Mao, et al., "A Review of Electrospun Carbon Fibers as Electrode Materials for Energy Storage", Current Organic Chemistry, vol. 17, 2013, pp. 1390-1401.

Matamoros, et al., "Organic micropollutant removal in a full-scale surface flow constructed wetland fed with secondary effluent", Water Research, vol. 42, 2008, pp. 653-660.

Matis, et al., "Flotation Removal of as(V) Onto Goethite", Environmental Pollution, 1997, vol. 97, No. 3, pp. 239-245.

(56) References Cited

PUBLICATIONS

Mauter, et al., "Antifouling Ultrafiltration Membranes via Post-Fabrication Grafting of Biocidal Nanomaterials", ACS Applied Materials & Interfaces, Jul. 7, 2011, vol. 3(8), pp. 2861-2868.

Mostafavi, et al., "Preparation of Nanofilter From Carbon Nanotubes for Application In Virus Removal From Water", Desalination, 2009, vol. 238, pp. 271-280.

Nalbandian, et al., "Synthesis and optimization of Fe2O3 nanofibers for chromate adsorption from contaminated water sources", Chemosphere, vol. 144, 2016, pp. 975-981.

Salimbeygi, et al., "Fabrication of polyvinyl alcohol/multi-walled carbon nanotubes composite electrospun nanofibres and their application as microwave absorbing material", Micro & Nano Letters, vol. 8, Iss. 8, 2013, pp. 455-459.

Niu, et al., "Preparation, Structure and Supercapacitance of Bonded Carbon Nanofiber Electrode Materials", Carbon, vol. 49, 2011, pp. 2380-2388.

Nowack, et al., "Potential Scenarios for Nanomaterial Release and Subsequent Alteration in The Environment", Environmental Toxicology and Chemistry, vol. 3, No. 1, 2012, pp. 50-59.

Oleszczuk, et al., "Adsorption and Desorption of Oxytetracycline and Carbamazepine By Multiwalled Carbon Nanotubes", Environ. Sci. Technol., 2009, vol. 43, pp. 9167-9173.

Oulton, et al., "Hydroxyl Radical Formation During Ozonation of Multiwalled Carbon Nanotubes: Performance Optimization and Demonstration of a Reactive Cnt Filter", Environ. Sci. Technol., 2015, vol. 49, pp. 3687-3697.

Padungthon, et al., "Carbon Dioxide Sequestration Through Novel Use of Ion Exchange Fibers (IX-Fibers)", Chemical Engineering Research and Design, vol. 89, 2011, pp. 1891-1900.

Pan, et al., "Adsorption and Hysteresis of Bisphenol a and 17r-ethinyl Estradiol on Carbon Nanomaterials", Environ. Sci. Technol., 2008, vol. 42, pp. 5480-5485.

Park, et al., "Use of Carbon Nanofibers in the Removal of Organic Solvents from Water", Langmuir, Sep. 15, 2000, vol. 16(21), pp. 8050-8056.

Patino, et al., "Adsorption of emerging pollutants on functionalized multiwall carbon nanotubes", Chemosphere, vol. 136, 2015, pp. 174-180.

Peigney, et al., "Specific Surface Area of Carbon Nanotubes and Bundles of Carbon Nanotubes", Carbon, Apr. 2001, vol. 39(4), pp. 507-514.

Pierce, et al., "Adsorption of Arsenite and Arsenate on Amorphous Iron Hydroxide", Water Res., 1982, vol. 16. pp. 1247-1253.

Wang, et al., "Polyacrylonitrile/polyaniline Core/shell Nanofiber Mat for Removal of Hexavalent Chromium From Aqueous Solution: Mechanism and Applications", RSC Advances, Mar 18, 2013, vol. 3, pp. 8978-8987.

Wang, et al., "Preparation of Silver Nanoparticles Dispersed in Polyacrylonitrile Nanofiber Film Spun by Electrospinning", Materials Letters, Jun. 13, 2005, vol. 59(24-25), pp. 3046-3049.

Wang, et al., "Removal of Lead(II) From Aqueous Solution by Adsorption onto Manganese Oxide-coated Carbon Nanotubes", Separation and Purification Technology, vol. 58, 2007, pp. 17-23.

Wang, et al., "Water-soluble Fe3o4 Nanoparticles With High Solubility for Removal of Heavy-metal Ions From Waste Water", Dalton Trans., 2012, vol. 41, pp. 4544-4551.

Waychunas, et al., "Surface Chemistry of Ferrihydrite: Part 1. EXAFS Studies of the Geometry Of Coprecipitated and Adsorbed Arsenate", Geochimica et Cosmochimica Acta, vol. 57, 1993, pp. 2251-2269.

Weber, et al., "The Effect of Blood Onthe Antiviral Activity Of Sodium Hypochlorite, a Phenolic, and a Quaternary Ammonium Compound", Infection Control and Hospital Epidemiology, Dec. 1999, vol. 20(12), pp. 821-827.

Wei, et al., "Regenerable Granular Carbon Nanotubes/alumina Hybrid Adsorbents for Diclofenac Sodium and Carbamazepine Removal From Aqueous Solution", Water research, 2013, vol. 47, pp. 4139-4147.

Wu, et al., "Preparation of novel poly(vinyl alcohol)/SiO2 composite nanofiber membranes with mesostructure and their application for removal of Cu2+ from waste water", Chem. Commun., vol. 46, 2010, pp. 1694-1696.

Wu, et al., "Simultaneous Removal of Coexistent Heavy Metals From Simulated Urban Stormwater Using Four Sorbents: a Porous Iron Sorbent and Its Mixtures With Zeolite and Crystal Gravel", Journal of Hazardous Materials, 2009, vol. 168, pp. 674-680.

Xiao, et al., "Fabrication of Multiwalled Carbon Nanotube-reinforced Electrospun Polymer Nanofibers Containing Zero-valent Iron Nanoparticles for Environmental Applications", Journal of Materials Chemistry, Jun. 3, 2010, 20:5700-5708.

Xiao, et al., "Fabrication of Water-Stable Electrospun Polyacrylic Acid-Based Nanofibrous Mats for Removal of Copper (II) Ions in Aqueous Solution", Journal of Applied Polymer Science, vol. 116, Jan. 14, 2010, pp. 2409-2417.

Xiao, et al., "Immobilization of Zerovalent Iron Nanoparticles into Electrospun Polymer Nanofibers:Synthesis, Characterization, and Potential Environmental Applications", J. Phys. Chem. C , vol. 113, 2009, pp. 18062-18068.

Xie, et al., "Electrospun Nanofibrous Adsorbents for Uranium Extraction From Seawater", Journal of Materials Chemistry A, Nov. 30, 2010, vol. 2(12), pp. 3619-3627.

Xu, et al., "Adsorption Characteristics of a Novel Carbon-nanotube-based Composite Adsorbent Toward Organic Pollutants", Ind. Eng. Chem. Res., 2015, vol. 54, pp. 2379-2384.

Xu, et al., "Biodegradable Electrospun Poly(L-lactide) Fibers Containing Antibacterial Silver Nanoparticles", European Polymer Journal, May 24, 2006, vol. 42(9), pp. 2081-2087.

Xu, et al., "Preparation of hierarchically nanofibrous membrane and its high adaptability in hexavalent chromium removal from water", Chemical Engineering Journal, vol. 198-199, 2012, pp. 301-317.

Yan, et al., "Adsorption and Desorption of Atrazine on Carbon Nanotubes", Journal of Colloid and Interface Science, 2008, vol. 321, pp. 30-38.

Yang, et al., "Adsorption of Polycyclic Aromatic Hydrocarbons by Crabon Nanomaterials", Environ. Sci. Technol., 2006, vol. 40, pp. 1855-1861.

Yang, et al., "Understanding Nano Effects in Catalysis", National Science Review, May 11, 2015, vol. 2(2), pp. 183-201.

Yin, et al., "Review of Modifications of Activated Carbon for Enhancing Contaminant Uptakes From Aqueous Solutions", Separation and Purification Technology, vol. 52, 2007, pp. 403-415.

Yu, et al., "Porous Hierarchically Micro-/nanostructured Mgo: Morphology Control and Their Excellent Performance in as(Iii) and as(V) Removal", J. Phys. Chem. C, 2011, vol. 115, pp. 22242-22250.

Yu, et al., "Synthesis of Monodisperse Iron Oxidenanocrystals by Thermal Decomposition of Iron Carboxylate Salts", Chemical Communications, Sep. 2, 2004, 2 Pages.

Zhang, et al., "Adsorption of Aromatic Compounds by Carbonaceous Adsorbents: A Comparative Study on Granular Activated Carbon, Activated Carbon Fiber, and Carbon Nanotubes", Environ. Sci. Technol., 2010, vol. 44, pp. 6377-6383.

Zhang, et al., "Contribution of Different Sulfamethoxazole Species to Their Overall Adsorption on Functionalized Carbon Nanotubes", Environ. Sci. Technol., 2010, vol. 44, pp. 3806-3811.

Zhang, et al., "The Road for Nanomaterials Industry: A Review of Carbon Nanotube Production, Post-Treatment, and Bulk Applications for Composites and Energy Storage", Small, vol. 9, No. 8, 2013, pp. 1237-1265.

Zodrow, et al. "Polysulfone Ultrafiltration Membranes Impregnated With Silver Nanoparticles Show Improved Biofouling Resistance and Virus Removal", Water Research, vol. 43, 2009, pp. 715-723.

Zuo, et al., "Enhanced Adsorption of Hydroxyl- and Amino-substituted Aromatic Chemicals to Nitrogen-doped Multiwall Carbon Nanotubes: a Combined Batch and Theoretical Calculation Study", Environ. Sci. Technol., 2016, vol. 50, pp. 899-905.

Blumhof, "Removing Nitrates with Ion Exchange", Water Tech Online, Retrieved from 'https://www.watertechonline.com/home/article/15529483/removing-nitrates-with-ion-exchange', Oct. 13, 2010, pp. 1-8.

(56) References Cited

PUBLICATIONS

"Appendix A: Primacy Revision Crosswalk for the Lead and Copper Rule Short Term Revisions", LCR Short-Term Revisions Implementation Guidance—Draft, 2007, 15 pages.

"Appendix B: 2007 Short-Term Revisions Compared to the Lead and Copper Rule", LCR Short-Term Revisions Implementation Guidance—Draft, 2007, 43 pages.

"Point-of-Use/Point-of-Entry Treatment", EPA, 2006 (Retreived from https://cfpub.epa.gov/safewater/arsenic/arsenictradeshow/arsenic. cfm?action=Point-of-Entry#:-:text=Point-of-use), 4 pages.

"Reverse Osmosis Discharge Water", Alliance for Water Efficiency, 2017, 2 Pages.

"The Water-Energy Nexus: Challenges and Opportunities", Available online at: https://www.energy.gov/downloads/water-energy-nexus-challenges-and-opportunities, Jun. 2014, 262 pages.

"Water Sustainability through Nanotechnology: Nanoscale Solutions for a Global-Scale Challenge", NSTC Committee on Technology, Subcommittee on Nanoscale Science, Engineering, and Technology, National Nanotechnology Initiative, Mar. 22, 2016, 12 Pages.

Abdullah, et al., "Polysulfone/Hydrous Ferric Oxide Ultrafiltration Mixed Matrix Membrane: Preparation, Characterization and Its Adsorptive Removal of Lead (II) From Aqueous Solution", Chemical Engineering Journal, vol. 289, 2016, pp. 28-37.

Ahmed, et al., "Global Prevalence of Norovirus in Cases of Gastroenteritis: A Systematic Review and Meta-analysis", The Lancet Infectious Diseases, vol. 14(8), 2014, pp. 725-730.

Aksu, et al., "Batch adsorption of 2,4-dichlorophenoxy-acetic acid (2,4-D) from aqueous solution by granular activated carbon", Separation and Purification Technology, vol. 35, 2004, pp. 223-240.

Ashbolt, "Microbial Contamination of Drinking Water and Human Health from Community Water Systems", Current Environmental Health Reports, vol. 2, Jan. 27, 2015, pp. 95-106.

Aslan, et al., "Fast and Slow Deposition of Silver Nanorods on Planar Surfaces: Application to Metal-enhanced Fluorescence", The Journal of Physical Chemistry B, vol. 109(8), Jan. 28, 2005, 3157-3162.

Ayoob, et al., "Fluoride in Drinking Water: A Review on the Status and Stress Effects", Critical Reviews in Environmental Science and Technology, vol. 36, No. 6, 2006, pp. 433-487.

Baltrusaitis, et al., "Reactions of sulfur dioxide on calcium carbonate single crystal and particle surfaces at the adsorbed water carbonate interface", Phys. Chem. Chem. Phys., vol. 9, 2007, pp. 3011-3024.

Benjamin, et al., "Multiple-Site Adsorption of Cd, Cu, Zn, and Pb on Amorphous Iron Oxyhydroxide", Journal of Colloid and Interface Science, vol. 79, No. 1, Jan. 1981, pp. 209-221.

Blaney, et al., "Hybrid Anion Exchanger for Trace Phosphate Removal From Water and Wastewater", Water Research, vol. 41, 2007, pp. 1603-1613.

Bloor, et al., "EMF Studies Associated with the Binding of Cetyltrimethylammonium Bromide to the Polymers Poly (propylene oxide), Poly(vinylmethylether), and Ethyl(hydroxyethyl) Cellulose", Journal of Colloid and Interface Science 178, Article No. 0121, 1996, pp. 334-338.

Bolong, et al., "A review of the effects of emerging contaminants in wastewater and options for their removal", Desalination, vol. 239, 2009, pp. 229-246.

Boparai, et al., "Kinetics and Thermodynamics of Cadmium Ion Removal by Adsorption Onto Nano Zerovalent Iron Particles", Journal of Hazardous Materials, vol. 186, 2011, pp. 458-465.

Boyd, et al., "Pharmaceuticals and personal care products (PPCPs) in surface and treated waters of Louisiana, USA and Ontario, Canada", The Science of the Total Environment, vol. 311, 2003, pp. 135-149.

Brady-Estevez, et al., "A Single-walled-carbon-nanotube Filter for Removal of Viral and Bacterial Pathogens", small, 2008, vol. 4, No. 4, pp. 481-484.

Bujnakova, et al., "Arsenic Sorption by Nanocrystalline Magnetite: an Example Ofenvironmentally Promising Interface With Geospherez", Journal of Hazardous Materials, 2013, vol. 262, pp. 1204-1212.

Chen, et al., "Adsorption of Polar and Nonpolar Organic Chemicals to Carbon Nanotubes", Environmental Science & Technology, vol. 41(24), Nov. 17, 2007, pp. 8295-8300.

Chen, et al., "Electrospun and Solution Blown Three-dimensional Carbon Fiber Nonwovens for Application as Electrodes in Microbial Fuel Cells", Energy & Environmental Science, vol. 4, 2011, pp. 1417-1421.

Chen, et al., "Kinetic Study on Removal of Copper(II) Using Goethite and Hematite Nano-photocatalysts", Journal of Colloid and Interface Science, vol. 347, 2010, pp. 277-281.

Chen, et al., "Quaternary Ammonium Functionalized Poly(Propylene Imine) Dendrimers as Effective Antimicrobials: Structure-activity Studies", Biomacromolecules, vol. 1(3), Aug. 1, 2000, pp. 473-480.

Chernyshev, "Effect of Nanoparticle Size on the Onset Temperature of Surface Melting", Materials Letters, vol. 63(17) Jul. 15, 2009, pp. 1525-1527.

Choi, et al., "Nanocrystalline Tio2 Photocatalytic Membranes With a Hierarchical Mesoporous Multilayer Structure: Synthesis, Characterization, and Multifunction", Advanced Functional Materials, vol. 16(8), Apr. 10, 2006, pp. 1067-1074.

Clara, et al., "Removal of selected pharmaceuticals, fragrances and endocrine disrupting compounds in a membrane bioreactor and conventional wastewater treatment plants", Water Research, vol. 39, 2005, pp. 4797-4807.

Corwin, et al., "Controlling trace organic contaminants with GAC adsorption", Journal—American Water Works Association, 2012, pp. E36-E47.

Cuervo, et al., "Effect of Carbon Nanofiber Functionalization on the Adsorption Properties of Volatile Organic Compounds", Journal of Chromatography A, vol. 1188(2), Apr. 25, 2008, pp. 264-273.

Cui, et al., "Engineering Interface and Surface of Noble Metal Nanoparticle Nanotubes toward Enhanced Catalytic Activity for Fuel Cell Applications", Accounts of Chemical Research, vol. 46(7), Feb. 20, 2013, pp. 1427-1437.

Dalton, et al., "Continuous Carbon Nanotube Composite Fibers: Properties, Potential Applications, and Problems", Royal Society of Chemistry, vol. 14, Dec. 2, 2003, pp. 1-3.

Deng, et al., "Aminated Polyacrylonitrile Fibers for Lead and Copper Removal", Langmuir, vol. 19, May 15, 2003, pp. 5058-5064.

Dolati, et al., "In Vitro Evaluation of Carbon-Nanotube-reinforced Bioprintable Vascular Conduits", Nanotechnology, vol. 25, No. 145101, 2014, 10 pages.

Domínguez, et al., "Determination of Critical Micelle Concentration of Some Surfactants by Three Techniques", Journal of Chemical Education, vol. 74, No. 10, Oct. 1997, pp. 1227-1231.

Dong, et al., "Simultaneous Adsorption of Lead and Cadmium on MnO2-loaded Resin", Journal of Environmental Sciences, vol. 22, No. 2, 2010, pp. 225-229.

Ebacher, "Sensitivity Analysis of Some Critical Factors Affecting Simulated Intrusion Volumes During a Low Pressure Transient Event in a Full-scale Water Distribution System", Water Research, vol. 46(13), Sep. 1, 2012, pp. 4017-4030.

Fabrega, et al., "Silver Nanoparticle Impact on Bacterial Growth: Effect of pH, Concentration, and Organic Matter", Environ. Sci. Technol., vol. 43, 2009, pp. 7285-7290.

Fan, et al., "Copper and Cadmium Removal by Mn Oxide-coated Granular Activated Carbon", Separation and Purification Technology, vol. 45, 2005, pp. 61-67.

Fan, "Modeling Pb Sorption to Microporous Amorphous Oxides as Discrete Particles and Coatings", Journal of Colloid and Interface Science, 2005, vol. 281, pp. 39-48.

Feng, et al., "Synthesis of Carbon Nanotube/Epoxy Composite Films With A High Nanotube Loading by a Mixed-curing-agent Assisted Layer-by-layer Method and Their Electrical Conductivity", Carbon, vol. 48, 2010, pp. 2057-2062.

Focazio, et al., "A national reconnaissance for pharmaceuticals and other organic wastewater contaminants in the United States—II) Untreated drinking water sources", Science of the Total Environment, vol. 402, 2008, pp. 201-216.

(56) References Cited

PUBLICATIONS

Galdiero, et al., "Silver Nanoparticles as Potential Antiviral Agents", Molecules, vol. 16, 2011, pp. 8894-8918.

Ganser, "Liquidity's New "Naked Filter" Water Bottle Strips Away 99.9999% of Bacteria from any Water Source", PR Web, Mar. 12, 2015, 3 pages.

Gao, et al., "Electrochemical Carbon Nanotube Filter Oxidative Performance as a Function of Surface Chemistry", Environmental Science & Technology, vol. 45, Oct. 3, 2011, pp. 9726-9734.

Gaya, et al., "Heterogeneous Photocatalytic Degradation of Organic Contaminants Over Titanium Dioxide: a Review of Fundamentals, Progress and Problems", Journal of Photochemistry and Photobiology C: Photochemistry Reviews, vol. 9(1), Mar. 18, 2008, pp. 1-12.

Genc-Fuhrman, et al., "Removal of as, Cd, Cr, Cu, Ni and Zn From Polluted Water Using an Iron Based Sorbent", Desalination, 2008, vol. 226, pp. 357-370.

Gerba, et al., "Removal of Poliovirus and Rotavirus From Tapwater by a Quaternary Ammonium Resin", Water Research, vol. 18(1), 1984, pp. 17-19.

Gheju, "Hexavalent Chromium Reduction with Zero-Valent Iron (ZVI) in Aquatic Systems", Water Air Soil Pollut, 2011, vol. 222, pp. 103-148.

Ghorai, et al., "Investigations on the Column Performance of Fluoride Adsorption by Activated Alumina in a Fixed-bed", Chemical Engineering Journal, vol. 98, 2004, pp. 165-173.

\* cited by examiner

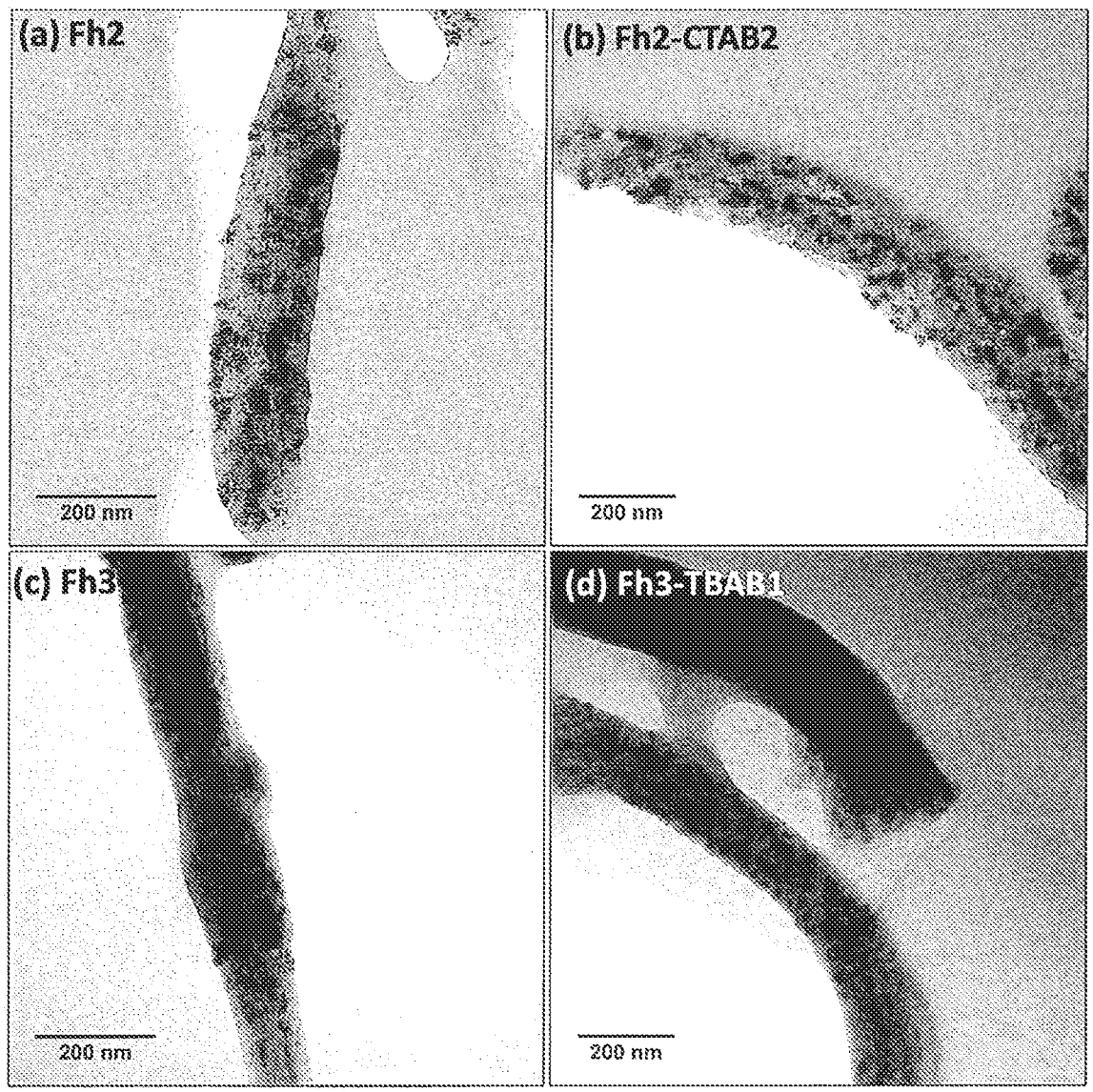
FIG. 43A-D

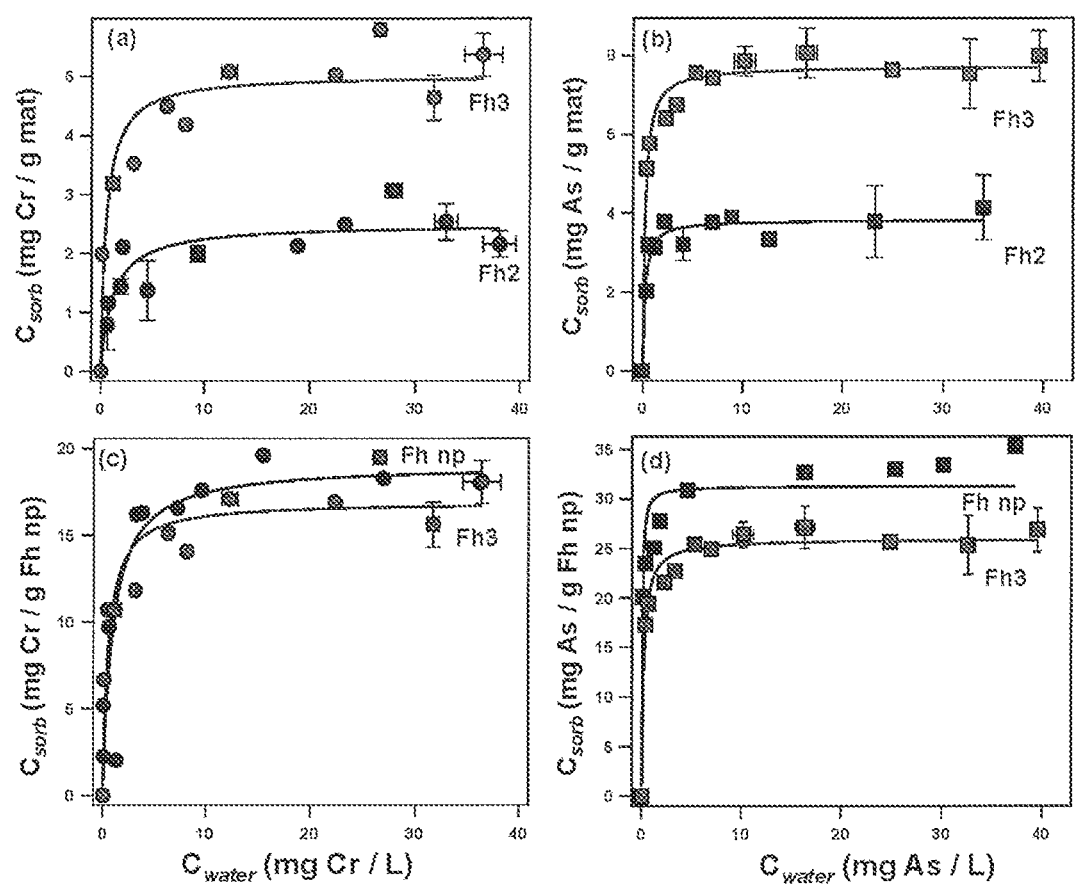
FIG. 44 A-D

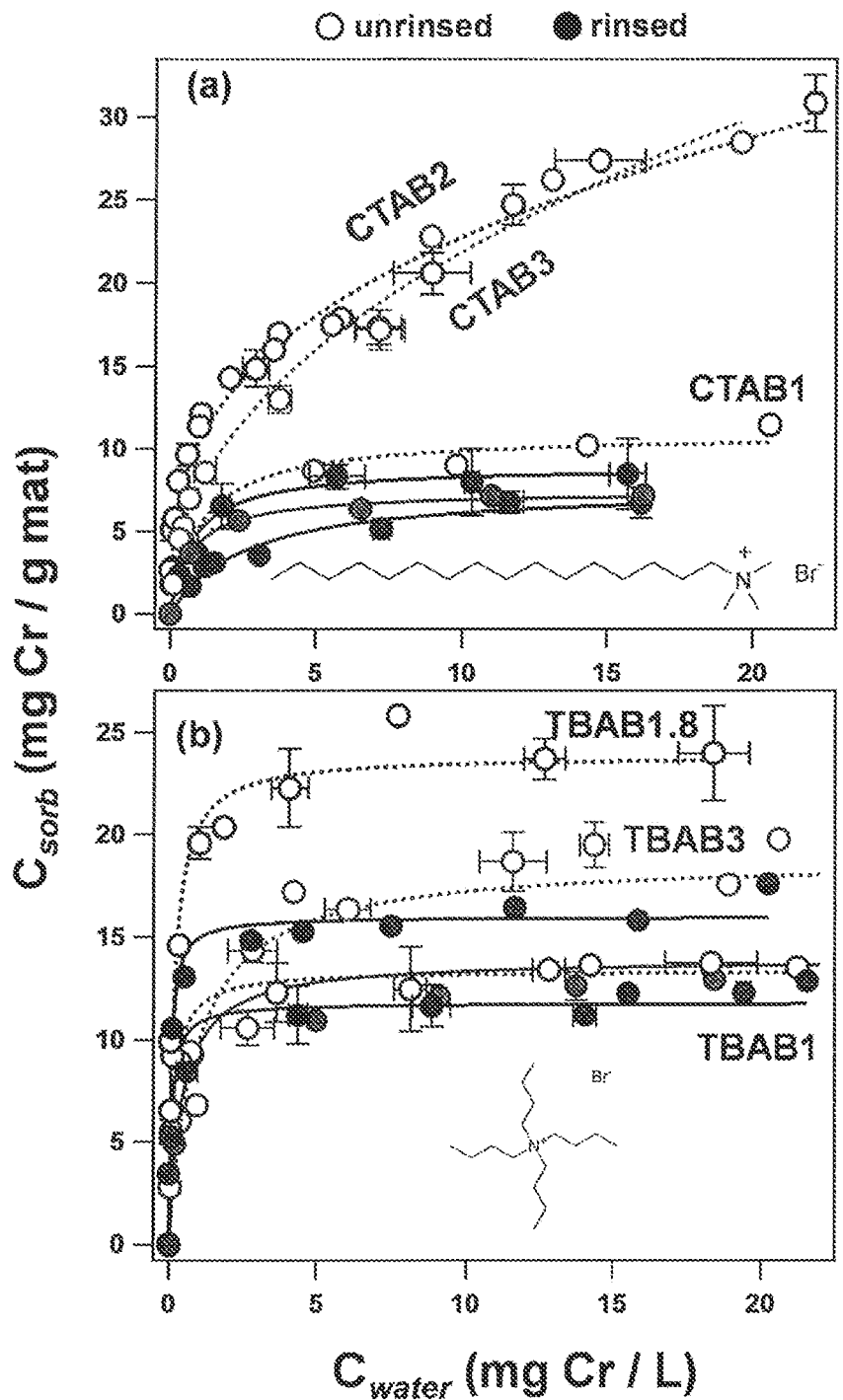
FIG. 45A-B

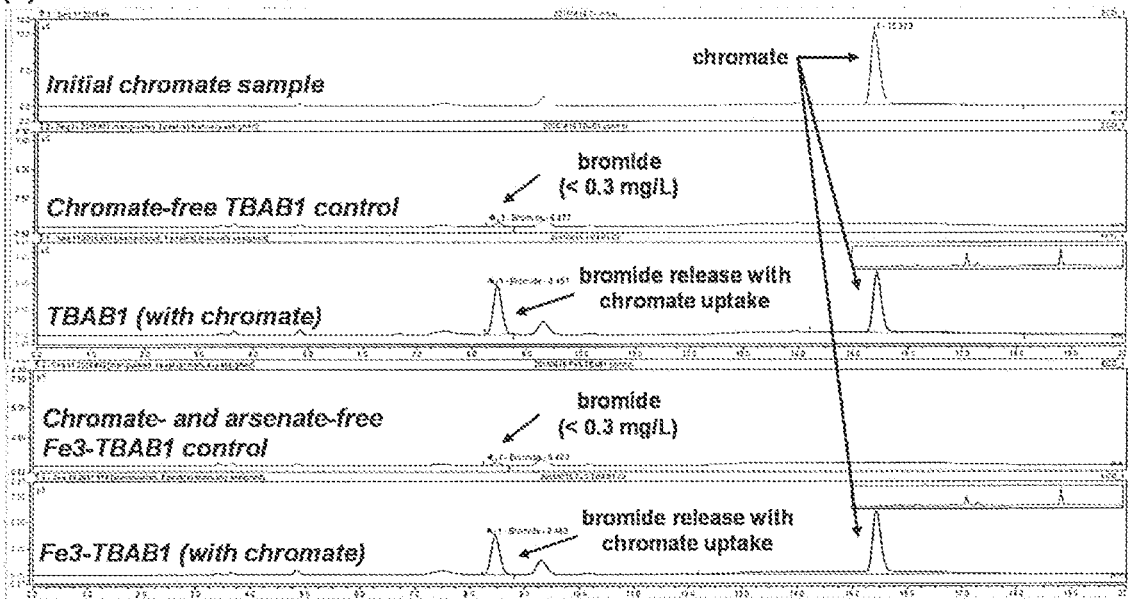
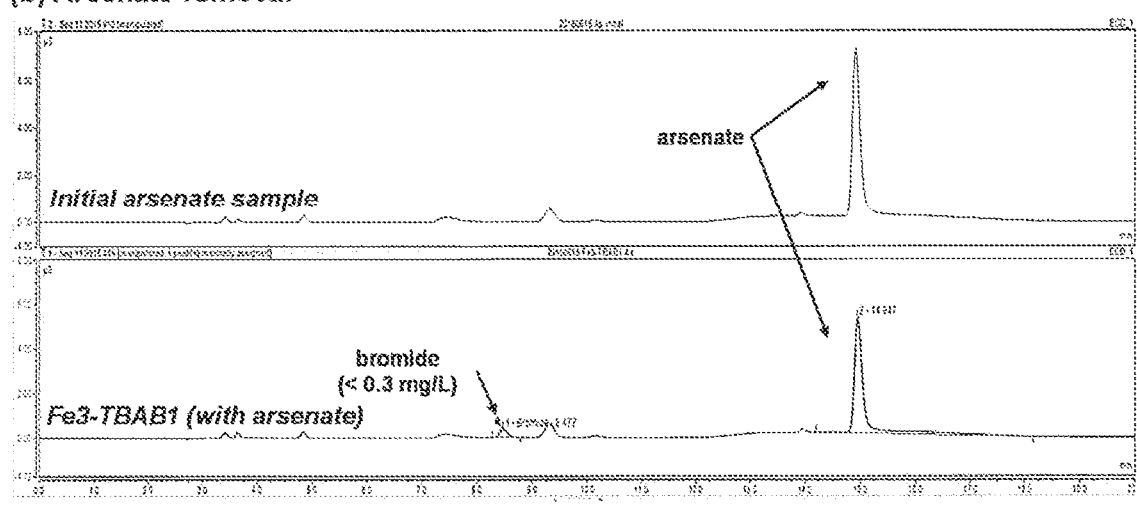
FIG. 46A-B

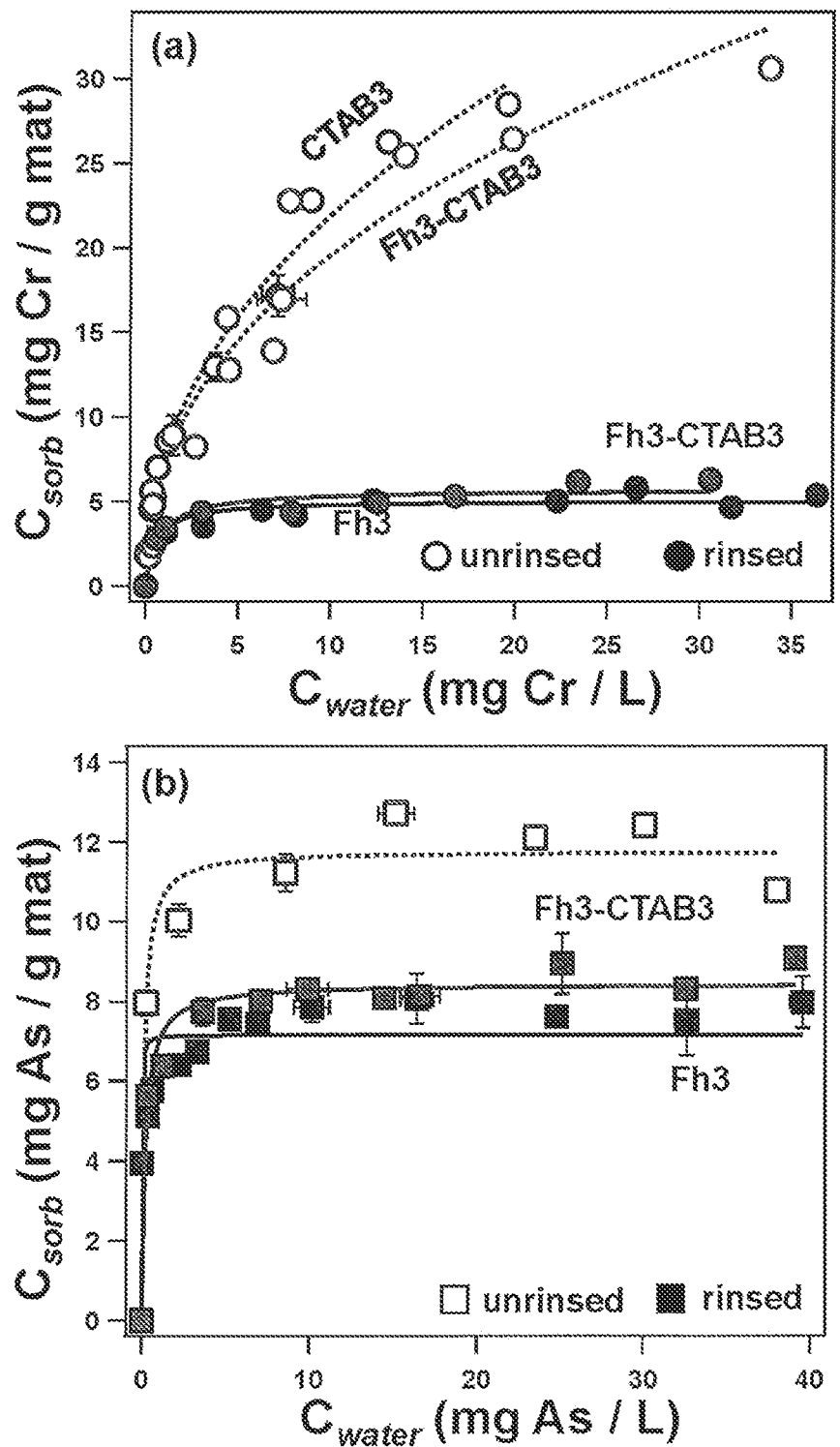
FIG. 47A-B

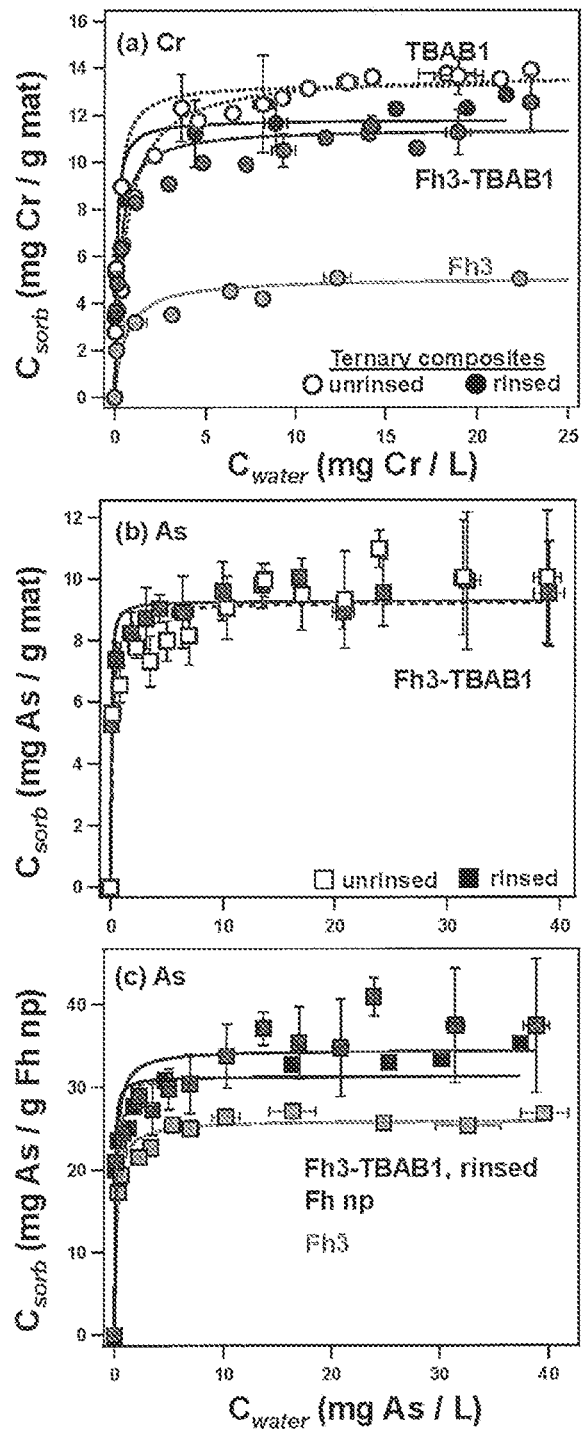
FIG. 48A-C

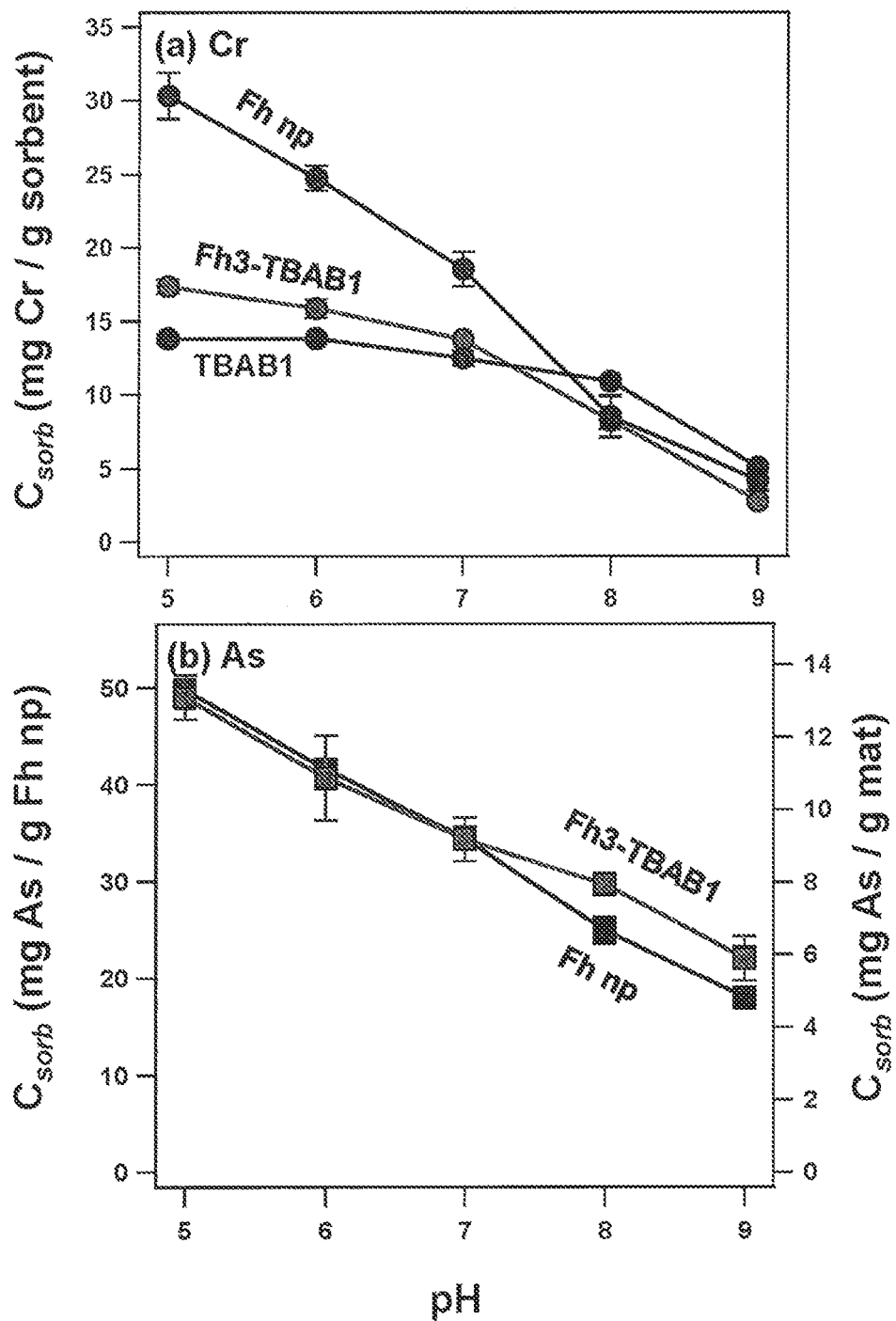
FIG. 49A-B

SURFACTANT-ASSISTED SYNTHESIS OF SURFACE-FUNCTIONALIZED NANOPARTICLE-POLYMER ELECTROSPUN COMPOSITES

CROSS-REFERENCES TO RELATED APPLICATIONS

This application claims priority under 35 U.S.C. § 119(e) to U.S. Provisional Application No. 62/527,941 filed on Jun. 30, 2017, the entire contents of which is incorporated herein by reference.

This invention was made with Government support under Grant No. R83517701, awarded by the Environmental Protection Agency. The Government has certain rights to the invention.

TECHNICAL FIELD

The present disclosure generally relates to surfactant-assisted synthesis of surface-functionalized nanoparticle electrospun composites, and more particularly to a functionalized polymer-metal oxide nanofiber for water treatment, for example, point of use (POU) and point of entry (POE) water treatment of metal cations, for example, lead, copper and cadmium.

BACKGROUND DISCUSSION

Lead, copper, and cadmium present an ongoing challenge for drinking water providers in the United States due to their negative public health effects. Despite corrosion control regulations, lead, copper, and cadmium are routinely released into the finished supply from galvanized, brass, and lead distribution system components. This is evidenced by recent municipal drinking water crises in Washington D.C. and Flint, Mich., as well as by studies revealing elevated lead levels in private drinking water systems across the U.S. While point-of-use (POU) technologies are promising for protecting both municipal and decentralized users, the only currently EPA-approved small system compliance technologies for POU removal of Pb, Cu, and Cd are reverse osmosis and cation exchange. Simple and effective sorption-based technologies, which have limited maintenance requirements and the potential for operation at near-ambient pressures, could fill a crucial gap in POU treatment of heavy metal contamination and provide critical protection to public health.

Nanoscale metal oxide sorbents exhibit high capacities for heavy metals. They provide high external surface area to volume ratios that overcome diffusion limitations of granular materials and allow application within small physical footprints. However, deployment of nano-metal oxides in flow-through systems is limited by high pressure drops and the potential for material release into the treated supply, which could pose threats to human and ecosystem health. Electrospinning is a promising, scalable method to overcome this barrier to application by harnessing the potential of engineered nano-sorbents within mechanically stable, high-flux nanofiber matrices (i.e., reactive membranes). In contrast to microporous composite supports for nanoscale metal oxides (e.g., sand, zeolite, polymer beads, and ion exchange resins), electrospun composites can avoid diffusion-limited rates of removal and the need for deployment in large packed beds.

Existing electrospun metal oxide-polymer composites are typically fabricated by either "hierarchical" or "single-pot" approaches. Hierarchical composites are surface-functionalized with metal oxide nanostructures after electrospinning, often via reductive deposition or hydrothermal methods, and they tend to exhibit a high degree of surface-available reactive sites. However, the multi-step procedure may be difficult to reproduce at industrial scales and requires additional energy and material inputs that may limit sustainability. Single-pot composites eliminate post-processing steps by incorporating nanoparticles into the precursor solution, but effective utilization of the metal oxide may be limited by encapsulation within the support. For example, inclusion of a cationic surfactant can prevent clogging during electrospinning of precursors containing nanoparticles, imparted quaternary ammonium functionalities to the polymer surface, and promoted enrichment of iron oxide nanoparticles at the nanofiber surfaces, such that nanofiber-embedded and freely-dispersed nanoparticles exhibited comparable reactivity per unit mass.

SUMMARY

A mechanically robust and highly reactive water filter is disclosed for treatment of cationic heavy metals (lead, copper, cadmium), using a surface-segregating surfactant to fabricate polymer nanofiber composites with embedded, surface-active iron oxide nanoparticles. The single-pot synthesis integrates commercially-available ~3 nm amorphous iron oxide nanoparticles, sodium dodecyl sulfate (SDS), and polyacrylonitrile (PAN). Characterization suggested the benefits of SDS inclusion are two-fold. During electrospinning, SDS surface-segregation facilitates nanoparticle transport to nanofiber surfaces, thereby enhancing iron oxide surface concentration in the composite. Subsequent rinsing in water leads to SDS release from the polymer; thus, SDS also serves as a removable porogen that enhances composite pore volume. Metal removal performance was evaluated via kinetic, isotherm, and pH-edge sorption experiments, with benchmarks to nanofiber supports (unmodified PAN, SDS-modified PAN) and freely dispersed nanoparticles. SDS-iron oxide nanoparticle synergies enhanced composite mechanical strength and metal uptake capacity. Notably, for the optimal precursor formulation (7 wt % PAN, 2 wt % iron oxide nanoparticles, 1 wt % SDS), embedded nanoparticles exhibited reactivity comparable to that of nanoparticle suspensions. Treatment of lead at drinking water-relevant concentrations (m/L) in a flow-through filtration system revealed that a relatively small amount of material can provide an individual's annual drinking water requirement (~5 g composite/L/day for tap water containing ~300 μg/L Pb), and effective regeneration can be achieved with small volumes of dilute acid (~0.6 L of 0.1N HNO3/g composite). In accordance with an exemplary embodiment, surface-segregating surfactants and porogen-assisted fabrication of electrospun composites can provide the reactivity benefits of nanoparticles within stand-alone, reactive filtration devices.

A method is disclosed for synthesizing nanofilters for water treatment, the method comprising: dispersing an active binding agent in an organic solvent solution to create a suspension of the active binding agent and the solution of the solvent; dissolving an organic polymer resin and an anionic surfactant in the suspension of the active binding agent and the solvent solution to create a sol gel; and electrospinning the sol gel to form electrospun nanofiber composites with embedded, surface-active nanoparticles.

A method is disclosed for synthesizing nanofilters for water treatment, the method comprising: dispersing an active binding agent in an organic solvent solution, such as dimethylformamide (DMF), to create a suspension of the active binding agent and the solution of the DMF; dissolving an organic polymer resin, such as poly-acrylonitrile (PAN), and an anionic surfactant in the suspension of the active binding agent and the solvent solution to create a sol gel; and electrospinning the sol gel to form electrospun nanofiber composites with embedded, surface-active nanoparticles.

An electrospun polyacrylonitrile (PAN) nanofiber composite with embedded, surface-active nanoparticles is disclosed, the PAN nanofiber composite comprising: an active binding agent; dimethylformamide (DMF); poly-acrylonitrile (PAN); and an anionic surfactant.

A method is disclosed for removing metal contaminations from a source of water, the method comprising: exposing a source of water to electrospun polyacrylonitrile (PAN) nanofiber composites with embedded, surface-active nanoparticles.

BRIEF DESCRIPTION OF THE DRAWINGS

FIGS. 43A-43D are representative TEM images of (a) Fh2, (b) Fh2-CTAB2, (c) Fh3, and (d) Fh3-TBAB1 composites, embedded in LR White resin (Ted Pella, Inc.). No difference in nanoparticle dispersion is discernable between binary PAN-Fh composites and ternary PAN-Fh-QAS materials.

FIGS. 44A-44D are sorption isotherms for uptake of (a,c) chromate and (b,d) arsenate, showing effect of Fh loading in binary PAN-Fh composites and a comparison to performance of freely dispersed Fh nanoparticles. Isotherms in (a) and (b) are normalized to the composite mass, while isotherms in (c) and (d) are normalized to the Fh nanoparticle mass (based on total Fh mass added to the precursor solution, for the Fh3 composite). Solid lines represent fits to the Langmuir adsorption model. Conditions: 0.5 g/L nanofiber loading, 0.2 g/L Fh nanoparticle loading, 10 mM HEPES buffer at pH 7.

FIGS. 45A-45B are sorption isotherms for uptake of chromate, showing effect of (a) CTAB loading and (b) TBAB loading in unrinsed (open symbols, dashed lines) and rinsed (filled symbols, solid lines) binary PAN-QAS composites. The molecular structures of CTAB and TBAB are shown as insets. Model fits are to the Langmuir adsorption model for all composites except CTAB2 and CTAB3, which are to the Freundlich adsorption model. Conditions: 0.5 g/L nanofiber loading, 10 mM HEPES buffer at pH 7.

FIGS. 46A-46B are ion chromatographs for bromide release experiments (a) Chromatographs for chromate removal experiments are shown for (i) the initial sample (containing only chromate), (ii) chromate-free controls with rinsed TBAB1 and rinsed Fe3-TBAB1 (the latter also serves as an arsenate-free control), which show negligible (<0.3 mg/L Br), and (iii) concurrent bromide release (at a molar ratio of ~1:3 Br:Cr) during chromate uptake on rinsed TBAB1 and rinsed Fe3-TBAB1 composites. (b) Chromatographs for arsenate removal experiments are shown for (i) the initial sample (containing only chromate) and (ii) negligible bromide release during arsenate uptake on a rinsed Fe3-TBAB1 composite. Results confirm retention of TBAB in the rinsed TBAB1 composite matrix, and the ion exchange mechanism for chromate uptake.

FIGS. 47A-47B are sorption isotherms for (a) chromate and (b) arsenate removal on unrinsed and rinsed ternary Fh3-CTAB3 composites, normalized to composite mass and shown relative to capacities of binary CTAB3 and Fh3 materials. Conditions: 0.5 g/L composite loading, 10 mM HEPES at pH 7.

FIGS. 48A-48C are sorption isotherms for uptake of (a) chromate and (b,c) arsenate by ternary Fh3-TBAB1 composites, relative to binary composites and dispersed Fh nanoparticles. For QAS-containing composites, unrinsed materials are shown with open symbols and dashed lines, and rinsed materials are shown with filled symbols and solid lines. Model fits are to the Langmuir adsorption model. Conditions: 0.5 g/L nanofiber loading, 0.2 g/L Fh nanoparticle loading, 10 mM HEPES buffer at pH 7.

FIGS. 49A-49B illustrate pH-dependent uptake of (a) chromate and (b) arsenate on ternary Fh3-TBAB1, with comparisons to binary TBAB1 and dispersed Fh nanoparticles. (a) Chromate uptake is normalized to the total mass of sorbent. (b) Arsenate uptake is normalized to Fh nanoparticle mass on the left y-axis, with a scale for the mat normalized capacity of Fh3 TBAB1 provided on the right y-axis for reference. Conditions: 0.5 g/L composite loading, 0.2 g/L Fh nanoparticle loading, 10 mM buffer (MES for pH 5 and 6; HEPES for pH 7 and 8; AMPSO for pH 9), initial concentrations 20 mg/L Cr or As.

DETAILED DESCRIPTION

Figure 1:
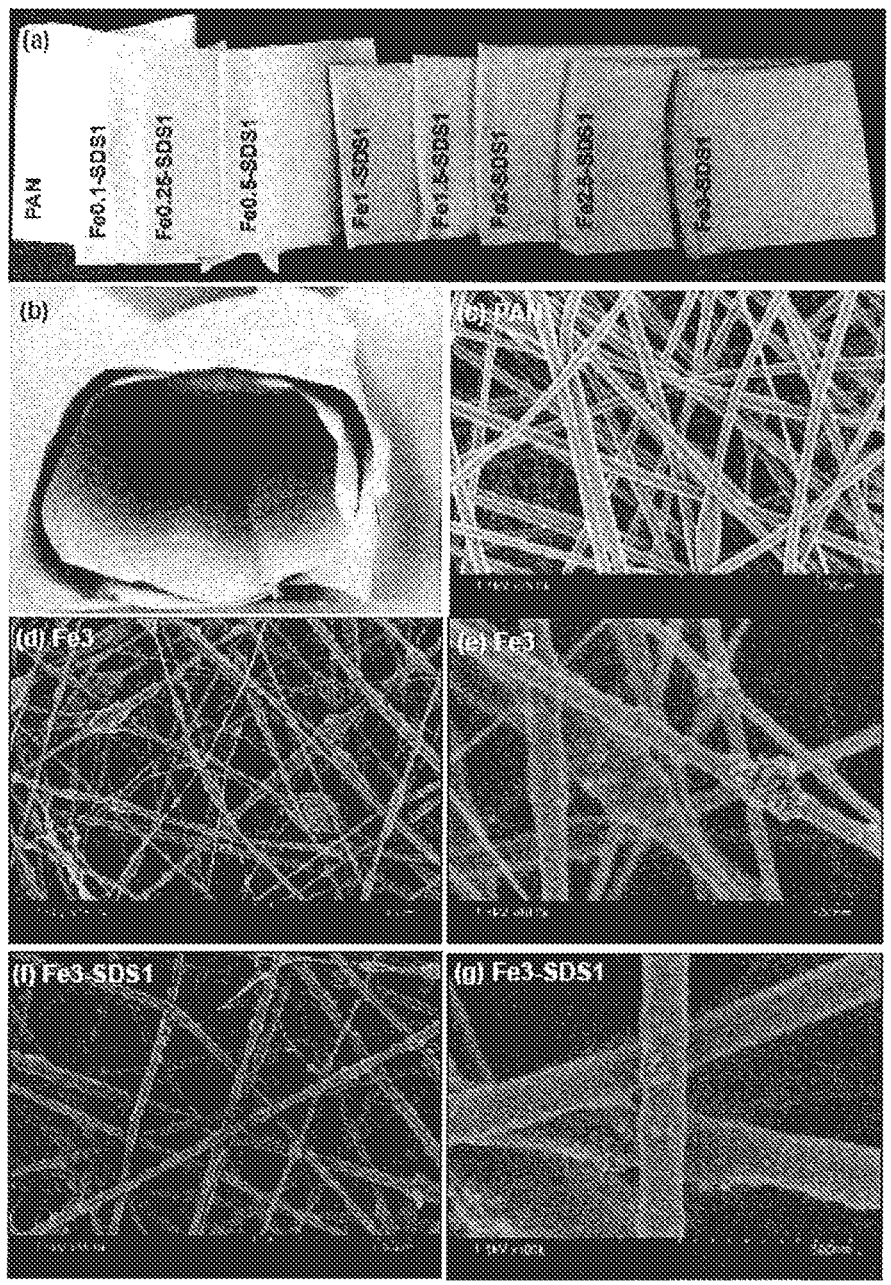
FIGS. 1A-1G shows digital images showing (a) the effect of increasing Fe2O3 nanoparticle loading on PANFe2O3-SDS composites relative to unmodified PAN and (b) flexibility of a representative composite. Representative SEM images of (c) unmodified PAN, (d and e) Fe3, and (f and g) Fe3-SDS1.

Herein, a "single-pot" electrospun organic polymer resin composite with surface-active nanoparticles is disclosed. In some embodiments, the nanoparticles can comprise iron oxide nanoparticles. In some embodiments, the nanoparticles can comprise silver nanoparticles. In some embodiments, the organic polymer resin can comprise polyacrylonitrile (PAN). Some composites can be intended for removal of Pb, Cu, and Cd. Some composites can be intended to be used for their biocidal and/or virucidal activities, such as inactivation of viruses like the MS2 bacteriophage. In some embodiments, the active binding agent in this composite can be an amorphous iron oxide nanoparticle (~3 nm $Fe_2O_3$; Alfa Aesar), chosen for its small size, high surface area, and commercial availability. In some embodiments, silver nanoparticles can be the active bonding agent (~20 nm Ag np; Nanostructured and Amorphous Materials). An anionic surfactant, sodium dodecyl sulfate (SDS), was also incorporated. SDS was selected for its charged head group, which is identical to that in common strong acid ion exchange resins; its demonstrated utility as a removable "porogen" to promote surface area in electrospun composites; and its potential, as an amphiphilic surfactant, to surface segregate within electrospun nanofibers (i.e., preferentially move to the polymer—air/water interface during synthesis). Thus, interactions between SDS and iron oxide nanoparticles may both improve ease of fabrication (i.e., electrospinnability) of the composite precursor solution and promote surface enrichment of the embedded nanoparticles. In some embodiments, tetrabutylammonium bromide (TBAB) can also be incorporated.

After fabrication, nanofiber morphology, surface area, and surface chemical composition across varied nanoparticle and surfactant loadings to determine the role(s) of SDS as a removable porogen and promoter of nanoparticle surface segregation were accessed. We quantified material capacities for Cu, Pb, and Cd uptake, with SDS-containing composites evaluated both before and after rinsing to facilitate SDS removal. Performance was benchmarked to polymer nanofiber supports (unmodified PAN and SDS-modified PAN) and to freely dispersed iron oxide nanoparticles. Our goal was to establish the contribution of the embedded nanoparticles to the composite's overall uptake capacity while also optimizing the "activity" of embedded nanoparticles as sorbents relative to unsupported nanoparticles (i.e., nanoparticle suspensions).

Practical demonstrations included batch kinetic and pH-edge experiments, composite application for arsenate removal, and flow-through treatment of influents with varied water qualities at Pb concentrations (e.g., µg/L) relevant to drinking water. Collectively, we provide evidence that SDS inclusion enhances composite porosity and promotes surface segregation of iron oxide nanoparticles. Importantly, relative to their freely dispersed counterparts, the immobilized iron oxide nanoparticles exhibit no loss in reactivity for Pb, Cu, and Cd removal. This represents a key advance towards the facile synthesis and viable application of reactive nanoparticle composites in practical POU drinking water treatment units.

EXPERIMENTAL

Reagents.

A complete list of reagents is provided in the Electronic Supplementary Information (ESI).

Electrospinning.

Amorphous $Fe_2O_3$ nanoparticles (~3 nm) were purchased from Alfa Aesar and used as received. For $Fe_2O_3$ nanoparticle-embedded nanofiber mats, nanoparticles were dispersed in DMF via sonication for 5 h at 0.1-3 wt % relative to the total sol gel mass. PAN and SDS were dissolved in DMF or $Fe_2O_3$ nanoparticle-DMF suspensions at 7 wt % PAN and 0-3 wt % surfactant (60° C., 2 h, 1.65 g; HLC Cooling-Thermomixer MKR 13, Ditabis). Hereafter, composite mats are referred to as 'Fex-SDSy' where x and y denote $Fe_2O_3$ nanoparticle and SDS loadings, respectively.

Most composites containing SDS utilized a 1 wt % concentration, as we observed no improvement in Cu removal capacity with at higher loadings (3 wt %) for PAN-$Fe_2O_3$-SDS composites (e.g., Fe3-SDS1 vs. Fe3-SDS3). Sol gels were returned to room temperature prior to electrospinning for a duration of ~8 h (additional details are in the SI).

Nanofiber Characterization.

Composite morphology was investigated using scanning electron microscopy (SEM), with average nanofiber diameters calculated via measurement of at least 100 individual nanofibers in collected images using ImageJ® software (National Institutes of Health). Cross-sections of composite mats, including individual nanofibers, were investigated using transmission electron microscopy (TEM). Specific surface areas and pore volumes were determined by $N_2$-BET analysis. Surface chemical composition was analyzed with X-ray photoelectron spectroscopy (XPS) by collection of full spectrum survey scans and Fe 2p region scans at two distinct points on composite surfaces. XPS scans represent an average across several nanofibers; the analytical area is on the order of ~10 μm while nanofiber diameters were on the order of ~100 nm. Possible precipitation of metal targets on composites during uptake was analyzed with XPS and X-ray diffraction (XRD). Complete instrumentation details and characterization protocols, including sample preparation, are available in the SI.

Based on protocols in disclosed herein, the "surface-available iron" in composites (operationally defined as the iron readily accessible at the composite-solution interface) was assessed by measuring the rate of soluble iron dissolution from $Fe_2O_3$-containing composites in dilute acid (0.1 N $H_2SO_4$; 0.25 g/L mat). Dissolution reactors were well-mixed on a rotator (Cole-Palmer Roto-Torque), with 1 mL samples taken over a 2 h period for colorimetric analysis of dissolved iron accordingly to our established protocols. To determine "total available iron," composites were placed in strong acid (5 N $H_2SO_4$; 0.25 g/L mat) for 24 h. A similar approach was used to quantify the total iron content of $Fe_2O_3$-containing composites (5 N $H_2SO_4$; 0.125 g/L nanoparticles). Generally, this experimentally measured total iron content was within ~5% of the theoretical (expected) total Fe content calculated using the precursor solution $Fe_2O_3$ nanoparticle loading and the nanoparticle iron content. For simplicity, therefore, theoretical $Fe_2O_3$ nanoparticle loading [as mg $Fe_2O_3$ nanoparticles/g mat or as wt % $Fe_2O_3$ nanoparticles (relative to total sol gel mass)] is used herein as a metric of composite iron content.

Batch Sorption Experiments.

All batch experiments used a fixed sorbent loading (0.5 g/L nanofiber mats, ~4 cm² piece of composite; 0.2 g/L $Fe_2O_3$ nanoparticles). For sorbents, composites containing SDS were evaluated both as fabricated and after extensive rinsing to assess the stability and influence of SDS on performance. Sorption isotherm experiments were performed in well-mixed 20 mL glass vials sealed with butyl rubber stoppers (for Cu) or 15 mL polypropylene centrifuge tubes sealed with polypropylene screw caps (for Pb, Cd). Sorption isotherms were evaluated over 24 h, which was sufficient to achieve equilibrium, with varied concentrations (from 2-120 mg/L) of Pb, Cu, or Cd at pH 6 or 7 (buffered by MES or HEPES, respectively; metal solutions prepared with $Pb(NO_3)_2$, $CuCl_2 \cdot 2H_2O$, or $Cd(NO_3)_2$). Sorption isotherms used data collected with at least two batches of nanofibers and were modeled with the Langmuir isotherm model [$C_{sorbed}=q_{max} \cdot K_L \cdot C_{aq}/(1+K_L \cdot C_{aq})$, where $q_{max}$ is the maximum sorption capacity at equilibrium and $K_L$ is the Langmuir adsorption constant] in IGOR Pro (WaveMetrics, Inc., Lake Oswego, Oreg.). For controls, all metal concentrations were stable in reactors without any sorbent.

Kinetic and pH edge experiments were performed with pre-rinsed composites. Kinetic experiments monitored decreases in concentration over time for excess (10 mg/L) or drinking water-relevant (300 μg/L Pb, 3 mg/L Cu, and 50 μg/L Cd) concentrations. pH-edge experiments were conducted from pH 5.5 to pH 9 (buffered by 10 mM MES, HEPES, or AMPSO) and used 10 mg/L initial concentrations.

Performance Testing in Flow-Through Systems.

Optimal composites (based on batch performance and qualitative material strength evaluations) were evaluated in a dead-end, flow-through filtration system representative of POU treatment. The filter housing (TAMI Industries, France) had an outer diameter of 47 mm and an active filtration area of 12.6 cm² (40 mm diameter). Filters were ~240 mg (~170 mg within the active area) and were supported on a 47 mm, 0.65 μm PVDF disk filter (DVPP4700; Durapore). To achieve a flux of ~950 LMH, influent containing 120 or 300 μg/L Pb was continuously dosed at 20 mL/min by a peristaltic pump (Masterflex L/S Precision Modular Drive 6-600 rpm; Cole-Parmer). Filters were pre-conditioned (i.e., rinsed) with 0.5 L deionized water. During treatment, the last 10 mL of each 100 mL of effluent was collected for subsequent dissolved metals analysis. The influent matrix was idealized (10 mM MES, pH 6) or representative of real drinking water (University of Iowa tap water, pH 9.9). Filters were operated for 5-12 L of influent, with passage of 0.2 L of regeneration solution (0.1 N $HNO_3$; collection of each 10 mL aliquot) between treatment runs to test reuse and filter operational lifetime.

Analytical Methods.

Samples containing $Fe_2O_3$ nanoparticles were centrifuged at 8,000 g for 30 minutes prior to analysis of the supernatant. Samples for metals analysis were acidified to 2% $HNO_3$ and filtered (0.45 μm Nylon) prior to analysis via inductively coupled plasma optical emission spectroscopy (Perkin Elmer Optima 7000 DC ICP-OES) after calibration (single-element Cu, Pb, and Cd standards; Inorganic Ventures, Inc.). Soluble iron concentration was quantified via the phenanthroline colorimetric method (see ESI for additional details).

Material Characterization

Nanofiber Appearance and Morphology.

Optical images of the composites (FIG. 1A) revealed an increasingly darker orange tint as $Fe_2O_3$ nanoparticle loading increased. At the macro-scale, composites were akin to fabric, being flexible and easily manipulated (FIG. 1B). Relative to unmodified PAN nanofiber mat, we observed moderate differences in nanofiber diameter upon inclusion of $Fe_2O_3$ nanoparticles and SDS. In materials containing only $Fe_2O_3$ nanoparticles (i.e., hereafter PAN-$Fe_2O_3$ composites), inclusion of 3 wt % $Fe_2O_3$ nanoparticles yielded a slight, albeit not statistically significant, decrease in average diameter (100±50 nm for Fe3 versus 120±40 nm for PAN), which is likely due to increased sol gel conductivity. Inclusion of 1 wt % SDS increased average diameter to 170±30 nm, an effect previously attributed to increased sol gel viscosity. Composites containing $Fe_2O_3$ nanoparticles and 1 wt % SDS (i.e., hereafter PAN-$Fe_2O_3$-SDS composites) had nanofiber diameters comparable to that of SDS1.

Relative to the smooth unmodified PAN nanofiber surfaces (FIG. 1C), the rough nanofiber surfaces of $Fe_2O_3$-containing nanofibers suggested that nanoparticle aggregates were at or near the polymer surface (FIG. 1D). Composites with 2 and 3 wt % $Fe_2O_3$ nanoparticle loadings exhibited significant beading (FIG. 1D) and were noticeably weaker than Fe1 and SDS-containing materials; for example, they were noticeably thinner and more easily torn during handling. Integration of SDS with $Fe_2O_3$ nanoparticles improved nanofiber uniformity, as well as bulk mechanical durability. Beading was also eliminated due to an increase in the net charge density of the sol gel, which improves polymer stretching during electrospinning (FIG. 1F).

BET surface area and pore volume of nanofibers.

Figure 2:
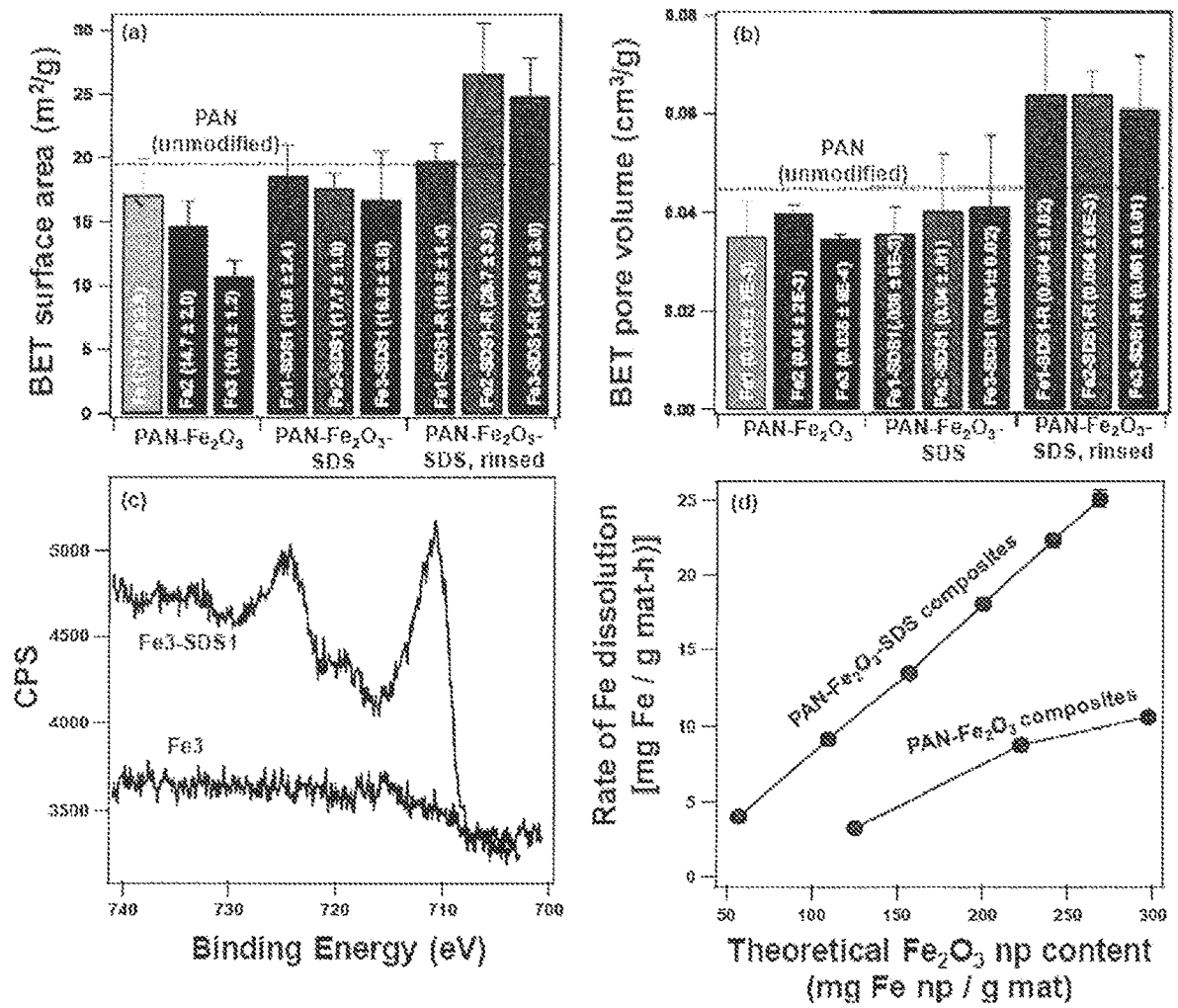
FIGS. 2A-2D show characterization of nanofiber composites. (a) BET surface areas and (b) BET pore volumes of PAN-Fe2O3, PAN-Fe2O3-SDS, and rinsed PAN-Fe2O3-SDS composites compared to that of unmodified PAN (shown as dashed red line). (c) XPS spectra of the Fe 2p region for Fe3 (black) and Fe3-SDS1 (blue) composites. (d) Rates of iron dissolution in dilute acid (0.1 N H2SO4, 0.25 g/L mass loading) for PAN-Fe2O3-SDS composites (red) and PAN-Fe2O3 composites (black) [as mg Fe/(g mat-h)]. Data are plotted against the theoretical iron content of all composites (as mg Fe2O3 np/g mat, based on Fe2O3 nanoparticle loading of the composite material).

Specific surface areas and pore volumes from N2-BET analysis for various composites are shown relative to those of unmodified PAN (18.8±0.3 m2/g and 0.045±0.005 cm3/g) in FIG. 2. SDS-containing composites were rinsed extensively to remove the surfactant (hereafter such rinsed materials include an '-R' after their name, such as SDS1-R). The surface areas (and pore volumes) of SDS1 and SDS1-R, which are not shown, were 16.9±4.2 $m^2/g$ (0.045±0.007 $cm^3/g$) and 18.2±1.7 $m^2/g$ (0.07±0.01 $cm^3/g$), respectively. The larger pore volume of SDS1-R relative to SDS1 and PAN is consistent with porosity induced by surfactant removal, although this increase did not affect the material's specific surface area.

For materials containing $Fe_2O_3$ nanoparticles, trends in surface area and pore volume helped further elucidate the role of SDS. For PAN-$Fe_2O_3$ composites, while pore volumes were comparable to that of unmodified PAN and independent of $Fe_2O_3$ content, BET surface area decreased with increasing $Fe_2O_3$ nanoparticle loading. This is counter to expectations from the slight decrease we observed in nanofiber diameter with increasing $Fe_2O_3$ content. We speculate that surface area losses for Fe2 and Fe3 nanofibers are likely due to the beading observed in SEM images. Upon integration of SDS, all PAN-$Fe_2O_3$-SDS composites had surface areas and pore volumes comparable to that of unmodified PAN. However, rinsing of all PAN-$Fe_2O_3$-SDS composites produced increases in pore volume comparable to that observed upon rinsing SDS1 and consistent with SDS acting as a porogen. While the surface area of Fe1-SDS1 was minimally affected by rinsing, significant increases in surface area were observed for composites containing ≥2 wt % $Fe_2O_3$ nanoparticles. It appears, therefore, that interactions between $Fe_2O_3$ nanoparticles and SDS at these higher loadings influences pore formation in the composite. Although the nature of these interactions is not fully understood, we speculate that the $Fe_2O_3$ surface may promote (or hinder) SDS micelle formation, in turn altering the size and shape of the pore produced via loss of SDS during rinsing.

Surface and Bulk Availability of Iron Oxide in Nanofiber Composites.

FIG. 2c compares representative spectra of the Fe 2p region for Fe3 and Fe3-SDS1. We note that materials containing 1 and 2 wt % $Fe_2O_3$ nanoparticles produced low Fe signal intensities that prohibited conclusive interpretation of Fe surface enhancement.

For composites containing 3 wt % $Fe_2O_3$ nanoparticles, XPS spectra in the Fe 2p region indicate a clear and significant increase in Fe surface concentration for Fe3-SDS1 relative to Fe3 (from survey scans, ~2 at % Fe for Fe3-SDS1 versus a value below the limit of quantification for surface Fe for Fe3). These data support the surface enrichment of $Fe_2O_3$ nanoparticles when used in tandem with SDS, a phenomenon we previously observed for PAN composites containing cationic surfactants and ferrihydrite nanoparticles. We attribute this effect to nanoparticle-SDS interactions; surface segregation of SDS during electrospinning helps "pull" $Fe_2O_3$ nanoparticles to the nanofiber surface. Prior reports have observed interactions of SDS with iron oxide surfaces. Others have observed surface segregation of surfactants in hydrophilic polymer matrices, where migration of the hydrophobic chain to the polymer surface would minimize free energy. These two processes work in complement to achieve surfactant-assisted surface segregation of Fe2O3 nanoparticles during our single-pot composite synthesis.

To further explore the ability of SDS to enrich the concentration of $Fe_2O_3$ nanoparticles on the nanofiber surface, we measured the rate of iron dissolution in dilute acid from PAN-$Fe_2O_3$-SDS composites (0.5-3 wt % $Fe_2O_3$ nanoparticles with 1 wt % SDS) and their corresponding PAN-$Fe_2O_3$ analogs (1-3 wt % $Fe_2O_3$ nanoparticles). Rate constants for iron dissolution [in mg Fe/(g mat-h), assuming initially linear changes in soluble iron concentration over time] are plotted as a function of theoretical $Fe_2O_3$ nanoparticle content in FIG. 2D. At all nanoparticle loadings, the rate of iron release was faster for PAN-$Fe_2O_3$-SDS composites than their PAN-$Fe_2O_3$ analogs. Further, with increasing nanoparticle loading, we observed diminishing improvements in the rate of iron release for PAN-$Fe_2O_3$ composites. In contrast, the rate of iron release from PAN-$Fe_2O_3$-SDS materials scaled linearly across the range of nanoparticle contents. Even at relatively high nanoparticle loadings up to 3 wt %, the inclusion of 1 wt % SDS was still able to promote the accessibility of embedded nanoparticles to solution, presumably through surface enrichment. However, cross-sectional images of nanofibers acquired with TEM failed to reveal any obvious differences in nanoparticle distribution (or aggregation state) within the polymer matrix of Fe3 and Fe3-SDS1 composites. Thus, we attribute improved solution phase accessibility of the iron oxide in PAN-$Fe_2O_3$-SDS composites to a combination of improved nanofiber uniformity (e.g., consistent surface area across nanoparticle loadings) and the surfactant-assisted surface segregation of $Fe_2O_3$ nanoparticles.

Performance Evaluation: Batch Removal of Cu, Pb, and Cd

To ensure metal solubility, minimize precipitation, and observe sufficient uptake to evaluate trends within the pH range relevant to drinking water, nanofiber sorbents and unsupported (freely dispersed) $Fe_2O_3$ nanoparticles were evaluated at pH 6 for removal of Cu and Pb and at pH 7 for removal of Cd. At these pH values, the dominant dissolved species are $Cu^{2+}$, $Pb^{2+}$, and $Cd^{2+}$ ions. Although isotherms were best described by the Langmuir model, which assumes reversible sorption, we observed partial to near-complete irreversibility on nanofiber sorbents. Isotherms thus represent a "Langmuir-type" dependence of sorbed metals on dissolved metal concentrations at equilibrium.

We analyzed a representative material (Fe2-SDS1-R) after sorption of Cu, Pb, or Cd with XRD and XPS to determine if metal surface precipitation was contributing to uptake. XRD analysis of dried samples suggested precipitation of all targets due to appearance of new diffraction lines not observed on a control material (e.g., Fe2-SDS1-R exposed to a solution without metals). Unfortunately, the corresponding lattice spacings were not characteristic of any known oxides or hydroxides. Additional characterization with XPS revealed the Cu 2p signal to be insufficient to determine its surface chemical state. Likewise, features from the Cd 3d region were inconclusive, as negligible binding energy shifts are expected for different Cd species including surface solid phases. A shift in the Pb 4f region of the XPS spectra to higher binding energies (137.7 eV, relative to 137.0 eV for Pb) is consistent with co-precipitation of lead oxide. However, sample drying and the ultra-high vacuum (UHV) conditions of XPS analysis may have altered the surface chemistry of the reacted material. Although these characterization results are suggestive of co-precipitation, we note that we did not observe any corresponding changes to isotherm shape to suggest multi-layer precipitation. We therefore conclude that co-precipitation is likely only a minor contributor to uptake.

PAN-SDS and PAN-$Fe_2O_3$ Composites.

Figure 3:
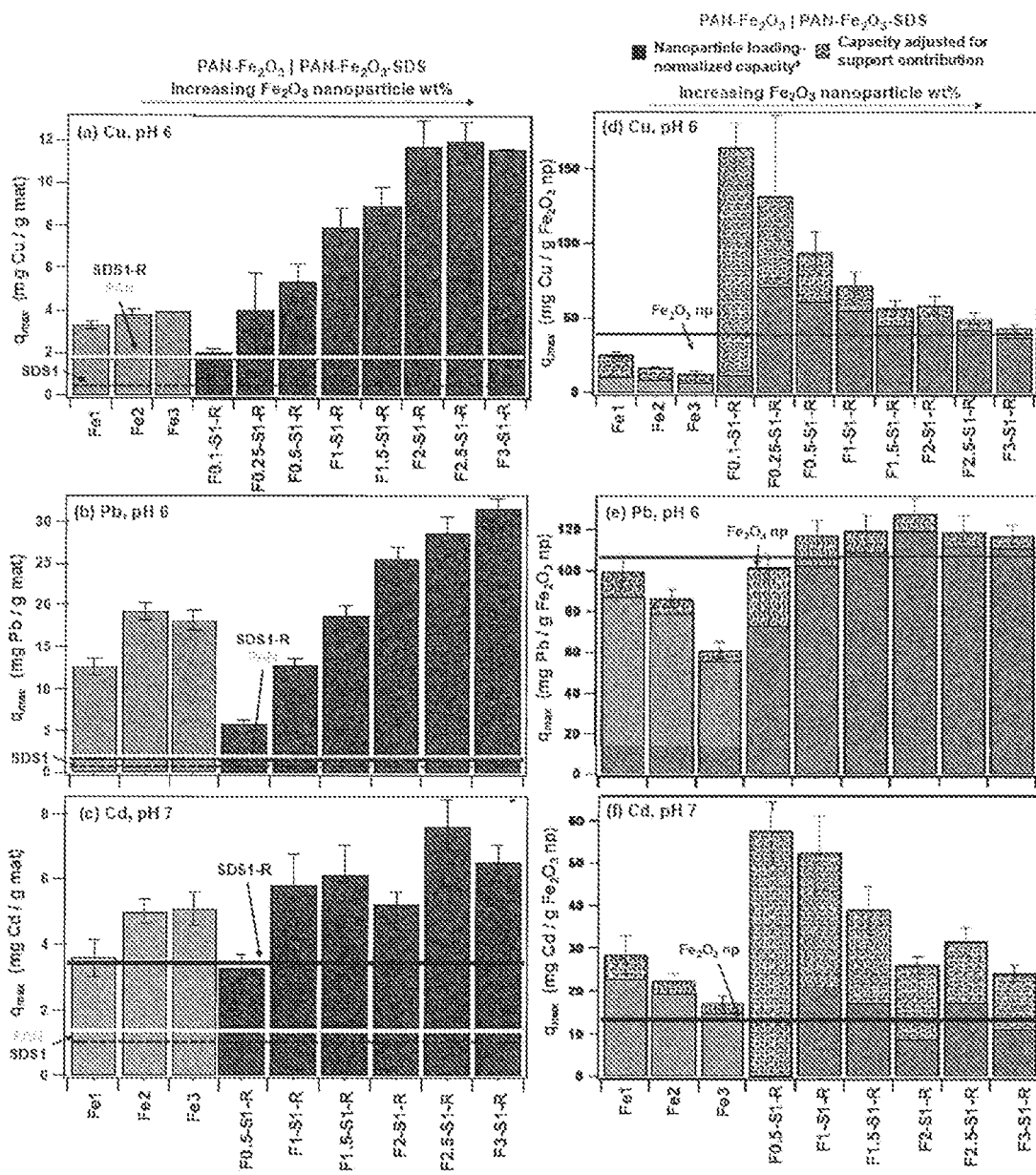
FIG. 3A-3F shows (left) Maximum mat-normalized uptake capacities of PAN-Fe2O3 (gray) and rinsed PAN-Fe2O3-SDS (blue) composites for (a) Cu, (b) Pb and (c) Cd (as mg Cu, Pb, or Cd/g mat) relative to the capacity of unmodified PAN, SDS1, and SDS1-R. Capacities were obtained from Langmuir model fits. (right) Maximum capacities normalized to Fe2O3 nanoparticle loading (as mg Cu, Pb, or Cd/g Fe2O3) are shown for (d) Cu, (e) Pb and (f) Cd relative to the capacity of freely dispersed Fe2O3 nanoparticles (shown as a red line). The solid portion of all bars reflects the Fe2O3-normalized capacities after adjustment to account for the contribution of the polymer support to metal uptake.

The maximum Cu, Pb, and Cd capacities of PAN-$Fe_2O_3$ composites [i.e., $q_{max}$ (mg/g mat) from Langmuir model fits] are summarized as the gray bars in FIGS. 3A-3C. These values are compared to the capacities of SDS1, SDS1-R, and unmodified PAN. This allows us to perform side-by-side comparisons of the different composite formulations and evaluate the contribution of each component (PAN, SDS, $Fe_2O_3$ nanoparticles) to metal uptake in the hybrid sorbent materials.

For Cu and Pb, PAN and SDS1-R capacities were comparable, but higher than that of SDS1. For these metals, SDS molecules likely block access to polymer sites at which metal binding occurs. A different trend was observed for Cd, where the uptake capacities of PAN and SDS1 were comparable, but lower than that of SDS1-R. Thus, for Cd, SDS removal appears to increase accessibility to additional electron-rich nitrile sites (C≡N) of PAN at which additional Cd uptake occurs more readily relative to Cu and Pb.

Uptake trends on PAN are consistent with reported formation constants for aqueous complexation with $CN^-$, supporting a role for nitrile groups in metal binding. While Pb complexation with $CN^-$ is not expected to be significant, values for Cd are ~two orders of magnitude larger than for complexation with other common ions (e.g., $OH^-$, $NH_3$). Though Cu complexation with $CN^-$ is also important, the first complex $[Cu(CN)_2]$ would require two adjacent C≡N groups, which may limit dependence of Cu removal on nitrile groups.

For PAN-$Fe_2O_3$ composites, Fe1 exhibited minimal improvements in Cu and Cd capacity, relative to SDS1-R. Increases to 2 and 3 wt % $Fe_2O_3$ nanoparticle loadings yielded modest improvements up to ~5 mg Cd/g and ~4 mg Cu/g. In contrast, Fe1 exhibited a significantly higher Pb capacity (13±1 mg Pb/g) than SDS1-R (1.6±0.5 mg Pb/g). However, Pb removal did not scale linearly with nanoparticle loading, as Fe2 and Fe3 exhibited comparable Pb capacities (~19 mg Pb/g). Thus, although addition of $Fe_2O_3$ nanoparticle sites promotes Pb removal, most additional nanoparticles must be encapsulated in the polymer and inaccessible as uptake sites as loading increases above 2 wt %. Also from a more practical perspective, Fe2 and Fe3 tended to partially disintegrate and fray during sorption experiments, suggesting that material strength could hinder their practical application.

PAN-$Fe_2O_3$-SDS Composites: Effect of SDS Inclusion and Removal.

Upon inclusion of SDS with $Fe_2O_3$ nanoparticles, only Fe3-SDS1 showed any signs of disintegration and visible fraying during batch experiments. Otherwise, PAN-$Fe_2O_3$-SDS composites maintained material integrity during application, and appeared to be stronger and more durable than PAN-$Fe_2O_3$ materials.

Generally, both unrinsed and rinsed PAN-$Fe_2O_3$-SDS composites exhibited significantly higher Cu and Pb capacities than either SDS1 or PAN-$Fe_2O_3$ materials, while the effect was less pronounced for Cd. Rinsing of PAN-$Fe_2O_3$-SDS composites resulted in lower $K_L$ values for each target, presumably due to the loss of anionic sulfonate groups that promote the uptake of cations on iron oxide surfaces, an effect we previously observed for composites containing cationic surfactants for targeting oxyanions.

The effects of rinsing on the uptake capacity of PAN-$Fe_2O_3$-SDS materials were distinct for each target. For Cu, rinsing improved uptake by ~3 mg Cu/g, but only for composites with $Fe_2O_3$ nanoparticle loadings ≤2 wt %. Thus, SDS removal from composites below this nanoparticle loading facilitates Cu uptake on previously inaccessible $Fe_2O_3$ binding sites. Above 2 wt %, either nanoparticle aggregation within or at the surface of the polymer matrix limits any further access to Cu binding sites after SDS release or much of the composite surface is already covered with $Fe_2O_3$ nanoparticles due to SDS-assisted surface segregation. For Cd, rinsing improved PAN-$Fe_2O_3$-SDS maximum capacities by ~2 mg/g, comparable to the improvement from rinsing SDS1 and consistent with binding primarily at C≡N sites in the composite. Distinct from results with Cu and Cd, rinsing of PAN-$Fe_2O_3$-SDS composites had no impact on Pb capacities. The larger ionic radius of $Pb^{2+}$ may limit transport through SDS-derived pores, and likely co-precipitation of Pb on nanofiber surfaces may also block access to internal binding sites made available through SDS release.

PAN-$Fe_2O_3$-SDS composites: Effect of $Fe_2O_3$ nanoparticle loading. The Cu, Pb, and Cd capacities of rinsed PAN-$Fe_2O_3$-SDS composites [$q_{max}$ (mg/g mat) from Langmuir model fits] are summarized (in blue) in FIGS. 3A-3C and shown in relation to the capacities of PAN-$Fe_2O_3$ and PAN-SDS composites. Notably, the capacity of Fe3 for all targets is comparable to or lower than that for PAN-$Fe_2O_3$-SDS composites with half the $Fe_2O_3$ nanoparticle loading (i.e., Fe1.5-SDS1). Thus, the inclusion of SDS results in the far more efficient use of $Fe_2O_3$ (i.e., more metal uptake per gram) embedded within the composite.

Across rinsed PAN-$Fe_2O_3$-SDS composites, we observed distinct trends with increasing $Fe_2O_3$ nanoparticle loading for each target. For Cu and Pb, a roughly 5.5-fold increase in maximum capacity occurred across the range of nanoparticle loadings examined. Cu removal capacity reached a plateau at nanoparticle loadings ≥2 wt %, the same threshold at which SDS removal no longer improved capacity. Above 2 wt %, composites likely possess comparable amounts of $Fe_2O_3$ sites for Cu complexation, either on the surface or within SDS-generated pores of the composite. Uptake of Cu presumably occurs via inner-sphere bidentate surface complexation, as reported elsewhere for nano-scale iron (hydr) oxides. For Pb uptake, capacity increased monotonically with nanoparticle loading. While inner sphere Pb complexation at internal nanoparticle sites may also occur, increasing the $Fe_2O_3$ concentration on the composite surface likely drives concurrent precipitation of lead (hydr)oxides, thus enabling continued removal at higher $Fe_2O_3$ loading.

In contrast, we observed no clear trend in Cd capacity with $Fe_2O_3$ nanoparticle loading, and only a minimal increase (~2-fold) in Cd capacity across all loadings investigated. Notably, the SDS1-R support contributes more than half of the total Cd capacity for all rinsed PAN-$Fe_2O_3$-SDS composites. Thus, the limited dependence of Cd uptake on $Fe_2O_3$ nanoparticle loading is likely attributable to the importance of C≡N binding sites in the composite. In fact, Cd removal appears almost entirely controlled by the availability of C≡N binding sites within and at the surface of nanofibers.

PAN-Fe$_2$O$_3$-SDS Composites: Assessing Fe$_2$O$_3$ Nanoparticle Utilization.

To compare the activity of embedded Fe$_2$O$_3$ nanoparticles relative to their unsupported (i.e., suspended) counterparts, the maximum capacities of PAN-Fe$_2$O$_3$ and rinsed PAN-Fe$_2$O$_3$-SDS composites (e.g., values from FIGS. 3A-3C) were normalized to the corresponding loading of Fe$_2$O$_3$ nanoparticles in each composite (yielding units of mg Cu, Pb, or Cd per g Fe$_2$O$_3$ np; FIGS. 3D-3F). For rinsed PAN-Fe$_2$O$_3$3-SDS composites, these normalized capacities (shown as the dotted portion of the bars) often appeared more than double that of freely dispersed nanoparticles (red line) due to the significant contribution of the polymer support to the total composite capacity. Accordingly, we also calculated "support-adjusted" capacities (shown as the solid portion of the bars) by first accounting for the contribution of the relevant polymer support (e.g., PAN or SDS1-R) prior to normalization with the nanoparticle loading.

For both Cu and Pb removal, PAN-Fe$_2$O$_3$ composites exhibited nanoparticle loading-normalized capacities much lower than that of dispersed nanoparticles, as expected due to nanoparticle encapsulation. For PAN-Fe$_2$O$_3$-SDS composites, our data suggest that Fe$_2$O$_3$ nanoparticles in the composite exhibit comparable uptake (on a per gram nanoparticle basis) relative to freely dispersed nanoparticles at loading greater than 0.25 and 1 wt % for Cu and Pb, respectively. Above these thresholds, the sorption capacity of the embedded nanoparticles is fully utilized and comparable across all composite formulations. The higher 1 wt % threshold for Pb supports our hypothesis that Pb uptake is primarily limited to surface-available Fe$_2$O$_3$ nanoparticles due to its larger ionic radius, whereas Cu removal can occur via complexation both on Fe$_2$O$_3$ nanoparticles located at the surface and along pores within the nanofibers.

For Cd removal, uptake on Fe$_2$O$_3$ nanoparticles in composites matches that of dispersed nanoparticles at loadings ≥1 wt %, although the contribution from C≡N binding sites remains significant (accounting for at least half of Cd uptake) even at the highest Fe$_2$O$_3$ loadings investigated. Nevertheless, the ability to fully utilize the sorption capacity of the Fe$_2$O$_3$ nanoparticles is encouraging; integration of a nanoparticle with a higher Cd binding affinity (particularly relative to Cd affinity for C≡N sites) would likely enhance composite performance.

Collectively, these results illustrate that Fe$_2$O$_3$ nanoparticles within PAN can be more effectively used as sorbents when integrated with SDS during synthesis. Indeed, above a certain nanoparticle loading, any loss in Fe$_2$O$_3$ surface area from encapsulation by PAN is no worse than the loss of reactive surface area in aqueous suspension arising from nanoparticle aggregation. Through the increased porosity and assisted surface segregation provided by SDS, PAN-Fe$_2$O$_3$-SDS composites provide a matrix in which the Fe$_2$O$_3$ nanoparticles can both be effectively contained and deployed without unreasonably sacrificing nanoparticle activity.

Practical Performance Demonstrations

Based on performance (e.g., high capacity and excellent utilization of embedded nanoparticle activity) and qualitative material strength metrics (e.g., physically robust during application), Fe2-SDS1-R was selected as the optimal material for practical demonstrations.

Kinetics.

Figure 4:
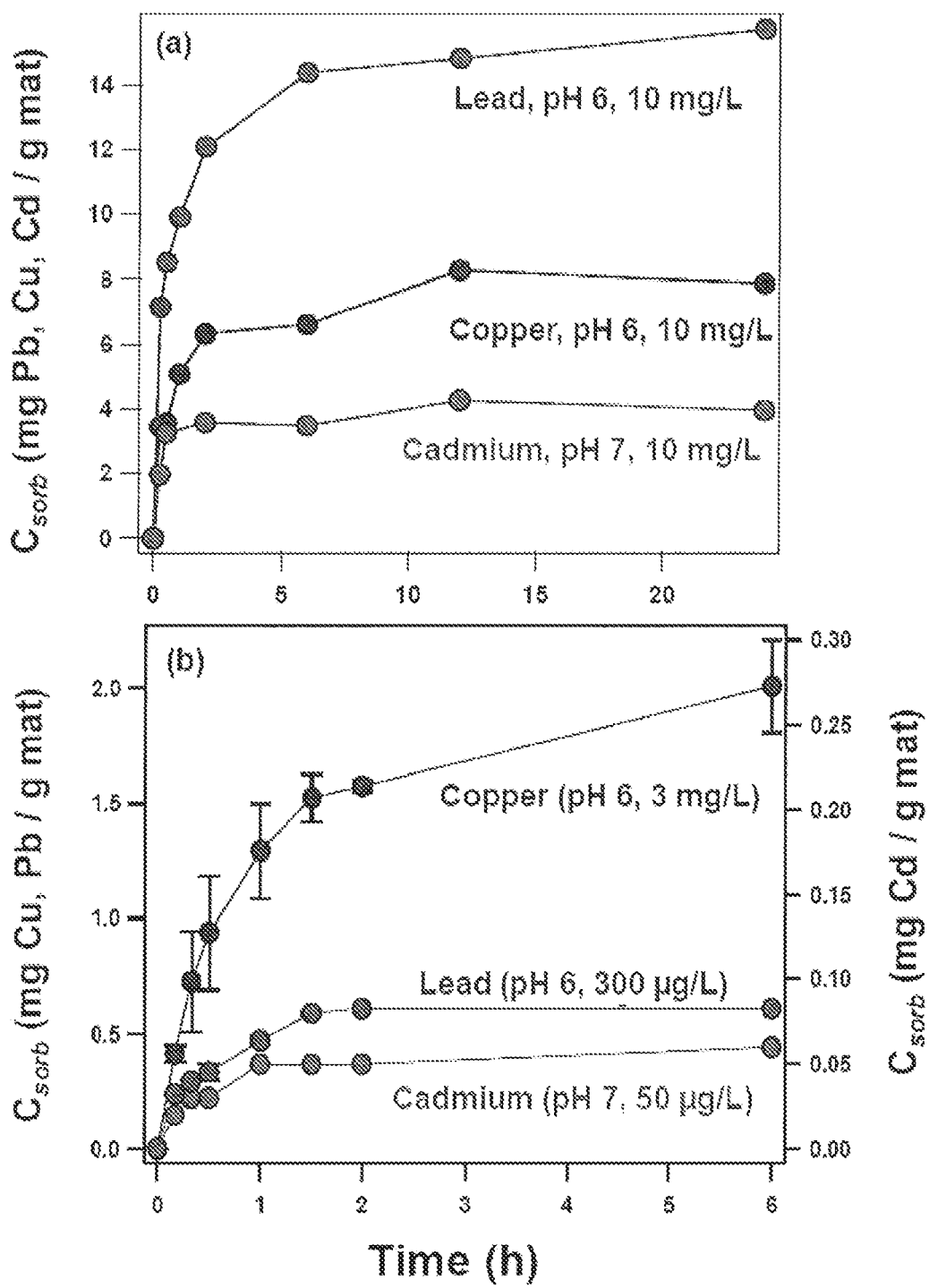
FIGS. 4A-4B show rates of metal removal on rinsed Fe2-SDS1 composites for (a) excess initial concentrations (10 mg/L Pb, Cu, or Cd) and (b) concentrations relevant to drinking water treatment (3 mg/L Cu, 300 µg/L Pb, or 50 µg/L Cd). Experimental conditions: 0.5 g/L composite mass loading (one reactor per time point); 10 mM MES buffer, pH 6 (Pb, Cu) or 10 mM HEPES buffer, pH 7 (Cd).

Results of kinetics experiments are shown in FIGS. 4A-4B. At excess concentrations (10 mg/L), the majority of Cu (20% of the total Cu mass) and Cd (10% of the total Cd mass) uptake occurred within 2 h, reaching equilibrium. Though the majority of Pb uptake (30% of the total Pb mass) also occurred rapidly within 2 h, the rate of removal then slowed, reaching equilibrium after ~6 h (40% uptake). We attribute these two regimes to rapid complexation and precipitation at external surfaces, followed by uptake at less accessible (diffusion-limited) sites internal to the nanofibers. At concentrations more relevant to drinking water (3 mg/L Cu; 300 μg/L Pb; 50 μg/L Cd), the rate of Cu uptake (35% of the total Cu mass) mirrored that observed at excess concentrations, with the majority of equilibrium uptake occurring within ~2 h. Cd and Pb uptake occurred more rapidly, reaching equilibrium for Cd (uptake of 60% of the total Cd mass) and achieving 100% removal of Pb within 1 h. These results indicate that at concentrations relevant to drinking water, external Fe$_2$O$_3$ and nitrile sites dominate Pb and Cd removal, respectively, while internal Fe$_2$O$_3$ sites likely remain important contributors to Cu removal.

pH Edges.

Figure 5:
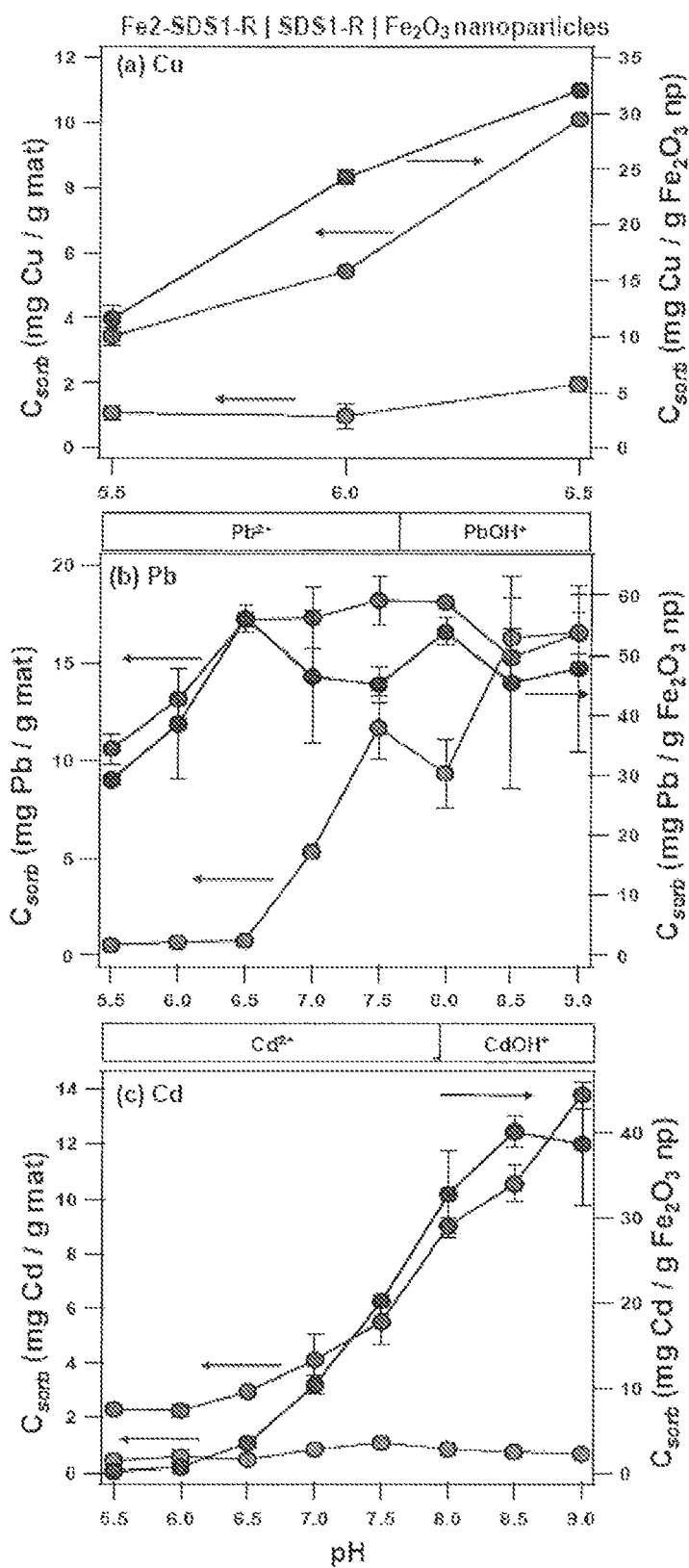
FIGS. 5A-5C show pH-dependent uptake of (a) Pb, (b) Cu, and (c) Cd (initial concentration 10 mg/L) on Fe2-SDS1-R (green), SDS1-R (purple), and dispersed Fe2O3 nanoparticles (red). For Pb and Cd, the dominant aqueous species are provided. For Cu, the dominant species is Cu2+ across the pH range examined. Arrows indicate the relevant axis for each data set based on normalization of the sorbed metal concentration by the mat (left y-axis) or Fe2O3 nanoparticle (right y-axis) mass.

The results of pH edge experiments with Fe2-SDS1-R are shown in FIGS. 5A-5C, with comparisons to SDS1-R and a dispersion of Fe$_2$O$_3$ nanoparticles. Due to solubility limitations, Cu uptake was only examined across pH 5.5 to 6.5. For the SDS1-R support, limited change in uptake of either Cu or Cd was observed across the pH range examined. At pH≤6.5, Pb removal on SDS1-R was also constant and limited, while uptake increased from pH 6.5 to 8.5.

Notably, removal of all targets by Fe2-SDS1-R mirrored the behavior of the Fe$_2$O$_3$ nanoparticle dispersion. This included a ~3-fold increase in Cu uptake across the pH range, a ~1.5-fold increase in Pb uptake from pH 5.5 to 6.5 with a plateau in capacity at higher pH, and a ~7-fold increase in Cd capacity from pH 6.0 to 9.0. The similarity in metal uptake between Fe2-SDS1-R and Fe$_2$O$_3$ dispersions highlight the primary contribution of the embedded Fe2O3 in the composite. Generally, the pH-dependent trends reflect the more favorable electrostatic interactions of the positively charged Cu$^{2+}$, Pb$^{2+}$, and Cd$^{2+}$ ions with increasing pH, which produces an increasingly anionic iron oxide surface.

Application for Arsenic Removal.

Based on the primary role of Fe$_2$O$_3$ nanoparticles as sorption sites in the composite, we also explored the versatility of Fe2-SDS1-R using sorption isotherms and pH-dependent uptake experiments for the anionic metalloid arsenate. Although arsenate is commonly targeted by iron oxide sorbents, the presence of residual anionic surfactants after rinsing would likely hinder the performance of embedded Fe$_2$O$_3$ nanoparticles toward anions like arsenate due to unfavorable electrostatics. Nevertheless, the Fe2-SDS1-R composite out-performed the Fe2 material, and exhibited a nanoparticle loading-normalized capacity for arsenate that approached the levels of freely dispersed Fe$_2$O$_3$ nanoparticles. Further, the pH-dependent performance toward arsenate by Fe2-SDS1-R once again reflected the behavior of the embedded Fe$_2$O$_3$ nanoparticles. Thus, the use of a removable surfactant during fabrication produces a composite that is surface-enriched in Fe$_2$O$_3$ with the ability to target both cationic and anionic targets.

Simulated POU Treatment of Pb Contamination.

Figure 6:
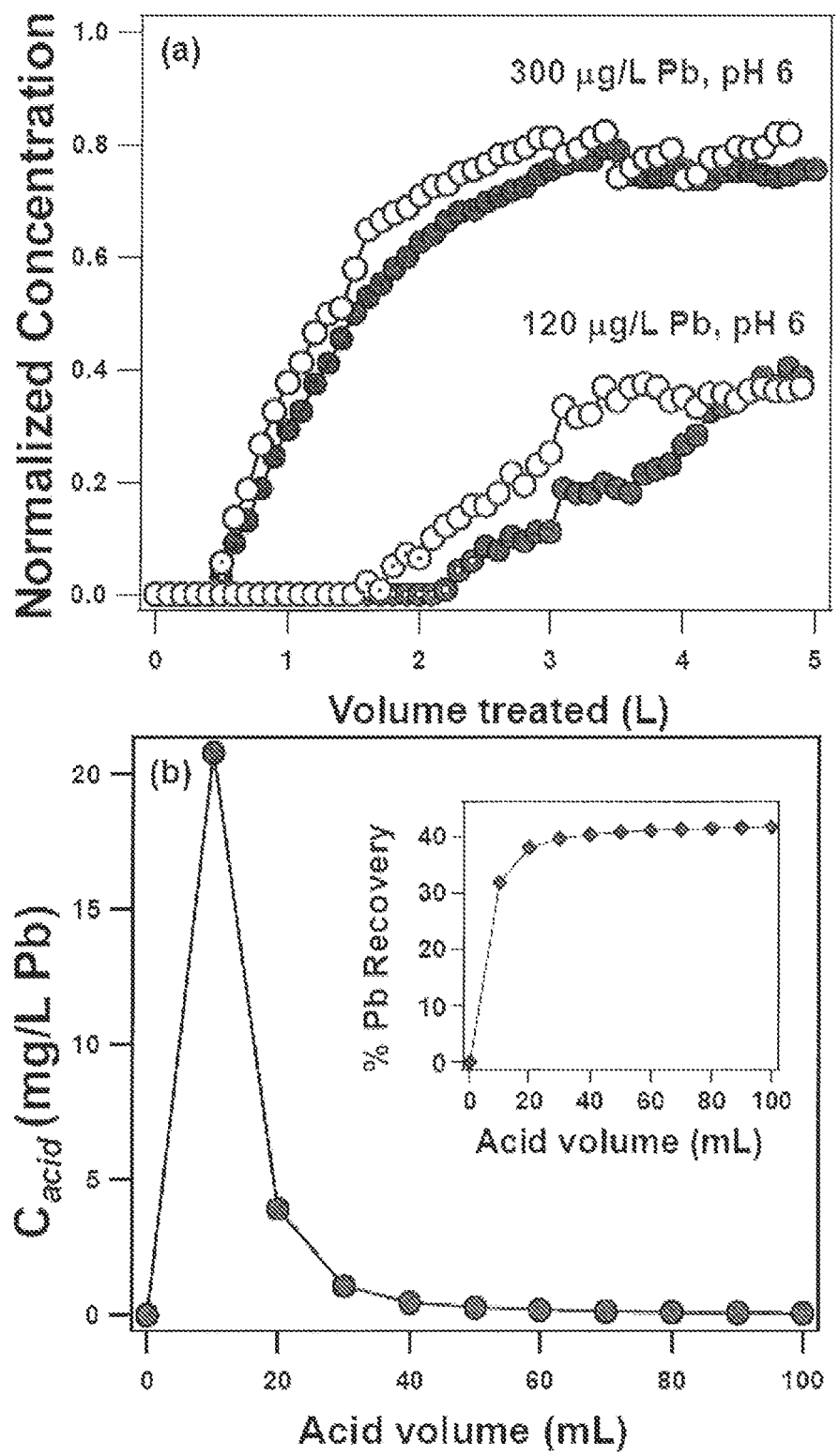
FIGS. 6A-6B show (a) Simulated POU treatment of Pb-containing influents for an idealized matrix (10 mM MES, pH 6) containing 120 (green) or 300 (blue) µm/L Pb. Solid symbols show the first pass through the filter, and open symbols show the second pass after regeneration with 100 mL dilute acid (0.1 N HNO3). (b) Lead concentration during regeneration after first-pass treatment of 300 µg/L Pb influent, with inset showing the percent recovery of Pb (as a percent of total Pb mass removed during the first treatment pass). Experimental conditions: Dead-end filter holder with 47 mm outer diameter and 40 mm inner diameter (active area 12.6 cm2). Filters are Fe2-SDS1 (~170 mg within active area), supported on a 0.65 µm PVDF disc filter and preconditioned with 0.5 L DI water. Influent dosed at 20 mL/min (~950 LMH).

Fe2-SDS1 filters were first evaluated in simulated POU treatment for Pb removal from an idealized influent matrix (10 mM MES, pH 6), with influent concentrations of 120 or 300 μg/L (e.g., levels 8 or 20 times the 15 μg/L EPA action level). Breakthrough curves for Pb during filter operation are shown in FIG. 6A. The dissolved Pb concentration released in the acid regeneration solution used in the 300 μg/L trial is shown in FIG. 6B, with the percent recovery of Pb (as a percentage of total mass removed during the first treatment pass) as an inset.

For both influents, comparable breakthrough performance was observed before and after regeneration. For the 120 μg/L influent, effluent concentrations above the EPA action level (15 μg/L) were observed after 2.2 L and 1.8 L during the first and second passes, respectively. As expected, these volumes decreased to 0.5 L during both 300 μg/L passes. Regardless of influent concentration, a comparable mass loading of Pb on the filter was achieved in each run (~3.4 mg Pb/g composite). This loading is well below the maximum theoretical loading of Pb (~25 mg/g, based on isotherm data), indicative of kinetically limited uptake at the short contact time within the filter holder (i.e., longer contact times at slower fluxes may allow more complete filter utilization). XPS analysis of the filter after the second 300 μg/L treatment pass showed the characteristic Pb 4f peak at 137.0 eV (e.g., not shifted to higher binding energies), indicating that, in contrast to batch systems at pH 6, Pb was not precipitated on the filter. Thus, the dominant mechanism for Pb removal (e.g., sorption vs. precipitation) is dependent on contact time and solution concentration, with sorption favored in the kinetically limited regime.

During regeneration, 40% of the sorbed Pb mass could be recovered, with roughly one third of the bound Pb released during contact with the first 10 mL of dilute acid (FIG. 6B). More Pb mass could likely be recovered with more aggressive treatments. This is encouraging, as the ability to recover a significant portion of the captured Pb with minimal volumes of regenerant can enable more sustainable disposal and/or treatment of spent (i.e., Pb-containing) regeneration solutions. Although the EPA does not currently approve regeneration of POU technologies, the composites herein could both improve the sustainability of POU treatment and be applied at larger scales, where regeneration may be economically requisite.

To further evaluate the practical applicability of the Fe2-SDS1 composite, flow-through demonstrations were performed with real tap water (pH ~9.9; laboratory tap water treated at the University of Iowa Water Treatment Plant), spiked with 120 or 300 μg/L Pb. For both influents, removal of Pb to <15 μg/L was observed across the entire 12 L trial. Because of the high pH and more complex composition of the tap water, XPS analysis of the filter revealed surface precipitation of Pb (based on a shift in the Pb 4f region of the XPS spectra to 138.4 eV, relative to 137.0 eV for Pb), indicative of lead oxide and/or hydroxycarbonate formation. Although primarily attributed to precipitation, the observed improvement in Pb removal efficiency allows for a single user's annual drinking water supply (assuming consumption of 2 L/day, contaminated with ~300 μg/L Pb) to be supplied with only ~10 g of the composite. This calculation underscores the potential of these composites for practical deployment of nanomaterials in effective, scalable POU drinking water treatment.

In accordance with the disclosure herein, the multi-faceted benefits of including a sulfonate surfactant (SDS) in the single-pot syntheses of electrospun polymer nanofiber-iron oxide nanoparticle composites are demonstrated, which represent a promising treatment platform for Cu, Pb, and Cd removal. Relative to composites containing only iron oxide nanoparticles, co-inclusion of SDS minimized nanofiber beading and improved bulk mechanical stability, while subsequent SDS removal via rinsing enhanced composite pore volume. Notably, SDS promoted nanoparticle surface segregation, enhancing both the iron concentration at nanofiber surfaces and solution-phase accessibility of embedded nanoparticles.

Ultimately, these SDS-iron oxide nanoparticle synergies influenced the composite performance as a heavy metal sorbent. Rinsed hybrid composites exhibited significantly higher removal capacities for Pb, Cu, and Cd than nanoparticle-only composites. Above a relatively low threshold of nanoparticle loading (typically 0.25-1 wt % depending on the target metal), embedded nanoparticles exhibited sorbent activity comparable to that of freely dispersed nanoparticles. An optimized composite (7 wt % PAN, 2 wt % $Fe_2O_3$ nanoparticles, 1 wt % SDS) was selected for its mechanical durability, high capacity, and near-complete utilization of nanoparticle activity (i.e., metal uptake per gram of nanoparticle relative to freely dispersed nanoparticles). The generalizability of this surfactant-assisted approach to composite fabrication was also demonstration through application of this composite for uptake of an anionic target, arsenate.

Using the optimized composite, Pb removal was also demonstrated in flow-through systems representative of point-of-use drinking water treatment for both idealized and real tap water matrices. Composite filters were effectively regenerated with minimal volumes of dilute acid. With real tap water contaminated with ~300 μg/L Pb, we show that an individual user's annual drinking water supply could be treated with only ~10 g of material. The relatively high capacity and small physical footprint associated with treatment of metal-contaminated water highlight the promise of these composites for the deployment of nanomaterials in drinking water treatment.

As set forth herein, range of chemical pollutants now contaminate drinking water sources and present a public health concern, including organic compounds, such as pharmaceuticals and pesticides, and heavy metals, such as arsenic and lead. Heavy metals have been detected both in private drinking water wells, which do not fall under federal drinking water regulations, as well as in urban tap water, due to the introduction of contamination in the drinking water distribution system. Further, many so-called "emerging organic contaminants," which are present in drinking water sources at detectable levels, but have unknown long-term health implications, do not fall under federal drinking water regulations. To protect the health of consumers, drinking water treatment at the point-of-use (POU) (i.e., the tap) is essential. Next-generation POU treatment technologies must require minimal energy inputs, be simple enough to permit broad application among different users, and be easily adaptable for removal of a wide range of pollutants.

Nanomaterials, such as carbon nanotubes (CNTs) and iron oxide nanoparticles, are ideal candidates for next-generation drinking water treatment, as they exhibit unique, high reactivity and necessitate small treatment units. However, concerns regarding water pressure requirements and nanomaterial release into the treated supply limit their application in traditional reactor designs. To bridge the gap between potential and practical application of nanomaterials, this study utilizes electrospinning to fabricate composite nanofiber filters that effectively deploy nanomaterials in drinking water treatment. In electrospinning, a high voltage draws a polymer precursor solution (which can contain nanomaterial additives, in the case of nanocomposites) from a needle to deposit a non-woven nanofiber filter on a collector surface.

Using electrospinning, we develop an optimized, macroporous carbon nanotube-carbon nanofiber composite that utilizes the sorption capacity of embedded carbon nanotubes, and achieves a key balance between material strength and reactivity towards organic pollutants. Additionally, via single-pot syntheses, we develop two optimized polymer-iron oxide composites for removal of heavy metal contamination by inclusion of iron oxide nanoparticles and either cationic or anionic surfactants in the electrospinning precursor solution. In hybrid materials containing a well-retained quaternary ammonium surfactant (tetrabutylammonium bromide) and iron oxide nanoparticles, ion exchange sites and iron oxide sites are selective for chromate and arsenate removal, respectively.

In accordance with an exemplary embodiment, it was demonstrated that a sulfonate surfactant, sodium dodecyl sulfate, acted as a removable porogen and an agent for surface segregation of iron oxide nanoparticles, thus enhancing composite performance for removal of lead, copper, and cadmium. Notably, nanoparticles embedded in composites exhibited comparable activity to freely dispersed nanoparticles. Collectively, the composites developed in this work represent a substantial advance towards the overlap of effective nanomaterial immobilization and utilization of nanomaterial reactivity. Outcomes of this work advance current knowledge of nanocomposite fabrication, and contribute to the responsible and effective deployment of nanomaterials in POU drinking water treatment.

Drinking Water Supply Quality: Challenges

Figure 7:
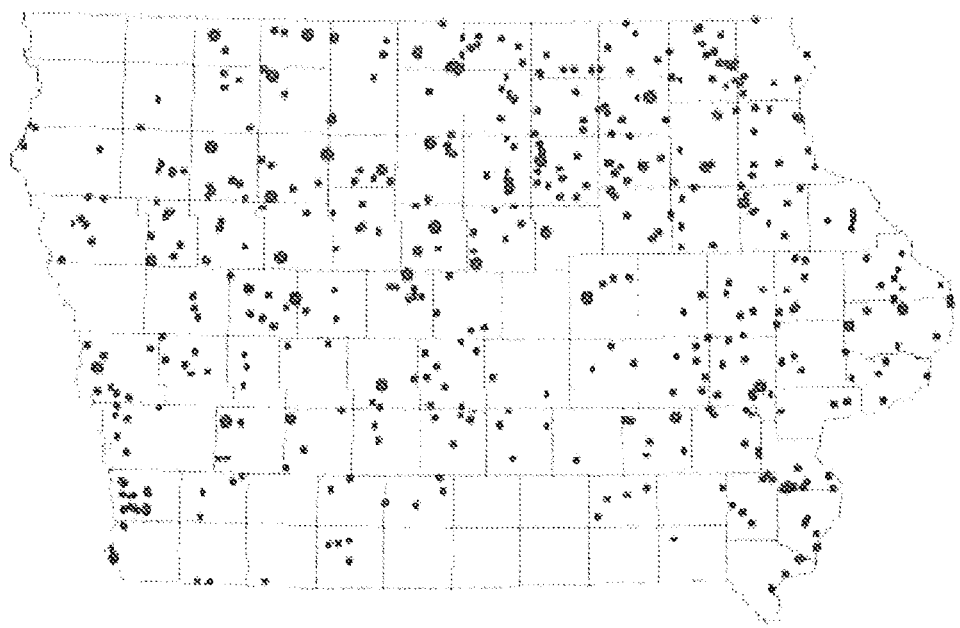
FIG. 7 is an illustration of arsenic occurrence in private, rural Iowa groundwater wells (2009, Center for Health Effects of Environmental Contamination, University of Iowa). Red dots indicate ≥0.01 mg/L (the EPA MCL). Blue dots indicate 0.001-0.009 mg/L).

Amid growing water scarcity, communities must also confront the challenge of increasingly compromised water sources. Surface and groundwater resources relied upon for drinking water now contain an array of chemically diverse contaminants (e.g., pharmaceuticals, agrochemicals, and heavy metals). For example, a U.S. Geological Survey (USGS) survey in 2000 estimated that ~8% of groundwater resources used by all public water supply systems contain arsenic at a concentration above the maximum contaminant level (MCL; 10 µg As/L). This estimation is also relevant to private groundwater wells. A 2009 University of Iowa Center for Health Effects of Environmental Contamination study examined water quality in private, rural groundwater wells across Iowa and found 8% of samples exceeded the MCL for arsenic (FIG. 7). Occurrences of chromate have also been observed in groundwater wells. Further, in urban settings, the water distribution system can represent a secondary cause of drinking water contamination beyond source water quality. Chromate may leach from distribution system piping, and corrosion of galvanized, brass, and lead piping is known to cause the release of lead, copper, and cadmium during transmission of drinking water to individual users. For example, a recent switch in drinking water source and the accompanying change in water chemistry led to extensive lead contamination of tap water in Flint, Mich. Due to the known negative health effects of heavy metals, such exposure represents a significant public health challenge. Occurrences of a range of organic micropollutants, such as atrazine and acetochlor, and have also been observed in groundwater wells. These organic contaminants complicate the water quality challenge further, as a broad suite of so-called "emerging organic contaminants" remain unregulated by EPA drinking water standards despite their presence in water resources. As yet, there exists a dearth of knowledge regarding long-term health effects of exposure to low concentrations of these potentially bioactive compounds. These emerging organic contaminants, which include pharmaceuticals and personal care products (PPCPs) and agrochemicals (e.g., herbicides, pesticides, and veterinary drugs), are known to be ubiquitous in surface and ground waters, often at low concentrations (e.g., ppb or ppt levels). Emerging organic contaminants are increasingly polar and polyfunctional in nature, and thus represent a significant challenge for conventional wastewater and water treatment methods. PPCPs are primarily released into the environment in domestic wastewater treatment effluent. For example, the incomplete removal of a range of pharmaceuticals, such as carbamazepine, diclofenac, metoprolol, and sulfamethoxazole, has been observed in primary and secondary wastewater treatment. Beyond inputs of recalcitrant micropollutants via domestic wastewater treatment effluent, agricultural runoff serves as another contamination source, releasing compounds such as atrazine, mecoprop, and trenbolone into the environment. Advanced treatment methods, such as reverse osmosis (RO) and ozonation, have been shown to improve micropollutant removal in wastewater treatment plants. Nevertheless, compounds resistant to advanced oxidation processes during wastewater treatment (e.g., clofibric acid) and contaminants from agricultural runoff (e.g., atrazine) must still be removed prior to consumption as drinking water.

To protect drinking water quality, the United States Environmental Protection Agency (US EPA) promulgates and enforces regulations that limit allowed concentrations of both heavy metals and organic compounds in drinking water. However, these regulations are limited both in range (e.g., drinking water standards are not enforced for private drinking water supplies, and do not protect users from contamination that stems from the distribution system) and in scope (e.g., unregulated, so-called "emerging contaminants"). Advanced technologies, such as chemical oxidation and reverse osmosis are able to efficiently remove many contaminants, but the economics of associated energy and maintenance costs are often limiting, particularly for small, rural communities that rely on decentralized water sources (e.g., private groundwater wells) and urban, often low-income, communities with aging water treatment infrastructure.

POU Drinking Water Treatment: Current Status

Communities that lack access to effective centralized drinking water treatment must depend upon decentralized, or point-of-use (POU), drinking water treatment. There are several technologies approved by the US EPA as small system compliance technologies (SSCTs) for POU removal of specified contaminants in drinking water systems serving 10,000 or fewer individuals (Table 1). Granular activated carbon (GAC) is approved as an SSCT for removal of synthetic organic compounds (SOCs). However, it should be noted that because many organic compounds remain unregulated (the so-called "emerging contaminants"), approval of GAC by the EPA does not consider removal efficiencies for a broad range of contaminants. Indeed, several studies have indicated that both powder and granular activated carbons are less effective for removal of more polar compounds, including many PPCPs such as sulfamethoxazole, ibuprofen, and acetaminophen, as well as deprotonated acids, such as naproxen and gemfibrozil. Thus, as emerging contaminants, such as those on the EPA Contaminant Candidate List (CCL4), become regulated, GAC may be unable to provide the necessary levels of removal to achieve safe levels in drinking water. Additionally, because GAC is an inherently microporous material, consisting primarily of internal pore volume, lengthy contact times (or large contact beds) may be necessary to overcome diffusion limitations and achieve acceptable levels of contaminant removal.

In the case of heavy metals, reverse osmosis (RO) is the only approved SSCT for removal of both anionic and cationic species. Applicability of RO in small drinking water systems may be limited by economic considerations, due to high capital, maintenance, and energy costs associated with operation. RO units typically produce significant volumes of waste discharge water (~5 gallons of discharge for each gallon of treated water), limiting applicability in communities with water scarcity limitations. Further, use of RO may require significant pretreatment (such as particulate pre-filtration) to prevent rapid membrane fouling. Both ion exchange (IX) and activated alumina (AA) adsorption are preferable alternatives to RO, as the IX and AA media require a significantly smaller pressure drop than RO membranes. AA is approved only for removal of arsenic, on the assumption that all arsenic exists as As(V) (e.g., arsenate, $AsO_4^{3-}$). Anion exchange (AX) is approved for removal of chromium, while cation exchange (CX) is approved for removal of cadmium, copper, and lead. It should be noted that for both POU IX and POU AA, the US EPA does not currently approve regeneration of treatment units, due to the difficulty of backwashing and/or the need for use of strong caustics or acids. Additionally, although granular iron hydroxide media is known to exhibit good arsenic removal performance, it is still considered to be under investigation towards its approval as a SSCT for arsenic.

Next Generation POU Drinking Water Treatment: The Role of Nanomaterials

The next generation of POU drinking water treatment must improve upon the currently available technologies described above. Given the widely acknowledged water-energy nexus, improvements to POU drinking water treatment should focus on technologies that require minimal energy inputs (e.g., sorption-based technologies) to treat water at high fluxes. POU treatment units should be simple and easy to use, to permit broad application among different users. Further, given the wide range of contaminants present in drinking water supplies, next-generation POU drinking water treatment must both be able to efficiently remove a range of pollutants and be easily tailored to a variety of source water qualities. Ideally, such a unit would exist within a small physical footprint, to be appropriate for use in decentralized systems or by individual users.

Nanomaterials are ideal candidates for deployment in such next-generation POU technologies. Nanomaterials are defined as those materials with at least one characteristic dimension less than 100 nm. Engineered nanomaterials are now routinely produced at industrial scale levels (e.g., hundreds of tons per year), and utilized in a wide range of commercial applications. For example, titania nanoparticles are found in sunscreens, paints, and cosmetics, zero valent iron nanoparticles are used in groundwater remediation, and carbon nanotubes are used in composite materials such as tennis rackets and bicycle frames. Indeed, global revenue from nano-enabled products reached $731 billion in 2012 and exceeded $1 trillion in 2013, according to an independent study funded by the National Science Foundation and National Nanotechnology Coordination Office. Due to their small size, nanomaterials can exhibit a range of unique properties and associated reactivity (so-called "nano-effects") relative to their micro- or macro-scale counterparts. For example, although carbon nanotubes (CNTs) exhibit specific surface areas (on the order of 300 m2/g) that are generally lower than those of conventional activated carbons, CNTs possess large surface area to volume ratios that provide a larger quantity of surface sites for contaminant uptake (e.g., larger sorption capacities). Likewise, nanoscale metal oxides possess high specific surface areas; values >200 $m^2$/g have been observed for nano-scale ferrihydrite, a naturally occurring iron oxyhydroxide that is commonly found in soils and groundwater. Accordingly, nanomaterials provide a greater fraction of surface atoms than their bulk scale counterparts. These surface atoms possess higher surface energies than bulk atoms, allowing the use of nanomaterials to improve the rate of heterogeneous reactions, such as catalytic reactions in fuel cells. Nano-effects extend beyond properties associated with surface site availability, as nanomaterials also exhibit unique magnetic, electronic, thermal and antibacterial properties.

In harnessing these properties, highly reactive nanomaterials could be deployed within units with small physical footprints that are ideal for POU-scale (e.g., in home or at the tap) drinking water treatment. In recognition of the unique potential of nano-structured materials, the National Nanotechnology Initiative recently highlighted the key role of nanomaterials in "addressing the pressing technical challenges related to water quality and quantity," and the future of water sustainability.

Potential of Carbon and Metal Oxide Nanomaterials in Drinking Water Treatment

Based on the above-mentioned unique material properties of nanomaterials and pressing water quality challenges, researchers have evaluated the potential of carbonaceous and metal oxide nanomaterials for removal of organic pollutants and heavy metals, respectively.

Potential of Carbon Nanotubes for Removal of Organic Contaminants

Figure 8:
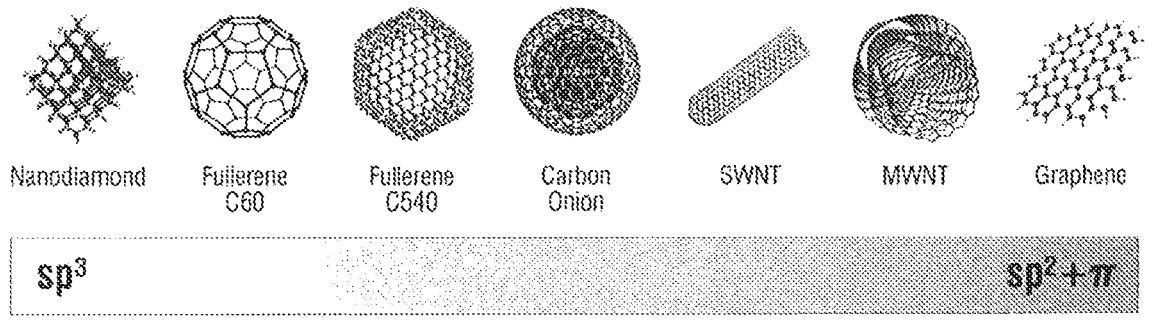
FIG. 8 is an illustration of types and hybridization states of commercially available and/or laboratory synthesized carbon nanomaterials.

Of the several types of carbon-based nanomaterials that are now commercially available or commonly examined in the literature, including carbon nanotubes, graphene, and fullerene (FIG. 8), the majority of research has focused on the potential of carbon nanotubes (CNTs) for sorption of organic pollutants. CNTs are cylinders composed of one (e.g., single-walled CNTs, SWCNTs) or more (e.g., multi-walled CNTs, MWCNTs) graphene sheets. Commercial CNTs are currently expensive relative to conventional activated carbon (AC) sorbents on a per unit mass basis (e.g., $100/kg for MWCNTs). However, Mitsui, a manufacturer of commercial CNTs, has projected that the cost of commercial CNTs could be reduced to $80/kg, and proposed processes that utilize catalytic chemical vapor deposition with plug flow or fluidized bed reactors could yield CNTs at an average cost of $25-38/kg. Further, CNTs have been shown in some cases to be cost-effective relative to conventional sorbents, particularly if regenerated. In fact, CNTs have been shown in some instances to be more easily regenerated than their AC counterparts. CNT surface compositions are highly tunable, and can be modified via attachment of functional groups to the CNT sidewall, as well as integration of heteroatoms into the sidewall. For example, CNT surfaces can be enriched with oxygen-containing functionalities (e.g., —OH, C═O, C—O, and —COOH) via acid treatment or KOH etching or via doping of heteroatoms such as nitrogen. Functionalization or doping of CNT surfaces with groups other than simple C- and O-containing moieties (i.e., N— containing groups) often proceeds through surface functionalization with carboxyl groups. These changes in surface functionality can influence CNT behavior in aqueous systems, as well as their capacity for adsorption of organic pollutants. For example, although non-functionalized CNTs are known to aggregate in solution, which can strongly influence their size, shape, and available surface area, surface oxygen-containing groups can improve CNT dispersion, and thus improve available area for contaminant uptake.

Accordingly, CNTs have been evaluated for removal of a range of both nonpolar [e.g., BTEX (benzene, toluene, ethylbenzene, and xylene), aliphatic and aromatic hydrocarbons, and dioxins] and polar (e.g., nitroaromatic compounds, phenolic compounds, and trihalomethanes) compounds. These investigations have revealed a variety of removal mechanisms, including π-π electron donor-acceptor (EDA) interactions, hydrophobic, and electrostatic interactions, as well as hydrogen bonding. Conventional wisdom in the carbon-based sorbent literature indicates that hydrophobic interactions typically control adsorption of nonionic hydrophobic organics. The role of both hydrophobic interactions (e.g., physisorption) and hydrophobic exclusion from the aqueous phase has been noted for uptake of naphthalene, phenanthrene, and pyrene by CNTs. However, the importance of π-π EDA interactions has also been emphasized in the literature. CNTs can (depending on their surface functional groups) act as either electron donors or acceptors, thus improving removal of compounds that are electron acceptors (e.g., 4-nitrotoluene) or electron donors (e.g., phenanthrene), respectively. Accordingly, improved removal capacities were obtained with non-functionalized CNTS (relative to those with oxygen-containing functionalities) for aromatic organics and phenolic derivatives, such as resorcinol, phenanthrene, biphenyl, and 2-phenylphenol. Similar removal trends have also been observed for several ionizable organic compounds (e.g., 1-nathylamine, 1-napthol, and phenol; and perfluorooctane sulfonate, perfluorooctanoic acid, perfluorooctanesulfonamide, 2,4-dichlorophenoxyacetic acid and 4-n-nonylphenol), likely due to both their hydrophobicity and/or aromaticity.

The aforementioned π-π EDA interactions can also impart unique reactivity behavior that is distinct for carbon nanotubes, relative to conventional activated carbons. For example, Chen et al. observed MWCNTs to have higher adsorption affinities for polar aromatic compounds (e.g., nitroaromatics) relative to nonpolar aromatics (e.g., benzene and chlorinated benzenes), and for nonpolar aromatics relative to nonpolar aliphatics (e.g., cyclohexane). These trends were attributed, respectively, to π-π electron donor-acceptor (EDA) interactions between the π-accepting nitroaromatic compounds and the π-donating carbon nanotube surfaces, and to π-electron dependent polarizable interactions between the aromatic adsorbates and the CNT surfaces. Similarly, carbon nanotubes have been shown to exhibit both higher sorption capacities and faster uptake kinetics for organic compounds relative to conventional activated carbon sorbents. Long et al. observed significantly higher uptake of dioxin on both single-walled and multi-walled carbon nanotubes relative to conventional activated carbon. This effect was attributed to specific interactions between the benzene rings of dioxin and the aromatic surfaces of the CNTs. Several researchers have observed that specific CNT surface functionalities can enhance adsorption of organic pollutants. Recent work has shown that N-doped CNTs exhibit higher adsorption affinity and selectivity for π-donor aromatic compounds, such as hydroxyl- and amino-substituted compounds. Likewise, Wu et al. noted that surface oxidation treatment enhanced exposed surface area of CNTs and yielded improved mass-normalized adsorption capacities for several polar contaminants (e.g., nitrobenzene, 4-nitrophenol, and 4-chlorophenol). Notably, however, increased competition with water molecules for surface sites caused a reduction in surface area-normalized adsorption capacities. Several reports indicate that the introduction of oxygen surface functionalities improved uptake of pollutants (albeit on a mass-normalized basis), including phenanthrene on —COOH functionalized SWCNTs, trihalomethanes on —OH and —COOH functionalized MWCNTs, BTEX on nitric and sodium hypochlorite-oxidized MWCNTs, 76 and for both monoaromatic compounds (phenol, nitrobenzene) and pharmaceutical antibiotics (sulfamethoxazole, tetracycline, and tylosin) on KOH-etched SWCNTs and MWCNTs. Zhang et al. attributed the improved sorption of sulfamethoxazole by hydroxylated MWCNTs at pH 7.5 to the influence of π-π EDA interactions, given the π-acceptor nature of the amino groups and nitrogen containing heterocyclic rings of sulfamethoxazole, and the π-donor characteristics of the hydroxylated benzene rings of the CNT surface.

Given the specific interactions described above and the increasingly polar and polyfunctional nature of emerging organic contaminants, the ease with which CNT surfaces can be functionalized to promote targeting of specific organic contaminants and the distinct reactivity observed for CNTs relative to traditional ACs underscore the unique role that CNTs could play in next-generation drinking water treatment. Indeed, CNTs have been demonstrated as effective adsorbents for a range of emerging organic contaminants (e.g., 17α-ethinyl estradiol, oxytetracycline, carbamazepine, atrazine, norfloxacin, sulfamethoxazole, tetracycline, and tylosin). However, although dispersions are conducive to laboratory investigations, CNTs cannot be applied for practical POU drinking water treatment either in packed beds (due to high head losses), or in dispersions (due to concerns regarding potential nanomaterial toxicity and material loss into the treated supply and environment).

Potential of Metal Oxide Nanoparticles for Removal of Heavy Metal Contaminants

Akin to the recognized utility of carbon-based adsorbents for treatment of organic pollutants, metal oxides (in particular, iron-based adsorbents) are widely used for treatment of heavy metal contamination. Granular ferric hydroxide (e.g., Evoqua® GFH) is a granular, poorly crystalline β-FeOOH primarily applied for arsenic removal. However, GFH and other comparable granular iron oxides have also been demonstrated for removal of lead, copper, cadmium, and chromium contamination across a range of water qualities including drinking water and urban storm water runoff. Application of GFH is primarily constrained by its limited durability, as the granules tend to crumble and disintegrate over prolonged periods of use, thus frequently requiring significant backwashing to avoid build-up of head loss pressure. Further, granular iron oxides (like their carbonaceous counterparts) possess high internal surface areas and exhibit diffusion limited rates of removal, thus requiring application in large packed beds with frequent backwashes that generate large volumes of associated waste.

The use of nano-scale metals and metal oxides, which possess high external surface area and large surface-to-volume ratios, could address these concerns regarding diffusion limited uptake, while also being applied within reactors with small physical footprints that are ideal for the POU scale. Further, nanoscale materials often exhibit reactivity behavior distinct from that of their micro-scale counterparts. For example, Ponder et al. observed that zero-valent iron nanoparticles (nZVI; both freely dispersed and resin-supported) exhibited ~5 times the initial rate (normalized to Fe content) of Cr(VI) and Pb(II) removal relative to both ~40 mesh iron filings and ~325 mesh iron powder (although surface area-normalized rates are not provided). Similarly, improved Cr(VI) removal efficiencies and rates of removal were observed for nZVI relative to granular ZVI. Within the nano-domain, nanoparticle performance is strongly influenced by particle size, as demonstrated by Waychunas et al. for uptake of Hg(II) by nano-goethite. Specifically, 5 nm particles sorbed significantly more Hg(II) than 75 nm particles on an absolute basis, while 75 nm particles exhibited the best performance on a surface area-normalized basis, indicative of a different number and different types of sorption sites across the various particle sizes. A similar effect was observed for hematite nanoparticles, where 7 nm hematite exhibited higher affinity for copper ions relative to 25 and 88 nm particles. This effect was attributed to a higher relative fraction of distorted binding environments with reduced symmetry on the surface of 7 nm particles, as compared to their larger analogues.

The efficiency of a wide range of metal oxides has been demonstrated for removal of heavy metal species, including iron oxide, magnesium oxide, cerium oxide, titanium oxide, and aluminum oxide. A number of different crystalline forms of nano-scale iron oxide, including goethite ($\alpha$-FeOOH), hematite ($\alpha$-Fe$_2$O$_3$), maghemite ($\gamma$-Fe$_2$O$_3$), and magnetite (Fe$_3$O$_4$), have been studied for their application in water treatment. For example, researchers have demonstrated the utility of nano-goethite for removal of arsenic and copper, nano-maghemite for chromate removal, and nano-magnetite for chromium and lead removal. Amorphous hydrous iron oxides, such as ferrihydrite, also exhibit high removal capacities for arsenic (including both arsenate and arsenite), copper, zinc, lead, and chromium.

Although nano-metal oxides are well-studied in aqueous suspensions, practical application in flow-through treatment systems remains challenging, primarily due to high head losses when they are deployed in a packed bed configuration. The magnetic properties of magnetite could be used to facilitate recovery, as demonstrated both for a hematite-coated nano-magnetite for arsenic removal and chitosan-coated magnetite applied for treatment of copper, lead, and cadmium. However, magnetite is not very stable, and is readily transformed to maghemite in oxidizing environments (e.g., exposure to air). Further, a secondary recovery step is still necessary during application of these functionalized composites.

Macroscale and Supported Nanocomposites for Drinking Water Treatment

The use of a nanocomposite could effectively address the challenges associated with direct application of nanotubes and nanoparticles. This includes their immobilization within a coordinated network of nanomaterials or on an inert, porous support material. The existing state-of-the-art related to the development of such nanocomposites and their application in water treatment are summarized as follows:

Carbon Nanotube Composites for Drinking Water Treatment

Several approaches have been developed to improve immobilization and/or recovery of CNTs, within a wide range of applications. Functionalization of CNTs with magnetic iron oxide nanoparticles could facilitate recovery from batch systems. To avoid post-treatment recovery of CNTs, Wei et al. fabricated a porous, granular CNT/Al$_2$O$_3$ hybrid adsorbent via granulation and subsequent calcination of a mixture of MWCNTs, the surfactant Brij 35, and pseudo-boehmite. Similarly, Xu et al. coated CNTs on CaCO$_3$ microparticles that were surface-functionalized with a pre-film of several poly(sodium 4-styrenesulfonate) and poly(diallyldimethylammonium chloride) double layers via electrostatic self-assembly. However, while both studies reported excellent batch uptake of organic pollutants (carbamazepine and diclofenac; 2-napthol and 4-chlorophenol) by the composites and demonstrated the ability to regenerate the immobilized CNTs, performance was not demonstrated under conditions most representative of application (i.e., flow-through systems).

To facilitate application of CNTs in flow-through systems, CNTs can be embedded within a matrix material, such as silicon nitride, although such a composite may restrict transport through the membrane (thus limiting achievable flux). Macroscale structures consisting primarily of CNTs are an alternative to matrix-embedded CNTs. Srivastava et al. created a mechanically stable, 300-500 µm diameter "macrotube" consisting of radially aligned MWCNTs by spray pyrolysis of a ferrocene/benzene solution [e.g., controlled chemical vapor deposition (CVD)]. CVD can also yield carbon nanotube "sponges" by use of a ferrocene precursor in dichlorobenzene to generate a porous, three-dimensional, interconnected framework. Although the separation/purification of oil mixtures has been demonstrated with such macroscale CNT structures, their relevance for the removal of more polar organic micropollutants has not been evaluated.

CNT networks that are vacuum-deposited or grown on polymeric and ceramic supports represents another class of CNT composite materials. These networks have been demonstrated for a range of end-goals, including advanced oxidation via hydroxyl radical formation during ozonation, viral and bacterial pathogen removal, and electrochemical treatment of model organics. Such CNT networks have also been evaluated for removal of organic micropollutants via adsorption. Wang et al. demonstrated that micropollutant removal performance at 1 mg/L influent concentrations (i.e., relatively high and beyond environmental relevance) translated to comparable performance at 100 µg/L influents, and that tailoring of CNT surface functionalities could improve removal of specific targets (e.g., improved removal of acetaminophen by hydroxylated MWNCTs relative to pristine MWNCTs). Notably, however, deposited CNT networks may require cross-linking or curing within a layer-by-layer composite to prevent mobilization and formation of preferential flow paths during flow-through application.

Supported Metal Oxide Nanoparticle Composites

Recent efforts to improve the practical feasibility of applying nano-metal oxides in flow-through systems for drinking water treatment have focused on their immobilization on high surface area supports. Metal oxide CNTs has been evaluated in a variety of reactor designs. Wang et al. demonstrated manganese oxide-coated CNTs for lead removal in a batch system, while Gupta et al. applied alumina-coated CNTs for lead removal in a fixed bed column. In a step towards a stand-alone hybrid composite, MWCNTs were functionalized with magnetite nanoparticles, and spray-coated onto a carbon fabric support. However, this material was demonstrated as an electrode for removal of arsenic via capacitive deionization, rather than for sorption-based treatment in flow. However, given that CNTs present similar barriers to application as nano-metal oxides, metal oxide-CNT composites are less likely to move towards commercial viability than other, more durable hybrid composites.

Relative to CNTs, macro-scale supports such as sand, zeolites, and activated carbon are more readily applied in packed columns. Iron oxide-coated sands have been demonstrated for removal of both anionic (e.g., arsenic) and cationic (e.g., copper, lead, and cadmium) heavy metal species, and have been applied in POU-scale arsenic treatment units. Immobilization of nano-iron oxides on microporous and granular supports such as zeolite, alumina, and granular activated carbon (GAC) permits the use of higher iron oxide loadings. Fan and Anderson demonstrated the removal of copper and cadmium on a manganese oxide-coated GAC, noting that GAC is a lower-cost support material for metal oxide impregnation relative to ion exchange resins. Further, they concluded that relative to a representative commercial cation exchange (CX) resin, the manganese oxide-coated GAC produced comparable performance for only a slightly higher unit cost. Jang et al. loaded hydrous ferric oxide (HFO) nanoparticles onto GAC via incipient wetness impregnation, and demonstrated metal removal in synthetic water (0.3 mM $HCO_{3-}$, pH 6.5) containing 300 µg As/L via mini-column tests. However, due to the microporous nature of both zeolite and GAC, diffusion limitations again restrain removal rates, necessitating larger treatment unit footprints for application at scale. Further, as for GFH, disintegration of GAC over time can lead to high head drops in packed beds.

Polymeric supports are a promising alternative to carbon- and mineral-supported composites to enhance composite lifetime and durability under flow conditions. Polymeric supports with a higher degree of porosity allow higher mass loadings of metal oxide nanoparticles, and thus enhanced removal performance per unit composite mass. This was clearly demonstrated by Katsoyiannis and Zouboulis, who showed that improved arsenic removal performance was attained with the higher achievable iron oxide nanoparticle loading on polyHIPE beads (which are produced by polymerization of a high internal phase emulsion, and have a more microporous structure) coated with iron oxide nanoparticles, relative to coated polystyrene beads (which have relatively smooth surfaces). Extending the concept of polymeric bead supports, the use of polymeric ion exchange resins as microporous supports for iron oxide nanoparticles has been extensively evaluated. Beyond their widely acknowledged durability during water treatment applications, ion exchange resins also offer the potential to exploit dual mechanisms of contaminant removal via both ion exchange at functional sites and sorption at iron oxide sites. Hybrid ion exchange (HIX) composites are particularly well-developed for arsenic removal, and have achieved commercial viability (e.g., Purolite Arsen$^{np}$).

The first generation of hybrid ion exchange (HIX) composites, which were applied for arsenic removal, utilized the sulfonate functional groups of cation exchange resins to facilitate their fabrication by first adsorbing $Fe^{3+}$ salts at sulfonate sites, followed by in situ precipitation of hydrous ferric oxide nanoparticles. Although hybrid cationic exchange (HCIX) resins have been successfully applied for removal of negatively charged arsenic species (e.g., arsenate and arsenite), other work has shown that HCIX resins preferentially remove cationic species (e.g., copper) over arsenic species. Further, Cumbal and SenGupta demonstrated that HCIX removal efficiencies for arsenic are limited by the Donnan membrane effect, in which the non-diffusible, negatively charged sulfonate groups cause exclusion of negatively charged arsenate ions from the resin micropores, thus preventing their access to the HFO sorption sites.

Thus, more recent work has focused on the development of hybrid anion exchange (HAIX) resins. The cationic (e.g., quaternary ammonium) sites have been shown to promote transport of anionic target species to the HFO sites, and HAIX composites preferentially remove anionic targets (e.g., selectivity for arsenic in the presence of copper). Further, the quaternary ammonium sites remain active ion exchange sites after deposition of HFO nanoparticles, and can be utilized for simultaneous removal of other contaminants, such as the concurrent removal of arsenate (via sorption) and perchlorate (via ion exchange), as was demonstrated by Lin et al.

Similarly, while hybrid AX resins have been applied for removal of cationic species (e.g., removal of lead and cadmium by a weak base AX resin impregnated with $MnO_2$), 180 HCIX composites are more effective than HAIX when targeting cationic heavy metal species (e.g., copper, lead, and cadmium). For example, Wan et al. demonstrated the selective removal of cadmium and zinc by a hydrous manganese oxide-CX composite in the presence of calcium. Likewise, Pan et al. showed that cadmium and lead were effectively removed in both simulated electroplating water and simulated natural water that contained both calcium and magnesium by a HFO—CX composite resin.

Notably, HIX composites remain limited by rates of intraparticle diffusion to HFO sites within the pores of spherical ion exchange resin beads. Fibrous ion exchange supports, such as commercially available FIBAN® fibers, which typically have diameters on the order of ~15-50 and thus provide high external surface areas relative to microporous beads, can overcome such diffusion limitations. Similar to their microporous counterparts, hybrid fibrous ion exchange composites can provide dual sites for uptake. Lin and Sengupta demonstrated concurrent removal of arsenic and perchlorate on HFO-impregnated anion exchange fibers, and Padungthon et al. showed the simultaneous removal of zinc and calcium/magnesium hardness by strong acid cation exchange fibers impregnated with hydrous zirconium oxide (HZO).

However, as for microporous resins, a major limitation is that production of fibrous ion exchange materials requires several material processing steps during production. Such processing steps and the associated material inputs are important factors in evaluating material sustainability via life cycle assessment. For example, polyacrylonitrile-based IX fibers are typically produced via cross linking of PAN via reaction with hydrazine prior to further functionalization (e.g., conversion of nitrile groups to carboxylic acid or amine groups). Subsequent immobilization of HFO (or other hydrous metal oxides, such as hydrous zirconium oxide) on the IX material typically relies on the precipitation of metals salts using sodium hydroxide. Although Chaudhary and Farrell demonstrated that a one-step treatment with 10% NaOH could produce carboxamide and carboxylate functional groups on the polymer surface, and allow deposition of iron oxide nanoparticles, this method does not allow functionalization with quaternary ammonium groups, the effectiveness of which has been demonstrated for removal of arsenic by both microporous HIX beads and fibrous composites.

Role of Electrospinning in Development of Functional Nanocomposites

Figure 9:
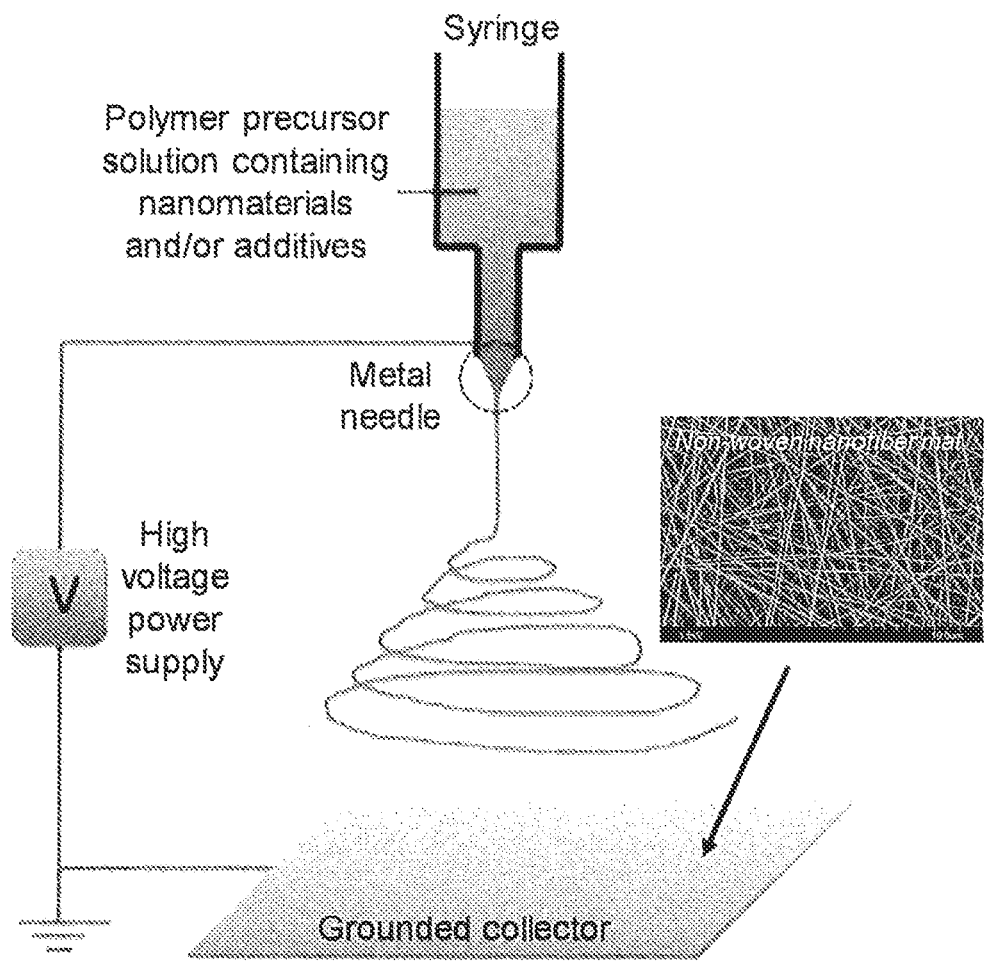
FIG. 9 is a schematic of the electrospinning process.

Electrospinning, a novel method for fabrication of non-woven, nanofiber materials, could overcome limitations associated with the application of nanotubes and nanoparticles in drinking water treatment, such as high head losses in packed beds and concerns regarding nanomaterial release into the treated supply (FIG. 9). In the electrospinning process, a polymer precursor solution (e.g., polyacrylonitrile dissolved in an organic solvent, such as N—N-dimethylformamide) is loaded in a syringe with a metal needle tip. As the polymer precursor solution (or "sol gel") is pumped through the needle tip, a high voltage is applied between the needle tip and a grounded collector (such as a rotating drum). The high voltage difference between the needle tip and collector is able to overcome surface tension of the droplet formed at the needle tip, pulling the solution towards the collector in a whipping jet of polymeric nanofibers, and causing evaporation of the organic solvent. The nanofibers are deposited on the collector as a non-woven mat, or filter, which is mechanically stable and allows high-flux fluid passage through the nanofiber network. Further, the electrospinning process is highly tunable, via changes to processing parameters (e.g., applied voltage, needle size, and humidity) and to the sol gel composition. For example, composite "building blocks," such as carbon nanotubes or metal oxide nanoparticles, can be included in the sol gel, allowing fabrication of a hybrid composite via single-pot synthesis. The electrospun polymeric composite can either be used directly, or undergo thermal treatment (e.g., thermal stabilization and pyrolysis for conversion of the polymer precursor to carbon) prior to application. The electrospinning process is also highly scalable, making the industrial-scale production of electrospun materials possible.

Current Status of Electrospun Composites for Organics and Heavy Metal Removal

Electrospun Carbon Nanofiber (CNF) Composites for Organic Removal

Polyacrylonitrile is commonly used in fabrication of electrospun carbon nanofiber (CNF) materials. Electrospun CNF materials have been applied for a wide range of applications, ranging from electrodes in microbial fuel cells, to supercapacitors, to supports for photocatalytic nanoparticles. CNFs (both electrospun and catalytically grown) have been applied as dispersions for adsorption of organic pollutants such organic dyes, organic solvents, and volatile organic compounds such as benzene. However, application of such dispersions is limited by the same practical considerations noted above for CNTs (e.g., potential for material release). Thus, the promise of electrospun CNFs is their potential for application as a cohesive, stand-alone material, although unmodified electrospun CNFs are relatively weak (e.g., brittle, prone to cracking). Singh et al. was able to apply an unmodified, electrospun CNF filter for removal of the disinfection byproduct monochloroacetic acid (MCAA) in a flow-through system by limiting carbonization temperatures during fabrication to <500° C. However, such low carbonization temperatures may prevent the degree of graphitization of the polymeric precursor, thus limiting material sorption capacity.

Methods to improve material flexibility have focused on the inclusion of silica ($SiO_2$) in the CNF matrix or the introduction of macropores (which reduces nanofiber stress during bending) via inclusion of removable components in the precursor solution. Such removable components include volatile organics or polymers (e.g., terephthalic acid, poly(methylmethacrylate), and poly(styrene-co-acrylonitrile)) and acid-dissolvable metal oxides (e.g., $SiO_2$, $CaCO_3$, Mn oxides, and $ZnCl_2$). Application of these flexible composites has focused on energy applications (e.g., as supercapacitors and battery anodes), physical separation of nanoparticles, or sorption of hydrophobic compounds (e.g., oil and organic dyes), rather than sorption of polar/polyfunctional organic micropollutants.

To improve CNF strength, several groups have evaluated the effect of embedding CNTs within the nanofibers. Embedded CNTs are commonly utilized to improve both mechanical strength and electrical/thermal properties of polymeric nanofibers. The inclusion of CNTs in CNFs yields similar improvements in material properties, although the effect on material strength has not been quantitatively investigated for cohesive CNF networks. Additionally, the influence of CNTs on both material strength and performance (e.g., sorption capacity) has not been evaluated. For example, while Singh et al. demonstrated that the inclusion of MWCNTs in their CNF filters improved initial removal of MCAA during flow-through treatment, the effect of MWCNTs on composite strength was not quantified.

Singh et al. further noted that embedded MWCNTs had no impact on removal efficiency beyond the first 50 mL treated, presumably due to rapid saturation of the relatively small fraction of surface-exposed CNTs. This represents a key challenge in deployment of CNTs (or other nanomaterials) within composite matrices: immobilizing the nanomaterial to prevent material leaching from the composite, while providing sufficient accessibility to embedded CNTs, such that material reactivity is not lost. While improvements in material porosity, such as those described above for fabrication of macroporous, flexible CNF membranes, could yield improved access to embedded CNTs, this phenomenon has not yet been investigated.

Electrospun Polymeric Composites for Heavy Metal Removal

Recent work towards development of polymeric electrospun composites for treatment of heavy metal contamination is focused in two main areas: surface-functionalized polymers and metal oxide-polymer composites. There is limited cross-over between the two areas (i.e., there are few demonstrations of electrospun composites that utilize both surface functional groups and immobilized metal oxides to provide surface sites for contaminant removal).

Both single-component and bi-component functionalized electrospun polymers have been developed as heavy metal sorbents. Single-component materials (typically polyacrylonitrile) are chemically modified to convert inactive functional groups (e.g., nitrile) to functional groups that serve as active sites for metal uptake (e.g., amine, amidoxime). In bi-component materials, a mechanically stable electrospun polymer support is surface-functionalized with another polymer (which provides the functional sites for uptake) or the secondary component is co-electrospun with a "functional component" to facilitate electrospinning fabrication of a functional material that is otherwise challenging to electrospin.

Surface-Functionalized Electrospun Polymers

The functionalization of both commercial PAN cloth and nonwoven electrospun PAN nanofiber mats with amino ($NH_2$) groups can be achieved via reaction with diethylentriamine (DETA). The rate and extent of conversion can be increased by use of higher temperatures, although the extent of functionalization must be carefully controlled (typically <35%) to prevent the polymer from becoming brittle and inflexible. Performance comparisons across aminated PAN fibers applied for heavy metal sorption are challenging, due to a range of functionalization conditions and rates of conversion. However, Kampalanonwat and Supaphol compared Pb and Cu removal performance of aminated PAN nanofibers and microfibers across identical functionalization conditions. They observed approximately 2-fold increases in material capacity for the nanofiber material at pH 4, which was attributed to the larger surface area of the nanofibers. Generally, aminated PAN fibers (evaluated between pH 2-6) exhibit batch uptake capacities for Cu and Pb that were >30 mg/g. Aminated PAN can be further converted to phosphorylated PAN via refluxing in paraformaldehyde and phosphorous acid, and subsequently applied for removal of copper, lead, cadmium, and silver. However, limited further investigations have pursued this functionalization route, likely due to the extensive materials processing required for fabrication of phosphorylated PAN.

Functionalization of PAN with amidoxime groups ($R_1R_2C=N-OH$) utilizes hydroxylamine hydrochloride ($NH_2OH-HCl$) and either sodium hydroxide or sodium carbonate. The extent of functionalization, which also can be controlled by temperature and solution alkalinity, must again be <35% to prevent loss of material strength and flexibility. Efforts to improve material properties include the use of a Teflon frame to prevent material shrinkage during functionalization, immobilization between two ethylene-propylene thermal bonded non-woven layers prior to functionalization, and co-electrospinning of pre-amidoximated PAN with poly(vinylidene fluoride) (PVDF).

Although performance comparisons across similar materials are again challenging, due to varied and/or limited reporting of functionalization conditions, amidoximated PAN materials have been applied for removal of dyes, lead, copper, and uranium (as well as other trace heavy metals). Most promising for the relevance of amidoxime functionalized materials in drinking water treatment are results indicating that the material can remove environmentally relevant concentrations from complex matrices in dynamic systems. For example, Horzum et al. demonstrated effective sorption of U(VI) from 50 and 100 µg/L solutions in a flow-through column over 14 trials. Xie et al. showed that an amidoximated PAN-PVDF composite could efficiently extract uranium from a simulated seawater containing both 3.5 wt % sea salt and nine other commonly found marine elements (V, Fe, Co, Ni, Cu, Zn, Pb, Mg, and Ca) at 100 times their typical concentrations in seawater. Notably, Xie et al. suggested that an important optimization parameter for improving material capacity is the improved distribution and accessibility of amidoxime groups throughout the material (i.e., via increased functionalization uniformity and material porosity), rather than simply the total functional group content. This lesson in performance optimization is like more broadly transferrable to development of other types of functionalized and composite materials.

A wider range of polymers has been utilized in bi-component composites, relative to the polyacrylonitrile-focused amine- and amidoxime-functionalized single-component materials. For example, electrospun cellulose acetate nanofibers, which provide a cohesive nanofiber matrix, were functionalized via surface grafting with polymethacrylic acid (PMMA), which provides carboxyl groups for heavy metal (mercury, copper, and cadmium) uptake. Similarly, several groups have demonstrated core-shell nanofibers for heavy metals uptake, with polyaniline (PANI) and polypyrrole (PPy) as the active "shell" layer. The "core" support material can affect the extent of processing required for deposition of the PANI or PPy layer; for example, deposition of PANI on a PAN support proceeds via a one-step chemical oxidative polymerization, while functionalization of polystyrene requires heat, pressure, and plasma treatment prior to surface polymerization of PANI. Cationic heavy metals (e.g., copper, cadmium, lead, and mercury) can be removed by PANI-composites via complex formation with the nitrogen in PANI. In contrast, both PANI and PPy remove Cr(VI) via a two-step mechanism, in which Cr(VI) is first removed via ion exchange with chloride counter-ions and subsequently reduced to Cr(III).

An alternative approach to surface deposition of a functional polymer after electrospinning is the use of a secondary "template" polymer to facilitate electrospinning. Polyvinyl alcohol (PVA) has been used to facilitate electrospinning of both poly(ethyleneimine) (PEI) and polyacrylic acid (PAA), although both composites required cross-linking (using glutaraldehyde or thermal treatment, respectively) to provide sufficient material stability for application in aqueous solution. The template may also be sacrificial, such as the removal of poly(ethylene oxide) (PEO) from a chitosan-PEO composite after electrospinning to allow production of pure chitosan nanofibers for arsenic removal.

Electrospun Metal Oxide-Polymer Composites

The templated approach to composite fabrication described above is typically used in the production of pure metal oxide nanofibers. A metal oxide precursor is included in the polymer precursor solution, and the polymer template is removed during subsequent calcination. However, iron oxide and aluminum oxide nanofibers produced by this method are typically brittle and can only be applied in batch as dispersions. This approach is, however, useful for the fabrication of polymer-silica composites, given the improved mechanical characteristics of silica relative to iron and aluminum oxides. For example, Wu et al. and Taha et al. produced mesoporous functionalized silica nanofibers by electrospinning with a polymer template (polyvinyl pyrrolidone or polyvinyl alcohol), followed by extraction of the polymer phase in acetone/HCl or ethanol/HCl mixtures. The silica was modified with amino or thiol groups prior to electrospinning via hydrolysis poly-condensation, and the functionalized nanofibers were applied for batch adsorption of Cr(III) or Cu, respectively. Similarly, an amino-functionalized cellulose acetate/silica composite was applied for Cr(VI) removal, where the silica component served both to improve material stability and support the surface functional groups. Although composite performance was demonstrated in a continuous flow-through system, experiments were performed at pH 1 and for influents containing ≥10 mg/L (i.e., conditions unrealistic for water treatment). Dastbaz and Keshtkar demonstrated an alternative approach to the co-electrospinning of silica by incorporating $SiO_2$ nanoparticles surface-functionalized with aminopropyltriethoxysilane (APTES) to incorporate amine functional groups into electrospun PAN. Both the degree of $SiO_2$ functionalization and the nanoparticle loading in the composite were optimized to improve adsorption capacity for $Th^{2+}$, $U^{6+}$, $Cd^{2+}$, and $Ni^{2+}$, although the material required application at relatively low sorbent loadings in batch systems to prevent adsorbent aggregation (implying that the composite was not a cohesive network of fibers).

Similarly, several iron and aluminum composites have been fabricated by including the component that provides the active site in the electrospinning precursor solution. Electrospun composites with active Fe(II) or Fe(III) sites were fabricated by the addition of iron chloride ($Fe_2Cl_2$ or $Fe_3Cl_3$) to PAN or PVA, respectively. The PAN/Fe(II) composite was applied directly for coordination and reduction of Cr(VI), while the PVA/Fe(III) composite was cross-linked via exposure to saturated liquid ammonia in a desiccator prior to application for arsenic removal.

Given that the iron salts may leach from the composites over time, the use of nanoparticles is a more promising alternative to fabricate durable composites with embedded active sites. Nevertheless, development of such simple composites is limited, and they tend to exhibit poor performance relative to surface-functionalized polymers, primarily due to inaccessibility of sites for uptake due to nanoparticle encapsulation. Hota et al. incorporated nano-boehmite (AlOOH) into polycaprolactone and Nylon-6, and observed a capacity for Cd removal of only 0.21 mg/g (relative to 0.34 mg/g for unsupported nano-AlOOH, although this capacity comparison was made on the basis of a single-point uptake experiment). They attributed the loss in AlOOH capacity to loss in reactive surface area after encapsulation within the nanofibers. Patel et al. observed that relative to PAN composites with surface-deposited iron oxide nanostructures, a PAN composite with embedded iron oxide nanoparticles exhibited approximately half the capacity for removal of Congo Red dye. However, a direct comparison was not made to the capacity of the unsupported iron oxide nanoparticles, and the PAN support was found to also contribute significantly to dye uptake (e.g., PAN provided 60% of the total uptake observed for the PAN-embedded iron oxide composite). Such factors confound comparisons across composite materials and prevent an evaluation of nanoparticle utilization within the composite.

Due to the challenges of effectively deploying nanoparticles embedded within a composite structure, the majority of polymer-metal oxide composite development to date has focused on the fabrication and application of hierarchical structures. Hierarchical (e.g., core/shell) composites are fabricated by post-electrospinning hydrothermal growth of nanostructures or deposition of nanoparticles on the surface of an electrospun polymer support. Surface deposited structures can be grown from a seed that is incorporated in the electrospinning precursor solution, such as the electrospinning of a thermal plastic elastomer ester doped with iron alkoxide. Alternatively, the metal oxide precursor (e.g., iron alkoxide, $Fe^{3+}$) can be complexed with the surface of the polymer after electrospinning, prior to hydrothermal growth of iron oxide nanostructures on the surface of the complexed Fe-polymer material. Other examples include the growth of γ-AlOOH nanostructures on the surface of electrospun PAN by hydrothermal treatment in the presence of aluminum powder and hexamethylenetetramine, and in-situ reduction of $MnO_{4-}$ to $MnO_2$ on a polypyrrole-coated PAN composite. While these composites are promising, as they provide a high degree of surface-accessible metal oxide nanostructures as uptake sites for heavy metals such as chromium, lead, and copper, their fabrication is time- and materials-intensive.

To our knowledge, commercial application of both nanomaterials and electrospun nanocomposites in drinking water treatment remains limited, primarily due to practical challenges associated with their deployment in treatment units. The two main examples of commercially available nanocomposites for drinking water treatment are Arsen$^{np}$® (Purolite Co.), a microporous ion exchange resin bead impregnated with HFO nanoparticles, and the Naked Filter® (Liquidity Nanotech), an electrospun polyacrylonitrile-based water bottle filter. Removal of arsenic by ArsenX$^{np}$® is limited by rates of diffusion, due to its microporous nature. The use of nanofibrous materials, such as the Naked Filter®, could overcome diffusion limitations and decrease the necessary physical footprint of treatment units. However, the Naked Filter® currently focuses on physical removal of contaminants (i.e., removal of bacteria via size exclusion), without tailoring of nanofiber surfaces to improve targeted removal of specific contaminants.

Demonstrations of immobilized CNTs and CNT-composite membranes for dynamic sorption of organic micropollutants are also limited, and these nano-enabled technologies have not achieved commercial viability. Wang et al. provided the most promising evidence for use of an entangled network of vacuum deposited MWCNTs supported by a polymer membrane, showing >40% removal of 7 micropollutants (ibuprofen, acetaminophen, carbendazim, 4-acetylamino-antipyrine, caffeine, prometryn, triclosan; treated individually) over 50 minutes of recirculation for a 100 µg/L influent solution. The inclusion of CNTs in an electrospun polymer and in CNF membranes has principally focused on material strength, although a limited number of studies have considered the potential for such a platform in treatment. For example, as noted earlier, Singh et al. showed that inclusion of MWCNTs in an electrospun CNF membrane improved initial removal efficiency of an 80 mg/L monochloroacetic acid influent solution, but they did not quantify the effect of MWCNTs on material strength, and saw no impact on removal efficiency at permeate volumes >50 mL due to MWCNT encapsulation. Methods to improve CNF macroporosity could promote accessibility of embedded MWCNTs, while simultaneously improving material flexibility. The most promising approach is that of Liu et al., who generated a macroporous, flexible CNF via inclusion (and subsequent sublimation during thermal treatment) of the volatile organic acid, terephthalic acid. In their work, however, the flexible CNF did not contain nanomaterial inclusions, and was applied for oil/water separation (i.e., hydrophobic pollutant targets), rather than removal of more polar organic micropollutant classes.

In the case of nanocomposites for heavy metal removal, the fabrication methodology utilized for Arsen$^{np}$® (e.g., nano-hydrous ferrous oxide immobilization on an ion exchange resin support) has been extended to commercial ion exchange fibers. Both cation and anion exchange fibers have been functionalized with hydrous metal oxides (HFO, HZO), and applied for removal of heavy metal contaminants (arsenate, zinc) in the presence of interfering counter-ions (chloride, sulfate, and bicarbonate, or calcium and magnesium). Composite performance is typically benchmarked to that of the unmodified ion exchange support, rather than to that of unsupported metal oxide nanoparticles; thus, the degree of utilization of the impregnated metal oxide is generally not optimized.

To date, most electrospun polymer nanofibers with embedded iron oxide nanostructures exhibit limited uptake capacities, due to encapsulation within the polymer. While electrospun composites with surface-deposited iron oxide nanostructures provide a higher degree of solution-accessible sites for uptake, they have not been demonstrated in dynamic (e.g., flow-through) treatment systems. More broadly, there is a need for simpler fabrication methods (e.g., single-pot syntheses) that avoid post-processing of electrospun materials, to improve both the sustainability and commercial viability of such materials. Additionally, the simultaneous functionalization of electrospun polymers with both ion exchange and iron oxide sites has not yet been investigated.

Electrospun polymers can be easily tailored via changes to the electrospinning precursor solution (i.e., addition of composite building blocks). The utility of ionic surfactants, which possess charged head groups similar to common ion exchange resins (i.e., quaternary ammonium and sulfonate groups), in facilitating electrospinning of complex and/or challenging sol gels is well established. Further, Jang et al. demonstrated the simultaneous removal of arsenate and perchlorate on HFO- and quaternary ammonium surfactant-modified GAC, indicating that surfactants may indeed provide active sites for contaminant uptake. Also, Lundin et al. showed that amphiphilic molecules, such as surfactants, can surface-segregate within polymer matrices (albeit, in the context of utilizing the quaternary ammonium functionality in antimicrobial materials). Thus, inclusion of ionic surfactants in electrospinning precursor solutions with iron oxide nanoparticles may be useful not only to functionalize nanofiber surfaces and provide active sites for uptake, but also to improve dispersion and promote surface segregation of embedded iron oxide nanoparticles. Such an effect could facilitate the single-pot synthesis of an electrospun composite that achieves an optimized balance between nanomaterial immobilization and accessibility of reactive surface area.

Figure 10:
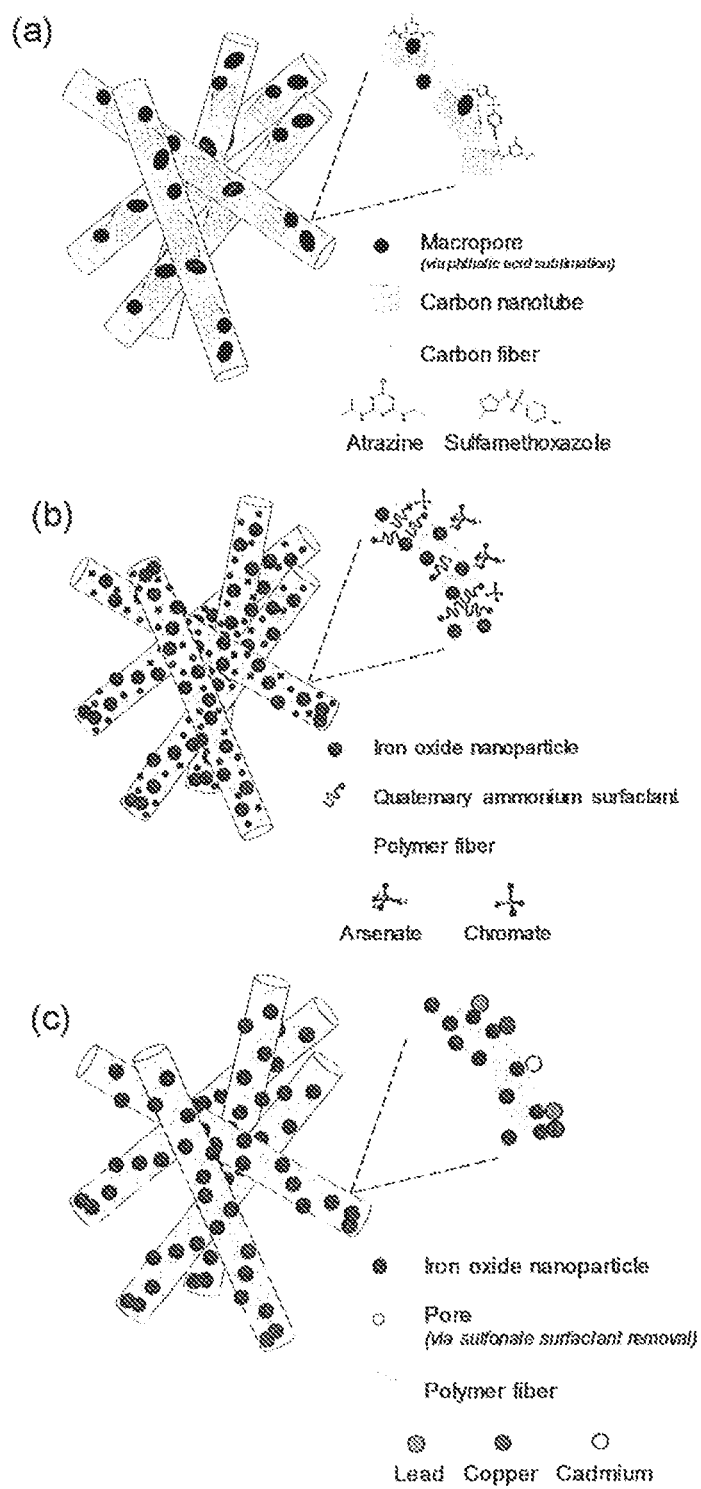
FIGS. 10A-10C are schematic representations of electrospun nanofiber composites developed herein. (a) Carbon nanofiber—carbon nanotube composite for organic micropollutant removal. (b) Hybrid iron oxide—ion exchange polymer composite for heavy metal oxyanion removal. (c) Porous iron oxide—polymer composite for heavy metal cation removal.
Figure 11:
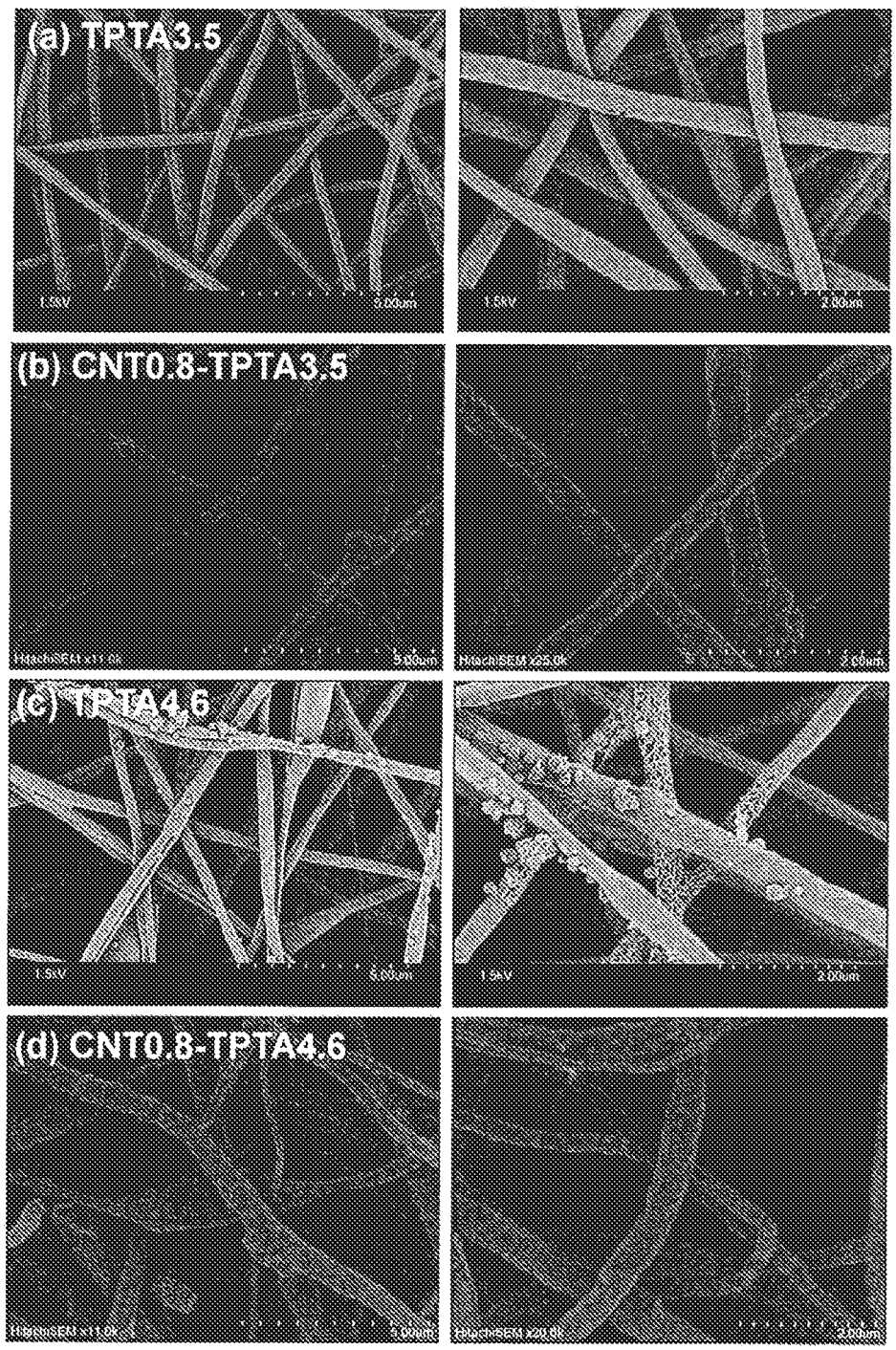
FIGS. 11A-11D are SEM images of TPTA-containing CNFs (a, c) and TPTA-containing CNFCNT composites (b, d) for both low (3.5 wt %) and high (4.6 wt %) TPTA loadings. Materials shown contain low (0.8 wt %) CNT loading. Both CNT-derived morphology (e.g., knobs) and TPTA-derived morphology (e.g., macropores) are marked by red arrows, and wherein increasing concentrations of TPTA yielded a higher degree of macroporosity.
Figure 12:
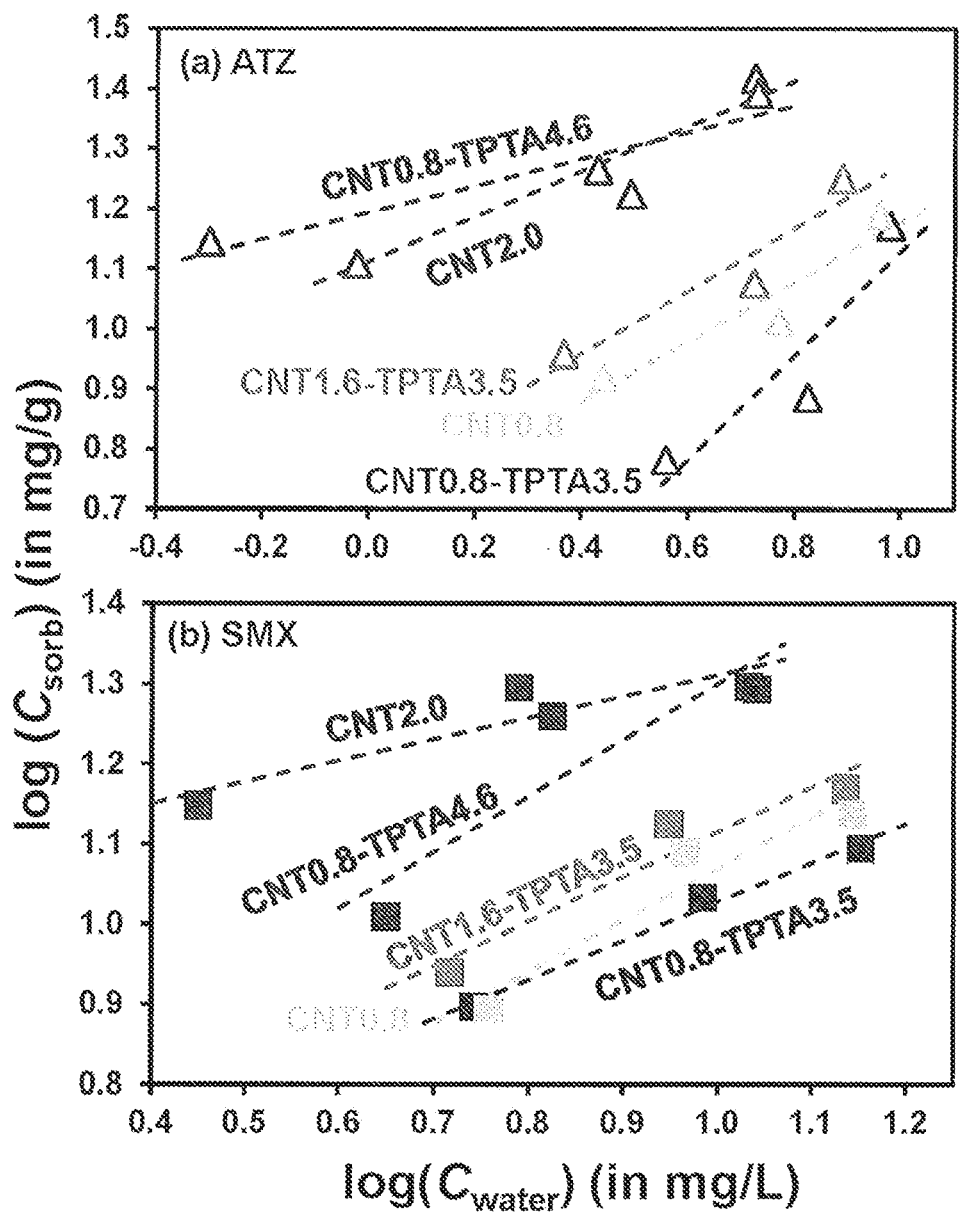
FIGS. 12A-12B are data shown for (a) ATZ and (b) SMX uptake by TPTA-containing CNFCNT composites, relative to CNF-CNT composite materials. Consistent with the literature, TPTA could be incorporated to yield a mat more flexible than unmodified CNFs. However, like PTA modified materials, TPTA modified mats were very poor sorbents (data not shown). Further, at the high TPTA and CNT concentrations needed for appreciable ATZ and SMX uptake during sorption isotherm experiments, both fabrication challenges (e.g., clogging during electrospinning) and unacceptable material properties (e.g., weak mats that could not be folded without breaking) were encountered. Because of their fabrication challenges and poor material strength, mats containing TPTA-derived macroporosity were not further investigated. Experimental conditions: 0.4 g/L nanofiber sorbent, 5 mM phosphate buffer, pH 7.

To address the existing gaps in the application of nanomaterials in drinking water treatment, this work explores the fabrication, characterization, and performance testing of composite carbonaceous and polymeric electrospun nanofiber materials (FIGS. 10A-10C). The important intersection of material strength and reactivity was examined, to enable both practical and effective utilization of nanocomposites in drinking water treatment. Specifically, this work establishes methods for fabrication of mechanically robust CNF-CNT composites and surface-functionalized iron oxide-polymer composites, and evaluates their performance for removal of emerging organic micropollutants and heavy metals, respectively, at environmentally relevant concentrations. Performance is benchmarked to both unmodified supports and unsupported nanomaterials. Collectively, this work establishes a basis for the development of responsible and effective nanocomposites for next-generation POU drinking water treatment.

Specific objectives include: identify an optimized balance between mechanical strength and sorption capacity of macroporous electrospun CNF-CNT composites, and evaluate performance for removal of organic micropollutants in a flow-through system representative of POU drinking water treatment, establish a single-pot method for fabrication of an electrospun, polymer-iron oxide nanoparticle composite, evaluate the inclusion of cationic (e.g., quaternary ammonium) surfactants to both provide ion exchange sites and improve accessibility of embedded iron oxide nanoparticles, and assess performance for removal of heavy metal oxyanions (arsenate and chromate) in complex, dynamic treatment systems, systematically evaluate the role of synergies between iron oxide nanoparticles and anionic (e.g., sulfonate) surfactants in development of electrospun polymer-iron oxide nanoparticle composites with surface-active iron oxide binding sites for removal of cationic heavy metal species (e.g., copper, lead, and cadmium), and apply optimized materials for removal of lead contamination in a flow-through system representative of POU drinking water treatment.

These objectives are driven by the following hypotheses. First, CNTs can be embedded in electrospun CNFs to provide unique sites for uptake of organic micropollutants. Macroporosity of CNF-CNT composites (achieved by inclusion of volatile acids in the electrospinning precursor solution) can be tuned to achieve a balance between improved material flexibility and enhanced solution-phase accessibility of incorporated CNTs, thus permitting utilization of CNT surfaces for micropollutant removal under kinetically limited conditions (e.g., continuous flow). Second, a comparable methodology can be applied to the development of electrospun polymer composites with surface-active iron oxide sites through the use of ionic surfactants. Specifically, ionic surfactants will surface-segregate within the polymer nanofibers, and interactions between ionic surfactants and iron oxide nanoparticles will yield concurrent surface segregation of nanoparticles to produce synergistic performance in the composite. Third, the choice of ionic surfactant (and its associated molecular structure and properties) can be utilized to modify nanofiber properties, such as surface-functionalization with active ion exchange sites via retention of the surfactant within the polymer matrix, or generation of porosity via removal of the surfactant. Fourth, both surfactant-generated ion exchange sites and iron oxide nanoparticle sorption sites can be utilized in dynamic flow-through systems for removal of heavy metal contamination, while also allowing construction of multi-layered materials tailored to quality problems of specific aquatic matrices.

In accordance with an exemplary embodiment, a macroporous, electrospun carbon nanofiber-carbon nanotube (CNF-CNT) composite is fabricated for removal of organic micropollutants. The effect of multi-walled CNTs and macroporosity (created via inclusion and sublimation of the volatile organic, phthalic acid) on material characteristics, such as nanofiber diameter and morphology, surface area, surface chemical composition, and macro-scale material strength and flexibility is disclosed. The influence of material fabrication parameters on batch sorption kinetics and capacities with two representative organic micropollutants chosen for their different polarities, sulfamethoxazole (SMX, log $K_{ow}$ 0.89) and atrazine (ATZ, log $K_{ow}$ 2.61) is disclosed. These studies establish the optimal material formulation to obtain a balance of material strength and flexibility (which is critical for practical applicability) and material reactivity. Batch performance comparisons are made to freely dispersed CNTs and commercially available granular activated carbon (GAC), and practical performance for removal of a suite of ten representative organic micropollutants in a flow-through system relevant to POU drinking water treatment is evaluated.

In accordance with a further exemplary embodiment, the development, via a "single-pot" synthesis, of electrospun ion exchange-iron oxide polyacrylonitrile (PAN) composites for heavy metal oxyanion removal is disclosed. To produce surface sites for uptake, the inclusion of quaternary ammonium salts (QAS), the surfactants cetyltrimethylammonium bromide (CTAB) and tetrabutylammonium bromide (TBAB), ferrihydrite (Fh) nanoparticles, and possible synergies of including both QAS and Fh in the electrospinning precursor solution are discussed. The effect of quaternary ammonium surfactants (QAS) and Fh loading on composite properties, such as nanofiber morphology, surface chemical composition, and solution phase accessibility of embedded nanoparticles, and batch uptake rates and capacities for arsenate and chromate removal are also discussed. Practical performance demonstrations include comparisons to unmodified PAN nanofibers and freely dispersed Fh nanoparticles, and evaluation of QAS retention within the polymer matrix. The effect of varied water quality on material performance is also disclosed, and demonstrates the flow-through treatment of influents containing arsenate and/or chromate at environmentally relevant concentrations.

In accordance with a further exemplary embodiment, material fabrication concepts are disclosed for the development of porous polymer-iron oxide composites for removal of cationic heavy metals (e.g., copper, lead, and cadmium). Commercially available, ~3 nm amorphous iron oxide nanoparticles are used as the active binding agent in the composite. The potential role(s) of the anionic surfactant sodium dodecyl sulfate (SDS) as a removable porogen and promoter of nanoparticle surface-segregation are assessed via characterization of nanofiber morphology, composite surface area, and surface chemical composition. Evaluation of material performance for copper, lead, and cadmium removal in batch systems is benchmarked to unmodified PAN, SDS-modified PAN, and unsupported iron oxide nanoparticles to determine both the contribution of the iron oxide nanoparticles to overall composite capacity, as well as the "utilization efficiency" of the nanoparticle capacity (i.e., the degree to which the uptake capacity of the unsupported nanoparticles is preserved within the nanocomposite). Practical performance is demonstrated for flow-through treatment of influents containing lead at concentrations relevant to drinking water.

In accordance with an exemplary embodiment, the deployment of carbon and iron oxide nanomaterials within self-contained filters for POU drinking water treatment is disclosed. Further, the materials and material fabrication methodologies developed herein will establish a new framework for the development of hybrid nanocomposites by providing insights into the concurrent immobilization and utilization of nanomaterials. These materials can also be extended to other contaminant targets and application platforms, such as for sequestration of carbon dioxide, removal of nutrient (e.g., nitrate and phosphate) pollution, binding of uranium for environmental sensing and biomonitoring, and for treatment of viral contamination both in drinking water and in air.

Synthesis, Optimization, and Performance Demonstration of Electrospun Carbon Nanofiber-Carbon Nanotube Composite Sorbents for Point-of-Use Water Treatment In accordance with an exemplary embodiment, an electrospun carbon nanofiber-carbon nanotube (CNF-CNT) composite with optimal sorption capacity and material strength for point-of-use (POU) water treatment is disclosed. Synthesis variables including integration of multi-walled carbon nanotubes (CNTs) and macroporosity (via sublimation of phthalic acid), relative humidity (20 and 40%), and stabilization temperature (250 and 280° C.) were used to control nanofiber diameter and surface area (from electron microscopy and BET isotherms, respectively), surface composition (from XPS), and strength (from AFM nanoindentation and tensile strength tests). Composites were then evaluated using kinetic, isotherm, and pH-edge sorption experiments with sulfamethoxazole (log $K_{ow}$=0.89) and atrazine (log $K_{ow}$=2.61), representative micropollutants chosen for their different polarities. Although CNFs alone were poor sorbents, integration of CNTs and macroporosity achieved uptake comparable to granular activated carbon. Through reactivity comparisons with CNT dispersions, we propose that increasing macroporosity exposes the embedded CNTs, thereby enabling their role as the primary sorbent in nanofiber composites. Because the highest capacity sorbents lacked sufficient strength, our optimal formulation (polyacrylonitrile 8 wt %, CNT 2 wt %, phthalic acid 2.4 wt %; 40% relative humidity; 280° C. stabilization) represents a compromise between strength and performance. This optimized sorbent was tested with a mixture of ten organic micropollutants at environmentally relevant concentrations in a gravity-fed, flow-through filtration system, where removal trends suggest that both hydrophobic and specific binding interactions contribute to micropollutant uptake. Collectively, this work highlights the promise of CNF-CNT filters (e.g., mechanical strength, ability to harness CNT sorption capacity), while also prioritizing areas for further development (e.g., improved removal of highly polar micropollutants, sensitivity to interfering co-solutes).

An array of structurally diverse, synthetic organic chemicals (e.g., agrochemicals, pharmaceuticals, and personal care products) are present in surface and groundwater resources relied upon for drinking water, where their removal proves challenging with conventional treatment approaches. Advanced technologies (e.g., chemical oxidation and reverse osmosis) are well-suited for the removal of these so-called emerging micropollutant classes. However, associated energy and infrastructure costs limit their viability in small (typically rural) water systems, as well as for the ~15% of Americans who directly utilize private groundwater wells as a drinking water source. In these cases, simple, scalable technologies appropriate for point-of-use (POU) application are needed to alleviate concerns associated with persistent, potentially bioactive organic chemicals in drinking water supplies.

Granular activated carbon (GAC), which is used at many municipal drinking water treatment plants, is currently the only POU technology approved by the EPA as a compliance technology for synthetic organic compounds in small water systems (e.g., serving 10,000 or fewer people). Nevertheless, general applications of GAC could be improved further by expanding its effective treatment targets both in quantity (e.g., unregulated but emerging contaminants) and type (e.g., more polar, polyfunctional compounds relative to those traditionally removed by GAC). For POU treatment, specifically, activated carbon-based approaches could also be enhanced by developing an application platform that operates at high permeate fluxes while also minimizing technology footprint.

Carbonaceous nanomaterials such as carbon nanotubes (CNTs) are promising candidates to address these new frontiers for sorbents in water treatment due to their large surface area (and in turn, high sorption capacity), and the potential to tailor their surface chemistry to target a broader spectrum of contaminants. For example, both non-functionalized and functionalized CNTs have been demonstrated to be effective sorbents toward a range of aquatic pollutants, including popular organic micropollutant classes. However, the deployment of CNTs, most often studied as sorbents in suspension, remains practically challenging amid rising concerns over their incidental environmental release and potential toxicity due to subsequent exposure. For safe and effective POU applications, improved CNT application platforms are needed that minimize their release into the treated supply, while also overcoming performance issues typically associated with such immobilization routes (e.g., possible loss of reactive surface area during encapsulation or high head losses in packed beds).

Carbon nanofibers (CNFs) may represent a more promising sorbent alternative, particularly when fabricated as a non-woven mat via electrospinning. Electrospun CNFs are often produced via thermal processing of polyacrylonitrile (PAN) nanofibers, while changes to electrospinning parameters (e.g., applied voltage, needle size, humidity) allow control of the final fiber morphology. Electrospinning also represents a relatively low-cost, highly tunable route for material production across a ranges of scales, including those suitable for POU applications. Such a CNF sorbent platform holds many potential advantages, including high fluxes through a stable, nanofiber-enabled filtration unit. Nevertheless, existing demonstrations of high surface area CNFs as sorbents have revealed them to be most often effective toward hydrophobic pollutant classes (e.g., oil, dyes, and aromatic compounds) rather than the more polar organic chemicals typical of emerging micropollutant classes. Further, CNFs often suffer from limitations in material strength that may also hinder their growth into a reliable sorbent alternative.

Here, using electrospinning, we have developed CNF-CNT composites as novel, non-woven sorbents suitable for POU water treatment. Incorporation of CNTs is recognized to improve the mechanical properties of polymeric and carbon nanofibers. Inclusion of CNTs has also been shown to generally increase the specific surface area of CNF-CNT composites. However, the influence of CNTs on both material properties and sorption capacity of electrospun CNF mats has not yet been investigated. Further, to best exploit the known, high sorption capacity of CNTs toward organic compounds, we explored methods to increase composite nanofiber porosity, in turn increasing sorbent surface area so as to promote access to embedded CNTs. For example, Liu et al. produced macroporous CNFs via sublimation of a volatile organic during thermal treatment to yield a flexible mat with two-fold higher surface area that was more effective than unmodified CNFs for oil/water separation.

In accordance with an exemplary embodiment, an optimal composite material exhibiting both high sorption capacity and material strength is disclosed. Accordingly, the influence of CNT loading and extent of macroporosity (via sublimation of volatile phthalic acids) on CNF-CNT composite properties including nanofiber morphology, specific surface area, and tensile strength was evaluated. Then, utilizing two representative, persistent organic micropollutants chosen for their distinct polarities [atrazine (log $K_{ow}$ 2.61) and sulfamethoxazole (log $K_{ow}$ 0.89)], the uptake rates and capacities of these nanofiber sorbents in batch systems was evaluated. Practical demonstrations of the optimal material included reactivity comparisons to dispersed CNTs and GAC, and its application for the removal of ten chemically diverse emerging organic micropollutants at environmentally relevant concentrations (i.e., ppb) in a flow-through system.

Materials and Methods

Reagents

All reagents were used as received. Electrospinning precursor solutions were prepared with polyacrylonitrile (PAN; MW 150,000, Aldrich), N,N-dimethylformamide (DMF; 99.85%, BDH Chemicals), terephthalic acid (99+%, Acros Organics), phthalic acid (99.5+%, Aldrich), and multi-wall carbon nanotubes (MWCNTs; 95+%, ash <1.5 wt %, <8 nm OD, 0.5-2.0 μm length, CheapTubes). Stock solutions of atrazine (Pestanal®, analytical standard, Fluka, Sigma), bezafibrate (≥98%, Sigma), caffeine (ReagentPlus®, Sigma), (−)-cotinine (≥98%, Sigma), gemfibrozil (Sigma), metoprolol tartrate (LKT laboratories), naproxen (meets USP testing specifications, Sigma), sulfadimethoxine (≥98.5%, Sigma), and sulfamethoxazole (Fluka, Sigma) were prepared in methanol (99.99%, Fisher Scientific). Sorption experiments were conducted either in 5 mM phosphate buffer (anhydrous potassium phosphate monobasic, $KH_2PO_4$; RPI; ACS grade) or 1 mM carbonate buffer (anhydrous sodium carbonate, $Na_2CO_3$; Fisher Scientific, ACS grade) prepared from deionized water (Thermo Scientific Barnstead NANOPure Diamond) and pH-adjusted as needed with 5 M NaOH. Granular activated carbon (GAC) was acquired from the Calgon Carbon Corporation (CENTAUR® 12×40; Iodine number 825 mg/g; Mean particle diameter 0.9-1.1 mm; Ash <7 wt %).

Preparation of Electrospinning Precursor Solutions

For unmodified CNF mats (hereafter 'CNF'), 8 wt % PAN was dissolved in DMF by mixing at 60° C. for 2 h at 1.65 g (HLC Cooling-Thermomixer MKR 13, Ditabis). For MWCNT-embedded CNF mats, non-functionalized MWCNTs (0.8, 1.6, or 2.0 wt % relative to total sol gel mass) were first dispersed in DMF via ultrasonication for 5 h, prior to dissolution of PAN in the MWCNT-DMF suspension. Hereafter, these composites will be referred to as 'CNTx', where x denotes the CNT concentration.

For macroporous mats, terephthalic acid (TPTA; 3.5 or 4.6 wt % relative to total sol gel mass) or phthalic acid (PTA; 1.5 or 2.4 wt %) was added simultaneously with PAN to the WCNT-DMF suspension. Hereafter, macroporous composites will be referred to as 'CNTx-TPTAy' or 'CNTx-PTAz', where x, y, and z denote the CNT, TPTA, and PTA concentrations, respectively. The majority of materials utilized PTA because synthesis conditions found to be conducive to sorption capacity (e.g., high TPTA and CNT concentrations) also resulted in fabrication challenges (e.g., clogging during electrospinning) and mats with limited material strength (see FIGS. 11A-11D and FIGS. 12A-12B and associated discussion).

Electrospinning

After preparation and prior to use, the kinematic viscosity of select sol gels was estimated by measuring the time for a set volume of sol gel to flow by gravity through a fixed length of tubing. The precursor solutions were then loaded into a 12 mL plastic syringe (HSW Norm-Ject). The syringe was connected to 2.0 mm ID polyethylene (PE) tubing via a PE 1/16" female luer lock fitting (NanoNC Co., Ltd). The tubing was also connected to a metal nozzle adapter (NanoNC Co., Ltd) via a PE 1/16" male luer lock fitting, and a 25G ½" needle was attached to the other end of the nozzle adapter. The needle tip was located at a distance of 10 cm from the surface of a 9 5/16"-circumference metal drum collector (SPG Co., Ltd; Korea), which was coated in Al foil and grounded. During electrospinning, the precursor solution was pumped through the needle at 0.5 mL/h (New Era Pump Systems, Inc.), a positive 12 kV voltage was applied at the needle tip (Acopian), and the grounded collector was rotating at 500-rpm (Dingtuo Technology). The high voltage difference between needle tip and collector caused formation of a whipping polymer jet, evaporation of the solvent, and deposition of non-woven polymer (or polymer CNT composite) nanofibers on the collector surface. Electrospinning was typically carried out for 5 hours (h).

After electrospinning, thermal oxidative stabilization was most often carried out for 2 h at 280° C. (5° C./min ramp rate) in air, but a limited number of mats were stabilized at 250° C. to assess the influence of this parameter on material performance. The mat was returned to room temperature prior to pyrolysis for 1 h at 1000° C. in an $N_2$ atmosphere (5° C./min ramp rate; OTF-1200X series tube furnace, MTI).

Figure 13:
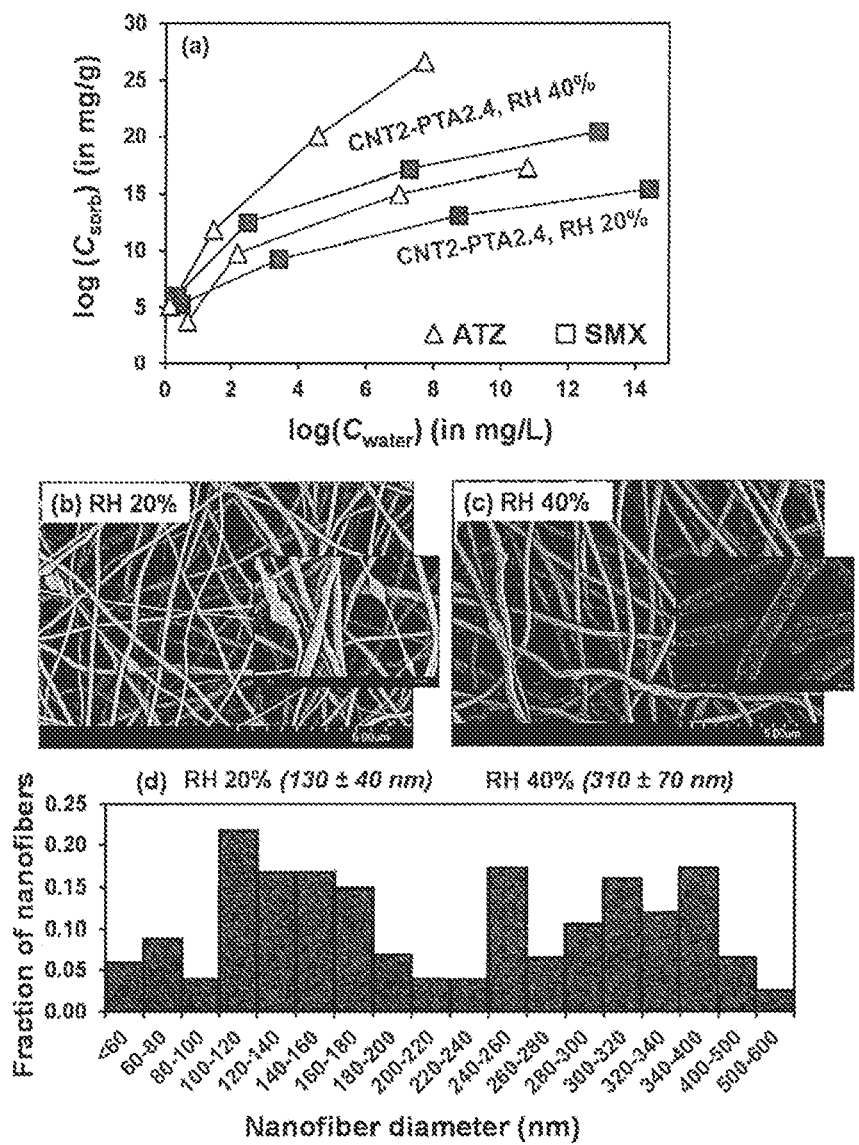
FIGS. 13A-13D illustrate nanofiber sorbents were fabricated at low and high relative humidity (~20% and ~40%, respectively). Shown here are the effect of relative humidity during electrospinning on (a) sorption isotherms for ATZ and SMX (0.4 g/L sorbent loading, 5 mM phosphate buffer, pH 7), (b, c) nanofiber morphology, and (d) nanofiber diameter distribution (obtained via measurement of 50-100 nanofibers in ImageJ software). The production of smaller nanofiber diameters at lower humidity is in agreement with the literature. The more rough (porous) appearance of the nanofibers fabricated at higher humidity (see inset SEM images) was hypothesized to be due to the expulsion of water from the nanofiber matrix during thermal treatment steps. Thus, despite larger nanofiber diameters, the surface roughness generated at higher humidity yielded nanofibers with larger sorption capacities for both ATZ and SMX. Based on higher material capacity at higher relative humidity, the majority of materials in this study were fabricated at ~40% relative humidity.

An important synthesis variable was humidity, with initial trials exploring nanofiber sorbents fabricated at low (~20%) and high (~40%) relative humidity (RH). Notably, although low humidity produced smaller diameter CNFs, composites produced at high humidity consistently displayed greater sorption capacity (see FIG. 13), which may be attributed to the microporosity introduced at higher humidity from the greater extent of water loss during thermal processing. Accordingly, all subsequent nanofibers were synthesized at ~40% RH.

Nanofiber Characterization

The morphology of electrospun nanofiber mats was investigated using a field-emission scanning electron microscope (SEM) (S4800, Hitachi) at an acceleration voltage of 1.8 kV. All samples were sputter-coated with a thin layer of gold/palladium (60:40 Au:Pd) prior to SEM imaging. Average fiber diameters were developed from measurement of 50-100 nanofibers in ImageJ software. Morphology of selected mats was also examined using transmission electron microscopy (TEM) (JEOL JEM-1230) at an operating voltage of 120 kV, as well as using high resolution transmission electron microscopy (HRTEM) (JEOL JEM 2100F with Schottky FEG Emission-Zr/W). Samples were prepared via sonication in deionized water, and a droplet was allowed to dry on a grid prior to imaging (#01814-F C-B 400 mesh Cu for TEM, #01824 UC-A on holey 400 mesh Cu for HR-TEM; Ted Pella, Inc.). Surface area and pore volumes were determined by N2-BET analysis using a Micromeritics ASAP 2020 Physisorption Analyzer. All samples were degassed at 300° C. for 3 hours prior to analysis. Surface chemical composition was analyzed with a custom Kratos Axis Ultra X-ray photoelectron spectroscopy (XPS) system equipped with a monochromatic Al Kα X-ray source. XPS was used to collect full spectrum survey scans, as well as to examine C 1s, O 1s, and N 1s regions. An extensive description of this system can be found elsewhere.

Strength Analysis Procedures

The mechanical strength of nanofibers and nanofiber mats was characterized by two complementary methods. The goal of characterization was to develop a quantitative assessment of the influence of CNT inclusion and macroporosity on nanofiber strength.

Atomic Force Microscopy Nanoindentation

The mechanical strength of individual nanofibers was characterized using atomic force microscopy (AFM) based nanoindentation conducted on a Molecular Force Probe 3D AFM (Asylum Research, Santa Barbara, Calif.). AFM height images and nanoindentation measurements were performed at room temperature in air, using silicon nitride probes (Mikromasch, San Jose, Calif., CSC37) with a nominal spring constant of 0.35 N/m and a typical tip radius of curvature of 10 nm. The tip radius of curvature was verified using scanning electron microscopy (SEM) and was found to be approximately 10 nm, as expected. Actual spring constants were determined using the built-in thermal noise method. Topographic images were collected using intermittent contact mode (AC mode) or contact mode at a typical scan rate of 1 Hz. Nanofiber mat samples were adhered to freshly cleaved atomically flat mica (V-I grade, SPI Supplies, Westchester, Pa.) using double-sided tape, and topographic images were obtained prior to nanoindentation experiments using AC imaging mode. For nanoindentation measurements, force-displacement curves were collected during the AFM probe motion towards and away from the sample. The probe was initially ~200 nm away from the surface, was moved towards the nanofiber surface until a predetermined force of 10 nN was achieved, and then the applied force was reversed until the probe returned to the initial position. A maximum force of 10 nN was selected because no sign of mechanical damage on the sample surface has been observed under such conditions after a series of repeated force-displacement measurements in previous studies. In order to ensure reproducibility, repeated force curves (~10 curves) were collected at a minimum of 5 sampling locations per nanofiber for 10 individual nanofibers within each mat. Force-displacement curves were also collected on the mica substrate in order to calibrate the deflection sensitivity of the instrument, which allowed the conversion of the force-displacement curves to force versus tip-sample separation plots. Overall, 4 different probes were used for the nanoindentation measurements.

Young's modulus values were extracted from force versus tip-sample separation data by fitting nanoindentation plots to a rearranged form of the Hertzian model, which assumes elastic contact. All force-displacement plots herein showed no deviation between the approach data and the retract data. Thus the indentation could be assumed purely elastic, allowing use of the Hertzian elastic model. The Hertzian model is described by Equation 51 below, where F is the loading force, R is the tip radius of curvature, $\Delta$ is the tip-sample separation, E is the Young's modulus, C is a constant, and $v$ is the Poisson's ratio of the sample. Use of this rearranged form eliminated the necessity of knowing the exact contact position between the tip and the sample, which is typically challenging. Based on Equation 1, a plot of the force to the ⅔ power vs. the tip-sample separation should be linear in the contact region. The Young's modulus of the sample can then be calculated using the linear slope of the $F^{2/3}$ vs. $\Delta$ plot in the contact region, with known or reported values of the tip radius of curvature and the Poisson's ratio. Here, R and $v$ were assumed to be 10 nm (using SEM) and 0.3 (typical value for organic nanomaterials), respectively. An average Young's modulus (±one standard deviation) for each nanofiber sample was obtained from histograms of Young's modulus values (provided below in FIGS. 14A-14C).

$$F^{2/3} = C - \left(\frac{4\sqrt{R}}{3(1-v^2)}E\right)^{2/3}\Delta \quad (1)$$

Load-Displacement Testing

Figure 14:
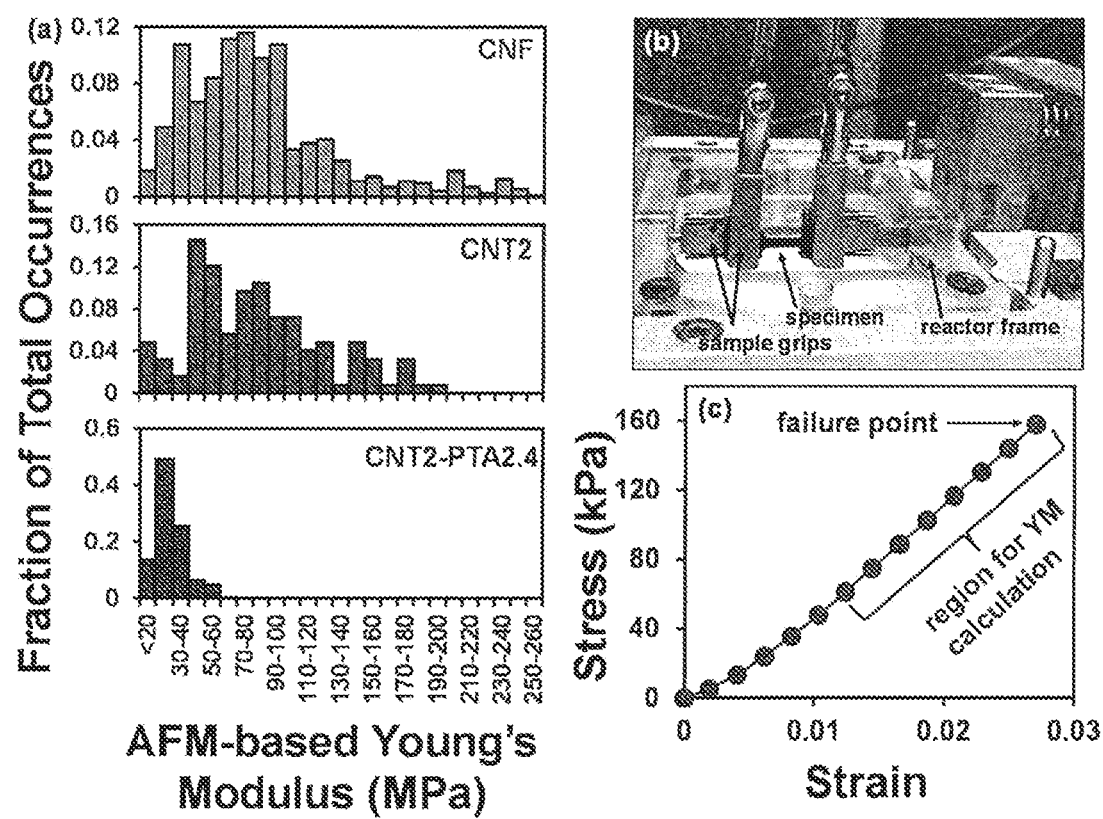
FIGS. 14A-14C are relevant details of tensile strength testing, including (a) histograms from AFM-based nanoindentation studies to determine Young's Modulus in compression for CNF, CNT2, and CNT2-PTA2.4 materials as indicated. Histograms were developed from 5 sampling locations on 10 individual nanofibers per material. Also shown are the (b) tensile testing device with specimen and (c) a representative stress strain curve for CNT2-PTA2.4.

Stress-strain curves were also developed for select nanofiber mats from load-displacement data collected with a BioTense Perfusion Bioreactor (ADMET, Inc., Norwood, Mass.), which consisted of a linear actuator, sample grips, a reactor frame, and a 250 g load cell (see FIG. 14B). Data acquisition was performed at 10 samples/sec through the MTestQuattro System (ADMET, Inc., Norwood, Mass.). Unlike the AFM-based nanoindentation performed on individual nanofibers within a mat, this load-displacement technique provided a measure of the average mechanical properties of the bulk nanofiber mat. Dog-bone-shaped specimens (with a gauge region measuring 2 mm wide by 8 mm long) were cut out using a stainless steel punch. The specimens were clamped to the sample grips with flat alligator clips, the initial gap between the arms was measured with calipers and recorded, and the position and the load were zeroed. Specimens were stretched to failure at a displacement rate of 10 mm/min, with the maximum extension set to 4 mm. Cross-sectional images of the mat in the gauge region were taken with a microscope (Nikon Eclipse Ti with Plan Fluor 4× objective), and the average thickness of the mat was determined via measurement with Image J software to allow the cross-sectional area of the specimen to be quantified. Engineering strain was calculated as the change in position during the test ($l-l_0$) divided by the gauge length (L), and stress was calculated as the recorded load (F) during the test divided by the initial cross-sectional area (A) of the gauge region. The Young's modulus was calculated from the slope of the stress-strain curves (see FIG. 14B). The ultimate tensile stress (UTS) and ultimate strain were calculated from the curve as the highest stress achieved before specimen failure and the corresponding strain, respectively.

Batch Sorption Experiments

Figure 15:
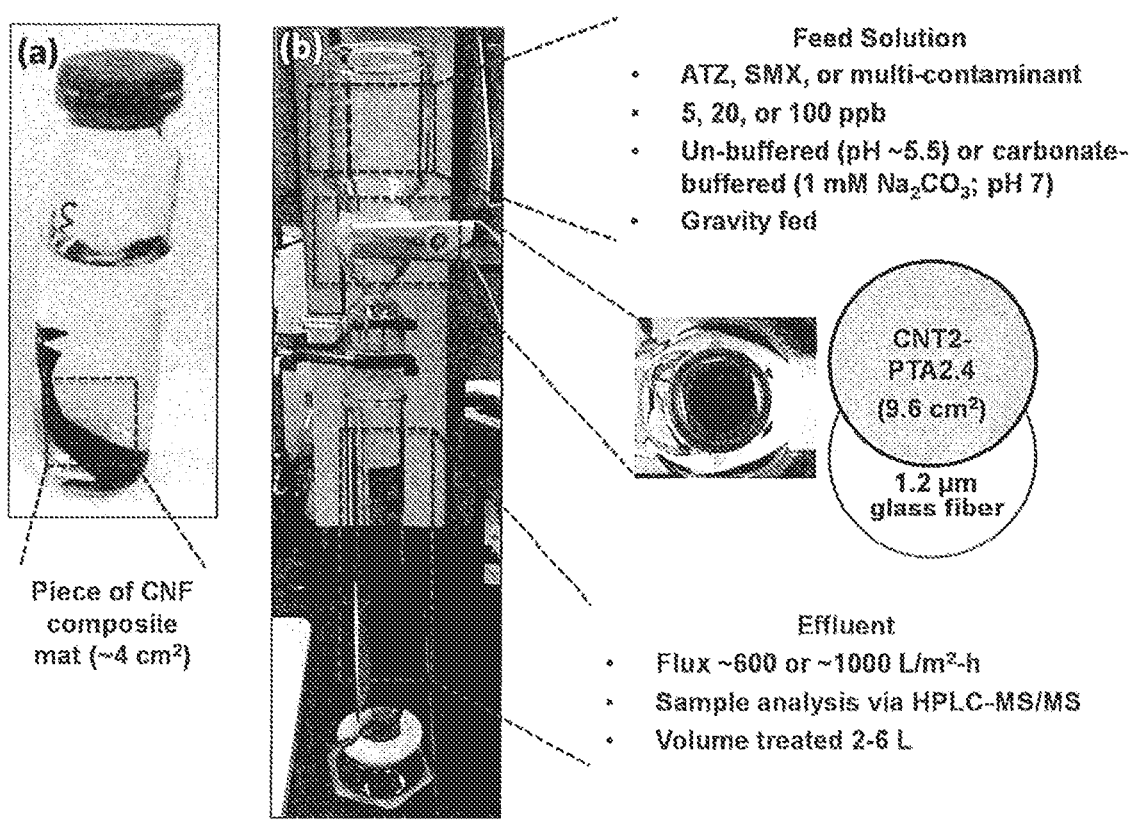
FIGS. 15A-15B are (a) Batch reactor for kinetic and isotherm studies, which used a cohesive piece (~4 cm2) of nanofiber mat rather than dispersed nanofibers. (b) The set-up for flow through filtration studies, using a gravity-fed, 47-mm OD filter housing and a 1.2 μm glass fiber filter support. Relevant experimental parameters are provided. To determine approximate filter capacity, initial trial runs were conducted with relatively high concentration (20 μg/L or 100 μg/L) feed solutions of either ATZ or SMX. Feed solutions were un-buffered to avoid counter-ion effects and to facilitate analysis via LCMS/MS without buffer ion interference. Filter mass was varied by changing the thickness of the nanofiber mat. Mat mass loading was calculated as the total mass of the carbon filter normalized to the active area of filtration (9.6 cm2). The typical mat produced in this study had a mass loading of 14 mg (1.5 mg/cm2), and was compared to a low mat mass loading of 5 mg (0.5 mg/cm2) by utilizing a shorter electrospinning time.

All batch experiments utilized a piece (~4 cm$^2$) of nonwoven mat (FIG. 15A). Initial sorbent optimization was conducted with atrazine (ATZ; log $K_{ow}$ 2.61) and sulfamethoxazole (SMX; log $K_{ow}$ 0.89) to identify the best sorbent material for species exhibiting a range of polarities. Timescales necessary to achieve sorption equilibrium (i.e., no further change in solution phase concentration) were determined first via kinetic experiments conducted in 20 mL vials sealed with butyl stoppers. Kinetic experiments monitored the decrease in ATZ and SMX concentration over time in sorbent suspensions (0.5 g/L) at pH 7 (buffered by either 5 mM phosphate or 1 mM carbonate). Reactors were spiked at the start of the experiment with either 50 μM of atrazine (ATZ) or sulfamethoxazole (SMX) from 50 mM stock solutions prepared in methanol (which produced <10$^{-3}$% v/v MeOH in the final reactor suspension). Reactors were well-mixed throughout the experiment on a rotator (Cole-Palmer Roto-Torque). Samples were taken periodically and then passed through a 0.2 μm Nylon syringe filter to remove the sorbent material. After filtration, samples were transferred to 1.5 mL amber vials for subsequent analysis via high pressure liquid chromatography equipped with a photodiode array detector (HPLC-DAD).

Sorption isotherms were collected in batch experiments performed in well-mixed reactors similar to those used for kinetic experiments. Reactors were spiked at the start of the experiment with varying concentrations (13-170 µM) of ATZ or SMX from 50 mM stock solutions prepared in methanol (resulting in <3.4×10$^{-3}$% v/v MeOH in the final reactor suspension), and the sorbent mass loading was held constant (0.4 g/L). Based on results from kinetic experiments, isotherm samples were taken at 0 and 6 h for nanofiber mats and after 24 h for GAC. Sample post-processing and analysis was identical to that performed for kinetic sorption experiments. Batch pH-edge experiments were also performed in identical reactors, with 0.4 g/L sorbent mass loading, 70 µM initial concentration SMX or metoprolol, 5 mM phosphate buffer (pH 6-9), and sample post-processing and analysis identical to that for sorption isotherm experiments. In all cases sorbed concentrations were quantified from the difference between the initial and (stable) equilibrium dissolved concentration in each system. Both ATZ and SMX were stable in controls without any sorbent.

Performance Testing in a Flow-Through Filtration System

Figure 16:
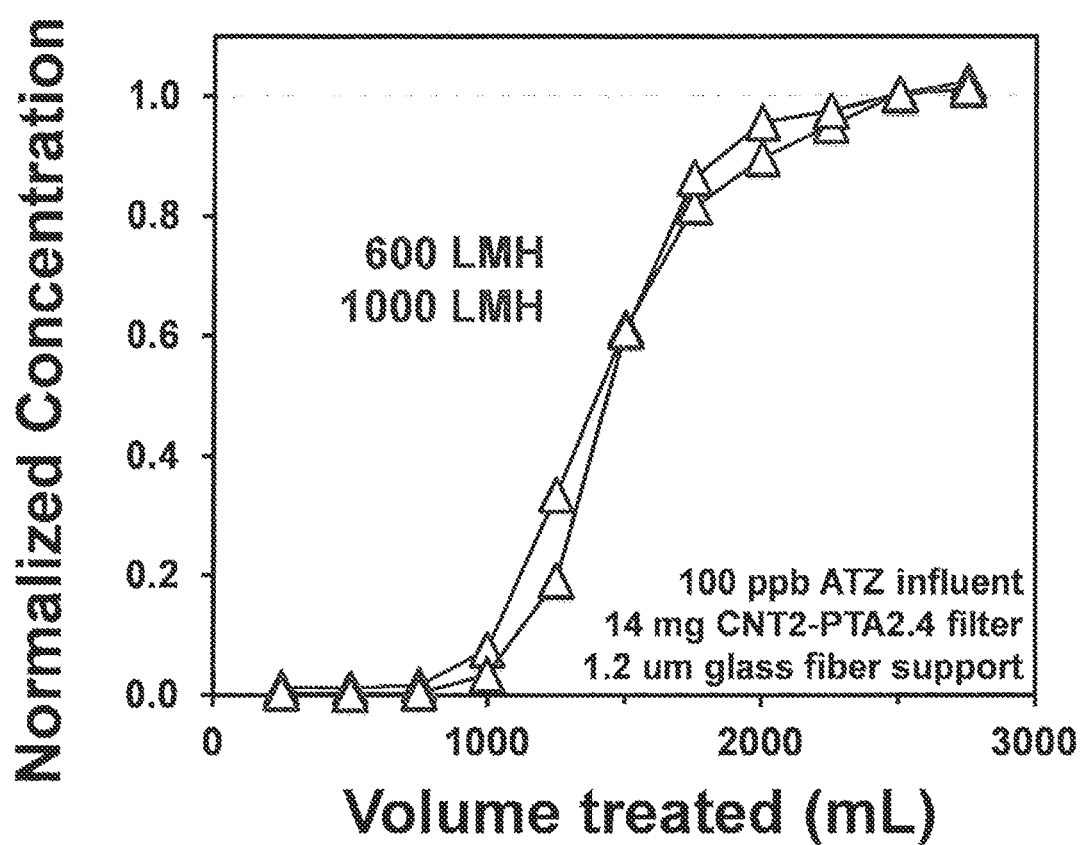
FIG. 16 illustrates effect of flux (600 vs. 1000 LMH-1) on breakthrough curves for removal of 100 ppb (100 μg/L) ATZ in DI water by a 1.5 mg/cm2 CNT2-PTA2.4 filter. Flux was slowed from 1000 LMH-1 to 600 LMH-1 by maintaining a lower head of influent above the filter. The effect of flux was found to be negligible in the single-filter flow through system evaluated in this study, presumably due to a minimal change in contact time. For example, based on filter thicknesses evaluated during load cell testing, the slower flux would be expected to increase contact time within the filter by approximately half of a millisecond. Larger filter thicknesses or significantly larger differences in flux are likely necessary to truly elucidate the impact of contact time on removal. Thus, in the remainder of this study, flux was typically 1000 L/m2-h, to achieve the upper bound of typical microfiltration.
Figure 17:
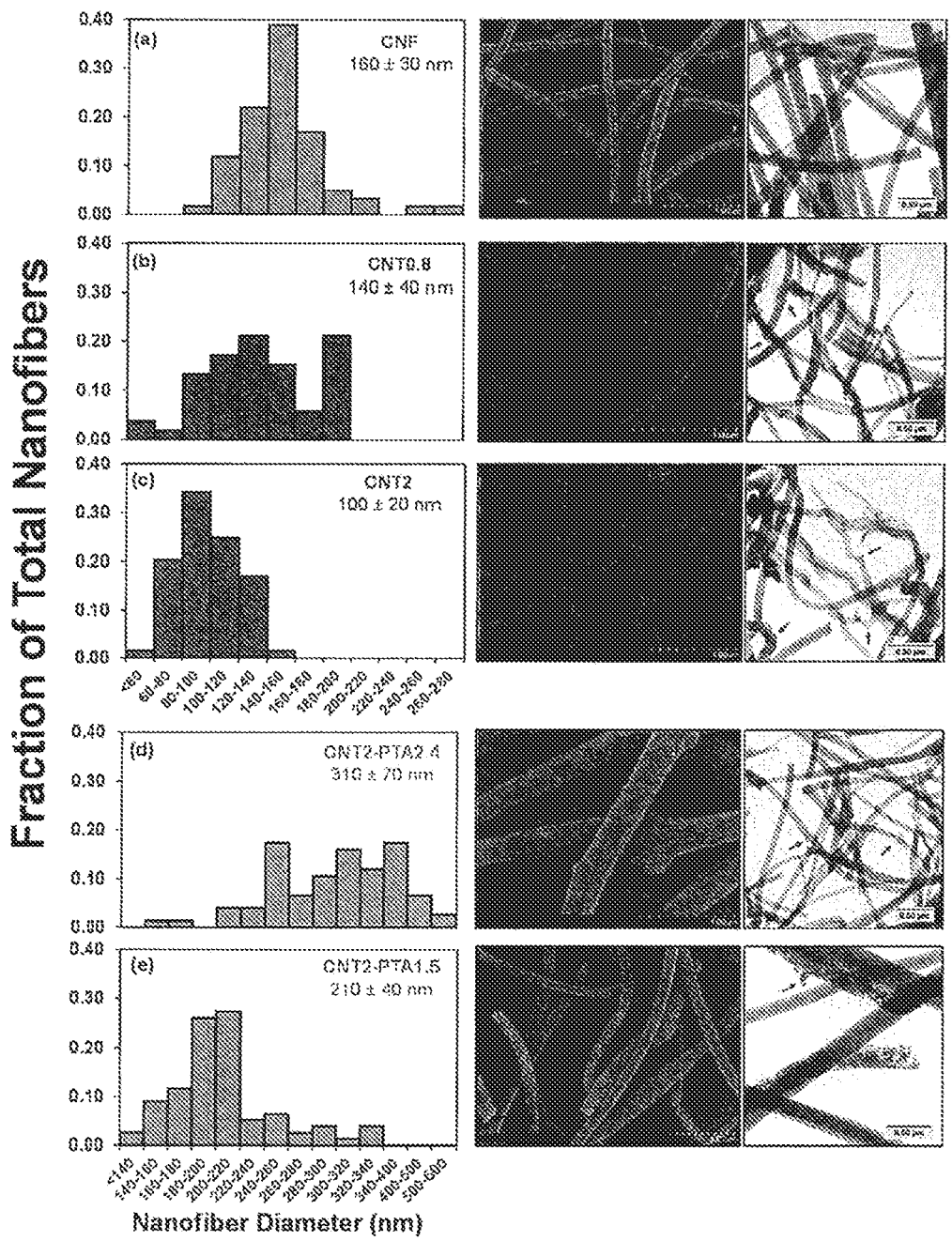
FIGS. 17A-17E illustrate histograms of nanofiber diameter, as well as corresponding representative SEM and TEM images, for (a) unmodified CNF, (b) CNT0.8, (c) CNT2, (d) CNT2-PTA2.4, and (e) CNT2-PTA1.5. Nanofiber diameters (average and standard deviation of n≥50 nanofibers) are provided. Red arrows in TEM images note nanofiber morphological features arising from inclusion of CNTs, specifically knobs, bends and the appearance of CNT aggregates within the nanofibers (i.e., features not observed in more uniformly structured unmodified CNF nanofibers).

The optimal nanofiber sorbent (prioritized by material strength and sorption capacity) was evaluated in a gravity fed, flow-through filtration set-up. The nanofiber mat was cut to a 47 mm diameter circle and supported by a 47 mm diameter, 1.2 µm glass fiber filter (Whatman). This set-up, with an active filtration area of 9.6 cm$^2$ (35 mm diameter), approximates typical point-of-use treatment (FIG. 15B). During the experiment, flux (typically ~600-1000 L/m$^2$-h, which lies at the upper bound for microfiltration) was measured via timed collection of permeate in a graduated cylinder, although no significant influence on performance was observed across this flux range (FIG. 16). To determine approximate filter capacity, initial trial runs were conducted with relatively high concentration (20 µg/L or 100 µg/L) feed solutions of either ATZ or SMX. Feed solutions were un-buffered to avoid counter-ion effects and to facilitate analysis via LC-MS/MS without buffer ion interference. Filter mass was varied by changing the thickness of the nanofiber mat. Mat mass loading was calculated as the total mass of the carbon filter normalized to the active area of filtration (9.6 cm$^2$). The typical mat produced in this study had a mass loading of 14 mg (1.5 mg/cm$^2$), and was compared to a low mat mass loading of 5 mg (0.5 mg/cm$^2$) by utilizing a shorter electrospinning time.

Subsequent performance testing used a more complex feed solution containing a mixture of 10 commonly encountered, but chemically diverse, organic micropollutants. This mixture contained 5 µg/L each of acetaminophen, atrazine, bezafibrate, caffeine, cotinine, gemfibrozil, metoprolol, naproxen, sulfadimethoxine, and sulfamethoxazole [structures and relevant chemical data (e.g., log $K_{ow}$ values) of these species are presented in Table 2]. Feed solutions were either un-buffered, or buffered with 1 mM carbonate buffer, pH 7. Samples (5 mL) were taken every 250 mL of filtrate for analysis, and filters were operated until "breakthrough" was observed (i.e., when effluent concentration equaled influent concentration).

Analytical Methods

High concentration (>0.1 mg/L) aqueous samples from batch experiments were analyzed on a 1200 series Agilent HPLC equipped with an Eclipse Plus C18 column (4.6 mm×150 mm, 5 µm particle size) and a photodiode array detector (DAD). Analysis of ATZ used a mobile phase of 50:50 acetonitrile (ACN):H$_2$O, a flow rate of 1 mL/min, an injection volume of 20 µL, and a 223 nm detection wavelength, whereas SMX analysis used a 30:70 ratio of methanol (MeOH):5 mM phosphate buffer pH 5, a flow rate of 1 mL/min, an injection volume of 25 µL, and a 268 nm detection wavelength. Samples with lower concentration (5 µg/L; i.e., those used in single-target, flow-through systems) were analyzed via HPLC-MS/MS, with a 1200 series Agilent HPLC equipped with an Eclipse Plus C18 column (4.6 mm×150 mm, 5 µm particle size) and a QQQ detector (Agilent 6460 Triple Quad LC/MS). Analysis of ATZ was performed via a MS2 SIM method, with a mobile phase of 50:50 ACN:H$_2$O, a flow rate of 0.4 mL/min, an injection volume of 5 µL, and a parent compound mass of 216, whereas SMX analysis was performed via a MS2 SIM method, with a mobile phase of 30:70 MeOH:H$_2$O, a flow rate of 0.4 mL/min, an injection volume of 5 µL, and a parent compound mass of 254.

Aqueous samples of the mixture of 10 emerging contaminants utilized in low concentration (5 µg/L) flow-through systems were analyzed at the University of Iowa State Hygienic Laboratory via direct aqueous injection LCMSMS. Samples were injected (100 µL) into an Agilent 1200 HPLC system operated in a reversed phase mode (acetonitrile, methanol, water, acetic acid gradient) using a Phenomenex Luna C18(2) column (3 µm, 3.0×100 mm). A turbospray interface (ESI) was used to generate positive and negative molecular ions which were subsequently fragmented and monitored using an AB Sciex 4000 QT LCMSMS system. Ions were monitored in the MRM mode. Unique quantitative and qualitative ion pair fragments were monitored. Internal standard, containing a mixture of labeled analytes, was added to each sample just prior to analysis at a concentration equal to that in the calibration standards (0.5 ng/mL). Labeled analytes were used as internal standards to correct for instrument signal drift and/or matrix effects. The following analytes (internal standard use in parenthesis) were monitored as positive ions: acetaminophen (acetaminophen-D4), caffeine (caffeine-13C3), cotinine (caffeine-13C3), metoprolol (metoprolol-D7), sulfadimethoxine (sulfamethoxazole-13C6), sulfamethoxazole (sulfamethoxazole-13C6), and atrazine (atrazine-D5). The following analytes (internal standard use in parenthesis) were monitored as negative ions: gemfibrozil (diclofenac-D4), naproxen (diclofenac-D4), and bezafibrate (diclofenac-D4). External calibration was used for quantitation (quadratic curve fit with 1/x weighting). Calibration standards ranged in concentration from 0.005 to 10 ng/mL for each analyte. Random samples were spiked with known amounts of the target analytes just prior to analysis to assess the accuracy of the method.

Nanofiber Characterization

Diameter and Surface Area

Inclusion of CNTs decreased nanofiber diameter from 160 (±30) nm for CNF to 100 (±20) nm for CNT2 composites (FIGS. 17A-17E). Typically, smaller diameter nanofibers result from lower sol gel viscosity. However, the sol gel viscosity was observed to increase with CNT concentration (e.g., the CNT2 sol gel was ~1.5-fold more viscous than that of CNFs; see SI). Thus, the smaller nanofiber diameters obtained with higher CNT concentrations was attributed to their ability to increase sol gel conductivity, which in turn induces strong repulsive, electrostatic forces within the electrospinning jet that ultimately decrease the final nanofiber diameter.

Figure 18:
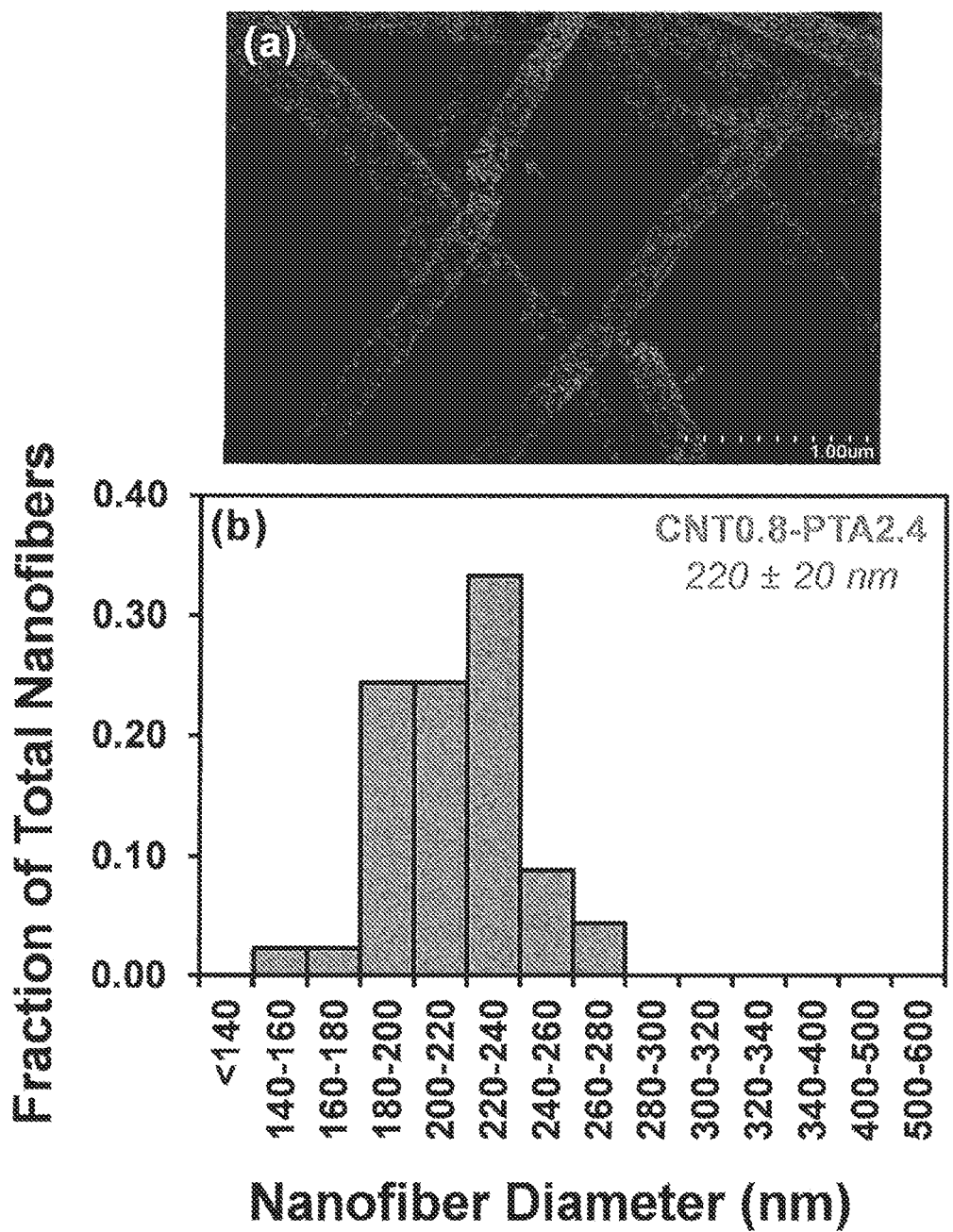
FIGS. 18A-18B are (a) Representative SEM image and (b) nanofiber diameter distribution for CNT0.8-PTA2.4 material. Average nanofiber diameter (from n of at least 50 nanofibers) was 220±20 nm. Red arrows in SEM image highlight the porosity introduced via sublimation of PTA. The higher macroporosity of these nanofibers relative to the high CNT, high PTA mat (CNT2-PTA2.4) is notable. We attribute this to the ability of PTA to sublime more completely from these smaller diameter (and thus higher surface area) nanofibers, which results from their lower viscosity sol gel at lower CNT concentration. It is also possible that some PTA may be sorbed onto CNTs, and thus unavailable for sublimation, at higher CNT concentrations.

The opposite trend was observed with increasing PTA concentration, which increased nanofiber diameters from 210 (±40) nm for CNT2-PTA1.5 to 310 (±70) nm for CNT2-PTA2.4 (FIGS. 17A-17E). This trend appears to primarily reflect changes in sol gel viscosity induced by PTA inclusion (e.g., CNT2-PTA2.4 sol gel was nearly 2-fold more viscous than that for CNFs). Notably, at a fixed PTA concentration, smaller diameter nanofibers were observed at lower CNT concentrations (e.g., 215 (±20) nm for CNT0.8-PTA2.4; see FIGS. 18A-18B). This trend is opposite to that observed for CNT inclusion in non-macroporous mats, suggesting that the increase in sol gel viscosity from PTA inclusion outweighed the gains in conductivity from CNT inclusion, resulting in a net increase in nanofiber diameter.

As expected, surface area was greatest for nanofibers with smaller diameters and a greater extent of macroporosity. In non-macroporous mats, both surface area and pore volume increased with increasing CNT concentration (e.g., ranging from 110 $m^2/g$ and 0.11 $cm^3/g$ for CNF, to 310 $m^2/g$ and 0.25 $cm^3/g$ for CNT2). For macroporous mats, in contrast, surface area and pore volume increased with decreasing PTA concentration, shifting, respectively, from 290 $m^2/g$ and 0.31 $cm^3/g$ for CNT2-PTA2.4 to 650 $m^2/g$ and 0.69 $cm^3/g$ for CNT2-PTA1.5.

These trends in surface area can be rationalized by corresponding changes in nanofiber morphology in response to changes in synthesis variables as observed in SEM and TEM images. TEM images of CNF-CNT nanofibers (FIGS. 17A-17E) suggest that the CNTs remain embedded within the fibers, producing irregular twists and knobs in the nanofiber structure that were not observed for unmodified CNFs. CNTs and their aggregates are also exposed randomly along the length of the nanofibers, particularly at those points where the CNTs produced knobs in the nanofiber structure (FIGS. 17A-17E).

Figure 19:
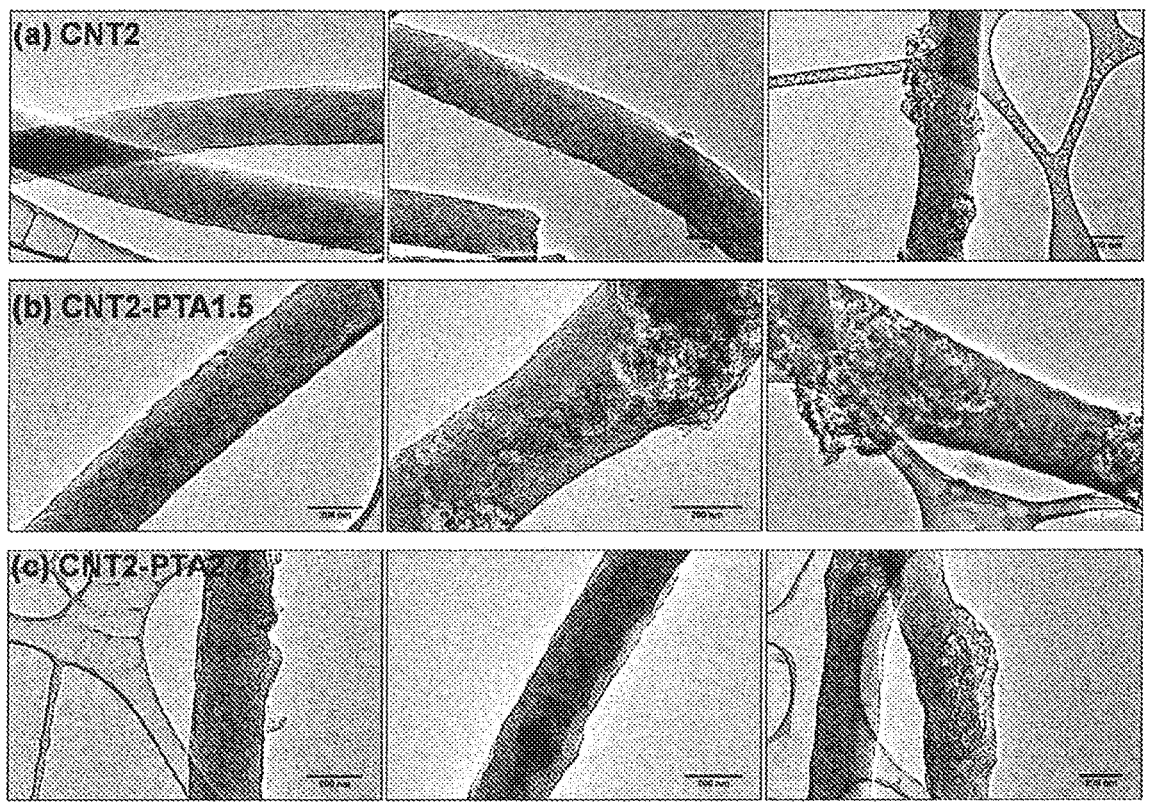
FIGS. 19A-19C are HRTEM images of (a) CNT2, (b) CNT2-PTA1.5, and (c) CNT2-PTA2.4. Images revealed similar morphology to those observed via SEM and TEM images. Due to the small size of CNTs used in the composite materials (<8 nm OD, 0.5-2.0 μm length) relative to the nanofiber diameters (hundreds of nm), CNTs are generally only visible via HRTEM when present as aggregated bundles. The images shown for each composite illustrate nanofiber segments both with and without clearly visible CNTs. Extreme macroporosity of the CNT2-PTA1.5 material is also clearly visible in (b).
Figure 20:
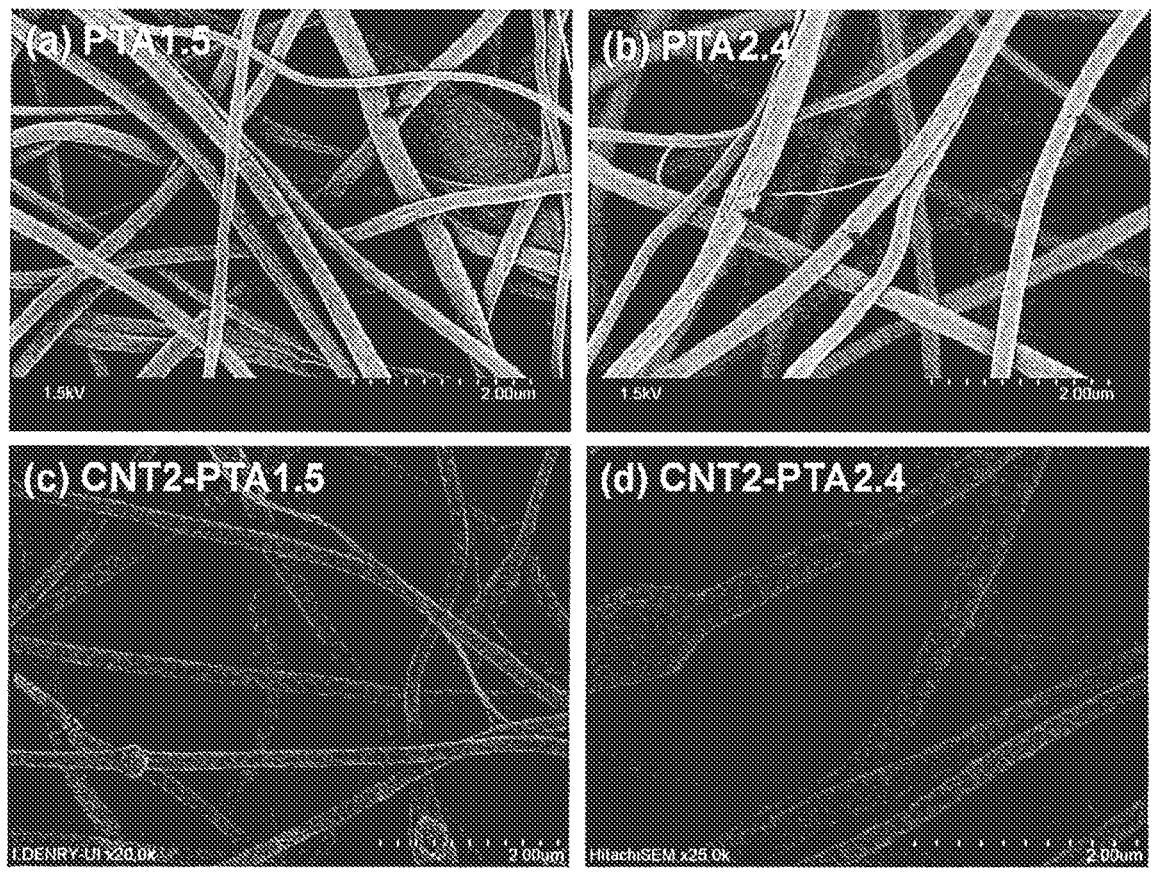
FIGS. 20A-20D are SEM images for PTA-containing CNFs (a, b) and PTA-containing CNFCNT composites (c, d). Images are shown for (a) PTA1.5, (b) PTA2.4, (c) CNT2-PTA1.5 and (d) CNT2-PTA2.4. In all images, macropores are indicated by red arrows. In line with TPTA-derived macroporosity (see FIG. 51 above), we found that increasing PTA concentration yielded a higher degree of macroporosity in PTA only materials, albeit to a less extent. However, this trend was reversed in PTA-containing CNF-CNT composites, suggesting an influence of CNT and PTA interactions on macropore evolution. As evidence in support of such interactions, we measured ~50 μg/mg of PTA uptake on CNTs in electrospinning solutions (in experiments examining changes in PTA UV/vis absorbance over time when in contact with CNTs in DMF).
Figure 21:
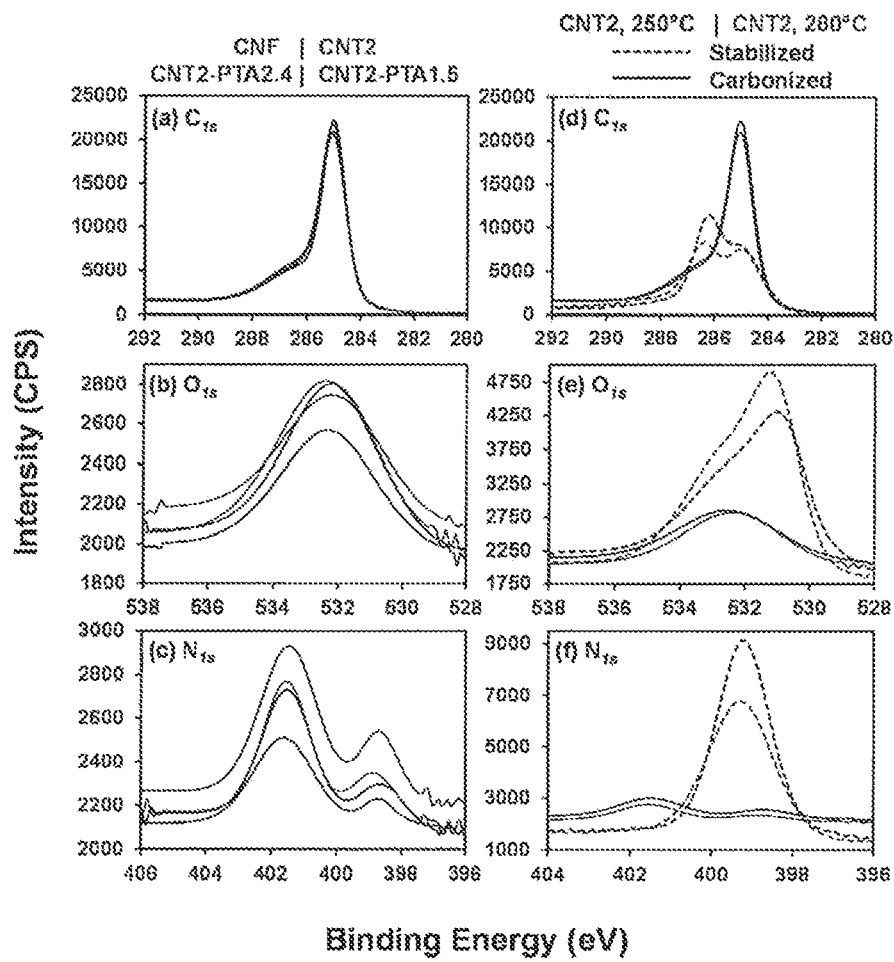
FIGS. 21A-21F illustrate XPS core level (a) C1s, (b) O1s, and (c) N1s scans for carbonized CNF, CNT2, CNT2-PTA2.4, and CNT2-PTA1.5 mats that were stabilized at 280° C. XPS core level (d) C1s, (e) O1s, and (f) N1s scans for CNT2 mats stabilized at 250° C. and 280° C., both post-stabilization and post-carbonization. During thermal stabilization of CNT2 samples in air, the N1s peak at 399.2 eV was consistent with partial conversion of nitrile (CN) groups to imine (C=N) and nitroso (N=O) bonds, due to cyclization of PAN to produce a ladder structure. While trends in C and N content were comparable across stabilization temperatures (250 and 280° C.), XPS suggested the introduction of more surface oxygen groups (e.g., hydroxyl, carbonyl, nitroso from the O1s region) at higher stabilization temperatures (6.6% O at 250° C. vs. 9.9% O at 280° C.). After carbonization, the C1s peak was centered at 285 eV (C—C bonds), indicative of PAN conversion to carbon, while the N1s region indicated the presence of primarily nitrile (398.6 eV) and nitroso (401.5 eV) functionalities. However, both the N and O contents of the carbonized CNT2 mats were comparable, regardless of stabilization temperature (2% O and 3% N). Relatively modest differences were observed in surface N and O concentrations of CNF, CNT2, CNT2-PTA2.4, and CNT2-PTA1.5 mats stabilized at the same temperature. The surface oxygen concentration of CNT2-PTA2.4 was slightly higher than other materials (2.7% O vs. 2% O), while surface nitrogen content of CNT2-PTA1.5 was approximately half that of the other materials (1.5% N vs. 3% N).
Figure 22:
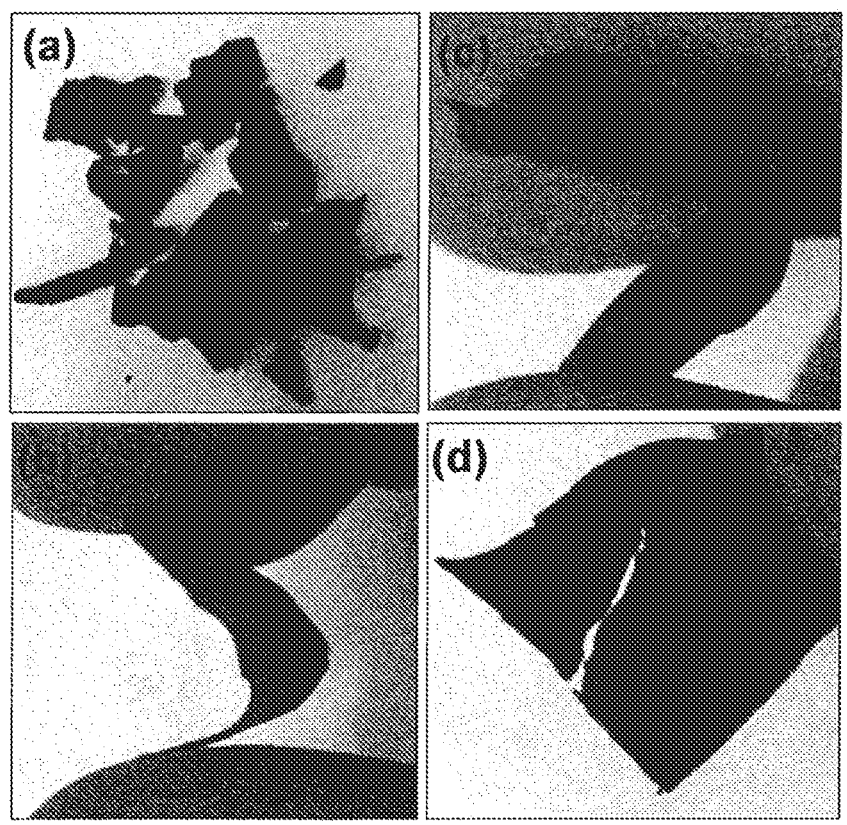
FIGS. 22A-22D illustrate qualitative assessments of nanofiber mat strength were made by examining their durability during and after basic handling procedures (e.g., gently folding the mats). Digital images from these assessments are shown for (a) CNF, (b) CNT2, (c) CNT2-PTA2.4, and (d) CNT2-PTA1.5 nanofiber mats. CNF readily broke into pieces owing to its extremely brittle nature. The tear in the CNT2-PTA1.5 resulted from folding of the material.

Also observed in SEM and TEM images is that inclusion of PTA produced relatively large macropores, discernible as holes in the nanofiber surface, to which measured increases in surface area can be attributed (see HR-TEM images in FIGS. 19A-19B). However, images suggest a greater degree of surface macroporosity in composites with lower PTA and lower CNT concentrations (CNT2-PTA1.5, CNT0.8-PTA2.4) (FIGS. 17A-17E and FIGS. 18A-18B), consistent with trends in BET surface area reported earlier. Observed pores were typically up to ~80 nm in diameter, irregular in shape, and distributed non-uniformly on the nanofiber surface, tending to appear in clusters.

The increase in porosity at lower PTA concentrations in CNF-CNT composites is noteworthy, as it is counter to expectations from Liu et al., which observed porosity to increase with increasing TPTA concentrations in CNFs (without CNTs). For PTA-containing CNFs produced herein, we also observed a moderately higher degree of macroporosity with increasing PTA concentration (FIGS. 20A-20D). Only after inclusion of CNTs was the opposite trend observed; at a fixed CNT loading, a lower PTA concentration produced a significantly higher degree of macroporosity in PTA-containing CNF-CNT composites. This behavior may be due in part to specific interactions between PTA and CNTs, which would influence the availability of PTA to volatilize and induce porosity (indeed, sorption of PTA onto CNTs was measured in electrospinning solutions; see FIGS. 20A-20D). Additionally, it is known that PTA undergoes decomposition to phthalic anhydride at ~210° C. during stabilization, followed by sublimation of phthalic anhydride at ~295° C. during carbonization to induce macroporosity. We suspect that incomplete decomposition and sublimation occurred at higher phthalic acid concentrations, particularly within larger composites that possessed greater internal volume and less external surface area for sublimation.

XPS

Surface characterization via XPS revealed rather modest differences in nanofiber surface composition in response to the synthesis conditions we explored (FIGS. 21A-21E). Across stabilization temperature and material formulation, differences of less than 1.5% in N and O surface concentrations were observed after carbonization (see SI for further details).

Nanofiber Strength

In handling the samples it was clear that CNF mats were extremely brittle. Inclusion of CNTs produced a stronger material that was more resistant to fracture and that demonstrated improved flexibility (i.e., it could be gently folded along one axis without breaking; FIGS. 22A-22D). For macroporous mats, those with low CNT (CNT0.8-PTA2.4) and low PTA (CNT2-PTA1.5) concentrations fell apart when folded, likely due to limited structural integrity arising from their significant macroporosity observed via SEM. The CNT2-PTA2.4 mat was noticeably more stable, flexible, and resistant to fracture than the non-macroporous counterpart (CNT2) (e.g., it could be folded along two axes simultaneously without breaking).

AFM-based nanofiber indentation provided a quantitative measurement of the compressive strength of CNF, CNT2, and CNT2-PTA2.4 mats. Additional tensile mechanical tests were performed on the strongest material fabricated, CNT2-PTA2.4, in order to characterize the material properties of the mat. From AFM, the average Young's Moduli (YM) values (see histograms in FIG. 14A) for CNF and CNT2 were 67±38 MPa and 68±45 MPa, respectively, while a YM of 25±8 MPa was measured for CNT2-PTA2.4. The comparable YM of CNF and CNT2 are reasonable, as AFM probes only the top several nanometers of the nanofiber surface, and the embedded CNTs are small (<8 nm outer diameter) relative to the nanofibers (>80 nm in diameter). The lower compressive YM of the macroporous nanofibers is consistent with the softer, more flexible nature of these mats. Tensile tests for CNT2-PTA2.4 mats yielded an ultimate tensile stress of 151±21 kPa, an ultimate strain of 0.035±0.019, and a YM of 7.0±1.4 MPa (values represent the average and standard deviation from analysis of three mat samples; FIGS. 14B and 14C). For reference, these ultimate strain and YM values are comparable to polymers such as acrylic and polyamide-imide.

For filtration applications, compressive forces reveal the material's ability to withstand deformation from the transmembrane pressure needed to drive flow, while tensile stress and strain relate to the ease with which the material can be physically handled or manipulated. Lower YM values observed in tension from a load cell relative to compression via AFM indentation have been previously observed for polymer-CNT and CNF-CNT composites, behavior often attributed to a lack of interfacial contact and mechanical interlock between the nanofibers and the embedded CNTs. This rationale is particularly applicable to our materials, given that the short, thin CNTs utilized herein appear mostly aggregated within the nanofibers (see FIGS. 17A-17E).

Optimization of Nanofiber Sorbent Performance

Figure 23:
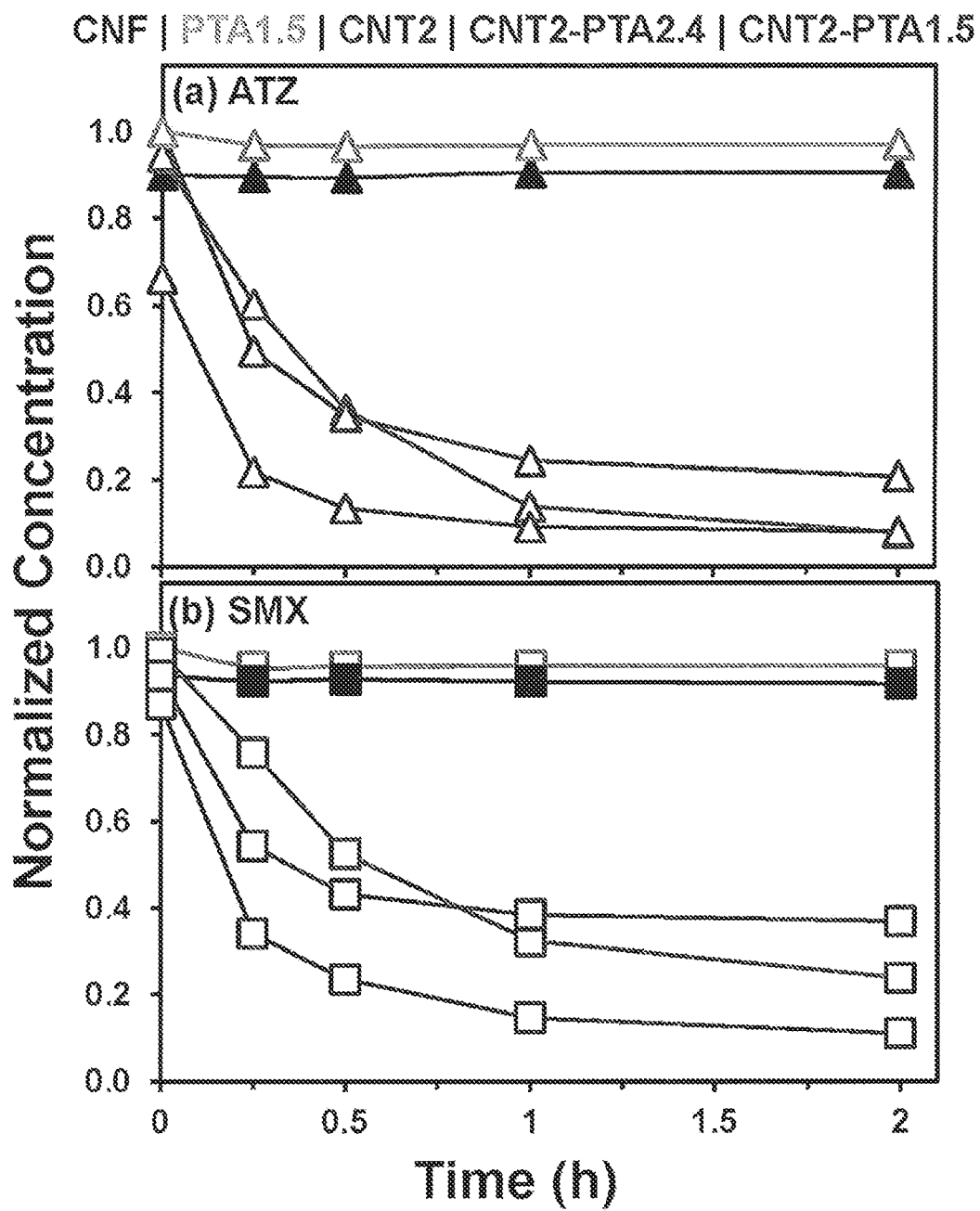
FIGS. 23A-23B illustrate change in (a) ATZ and (b) SMX concentration over time during sorption kinetic experiments with different nanofibers: CNF (black), PTA1.5 (grey), CNT2 (green), CNT2-PTA2.4 (red), and CNT2-PTA1.5 (blue). Conditions: 0.5 g/L sorbent loading, 50 µM initial concentration (~11 mg/L ATZ; ~12.5 mg/L SMX), 5 mM phosphate buffer at pH 7.
Figure 24:
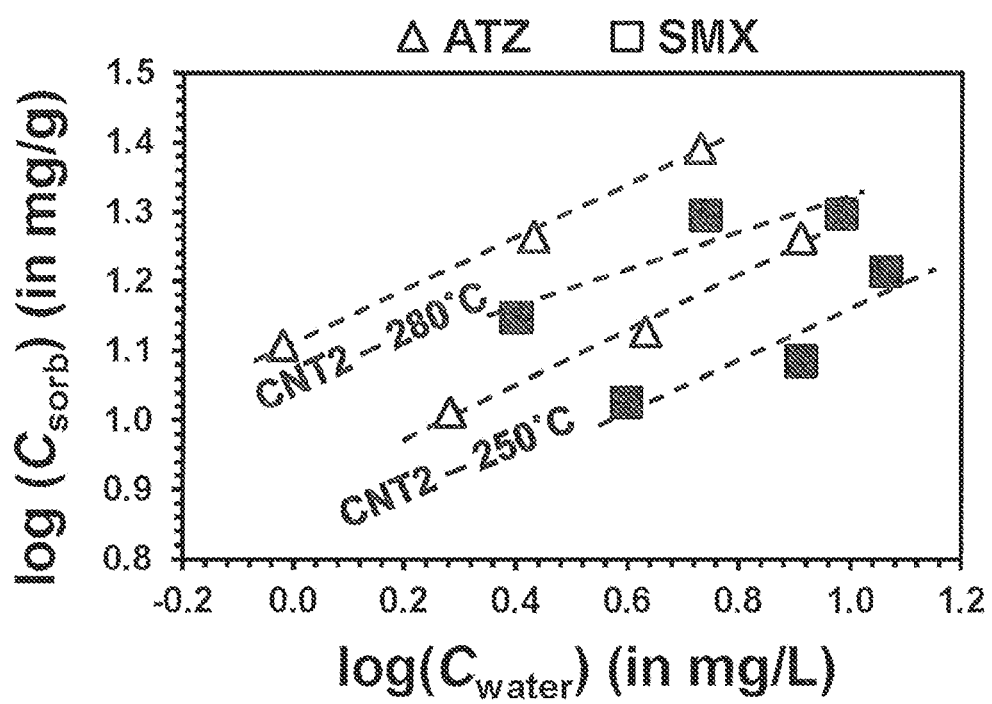
FIG. 24 illustrates that although a higher degree of oxygenation during thermal stabilization has been shown to improve nanofiber ability to withstand high temperature pyrolysis, significant differences in material characteristics (e.g., flexibility, ease of handling) were not observed between mats fabricated at the two stabilization temperatures used herein. Sorption isotherms for ATZ and SMX with CNT2 materials stabilized at either 250° C. (blue) or 280° C. (green) are shown here. Results consistently showed that a higher stabilization temperature produced higher capacity sorbents, a trend we believe is generalizable across the different composites considered. Thus, stabilization at 280° C. was used in all other syntheses. Experimental conditions: 0.4 g/L sorbent mass loading, 5 mM phosphate buffer, pH 7.

FIGS. 23A and 23B show results of sorption rate studies for a subset of representative nanofibers: (i) unmodified (CNF); (ii) enhanced macroporosity (PTA1.5); (iii) CNT-embedded (CNT2); and (iv) CNTs with macroporosity producing composites of variable strength (strong and flexible CNT2-PTA2.4 and weaker CNT2-PTA1.5). We note that based on preliminary results illustrating superior performance (FIG. 24), these nanofibers were stabilized at 280° C. All nanofibers exhibited two regimes of ATZ and SMX uptake; a near-instantaneous, albeit limited, initial sorption event that was followed by a period of much slower sorption. Unmodified CNFs and PTA1.5 were the poorest sorbents, showing <10% immediate uptake for both ATZ and SMX and no further sorption over the following 2 hours. For CNT2 and CNT2-PTA2.4, limited (<5%) immediate uptake of ATZ and SMX was followed by considerable sorption over one hour (during which pollutant loss followed exponential decay) before slowing as the sorbent presumably approached capacity. CNT2-PTA1.5, with both high macroporosity and CNTs, exhibited the greatest immediate uptake, with more spontaneous sorption of ATZ (~30%) than SMX (~10%). As in other CNF-CNT composite systems, both ATZ and SMX then followed exponential decay for 30 minutes until sorption equilibrium was achieved.

Figure 25:
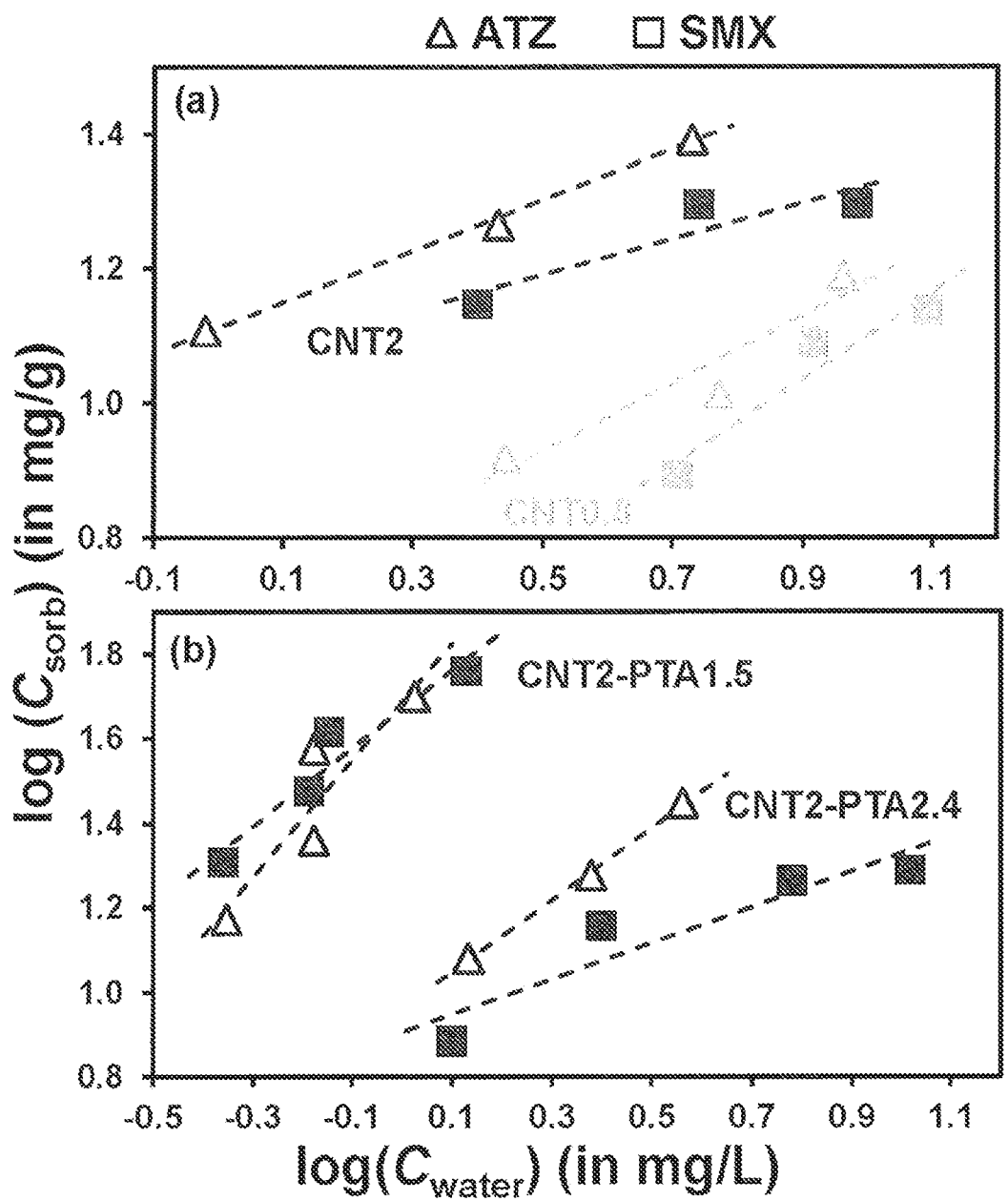
FIGS. 25A-25B illustrate sorption isotherms for uptake of ATZ and SMX showing (a) influence of CNT concentration (CNT0.8 vs. CNT2) and (b) PTA concentration (CNT2-PTA1.5 vs. CNT2-PTA2.4) on uptake. Isotherms are presented on a log-log scale, assuming sorption is best described by the Freundlich model. Dashed lines represent linear fits to log-log data and are presented only to guide the eye. Conditions: 0.4 g/L sorbent loading, 5 mM phosphate buffer at pH 7.
Figure 26:
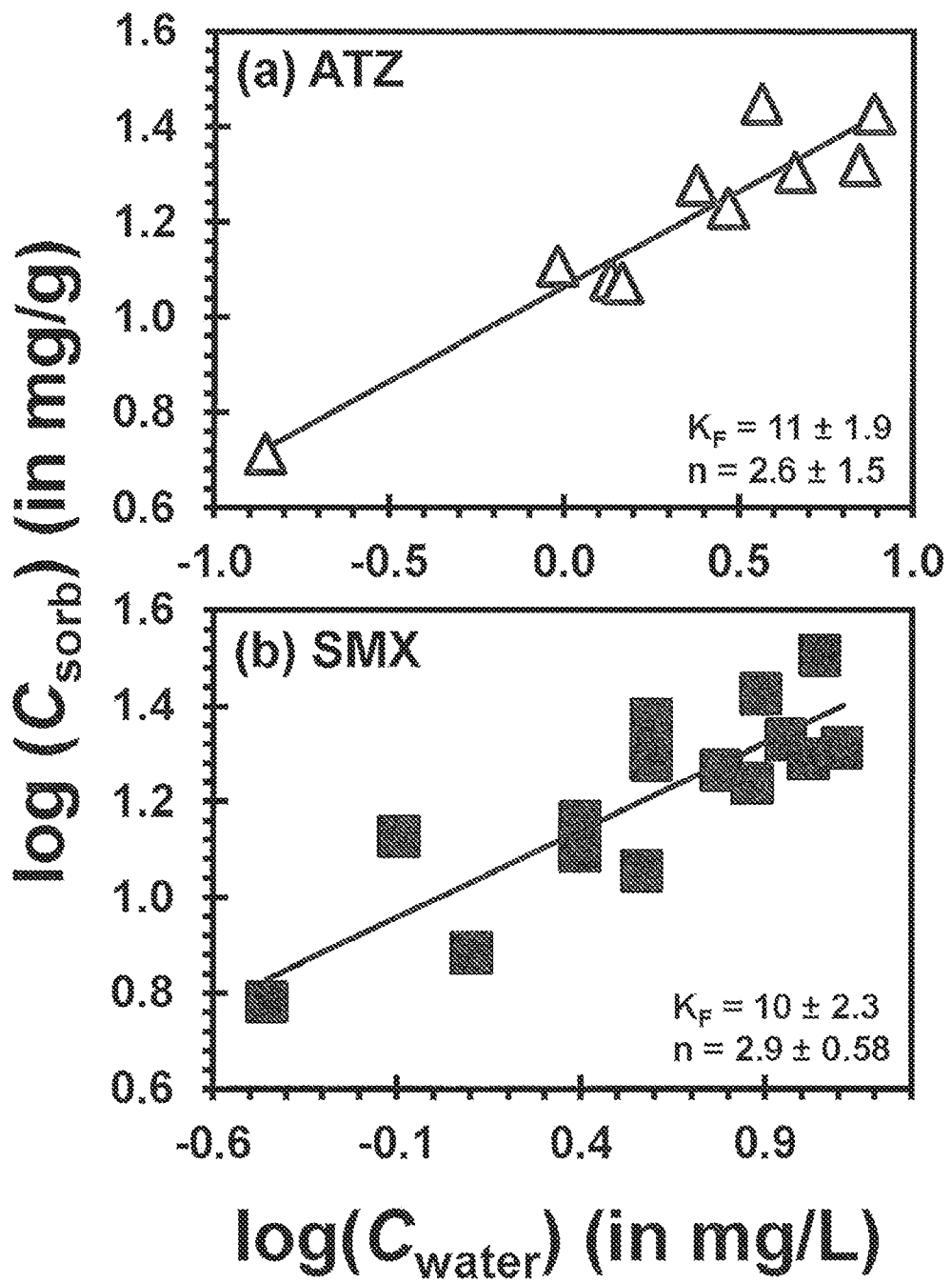
FIGS. 26A-26B illustrate data from at least triplicate sorption isotherms for (a) ATZ and (b) SMX with CNT2-PTA2.4 materials. Collectively, data is shown from composites fabricated and sorption experiments conducted over the course of a year so as to demonstrate the reproducibility of our methods from material fabrication to application. Linear fits to Freundlich model [$C_{sorbed}=K_f(C_{aqueous})1/n$] shown for compiled data, with values for Freundlich parameters based on fits for individual isotherms. Experimental conditions: 0.4 g/L sorbent mass loading, 5 mM phosphate buffer, pH 7.

These relative performance trends for ATZ and SMX uptake rate are supported by sorption isotherms (FIGS. 25A-25B). Isotherms for different synthesis batches of nanofibers are presented on a log-log scale, assuming that sorption equilibrium is best described by the Freundlich model [$C_{sorbed}=K_f(C_{aqueous})^{1/n}$]. However, because these isotherms were collected only to reveal trends in sorbent performance resulting from changes in nanofiber synthesis, they were limited to only three or four initial concentrations and thus we do not report their Freundlich model fit outputs (e.g., $K_f$ and n values). We emphasize that we observed very good batch-to-batch reproducibility in structure and performance, with all performance trends consistent across all replicates (see FIGS. 26A-26B, where we report results from multiple synthesis batches of two different nanofiber formulations, resulting in sufficient data points for reporting model fit isotherm parameters with reasonable statistical uncertainty). Finally, data for unmodified and macroporous-only CNFs are not shown, as sorption capacities for both ATZ and SMX were consistently low (≤5 mg/g) and essentially negligible relative to CNT-containing materials, even after accounting for differences in surface area. This is notable, as it supports a role in which CNTs not only alter nanofiber properties (e.g., material strength and surface area), but also provide new sites for micropollutant uptake.

Figure 27:
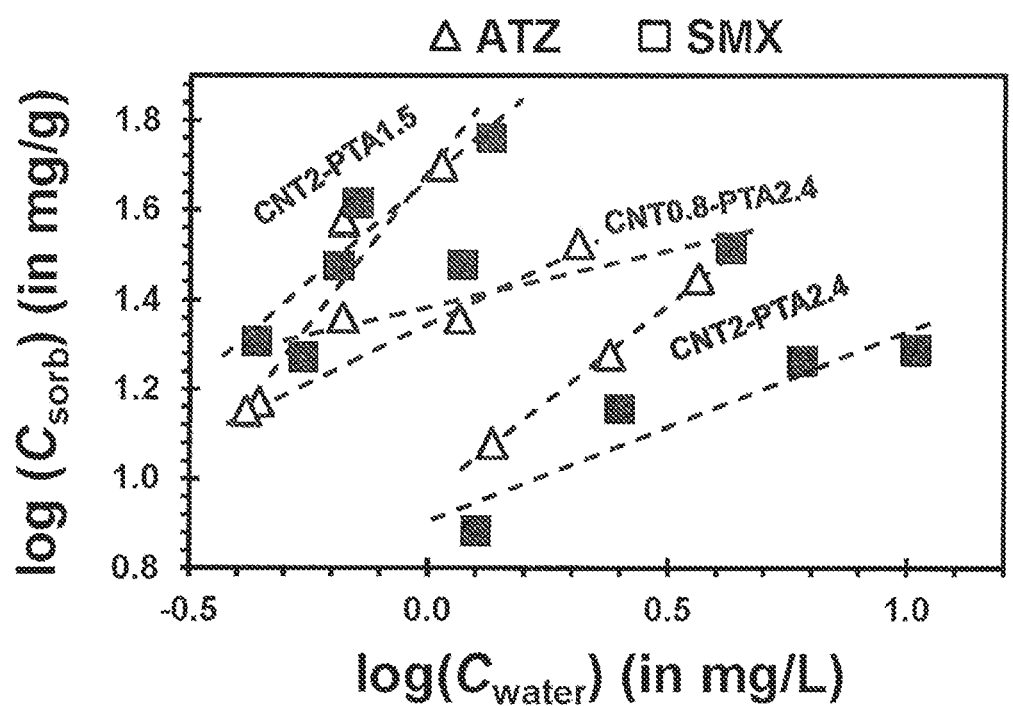
FIG. 27 illustrates a comparison of sorption isotherms for ATZ and SMX obtained with the optimal composite formulation CNT2-PTA2.4 (considering strength and reactivity) to CNT0.8-PTA2.4 and CNT2-PTA1.5, alternative formulations found to be weaker during material testing. Notably, CNT0.8-PTA2.4 and CNT2-PTA1.5 showed approximately equivalent capacity for ATZ and SMX (i.e., sorbent performance was independent of sorbate hydrophobicity). Trends in ATZ and SMX uptake for these materials illustrate that increasing CNTs and macroporosity promote sorption. However, too much macroporosity ultimately yields weaker nanofibers that are more prone to fracture. Thus, in design of these composites, there exists an optimal macroposity (i.e., PTA loading), a value that increases surface area and access to embedded CNTs while not compromising composite strength. Experimental conditions: 0.4 g/L sorbent mass loading, 5 mM phosphate buffer, pH 7.

The positive influence of CNT inclusion on sorption capacity is illustrated in FIG. 25A, which shows that sorbed ATZ and SMX concentration increased ~2-fold as the embedded CNT loading increased from 0.8 to 2.0 wt %. In FIG. 25B, sorption isotherms are compared across increasing PTA concentration for CNT2 nanofibers (another comparison to CNT0.8-PTA2.4 available in FIG. 27). While CNT2-PTA2.4 resulted in sorption that matched unmodified CNT2, CNT2-PTA1.5 exhibited enhanced uptake with an extent of sorption that was essentially equivalent for both ATZ and SMX.

These kinetic and isotherm experiments illuminate the key nanofiber properties critical for sorbent performance. First, incorporation of CNTs clearly produces a superior sorbent relative to unmodified and enhanced macroporosity CNFs (see FIGS. 23A-23B). Further, because sorption capacity in CNT composites increases with PTA-induced macroporosity (see FIGS. 25A-25B), data also imply that macropores provide greater accessibility of solutes to the embedded CNTs. Thus, evidence suggests the CNTs remain highly active sorbents even when embedded within porous nanofibers. Second, we thereby attribute the two regimes in ATZ and SMX uptake kinetics (see FIGS. 23A-23B) to the porosity of CNF-CNT composite nanofibers. Consistent with the extent of initially rapid uptake always being greater for ATZ (log $K_{ow}$ 2.61) than SMX (log $K_{ow}$ 0.89), this sorption is most probably occurring via hydrophobic interactions with easily accessible (i.e., surface exposed) CNTs. The slower sorption over longer timescales likely results from mass transfer limitations arising from ATZ and SMX accessing CNTs exposed within pores of the composite. Indeed, rate coefficients for ATZ and SMX sorption within the exponential decay regime increased with composite macroporosity [$k_{CNT2}$ (ATZ 1.9 h$^{-1}$, SMX 1.1 h$^{-1}$)< $k_{CNT2-PTA2.4}$ (ATZ 2.1 h$^{-1}$, SMX 1.6 h$^{-1}$)<kCNT2-PTA1.5 (ATZ 3.2 h$^{-1}$, SMX 2.6 h$^{-1}$)], underscoring that accessibility to embedded CNTs is essential for material performance.

Figure 28:
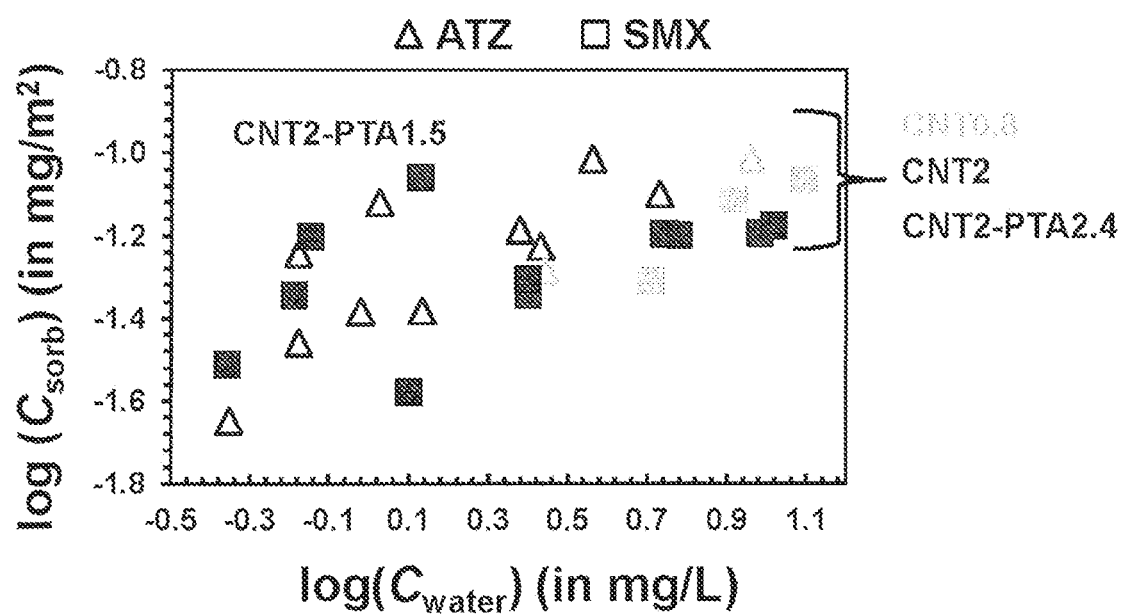
FIG. 28 illustrates sorption isotherms for ATZ and SMX with CNT0.8, CNT2, CNT2-PTA2.4, and CNT2-PTA1.5 when sorbed concentrations are normalized to measured N2-BET surface area. Generally, the relative performance of all sorbent materials except CNT2-PTA1.5 can be rationalized by the materials' relative differences in reactive surface area. Accordingly, normalization to surface area shows similar sorption behavior for CNT0.8, CNT2 and CNT2-PTA2.4. For CNT2-PTA1.5, the greater uptake of ATZ and SMX, even after accounting for available surface area, suggests there may be uniquely reactive surface sites on these materials that promote micropollutant uptake. Experimental conditions: 0.4 g/L sorbent mass loading, 5 mM phosphate buffer, pH 7.

Finally, the influence of surface area is shown in FIG. 28, in which isotherms from FIGS. 25A-25B have been normalized by BET measured surface areas. Among the composites CNT0.8, CNT2, and CNT2-PTA2.4, increasing surface area (from embedded CNTs and induced macroporosity) is largely responsible for greater uptake, with equivalent ATZ and SMX sorption when normalized to BET specific surface area. However, surface area does not always account for trends in composite sorption capacity. The surface area normalized uptake for CNT2-PTA1.5 was greater than those of other composites, suggesting a contribution from specific binding interactions (e.g., hydrogen bonding, electron donor-acceptor complexes) at surface sites generated during fabrication of these highly porous composites.

Performance Comparison to GAC and CNTs

Figure 29:
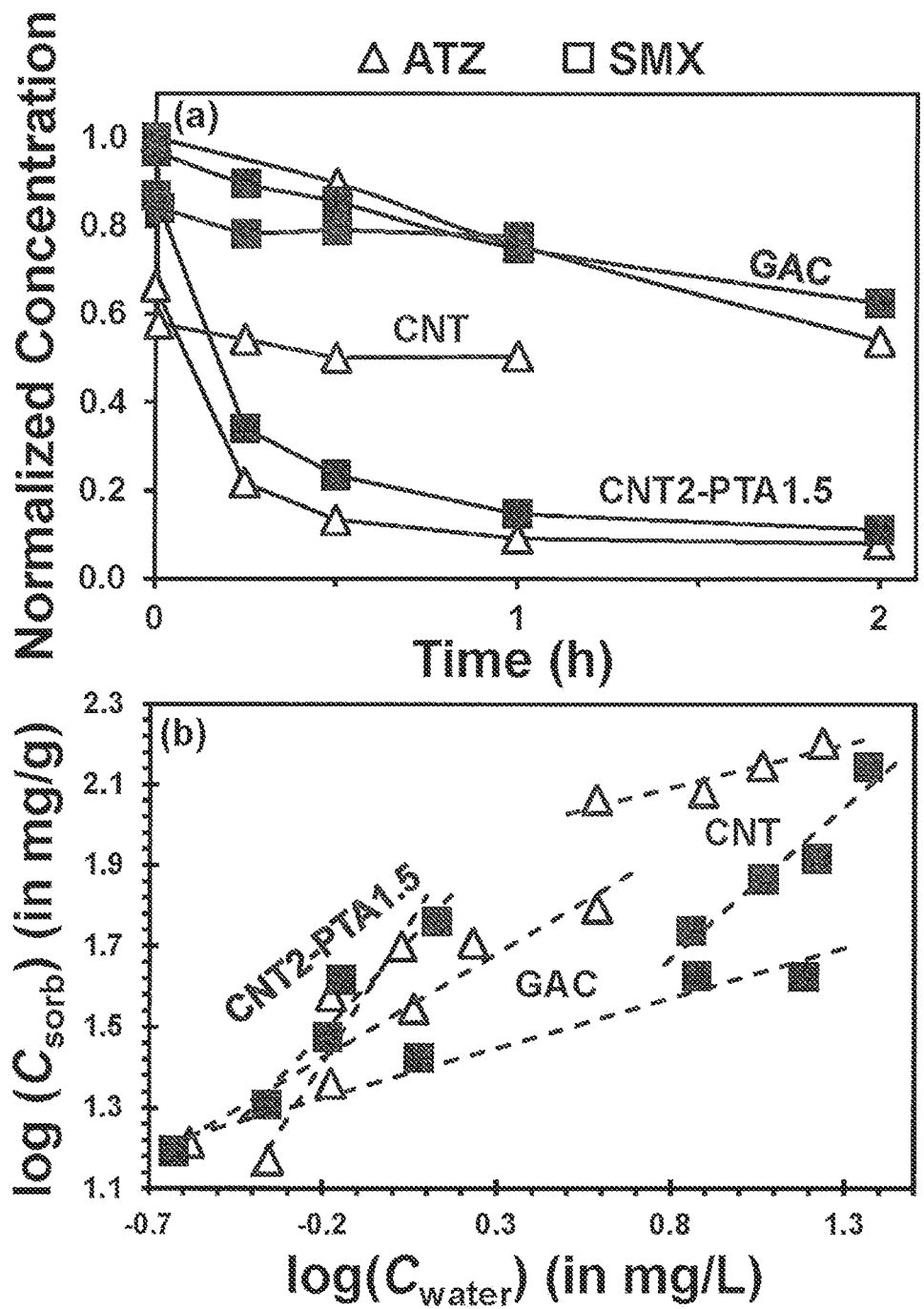
FIGS. 29A-29B illustrate performance comparison for CNT2-PTA1.5 (the highest capacity nanofiber material) relative to GAC and CNTs, including sorption (a) kinetics and (b) isotherm experiments. Although CNT2-PTA1.5 exhibited faster kinetics and comparable sorption capacities relative to GAC, material strength considerations (i.e., weak, falls apart upon handling) prevent practical application of the material. Experimental conditions: kinetics –0.5 g/L sorbent mass loading, 5 mM phosphate buffer, pH 7, 70 µM initial concentration; isotherms –0.4 g/L sorbent mass loading, 5 mM phosphate buffer, pH 7.
Figure 30:
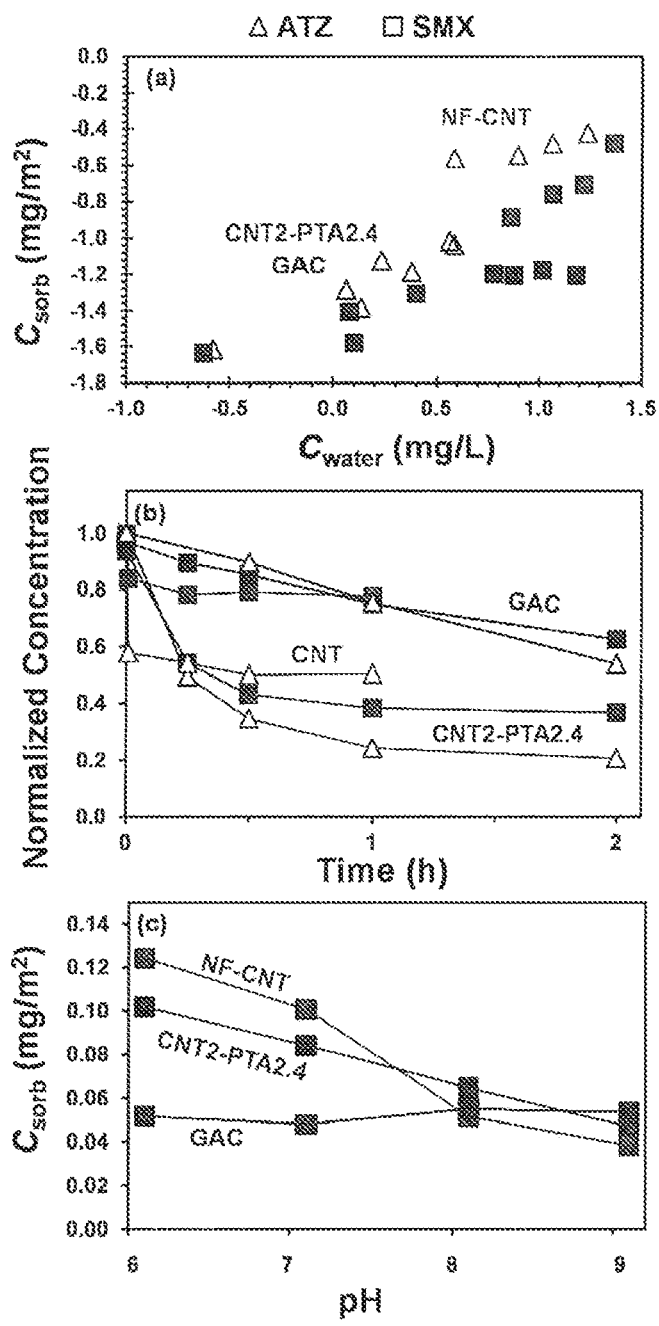
FIGS. 30A-30C illustrate performance comparison of optimized CNT2-PTA2.4 with GAC and dispersed CNTs. (a) Sorption isotherms for ATZ and SMX at pH 7 are presented on a log-log scale and shown after normalization of sorbed concentrations to measured BET surface area (CNT2-PTA2.4: 290 m2/g; GAC: 675 m2/g; CNT: 420 m2/g). (b) Rate of ATZ and SMX uptake at pH 7 shown as dissolved concentration change over time; initial concentration 50 µM (~11 mg/L ATZ, ~12.5 mg/L SMX). (c) pH edge for SMX sorption after normalization of sorbed concentrations to BET surface area; initial concentration 50 µM (~15 mg/L ATZ, ~18 mg/L SMX). Conditions: 0.4-0.5 g/L nanofiber or GAC mass loading, 0.06-0.08 g/L CNT mass loading, 5 mM phosphate buffer.
Figure 31:
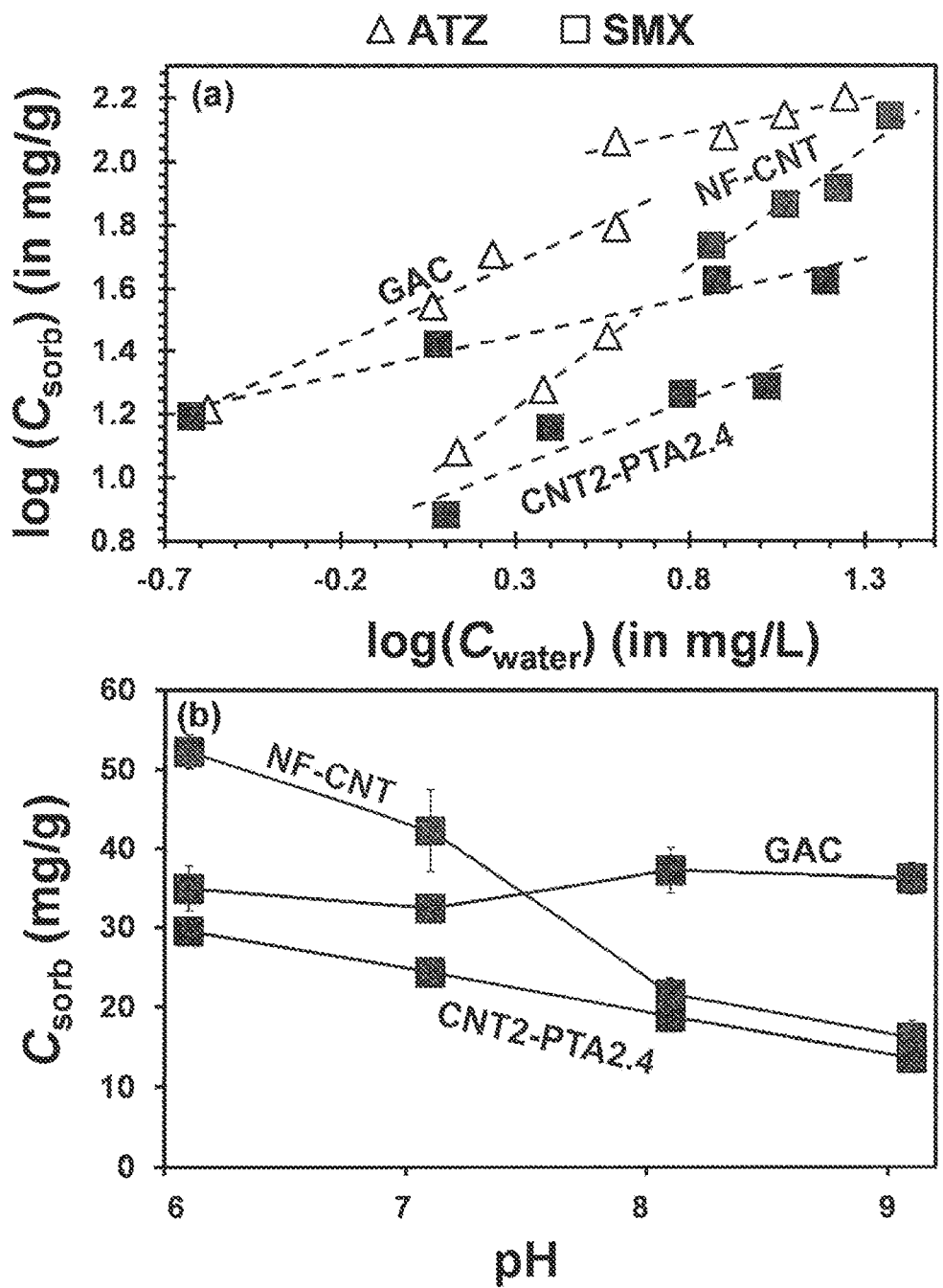
FIGS. 31A-31B illustrate mass-normalized performance comparison for CNT2-PTA2.4 relative to GAC and CNTs, including (a) sorption isotherms for ATZ and SMX (pH 7) and (b) SMX sorption as a function of pH (i.e., pH-edge behavior at an initial SMX concentration of 70 µM). Experimental conditions: 0.4 g/L sorbent mass loading, 5 mM phosphate buffer. 125 FIG. 2.22. Breakthrough curves from flow-through experimental systems using a CNT2-PTA2.4 filter.

As the only material exhibiting sufficient strength and appreciable sorption capacity, additional performance studies focused primarily on CNT2-PTA2.4 mats (some analogous performance results are also provided in the SI for highest capacity CNT2-PTA1.5; FIG. 29). FIG. 30A compares surface-area-normalized isotherms for ATZ and SMX on CNT2-PTA2.4, GAC and in a suspension of CNTs (corresponding mass-normalized isotherms are provided in FIG. 31). CNTs exhibited the greatest sorption capacity (per m$^2$) for both ATZ and SMX, illustrating their promise in water treatment despite practical disadvantages in their application as dispersions. Generally, per unit surface area, GAC and CNT2-PTA2.4 mats were roughly equivalent in their uptake, even yielding comparable isotherms slopes that may imply similar sites and/or mechanisms for ATZ and SMX uptake on each material. For example, sorption by GAC is known to occur primarily by hydrophobic interactions, consistent with the greater extent of uptake for less polar ATZ (log $K_{ow}$ 2.61) relative to SMX (log $K_{ow}$ 0.89) that we observed for nearly all carbonaceous sorbents.

A more pronounced difference among sorbents was observed for the rate of ATZ and SMX sorption (FIG. 30B). In CNT suspensions (0.08 g/L; corresponding to the equivalent CNT mass embedded in composite CNF-CNTs used in comparative sorption studies), ATZ and SMX exhibited near instantaneous uptake, and sorption capacity was quickly achieved (by 30 minutes). Slower but more sustained uptake of ATZ and SMX was observed in GAC suspensions (0.5 g/L), with capacity not yet achieved by 2 h. This slower sorption rate is consistent with diffusion limitations as ATZ and SMX access available sorption sites within GAC micropores.

On a piece of CNT2-PTA2.4 mat (corresponding to a suspension loading 0.5 g/L), ATZ and SMX uptake was considerably faster than on GAC, and more closely resembled the immediate uptake exhibited by the CNT suspension. Roughly half of the available ATZ and SMX mass sorbed onto CNT2-PTA2.4 mats within 30 min, with much slower uptake and eventually sorbent saturation thereafter. Unlike GAC, CNT2-PTA2.4 nanofibers have both significant external surface area, responsible for rapid uptake, and PTA-induced macropores, responsible for slower, more sustained uptake. Further, the high initial rate of sorption on CNT2-PTA2.4 suggests that a significant fraction of the embedded CNTs remain readily accessible to solution. Thus, CNT2-PTA2.4 mats combine the high surface-area-normalized capacity of GAC with the more rapid sorption kinetics of CNTs.

As a final comparison, the pH-dependent performance of these carbon-based sorbents was explored toward SMX (FIG. 30C), which will become predominantly anionic at higher pH (i.e., approaching 9). Per unit surface area, uptake of SMX is largely independent of pH on GAC, whereas sorption on CNTs and CNT2-PTA2.4 is greatest at lower pH and decreases monotonically with increasing pH values. The observed pH-edge behavior on CNTs and CNT2-PTA2.4 is consistent with a decrease in uptake of anionic SMX on what we presume to be predominantly negatively charged surfaces at higher pH values. Nevertheless, these data provide a final line of evidence that (i) the sorption behavior of CNF-CNT composites primarily reflects the nature of the embedded CNTs and (ii) CNT2-PTA2.4 composites compare favorably per unit surface area to more conventional carbon-based sorbents across the range of pH values and micropollutant targets anticipated for water treatment.

Micropollutant Removal During Filtration

Single Compound Flow-Through Systems

The performance of CNT2-PTA2.4 mats during simulated POU treatment was assessed in a gravity fed, flow-through system for removal of either ATZ or SMX solutions at parts-per-billion (m/L) levels. As expected, breakthrough curves (FIG. 32A) revealed that higher influent concentration (100 vs. 20 ppb) and lower CNT2-PTA2.4 areal densities (0.5 mg/cm$^2$ vs. 1.5 mg/cm$^2$) resulted in earlier ATZ breakthrough. The later breakthrough of SMX observed relative to ATZ is most likely because these experiments were conducted in more idealized solutions (i.e., deionized water) for facile LC/MS analysis, resulting in a pH (~5.5) at which relative removals of SMX and ATZ differed from results observed in our earlier batch systems.

Importantly, breakthrough of ATZ and SMX under gravity flow occurred at <30% of the theoretical maximum capacity estimated from batch isotherm experiments with CNT2-PTA2.4 (i.e., 30 mg ATZ/g and 20 mg SMX/g). This low degree of sorbent utilization in flow-through relative to batch implies that uptake is kinetically (rather than thermodynamically) limited in the flow-through system. Alternatively, it has also previously been noted that sorption trends and capacities measured with high concentration (e.g., ppm level) experiments often do not extrapolate to sorbent performance at lower concentrations (e.g., ppb level). Nevertheless, these experiments, with effective treatment (i.e., no ATZ or SMX breakthrough) for 1 L of influent solution (corresponding to ~230,000 sorbent bed volumes based on a filter mass of 14 mg and material porosity of 0.31 cm$^3$/g), are encouraging for the prospects of applying these materials in high-flux filtration systems.

Multi-Contaminant Flow-Through Systems

Figure 32:
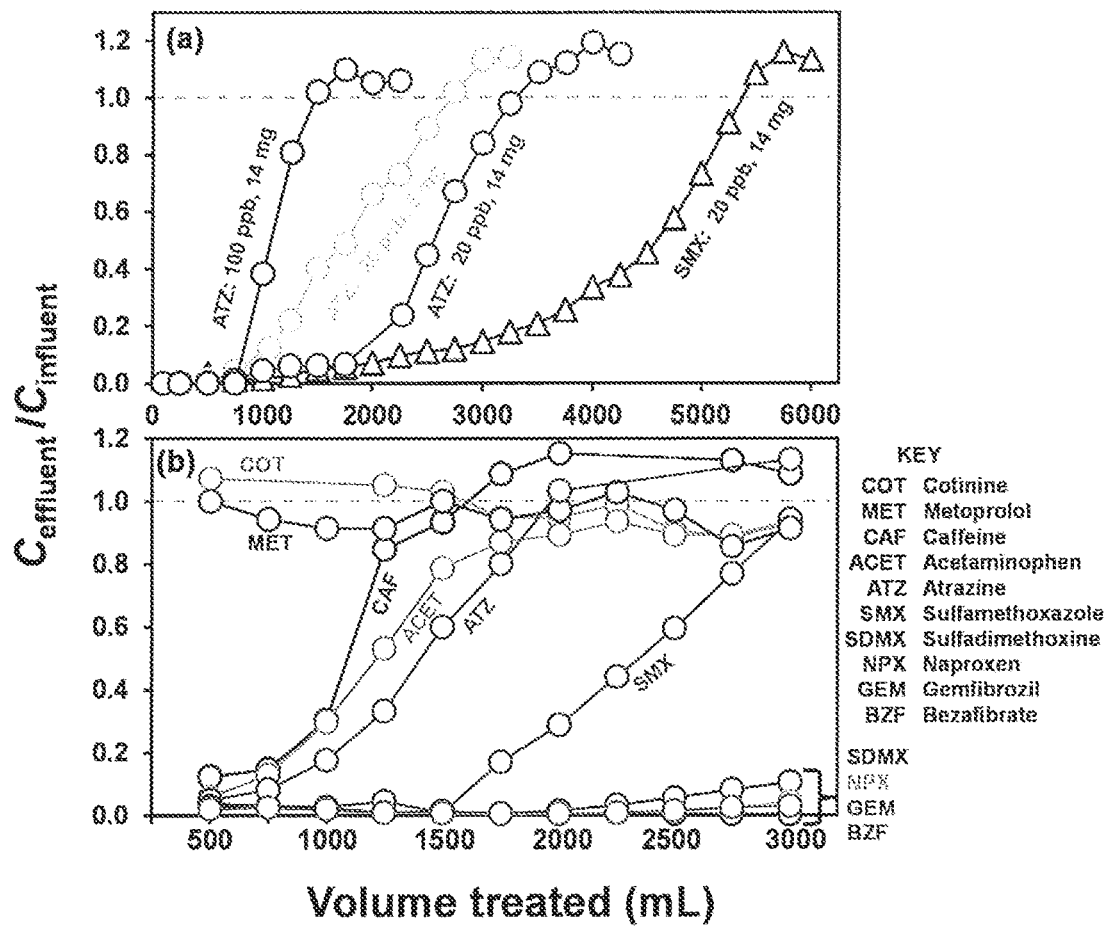
FIGS. 32A-32B illustrate breakthrough curves are shown for (a) single-contaminant treatment systems, where influent contained either ATZ or SMX at 20 or 100 ppb and used filter masses of 5 or 14 mg (corresponding to 0.5 or 1.5 mg/cm2) as indicated; and (b) a multi-contaminant treatment system, where influent contained each target compound at 5 µg/L and used a filter mass of 14 mg (1.5 mg/cm2). In both cases, the filter had an active area of 9.6 cm2 and was supported by a 1.2 µm glass fiber filter. This set-up produced a flux ~1000 LMH during gravity-flow, and data were collected in deionized water at ~pH 5.5 to facilitate LC/MS analysis without interference from buffer ions. Dashed gray lines indicate breakthrough condition (i.e., when effluent concentration equals influent concentration).
Figure 33:
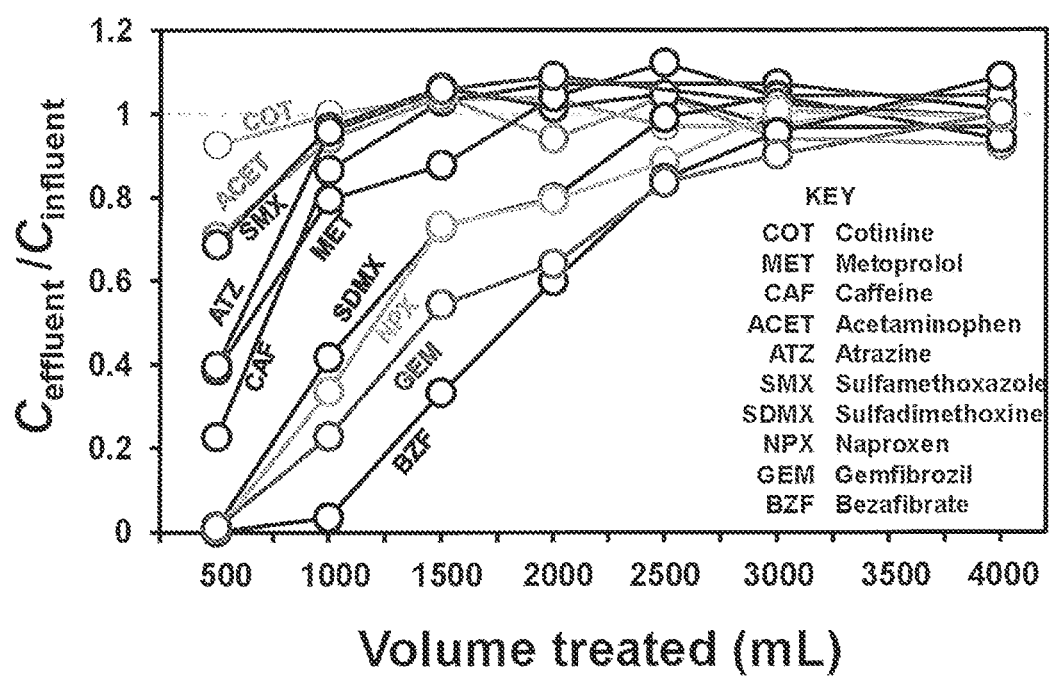
FIG. 33 illustrates breakthrough curves from multi-contaminant (5 µg/L each) flow-through experiments in a matrix more representative of natural waters (1 mM carbonate buffer, pH 7). Performance trends echo those observed in the deionized water systems, albeit with breakthrough consistently occurring at smaller volumes of treated influent (consistent with competition for sorption sites from dissolved carbonate species). Experimental conditions: 47-mm (9.6 cm2 active area), 14 mg CNT2-PTA2.4 filter supported by 47-mm 1.2 µm glass fiber filter; flux ~1000 LMH; gravity-fed.

Results for the treatment of an influent containing a suite of 10 emerging contaminants with a range of structures and polarities are shown in FIG. 32B. Data in FIG. 32B were once again collected using more idealized solution conditions (i.e., Ph ~5.5, deionized water) to facilitate LC/MS analysis without interference from buffer ions, whereas results obtained in a matrix more representative of natural waters (pH 7 stabilized by 1 mM Na$_2$CO$_3$) are provided in the SI (FIG. 33).

In the simplified aquatic matrix, >95% removal was maintained after 3 L (~690,000 bed volumes) of operation for naproxen, bezafibrate, and gemfibrozil. This behavior is particularly noteworthy given prior reports of poor removal of naproxen and gemfibrozil by activated carbons. These represent the three compounds with the largest reported log $K_{ow}$ values (log $K_{ow}$>3.1), but all three also have deprotonated —OH groups under the conditions of our flow through experiments (pK$_a$ 4.50, 3.73, and 4.48, for naproxen, bezafibrate and gemfibrozil, respectively). We propose the primary driver for their sorption is via hydrophobic interactions with the sorbent surface, driven by the non-polar moieties (e.g., aromatic rings) in their structures. When examining performance toward less hydrophobic compounds (based on reported log $K_{ow}$ values), the highest degree of removal was observed for the sulfa drugs (sulfadimethoxine (SDMX) and SMX), with >90% removal observed throughout for SDMX (log $K_{ow}$=4.63) and complete breakthrough of SMX only after 3 L of effluent volume. The relatively good removal of these sulfa drugs likely is attributable in part to the lower pH (~5.5) of these trials, with pH edge data (see FIG. 30C) revealing improved sorption for sulfa drugs at lower pH (pK$_a$ values of SDMX and SMX of 6.36 and 9.28, respectively).

Modest removal (breakthrough after 2 L or ~460,000 bed volumes) was observed for caffeine (log $K_{ow}$–0.07), acetaminophen (log $K_{ow}$ 0.46), and ATZ (log $K_{ow}$ 2.61), despite their wide range of polarities. As with sulfa drugs, caffeine and atrazine contain heterocyclic nitrogen moieties, and we hypothesize that specific interactions between these electron-rich N-containing rings and sites on the CNF-CNT composite surface enhance the sorption affinity for these compounds. This behavior is consistent with previous observations of a lack of correlation between log $K_{ow}$ and removal trends on activated carbon for compounds containing heterocyclic/aromatic nitrogen groups. Removal of acetaminophen, which has a secondary amine group but is neutrally charged in our test solution (pK$_a$ 9.48), has also previously been proposed to be higher on activated carbon than would be predicted by log $K_{ow}$.

Figure 34:
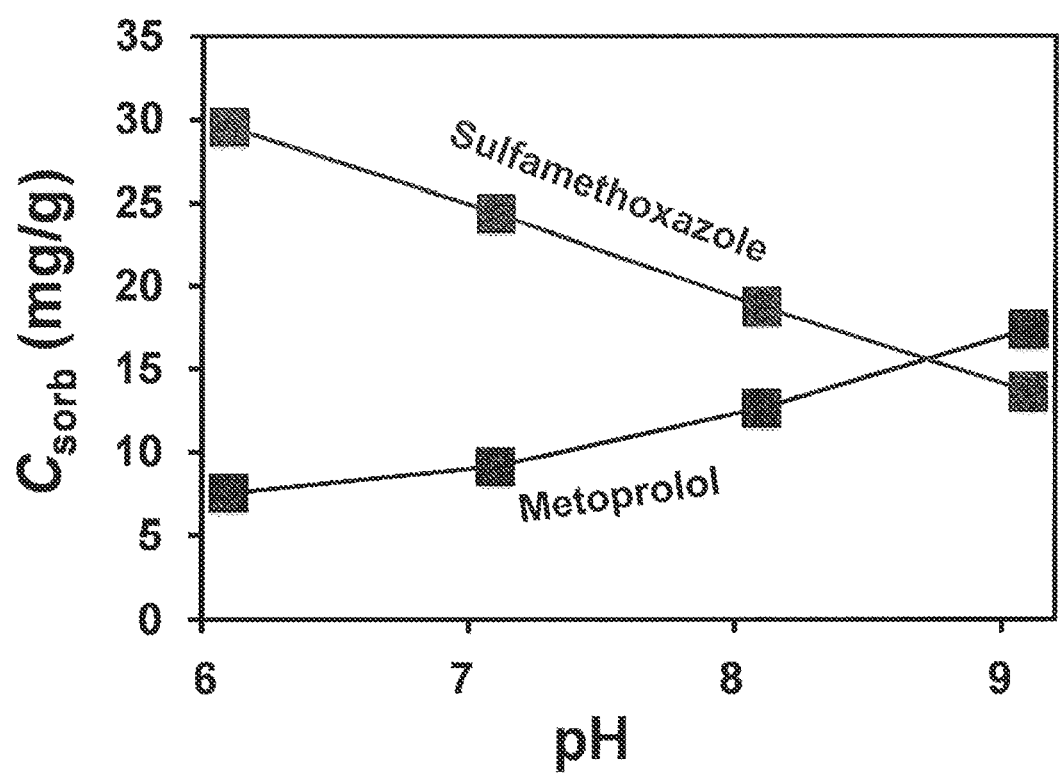
FIG. 34 illustrates SMX (pKa 9.28) and metoprolol (pKa 9.09) sorption on CNT2-PTA2.4 as a function of pH. Removal of each compound decreases with the increasing fraction of anionic species (e.g., SMX at higher pH) or cationic species (e.g., metoprolol at lower pH). Experimental conditions: 0.4 g/L sorbent mass loading, 5 mM phosphate buffer, 70 μM initial concentration.

Essentially unretained by the CNF-CNT composite were metoprolol and cotinine. For metoprolol (pK$_a$ 9.09), its poor removal is in part due to its pH-dependent uptake, as we observed its extent of sorption to decrease at lower pH values where it is positively charged (FIG. 34). Cotinine, which is relatively polar (log $K_{ow}$ 0.07) and neutrally charged (pK$_a$ 4.36) in our test system, also was unretained by the CNF-CNT sorbent. Thus, despite containing heterocyclic N sites typically prone to specific binding interactions, the polarity of cotinine appears sufficient to inhibit its binding to the CNF-CNT surface.

Collectively, therefore, mixture treatment results support CNF-CNT composites targeting organic micropollutants via multiple sorption mechanisms (e.g., hydrophobic interactions and/or specific binding interactions), presumably occurring at different sites on the sorbent surface. This is consistent with our earlier findings with ATZ and SMZ, which on occasion exhibited comparable uptake on CNF-CNT composites despite their differences in polarity (i.e., sorption was not easily predictable from log $K_{ow}$ values). This is also consistent with prevailing wisdoms in the carbon-based sorbent literature, particularly at trace (sub-ppm) concentrations, where the presence of acid/base groups and/or hydrogen bond donors/acceptors have been shown to contribute to uptake. However, flow-through experiments clearly reveal that these materials are, indeed, most effective toward more hydrophobic species, else they require specific moieties (e.g., heterocyclic N groups) to target for uptake.

Figure 35:
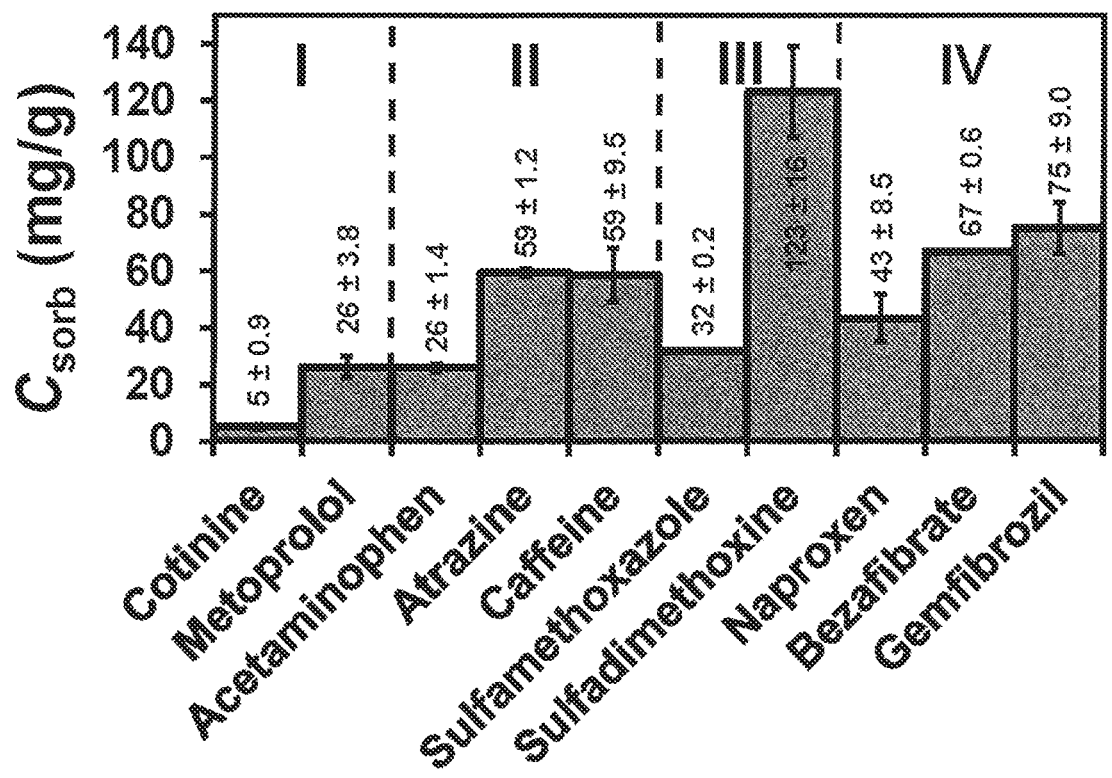
FIG. 35 illustrates single-point sorption uptake results for removal of the 10-compound suite of micropollutants on dispersed CNTs. Results roughly match the trends for pollutant breakthrough observed in the multi-contaminant flow-through systems (see FIG. 5 in the main text). Group designations (I-IV) indicate relative removal classes in multicontaminant flow-through system, as discussed in the main text and described as follows: Group I—Compounds essentially unretained; Group II—Compounds for which moderate removal was observed; Group III—Compounds for which good removal was observed (sulfa drugs); Group IV—Compounds for which >95% removal was observed (hydrophobic compounds). Experimental conditions: CNT mass loading 0.06 g/L, 50 μM initial concentration, 5 mM phosphate buffer, pH 7.

In terms of predicting composite activity, a reasonable indicator appears to be the sorption capacity of the non-functionalized CNTs. In parallel to these flow through systems, the sorption of each micropollutant in suspensions (0.06 mg/L) of well-mixed (albeit still quite aggregated) CNTs were examined. Removal in flow through generally followed trends of relative micropollutant uptake observed in CNT dispersions (FIG. 35), once again implying that the embedded CNTs are the primary active sorbent within the porous composite materials. This raises the possibility of using different types of functionalized CNTs known to exhibit unique reactivity (e.g., N-doped CNTs were recently noted to be better sorbents for π-donor aromatic compounds) to produce composites with performance specifically tailored for target pollutants.

Figure 36:
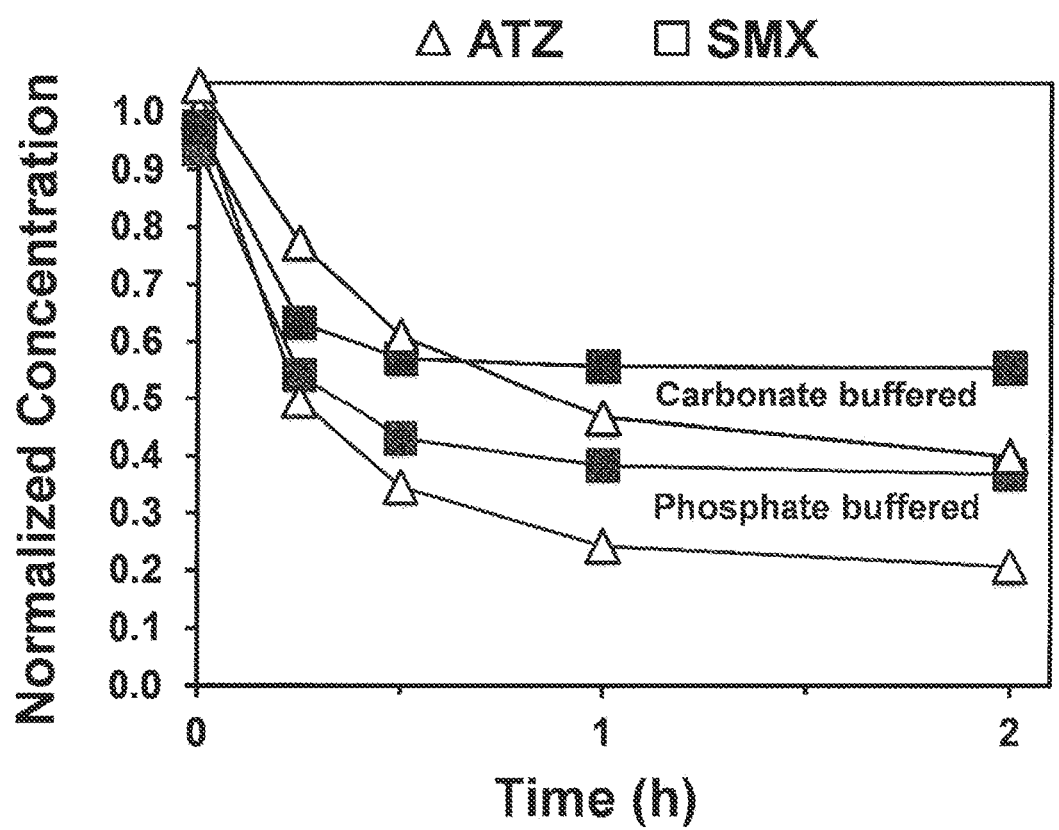
FIG. 36 illustrates effect of dissolved carbonate species on sorption of SMX (squares) and ATZ (triangles) on CNT2-PTA2.4 (data in blue). Data (in green) from a phosphate buffered system are provided for comparison. Diminished sorption of both SMX and ATZ in the carbonate buffered system likely indicates an inhibitory role for dissolved carbonate via competition for available sorption sites. Experimental conditions: 0.4 g/L sorbent mass loading, 50 μM initial concentration, pH 7, either 5 mM phosphate buffer or 1 mM carbonate buffer.

Finally, these trends in micropollutant sorption were also observed in systems with 1 mM carbonate (100 mg/L as $CaCO_3$ or moderate hardness), although breakthrough occurred much more rapidly (FIG. 33). This behavior likely indicates sorption inhibition by dissolved carbonate species (i.e., bicarbonate; $HCO_3^-$). A competitive or inhibitory role for bicarbonate is supported by results from batch experiments, where increasing bicarbonate concentration decreased the extent of ATZ and SMX sorption (FIG. 36). From the inhibition observed from bicarbonate as a co-solute, application may require integration of another filter layer designed to specifically remove interfering species via other mechanisms (e.g., ion exchange).

Despite the shorter breakthrough times, micropollutant removal in the carbonate-containing system could generally be divided into two categories. Compounds well-removed in more idealized, deionized water systems (FIG. 32B; i.e., SDMX, naproxen, bezafibrate, and gemfibrozil) broke through at ~2-fold greater volume than the remaining compounds. Notably, metoprolol was removed slightly better in carbonate buffered systems, behavior that can be ascribed to its pH-dependent uptake (see FIG. 34). Thus, while the same sorption processes appear to be at play in this more representative aquatic matrix, composite ability (presumably both uptake rate and capacity) is, not surprisingly, influenced by the presence of co-solutes. Accordingly, these filters are likely best applied as a final polishing step for water treatment (e.g., point of use application at the tap) after effective management to limit competitive co-solutes.

As a robust, high-sorption capacity material, the optimized nanocarbon sorbent fabricated herein via electrospinning represents a significant practical advance in POU drinking water treatment. Relying on integrated CNTs for improved strength and sorption capacity, and macroporosity for flexibility and external surface area, the optimized CNF-CNT composite (CNT2-PTA2.4) exhibited capacities comparable to and sorption kinetics much faster than those of commercial GAC. The promise of these materials is their ability to be deployed in high-flux systems while minimizing application footprint. Depending on solution complexity and the number of dissolved targets, relatively low masses can be used to treat large volumes under dynamic flow conditions (e.g., 14 mg for 2 L of treatment for SMX, or 7 mg/L).

Our study yields two notable findings broadly relevant to nanofiber fabrication and application. First, embedded CNTs serve as the primary active sorbent in these materials, and the porosity of the fibers is integral for promoting their accessibility to solution. Second, building upon the work of Liu et al., we further illustrate the positive benefits of macroporosity on nanofiber mat flexibility and durability. Thus, these CNF-CNT composites may represent a self-contained platform through which the unique reactivity of CNTs can be safely harnessed during water treatment while minimizing risk of their release into the finished supply.

Admittedly, more optimization is needed to realize the full potential of these materials. For example, there remain some poorly retained compounds (e.g., highly polar, small molecular weight cotinine), indicating the need for additional tuning of composite surface chemistry to target such species. Further, for example, consideration of reversibility, as the kinetically limited sorption observed is indicative of relatively weak binding interactions, and our preliminary results have indeed suggested that binding is reversible in most instances on these composites. More work is also needed to verify the long-term fate of CNTs in the porous CNF matrix and their propensity for release under flow. Finally, we found that too much porosity can be disadvantageous, ultimately weakening material strength. Thus, in designing such CNF-CNT composites, a critical step will be identifying an optimum macroporosity, the degree that increases material flexibility, reactive surface area, and CNT accessibility without compromising composite strength.

Functionalized Polymer-Iron Oxide Hybrid Nanofibers: Electrospun Filtration Devices for Metal Oxyanion Removal Via a single-pot electrospinning synthesis, a functionalized polymer-metal oxide nanofiber filter for point of use (POU) water treatment of metal oxyanions (e.g., arsenate and chromate) is disclosed. Polymer functionalization was accomplished by inclusion of surface-active, quaternary ammonium salts (QAS) that are known to serve as strong base ion exchange sites [cetyltrimethylammonium bromide (CTAB) or tetrabutylammonium bromide (TBAB)], while embedded iron oxide [ferrihydrite (Fh)] nanoparticles were used for their established role as metal sorbents. We examined the influence of QAS and Fh loading on composite filter properties, including nanofiber morphology, BET surface area, surface chemical composition, and the accessibility of embedded Fh nanoparticles to solution (from acid dissolution experiments). Composite performance was evaluated using kinetic, isotherm, and pH-edge sorption experiments with arsenate and chromate, with performance benchmarked to unmodified polyacrylonitrile (PAN) nanofibers and unsupported Fh nanoparticles. We also assessed the long-term stability of QAS in the composite matrix. The optimized composite (PAN 7 wt %, Fh 3 wt %, TBAB 1 wt %) exhibited two distinct sites for simultaneous, non-competitive metal binding (i.e., QAS sites for chromate removal via ion exchange and iron oxide sites for arsenate removal via sorption). Further, synergistic performance arising from the ability of surface-segregating QAS to enrich Fh nanoparticles at the nanofiber surface allowed immobilized nanoparticles to exhibit reactivity comparable to that of unsupported nanoparticles. To simulate POU treatment, the optimized composite was tested in a dead-end, flow-through filtration system for removal of arsenate and chromate at environmentally relevant concentrations (e.g., µg/L) in both an idealized matrix and simulated tap water. Performance trends indicate that dual mechanisms for uptake are maintained in kinetically limited regimes, although chromate removal via ion exchange is more susceptible to interfering counter-ions, and that, assuming an influent contaminated with 100 µg As/L, only ~130 g of the composite could produce an individual's annual supply of drinking water.

Despite their regulation in finished supplies, a significant number of consumers still rely upon drinking water contaminated with the metal oxyanions arsenate and chromate, which pose significant health concerns. For example, private groundwater wells may contain significant levels of arsenic, while chromate may occur in tap water via leaching or corrosion of distribution system infrastructure, such as cast iron or stainless steel piping. To protect affected consumers, decentralized point-of-use (POU) treatment technologies hold great promise for minimizing exposure risks, although reverse osmosis and anion exchange are currently the only EPA-approved POU technologies for small system arsenic and chromium compliance.

The potential of granular iron oxide sorbents for oxyanion removal been demonstrated based on long-term performance and cost-effectiveness, and commercial granular media are available (e.g., Evoqua granular ferric hydroxide, GFH®). However, granular materials require relatively large physical footprints for packed bed application, may disintegrate during repeated use, and possess high internal surface area (i.e., removal is diffusion limited). Alternatively, nanoscale iron oxides, such as hydrous ferric oxides (HFOs), can remove a range of heavy metals (arsenate, chromate, copper, lead), and possess high external surface area that helps to address concerns over mass transfer limitations and large technology footprints. Nanoscale iron oxides pose other challenges, unfortunately, as their use in packed beds is limited by excessive pressure drops and concerns over material release into the treated supply.

To improve the practical viability of nanoscale iron oxides, recent efforts have focused on their immobilization in porous support media. For example, hybrid HFO-anion exchange (HAIX) materials (e.g., commercial Purolite ArsenX$^{np}$) are especially promising, due to the potential for dual mechanisms of uptake when treating pollutant mixtures (e.g., concurrent removal of arsenate via sorption to HFO and simultaneous removal of other targets such as perchlorate via ion exchange, as demonstrated by Lin et al.). For such hybrid materials, HFO sites within the pores of spherical ion exchange resin beads can still suffer from mass transfer limitations. Accordingly, this has motivated HFO immobilization on fibrous, high (external) surface area ion-exchange polymers (e.g., registered trademark FIBAN®), which may help to minimize such limitations during drinking water treatment for arsenic.

Building upon these existing hybrid technologies, we illustrate herein the facile development and synergistic performance of electrospun polymer-iron oxide nanofiber composites for metal oxyanion removal. Fibers in existing composites typically exhibit diameters on the order of ~30-50 μm, and fabrication of the fibrous ion exchange polymers and their hybrid iron oxide composites requires significant material processing. In contrast, electrospinning is a highly scalable route for the "one-pot synthesis" of tunable nanofiber composites (diameter 50-500 nm) via changes to precursor solution composition (e.g., polymer concentration) and electrospinning parameters (e.g., applied voltage, needle size). The final nonwoven nanocomposite is a mechanically stable, stand-alone, high-flux platform ideal for POU deployment.

In fact, the ease of fabrication afforded by electrospinning is ideal for composite synthesis, as composite building blocks only need to be integrated into polymer precursor solutions. For example, it has been shown that some amphiphilic molecules (i.e., surfactants) can surface-segregate within electrospun polymer matrices, a phenomenon primarily exploited for development of antimicrobial materials. Notably, the head groups of common cationic surfactants used in this regard, quaternary ammonium groups, are identical to those in strong base ion exchange resins for oxyanion (e.g., arsenate and chromate) removal. Beyond introducing exchange sites for oxyanions, the quaternary ammonium groups may have additional benefits to hybrid performance. For example, cationic QAS sites may enhance uptake of anionic targets on adjacent iron oxide surfaces within composites. Further, interactions between cationic surfactants and iron oxide nanoparticles in electrospinning precursor solutions may improve dispersion of nanoscale iron oxides in nanofibers, thereby increasing their available reactive surface area in electrospun composites.

In accordance with an exemplary embodiment, via single-pot electrospinning synthesis, a functionalized polymer-iron oxide hybrid nanofiber filter was developed for targeting the pervasive metal oxyanions arsenate and chromate. The active binding agents in this hybrid material are surface-active quaternary ammonium moieties and ferrihydrite (Fh) nanoparticles. Specifically, we evaluated the inclusion of two quaternary ammonium salts (QAS), the surfactants cetyltrimethylammonium bromide (CTAB) and tetrabutylammonium bromide (TBAB), in polyacrylonitrile nanofibers, as well as possible synergies arising from the inclusion of both QAS and Fh nanoparticles. CTAB and TBAB were chosen for their different hydrophobic tail structures, which should influence their retention in the PAN matrix, while Fh nanoparticles were selected based on their small size (~4 nm) and corresponding high specific surface area. We examined the influence of QAS and Fh concentration on composite properties, including nanofiber morphology, surface chemical composition, and solution phase accessibility of the embedded Fh nanoparticles. Then, we evaluated batch uptake rates and sorption capacities of the composites for arsenate and chromate removal, with comparisons to dispersed Fh nanoparticles and unmodified PAN nanofibers. Practical demonstrations included evaluation of QAS retention, and performance testing for treatment of mixed influents at environmentally relevant oxyanion concentrations (e.g., μg/L) in a flow-through system representative of POU treatment.

Materials and Methods
Reagents

All reagents were used as received. Electrospinning precursor solutions were prepared with polyacrylonitrile (PAN; MW 150,000, Aldrich), N,N-dimethylformamide (DMF; 99.85%, BDH Chemicals), cetyltrimethylammonium bromide (CTAB; ≥98%, Aldrich), tetrabutylammonium bromide (TBAB; ≥98%, Aldrich). Ferrihydrite nanoparticles (Fh; 4 nm, 6-line; prepared according to Anschutz et al.) were prepared with iron (III) nitrate nonahydrate (Fe(NO$_3$) 3.9H$_2$O, ≥98%, Aldrich) and sodium bicarbonate (NaHCO$_3$, ≥99.7%, Aldrich). Stock solutions of potassium chromate (K$_2$CrO$_4$; ≥99%, Aldrich) and sodium arsenate dibasic heptahydrate (Na$_2$HAsO$_4$-7H$_2$O; ≥99%, Aldrich) were prepared in deionized water (Thermo Scientific Barnstead NANOPure Diamond). Batch experiments were conducted in 10 mM HEPES buffer (≥99%, Aldrich), 10 mM MES buffer (MES hydrate, ≥99.5%, Aldrich), or 10 mM AMPSO buffer (≥99%, Aldrich), prepared with deionized water and pH-adjusted as needed with 5 M NaOH. Reagents for colorimetric determination of chromium and iron were prepared with sulfuric acid (H$_2$SO$_4$; 95.0-98.0%, Aldrich), 1,5-diphenylcarbazide (ACS reagent, Aldrich), hydroxylamine hydrochloride (NH$_2$OH.HCl; 98%, Aldrich), 1,10-phenanthroline (≥99%, Aldrich), ammonium acetate (≥98%, Aldrich), and glacial acetic acid (≥99.7%, Aldrich). Iron standards were prepared with ammonium iron sulfate hexahydrate (($NH_4$)$_2$ Fe($SO_4$)$_2$·6$H_2O$; 99%, Aldrich).

Ferrihydrite Nanoparticle Synthesis

Figure 37:
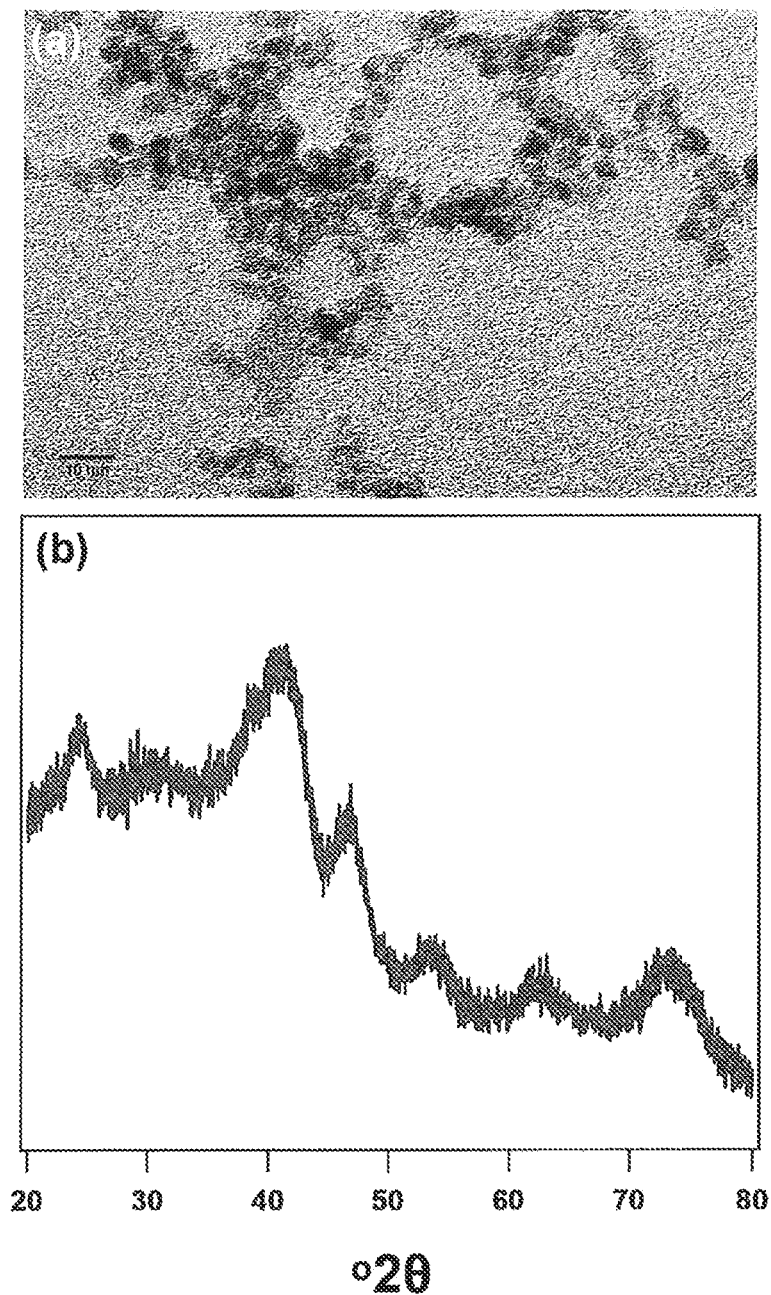
FIGS. 37A-37B illustrate characterization of Fh nanoparticles, showing (a) representative HRTEM image and (b) XRD. HRTEM shows good nanoparticle uniformity. We note that the batch of Fh used in this study was originally synthesized in 2012. XRD indicates that the nanoparticles are actually a mixed phase of ferrihydrite and goethite. This is in agreement with results observed by Anschutz and Penn, who found ~10% goethite in 4 nm-6 line ferrihydrite.
Figure 38:
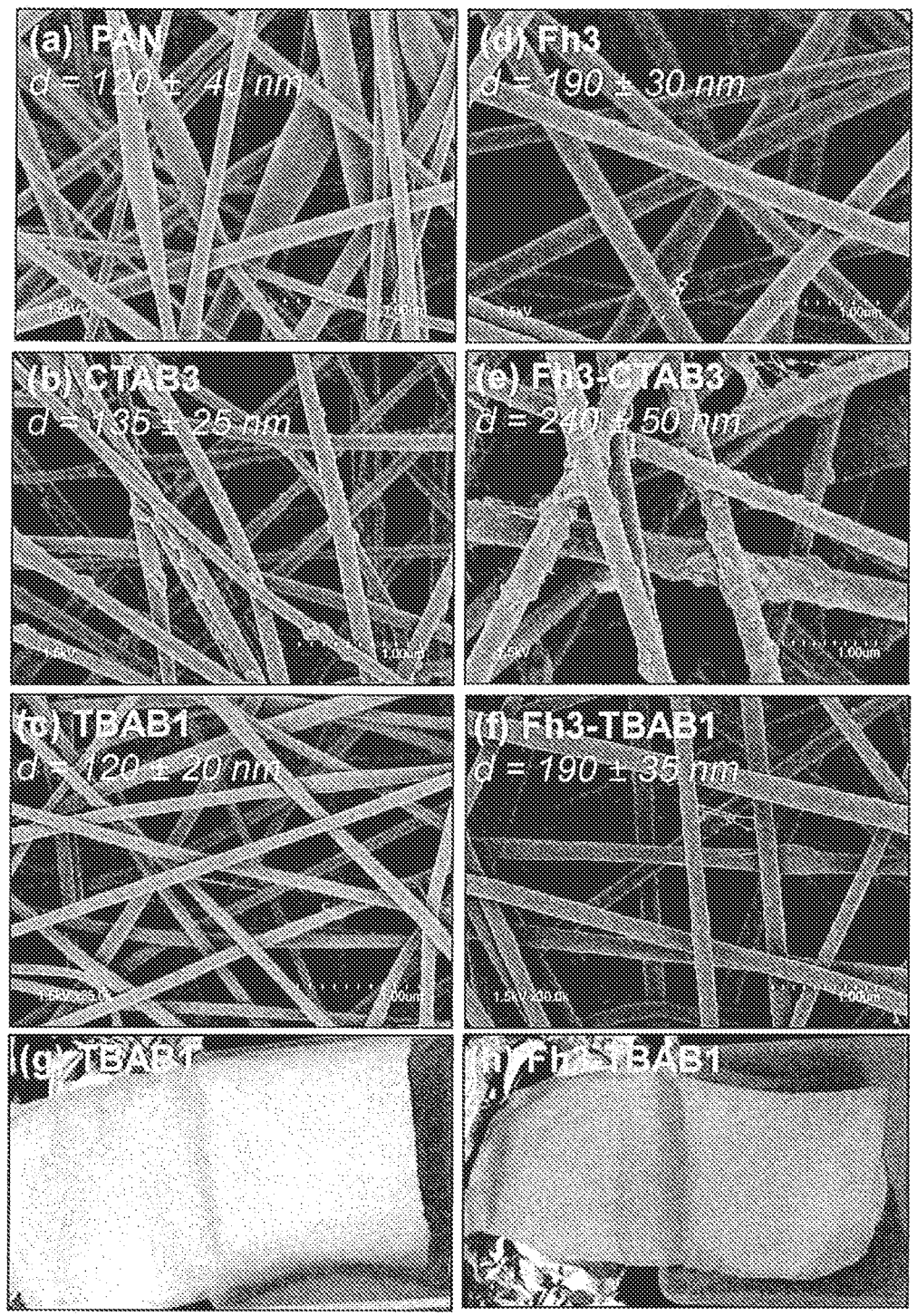
FIGS. 38A-38H illustrate representative SEM images of (a) PAN, (b) CTAB3, (c) TBAB1, (d) Fh3, (e) Fh3-CTAB3, and (f) Fh3-TBAB1 reveal smooth nanofiber surfaces for PAN and binary PAN-QAS composites, while nanofiber roughness is evident for binary (Fh3) and ternary (Fh3-CTAB3, Fh3-TBAB1) Fh-containing materials. Digital images of (g) TBAB1 and (h) Fh3-TBAB1 show the bulk scale appearance and flexibility of nanofiber materials.

Fh nanoparticles were prepared according to the method for synthesis of 4 nm, 6-line Fh outlined by Anschutz and Penn (see FIGS. 37A-37B for characterization). To prepare Fh nanoparticles, 1 L of a 0.48 M $NaHCO_3$ solution was added dropwise at a rate of 4.58 mL/min to 1 L of a constantly-stirred, 0.40 M Fe($NO_3$)$_3$·9$H_2O$ solution using a peristaltic pump (Masterflex L/S Precision Modular Drive 6-600 rpm; Cole-Parmer). The solution was divided into 250-mL Nalgene bottles, and was microwaved until boiling occurred in intervals of 40 s (with shaking between intervals to ensure even heating; boiling occurred after 120 s). The solutions were immediately cooled in an ice bath to room temperature, and then were dialyzed (Spectra/Por® Standard RC Tubing, MWCO 3500) in deionized water for at least 3 days, with at least 9 changes of water.

Electrospinning

For polyacrylonitrile (PAN) mats containing a surfactant, PAN and a quaternary ammonium surfactant (either CTAB or TBAB) were dissolved in DMF at a concentration of 7 wt % PAN and 1-3 wt % surfactant by mixing at 60° C. for 2 h at 1.65 g (HLC Cooling-Thermomixer MKR 13, Ditabis). For Fh-embedded mats, Fh nanoparticles were first dispersed in DMF (at concentrations of up to 3 wt % relative to the total mass of the precursor solution) via ultrasonication for 5 h, after which PAN and the surfactant were added to the Fh-DMF suspension. Hereafter, the composite mats will be referred to as 'Fhx-CTABy' or 'Fhx-TBABz', where x, y, and z denote the Fh, CTAB, and TBAB concentrations in the sol gel, respectively. The sol gels were allowed to return to room temperature prior to electrospinning for 8 h. The electrospinning apparatus was described previously. Electrospinning conditions specific to syntheses herein included a temperature and relative humidity of 28° C. and 16%, respectively, pumping rate of 0.3 mL/h (New Era Pump Systems, Inc.), and a positive 15 kV voltage.

Nanofiber Characterization

The morphology of electrospun nanofiber mats was investigated using a field-emission scanning electron microscope (SEM) (S4800, Hitachi) at an acceleration voltage of 1.5 kV. All samples were sputter-coated with a thin layer of gold/palladium (60:40 Au:Pd) prior to SEM imaging. Average fiber diameters were developed from measurement of >100 nanofibers in Image? software. Ferrihydrite nanoparticles were analyzed via X-ray diffraction (XRD; Rigaku MiniFlex II, cobalt X-ray source). Samples were prepared for XRD by placing a compact layer of nanoparticles on a slide with a well depth of 0.2 mm, and samples were analyzed from 10° to 80° with an interval of 0.02°. Ferrihydrite nanoparticle morphology was examined using high resolution transmission electron microscopy (HRTEM) (JEOL JEM 2100 F with Schottky FEG Emission-Zr/W). Samples were prepared via sonication in deionized water, and a droplet was allowed to dry on a grid prior to imaging (#01824 UC-A on holey 400 mesh Cu; Ted Pella, Inc.). Nanofiber composites were examined using transmission electron microscopy (TEM) (JEOL JEM-1230) at an operating voltage of 120 kV. Samples were prepared via embedding in EPON™ resin (Hexion) and sectioning at 80 nm on an ultramicrotome (Leica UC6). Sections were placed on a grid for imaging (#01814-F C-B 400 mesh Cu; Ted Pella, Inc.). Surface area and pore volumes were determined by N2-BET analysis using a Quantachrome NOVA 4200e Analyzer. Nanoparticle samples and nanofiber materials were degassed at 90° C. and 35° C., respectively, for 12 h prior to analysis. Surface composition was analyzed with a custom Kratos Axis Ultra X-ray photoelectron spectroscopy (XPS) system equipped with a monochromatic Al Kα X-ray source. XPS was used to collect full spectrum survey scans, as well as to examine C is and Fe 2p regions. An extensive description of this system can be found elsewhere.

To assess the relative availability of Fh in composites, the rate of soluble iron dissolution from Fh-containing nanofibers was measured in dilute sulfuric acid (0.1 M $H_2SO_4$; 0.125 g/L mat). Dissolution reactors were well-mixed on a rotator (Cole-Palmer Roto-Torque), and 1 mL samples were taken periodically over a 6 h period. This procedure was used to operationally define "surface available iron" for Fh-containing composites. To determine "total available iron" in Fh-containing composites, mats were placed in well-mixed reactors containing concentrated sulfuric acid (5 M $H_2SO_4$; 0.125 g/L mat) for 24 h. In both instances, dissolved iron concentration in acid digests was quantified via the phenanthroline colorimetric method.

Batch Sorption Experiments

All batch experiments with nanofiber mats utilized a piece (~4 $cm^2$ in dimension) of the nonwoven mat and were generally performed in 20-mL glass vials sealed with butyl rubber stoppers, at a fixed sorbent loading (0.5 g/L for nanofiber mats; 0.2 g/L for Fh nanoparticles). For reactors containing nanoparticles, 15 mL polypropylene centrifuge tubes with polypropylene screw caps were used in place of glass vials, for ease of sample processing. Reactors were well-mixed throughout the experiment. We note that composites containing surfactant were evaluated both as-fabricated and after extensive rinsing (3 solution exchanges with continuous mixing over 24 h), to evaluate whether the surfactant would be retained within the nanofiber matrix during use, and the influence of surfactant loss via leaching on performance. For controls, all metal concentrations were stable in reactors without any nanocomposite.

Sorption isotherms were developed at pH 7 (buffered by 10 mM HEPES) for chromate and arsenate by varying initial concentration (2-150 mg/L As or Cr), with samples taken at 0 and 24 h. Data for isotherms were collected with at least two batches of nanofibers, from which metal uptake (via sorption or ion exchange) was quantified from the difference between the initial metal concentration in solution and the metal concentration in solution at equilibrium. The mass of sorbed metal was then normalized to the mass of the dry, unrinsed sorbent, and these values were used to develop sorption isotherms that were modeled using IGOR Pro (WaveMetrics, Inc., Lake Oswego, Oreg., USA). Samples were analyzed via ICP-OES and/or colorimetric methods (see details below). We note that samples from these isotherm studies were also used to monitor for bromide release indicative of anion exchange (in the presence of up to 10 mg/L As or Cr), with analysis of bromide concentration via ion chromatography.

Duplicate pH edge experiments and kinetic experiments were performed in reactors identical to those used for batch isotherm experiments. pH edge experiments used 10 mM buffer (MES for pH 5 and 6; HEPES for pH 7 and 8; AMPSO for pH 9) and 20 mg/L Cr or As initial concentrations. Kinetic experiments (pH 7, 10 mM HEPES) monitored decreases in chromate and/or arsenate concentration over time for excess (20 mg/L As and Cr) or environmentally relevant (500 µg/L Cr and 50 µg/L As) initial concentrations, and one reactor was prepared for each time point, to avoid concentration of the sorbent mass loading over time.

Flow-Through Experiments

Optimal composite nanofibers (i.e., those with highest capacity towards arsenate and chromate and maximum QAS retention in batch systems) were also evaluated in a dead-end, flow-through filtration system representative of point-of-use treatment applications. The filtration housing (TAMI Industries, France) had an outer diameter of 47 mm and an active filtration area of 12.6 cm$^2$ (40 mm diameter). Filters were typically ~250 mg (~175 mg within the active area), and were supported on a 47 mm, 0.65 µm PVDF (DVPP4700; Durapore) disk filter. To achieve a flux of ~950 LMH, influent containing arsenate and/or chromate was continuously dosed to the nanofiber filter at a rate of 20 mL/min by a peristaltic pump (Masterflex L/S Precision Modular Drive 6-600 rpm; Cole-Parmer). Filters were pre-conditioned with 200 mL of deionized water. During the treatment run, the last 10 mL of each 100 mL aliquot that passed through the filter was collected for subsequent metals analysis. Influent levels of arsenate and chromate were representative of levels in water treatment (e.g., 100 µg/L As and/or 100 µg/L Cr), and the influent matrix was either idealized (e.g., deionized water, adjusted to pH 7) or made to represent simulated tap water (70 mg/L Cl$^-$, 120 mg/L SO$_4^{2-}$, and 100 mg/L HCO$_3^-$; adjusted to pH 7.2). Filters were generally operated until complete breakthrough was observed (i.e., when effluent concentration equaled influent concentration), or until 8 L of effluent passed through the filter, whichever came first.

Analytical Methods

Determination of Fe(III) used 1 mL sample, 30 µL 100 g/L hydroxylamine hydrochloride, 200 µL 1 g/L 1,10-phenanthroline, 200 µL ammonium acetate buffer; 40-minute reaction time; and measurement at 510 nm on UV-vis spectrophotometer (Thermo Scientific Genesys 10S). Iron standards were made by dilutions of ferrous ammonium sulfate in 0.1 N H$_2$SO$_4$.

Samples for ICP-OES were acidified to 2% HNO$_3$ and passed through a 0.45 µm Nylon syringe filter prior to analysis on a Perkin Elmer Optima 7000 DC ICP-OES. Samples containing Fh nanoparticles were centrifuged at 8,000 g for 30 minutes prior to acidification, filtration, and analysis of the supernatant. The ICP-OES was calibrated with single-element arsenic and chromium standards (Inorganic Ventures, Inc.). A portion of chromate samples were quantified via the diphenylcarbazide colorimetric method, which used 900 µL DI, 100 µL sample, 50 µL 5 N H$_2$SO$_4$, and 50 µL 5 g/L 1,5-diphenylcarbazide; 30 minute reaction time; and measurement at 540 nm on a UV-vis spectrophotometer. All colorimetric results were confirmed via ICP-OES analysis.

Samples for bromide quantification were passed through a 0.45 µm Nylon syringe filter prior to analysis on a Thermo Scientific Dionex ICS-2100. The ICS-2100 was operated with a 23 mM KOH eluent at a flowrate of 1.00 mL/min and an AERS_4 mm suppressor set to 124 mA, and calibrated with a Dionex™ combined seven-anion standard (Thermo Scientific).

Nanofiber Morphology

Figure 39:
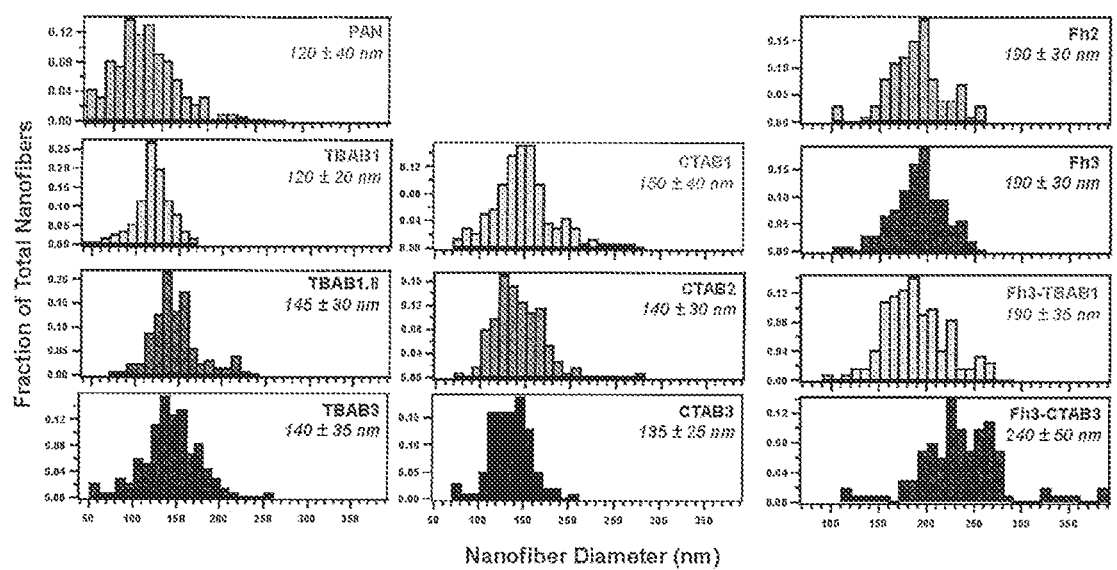
FIG. 39 are histograms of nanofiber diameter for PAN, binary PAN-QAS and PAN-Fh, and ternary PAN-Fh-QAS composites. Nanofiber diameters (average and standard deviation of n≥100 nanofibers) are provided. Inclusion of CTAB or TBAB did not yield statistically different nanofiber diameters relative to unmodified PAN. With the inclusion of Fh nanoparticles, average nanofiber diameter increased slightly relative to the PAN only material, shifting to 190 (±30) nm for both Fh2 and Fh3. For ternary polymer, surfactant, and Fh systems, Fh3-TBAB1 composites exhibited no significant difference relative to the Fh3 material. Fh3-CTAB3 materials yielded larger nanofiber diameters relative to either Fh-only or CTAB-only materials, likely due to an increase in overall precursor solution viscosity.
Figure 40:
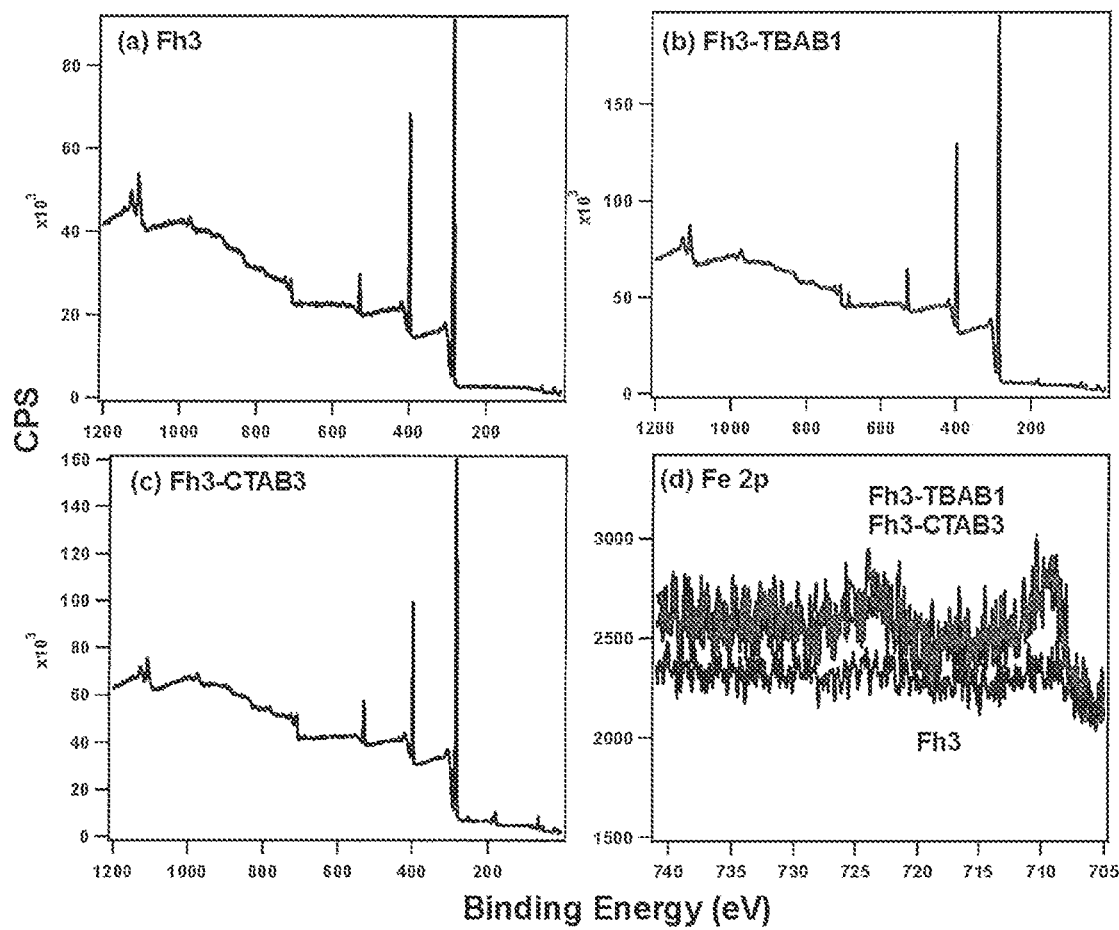
FIGS. 40A-40D are XPS survey scans for (a) Fh3, (b) Fh3-TBAB1, and (c) Fh3 CTAB3 composites, with (d) representative XPS core scans in the Fe 2p region. Triplicate Fe 2p core scans taken at different points on the same nanofiber composite. Fh3-TBAB1 and Fh3-CTAB3 were consistent across replicates. Less uniform surface Fe signals were observed across Fh3 replicates; however, two of three scans showed lower Fe concentrations relative to ternary composites, indicating a lower overall degree of surface-segregated Fh nanoparticles in the binary composite.

SEM images of PAN and PAN-QAS composites revealed smooth nanofiber surfaces (FIGS. 38A-38E), and the inclusion of either CTAB or TBAB had little to no influence on nanofiber diameter relative to unmodified PAN (FIG. 39). The inclusion of surfactants and/or salts at low concentrations is often used to improve electrospinning precursor conductivity, both to prevent bead formation and decrease average nanofiber diameter. However, due to the relatively high surfactant loading relative to PAN concentration (e.g., ~15-40% wt/wt), any positive effect on nanofiber diameter from increased sol gel conductivity was likely offset by an increase in sol gel viscosity, an effect that has been previously observed.

Materials containing Fh nanoparticles (with or without surfactant) had a uniform reddish-brown hue characteristic of iron oxides, suggesting a reasonably even distribution of Fh nanoparticles throughout the material (FIGS. 38A-38E). Nanofiber surfaces of Fh-composites appeared rough in SEM images, indicating the Fh nanoparticles were present as aggregates at or near the nanofiber surface (FIGS. 38A-38E). Notably, the Fh3 material (without surfactant) was challenging to fabricate due to clogging and spraying during electrospinning (only ~50% of attempts to fabricate this material were successful). However, materials containing both 3 wt % Fh and a surfactant posed no such fabrication challenges. Based on prior reports of the surfactant-assisted dispersion of nanomaterials in polymer matrices, we hypothesize that interactions between the surfactant and Fh nanoparticles in these composite materials (e.g., formation of surfactant mono- or bi-layers on the nanoparticle surfaces) improved Fh nanoparticle dispersion in the sol gel, thus minimizing clogging.

Surface Segregation of Iron Oxide Nanoparticles in Nanofiber Composites

Figure 41:
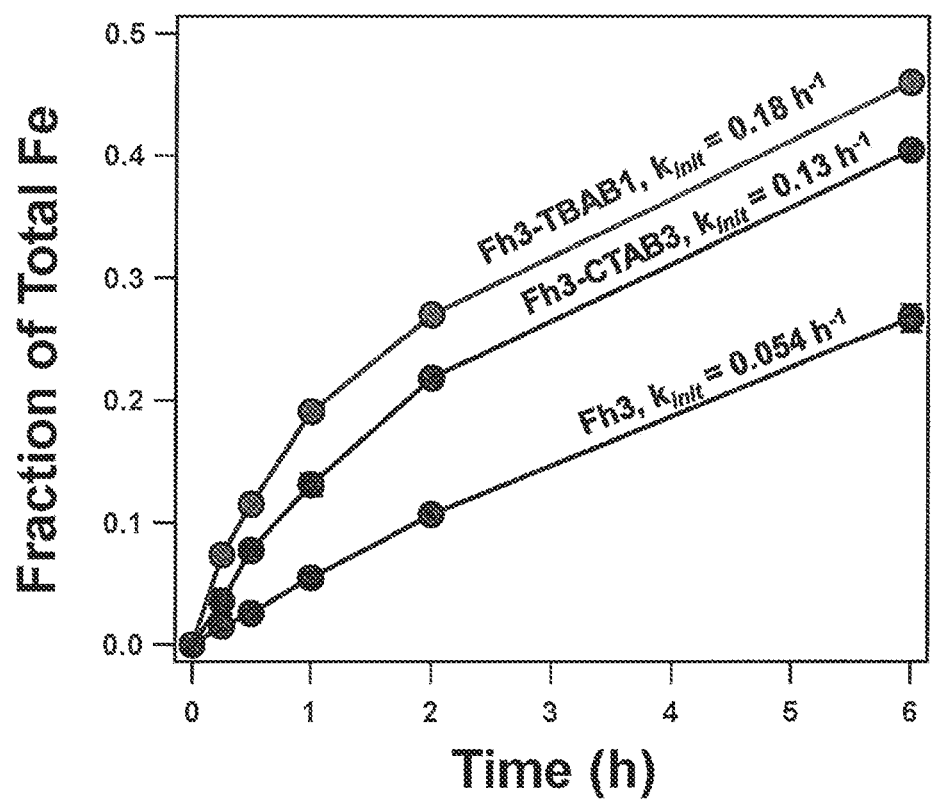
FIG. 41 are normalized iron dissolution as a function of time for Fh3 (red), Fh3-CTAB3 (blue), and Fh3-TBAB1 (green) composites. Initial dissolution rate constants (calculated over the first hour of dissolution) are provided. Conditions: 0.1 M H2SO4, 0.125 g/L composite loading.
Figure 42:
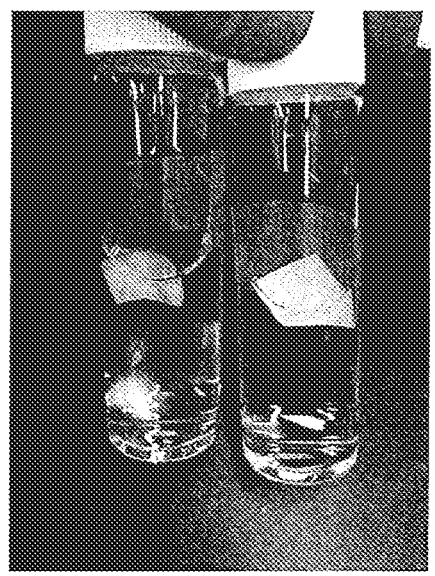
FIG. 42 are representative images of Fh3 (at left) and Fh3-CTAB3 (at right) composites after digestion in 5 M H2SO4 for 24 h with constant mixing (0.125 g/L composite loading), indicating greater total solution phase availability of the iron oxide in ternary composites

XPS was used to examine the surface chemical composition of nanofiber composites, and the possibility of surfactant-assisted enrichment of Fh at the nanofiber surface. While the concentration of surface Fe was often too small to provide a quantitative comparison from survey scans, XPS spectra in the Fe 2p region suggest a greater concentration of surface Fe for composites containing surface-segregating surfactants (i.e., Fh3-CTAB3 or Fh3-TBAB1) relative to materials without surfactants (i.e., Fh3; see FIGS. 40A-40D). Further evidence for surface-enrichment of Fh is provided by Fe dissolution rates during mat digestion in dilute acid (FIG. 41), which suggest improved solution phase accessibility of Fh upon QAS inclusion. Data are shown for Fh3-CTAB3, Fh3-TBAB1 and Fh3 composites, and are normalized to the total mass of iron in the materials (based on sol gel composition and iron content of Fh (assuming a chemical formula of Fe$_5$HO$_8$.4H$_2$O); see Table 3). Over the first hour of mixing in 0.1 M H$_2$SO$_4$, Fh3-CTAB3 and Fh3-TBAB1 composites exhibited initial iron dissolution rates 2.5- and 4-fold greater than that of Fh3, respectively. Further, after 24 h in 5 M H$_2$SO$_4$, Fh3 materials retained their characteristic reddish tint, indicating that some embedded Fh nanoparticles had limited or no solution-phase access (FIG. 42). In contrast, after 24 h in strong acid, both the Fh3-CTAB3 and Fh3-TBAB1 composites were white (the color of PAN; FIG. 42), implying near-complete Fh dissolution from the PAN-QAS-Fh composites.

Collectively, observations of increased surface Fe concentrations from XPS and enhanced rates of Fe dissolution are consistent with surface enrichment, and thus improved solution phase accessibility, of Fh nanoparticles in composites that included cationic surfactants. Given that the inclusion of surfactant did not increase the N$_2$ BET surface area of the composite (19 m$^2$/g for PAN vs. 19 m$^2$/g for Fh3 vs. 16 mg$^2$/g for Fh3-TBAB1), the improvement in Fh availability is not attributed to a possible difference in specific surface area between materials (e.g., some surfactants have been used as porogens during polymer nanofiber production). It is also tempting to attribute the enhanced Fh dissolution and surface concentration to improved Fh dispersion upon inclusion of the surfactant. However, there is no apparent difference in nanoparticle dispersion in cross-sectional TEM images of composites with and without surfactant, both of which reveal primarily aggregates of Fh within the nanofibers (FIGS. 43A-43D).

Instead, we propose that the surface enrichment of Fe in composites arises from a surfactant-assisted surface segregation phenomenon. During polymer electrospinning, some QAS surfactants are known to be surface segregating; they preferentially locate at the nanofiber surface to minimize the free energy of interactions between their hydrophobic tail and charged head within the polymer matrix. Although the mechanism is not clearly understood, we hypothesize that interactions between Fh nanoparticles and surface segregating QAS result in co-location of the iron oxides at the nanofiber surface, which ultimately should be beneficial to applications of the composite intending to use the Fh surface sites during application (e.g., metal sorption, herein).

Removal Capacities of Fh Nanoparticles and PAN-Fh Composites

The performance of unsupported Fh nanoparticles and of binary PAN composites containing Fh nanoparticles (2 or 3 wt %) were evaluated for removal of chromate and arsenate (FIGS. 44A-44D). Isotherms are shown normalized to the mass of the nanofiber mat in FIGS. 44A and 44B, whereas isotherms for Fh3 composites are normalized to the total Fh nanoparticle content in the mass (as g of Fh, based on the mass of Fh added to the electrospinning precursor) and compared to unsupported nanoparticles in FIGS. 44C and 44D. Isotherms for the majority of sorbent materials were best described via the Langmuir adsorption model $[C_{sorbed}=q_{max} \cdot K_L \cdot C_{aq}/(1+K_L \cdot C_{aq})]$, where $q_{max}$ is the maximum sorption capacity at equilibrium, and $K_L$ is the Langmuir adsorption constant. We note, however, that although the Langmuir model assumes complete reversibility, we observed near-complete irreversibility of uptake on composite sorbents. Thus, although model fits to Langmuir parameters are provided herein, isotherms represent "Langmuir-type" behavior, rather than true Langmuir adsorption. All model fits are compiled in Tables 4-6.

Generally, oxyanion uptake increased with Fh concentration. For example, the Fh3 composite, although challenging to fabricate due to clogging during electrospinning, exhibited higher capacity for both arsenate and chromate relative to the Fh2 material (see Table 4, Table 6, and FIGS. 44A and 44B). When normalized to the total Fh in the mat, the Fh3 composite exhibited uptake capacities of 24.1±0.9 mg As/g Fh and 16.9±0.9 mg Cr/g Fh. Notably, this removal approaches that measured for freely dispersed nanoparticles, which exhibited capacities of 31.3±1.2 mg As/g Fh and 19.1±1.8 mg Cr/g Fh (FIGS. 44C and 44D). Thus, at relatively high Fh mass loading, supported Fh nanoparticles are nearly as effective of a sorbent for metal oxyanions as freely dispersed nanoparticles, despite encapsulation within a polymer support network. Certainly, the process of Fh immobilization within the polymer nanofibers must consume available Fh surface area, but this loss must be comparable to the loss in reactive Fh surface area caused by nanoparticle aggregation in aqueous suspensions.

Removal Capacities of PAN-QAS Composites

Both unmodified PAN and binary PAN composites containing CTAB or TBAB were evaluated for removal of chromate and arsenate. Unmodified PAN exhibited no uptake of either arsenate or chromate, and arsenate capacity of PAN-QAS composites was limited (<1 mg/g). Thus, the effects of QAS inclusion on material performance were best evaluated in terms of chromate capacity (FIGS. 45A-45B). Data in FIGS. 45A-45B are shown for both unrinsed (open symbols, dashed lines) and rinsed (filled symbols, solid lines) materials, to evaluate QAS retention within the polymer matrix.

For unrinsed materials, we generally observed increasing chromate uptake with increasing QAS loading. Assuming surface segregation of quaternary ammonium surfactants within the polymer matrix during electrospinning, the inclusion of higher surfactant concentrations in the electrospinning precursor yields a higher concentration of quaternary ammonium sites at the nanofiber surface. Thus, the improvement in uptake is most likely promoted by charge-charge interactions and/or ion exchange. To confirm an ion exchange mechanism for chromate uptake, we examined bromide release from rinsed TBAB1 mats used as chromate sorbents or as chromate-free controls under identical mixing conditions. Negligible bromide release was observed for the control, while bromide release was observed concurrent with chromate uptake (albeit at a molar ratio of ~1:3 relative to chromate removal) (FIGS. 46A-46B).

Several other trends in uptake by unrinsed materials were notable. First, CTAB1 and all TBAB composites follow the Langmuir adsorption isotherm model. In contrast, composites containing 2 or 3 wt % CTAB exhibited distinct uptake behavior best described by the Freundlich adsorption isotherm $[C_{sorbed}=K_f(C_{aq})^{1/n}]$, despite providing the same type of ion exchange site for uptake. We propose that when present at such high concentrations, the charged heads of the CTAB molecules may reside at a variety of distances from the nanofiber surface (e.g., the hydrocarbon tail is embedded within the polymer nanofiber at a range of extents), yielding uptake behavior that appears multi-site. Second, increases in surfactant loading above the intermediate concentrations used in this study (e.g., CTAB2 or TBAB1.8, which are equivalent on the basis of molar charge density of quaternary ammonium groups) generally did not yield further improvements in chromate uptake. For example, CTAB3 performance was comparable to that of CTAB2, and the capacity of TBAB3 was intermediate to that of TBAB1 and TBAB1.8. The CTAB concentration in all CTAB-containing sol gels exceeded the critical micelle concentration (CMC) for pure DMF (9 mM at 25° C.). However, the limited further improvement in availability of quaternary ammonium head groups at the nanofiber surfaces at CTAB loadings >2 wt % is likely indicative of reaching the concentration at which micelle/hemimicelle formation occurs in the distinct (and more complex) DMF-PAN mixture. While TBAB is not expected to form micelles due to its four tail structure, the change in behavior at higher TBAB loadings is likely also due to surfactant-polymer solution interactions. Disambiguation of these interactions requires a detailed, mechanistic study that is beyond the scope of the current work.

Another notable observation with practical implications for nanofiber application was that rinsing reduced binding capacity, consistent with release of loosely bound QAS (and thus binding sites) over time. An extensive rinsing procedure was employed to simulate exposure to continuous flow during application in a water treatment unit. After rinsing, the CTAB1 composite lost ~30% of its initial capacity, and uptake by rinsed CTAB2 and CTAB3 composites now followed the Langmuir model, with capacities comparable to that of CTAB1 (see Table 6). These losses can be attributed to poor retention of CTAB molecules and/or micelles that are minimally embedded/entangled in the polymer matrix.

In the case of PAN-TBAB composites, materials containing 1.8 and 3 wt % TBAB each lost >40% of their initial capacity after rinsing (see Table 4). Notably, performance of the TBAB1 material was distinct, exhibiting only ~10% loss in capacity after extensive rinsing (13.4±0.2 mg Cr/g unrinsed vs. 11.8±0.6 mg Cr/g rinsed). The bromide release studies discussed above, in which negligible bromide was observed in chromate-free controls, further support retention of TBAB in the matrix after rinsing. The improved retention of TBAB may be due to entanglement of the four butyl tails within the PAN matrix, with either neighboring TBAB molecules or the polymer. Entanglement of TBAB with the polymer is most likely because of the loss of TBAB observed at higher inclusion concentrations, where more interactions with neighboring TBAB molecules would be anticipated. This suggests an operational "capacity" of PAN for retention of TBAB molecules on the order of 1 wt %.

Removal Capacities of PAN-QAS-Fh Composites

Initial performance evaluations examined composites containing Fh and CTAB at equivalent loadings (e.g., Fh3-CTAB3), indicating that performance of such ternary materials is at least equivalent to the summed performance of their binary analogs for arsenate and chromate uptake (e.g., Fh3 and CTAB3 composites; FIGS. 47A-47B). Specifically, chromate uptake followed the material's CTAB loading, whereas arsenate uptake in these ternary composites scaled with their Fh loading. Uptake of chromate by Fh3-CTAB3 was comparable to that of CTAB3 (Table 5). Consistent with loss of loosely bound CTAB observed in binary composites, uptake of chromate decreased after rinsing to a final Langmuir-model capacity of 5.7±0.3 mg Cr/g, indicating that chromate is again primarily removed via ion exchange at quaternary ammonium sites in these ternary materials (FIG. 47A). Notably, performance toward arsenate was not simply additive, with Fh3-CTAB3 exhibiting a higher capacity for arsenate uptake (11.8±0.4 mg As/g from Langmuir-type isotherm model fit) than would be expected from the sum of Fh3 (7.7±0.1 mg As/g) and CTAB3 (<1 mg As/g). We attribute the greater arsenate uptake in these ternary systems to the influence of positively charged quaternary ammonium groups on the surface charge of the embedded Fh, making the Fh surface more electrostatically favorable for arsenate uptake at circumneutral pH. Notably, loss of CTAB with extensive rinsing (and thus the positive influence of adjacent quaternary ammonium groups) reduced the arsenate capacity to 8.4±0.2 mg As/g, on par with the Fh3 composite (FIG. 47B).

Further evaluation of ternary PAN-QAS-Fh composites focused on materials containing 1 wt % TBAB, based on the sustained performance of TBAB1 after washing. As with CTAB, performance of TBAB ternary composites for chromate and arsenate uptake was predicted by the performance of its binary analogs (FIGS. 48A-48C). Chromate uptake on Fh3-TBAB1 composites was comparable to that of TBAB1, with capacity largely unaffected by rinsing (FIG. 48A and Table 5). In bromide release experiments identical to those performed with the TBAB1 material (see FIGS. 43A-43D), an equivalent degree of bromide release occurred concurrent with chromate uptake on Fh3-TBAB1, confirming uptake via ion exchange at QAS sites. Further, negligible bromide release in chromate-free controls indicates that co-inclusion of Fh did not adversely affect TBAB retention.

In a similar evaluation of the Fh3-TBAB1 material for arsenate removal, Fh3-TBAB1 exhibited a capacity of 9.3±0.2 mg As/g (equivalent to 34.6±0.7 mg As/g Fh), and no loss in capacity was observed after rinsing (FIG. 48B). Thus, per mass of Fh, Fh3-TBAB1 not only outperformed the Fh3 composite, but exhibited arsenate uptake at least equal to that observed in an aqueous suspension of unsupported Fh nanoparticles (FIG. 48C). Importantly, bromide release was not measureable concurrent with arsenate removal, thereby implying that Fh nanoparticles are the primary sites in the composite for arsenate uptake, presumably via inner-sphere bidentate complexation, as proposed in the literature for Fh. Given the comparable specific surface areas of Fh3 and Fh3-TBAB1 materials, the improved arsenate removal by the ternary composite is primarily attributable to the positive influence of adjacent quaternary ammonium groups on the surface charge of Fh nanoparticles, analogous to the phenomenon observed for CTAB composites (see FIGS. 47A-47B). We note, however, that surface enrichment of Fh in Fh3-TBAB1, relative to the binary Fh3 material, may also contribute to the improved performance of the ternary composite (see FIG. 41).

pH Edge Experiments

The results of pH edge experiments further support the selective binding of chromate to quaternary ammonium sites and arsenate to Fh sites in ternary composites. FIGS. 49A-49B shows pH-dependent uptake of chromate and arsenate on ternary Fh3-TBAB1, while also providing sorption data on binary TBAB1 and a suspension of Fh nanoparticles for comparison. As expected for oxyanion uptake on an iron oxide, sorbed chromate concentrations decreased with increasing pH in suspensions of freely dispersed Fh nanoparticles. Relative to TBAB- and Fh-containing composites, unsupported Fh nanoparticles exhibited much higher sorbed chromate concentrations at low pH values, but chromate uptake was essentially equivalent to that observed with composites at higher pH (pH>7).

These pH edge results match expectations for chromate uptake being governed primarily by electrostatic interactions. At higher pH (i.e., above pH 7 or 8, the typical zero point of charge (zpc) of Fh), the Fh nanoparticle surface becomes increasingly anionic, thus limiting uptake of negatively charged chromate ions. In contrast, the charged quaternary ammonium head on TBAB remains positively charged across the entire range of pH values investigated. Thus, the similar pH dependence of Fh3-TBAB1 and TBAB1 further implicates the quaternary ammonium sites as being primarily responsible for chromate binding via a mechanism analogous to anion exchange. As the quaternary ammonium group is not affected by pH, the slight decrease in chromate uptake on Fh3-TBAB1 and TBAB1 composites at higher pH (relative to limited pH dependence below pH 7) can likely be attributed to the speciation of chromate. At pH values above the $pK_{a2}$ value (i.e., pH>6.5), $CrO_4^{2-}$ is the dominant species relative to $HCrO_4-$, and it has been suggested that $CrO_4^{2-}$ utilizes two quaternary ammonium sites for uptake, rather than one, thereby limiting the total number of exchange sites available at higher pH.

For arsenate uptake, Fh3-TBAB1 and the freely dispersed Fh nanoparticles exhibited nearly identical pH dependent performance, with sorbed arsenate concentrations decreasing linearly with increasing pH as the Fh nanoparticle surface becomes more anionic. This is yet another piece of evidence that the embedded Fh nanoparticles are the primary sites for arsenate removal by the composite. We note that the polymer composite slightly, but reproducibly, outperforms the Fh nanoparticles at pH 8 and 9. As noted previously, the positive charge of the adjacent quaternary ammonium groups likely makes the Fh surfaces more electrostatically favorable for arsenate uptake, particularly at pH values above the zpc.

Influence of Co-Solutes on Oxyanion Uptake

Figure 50:
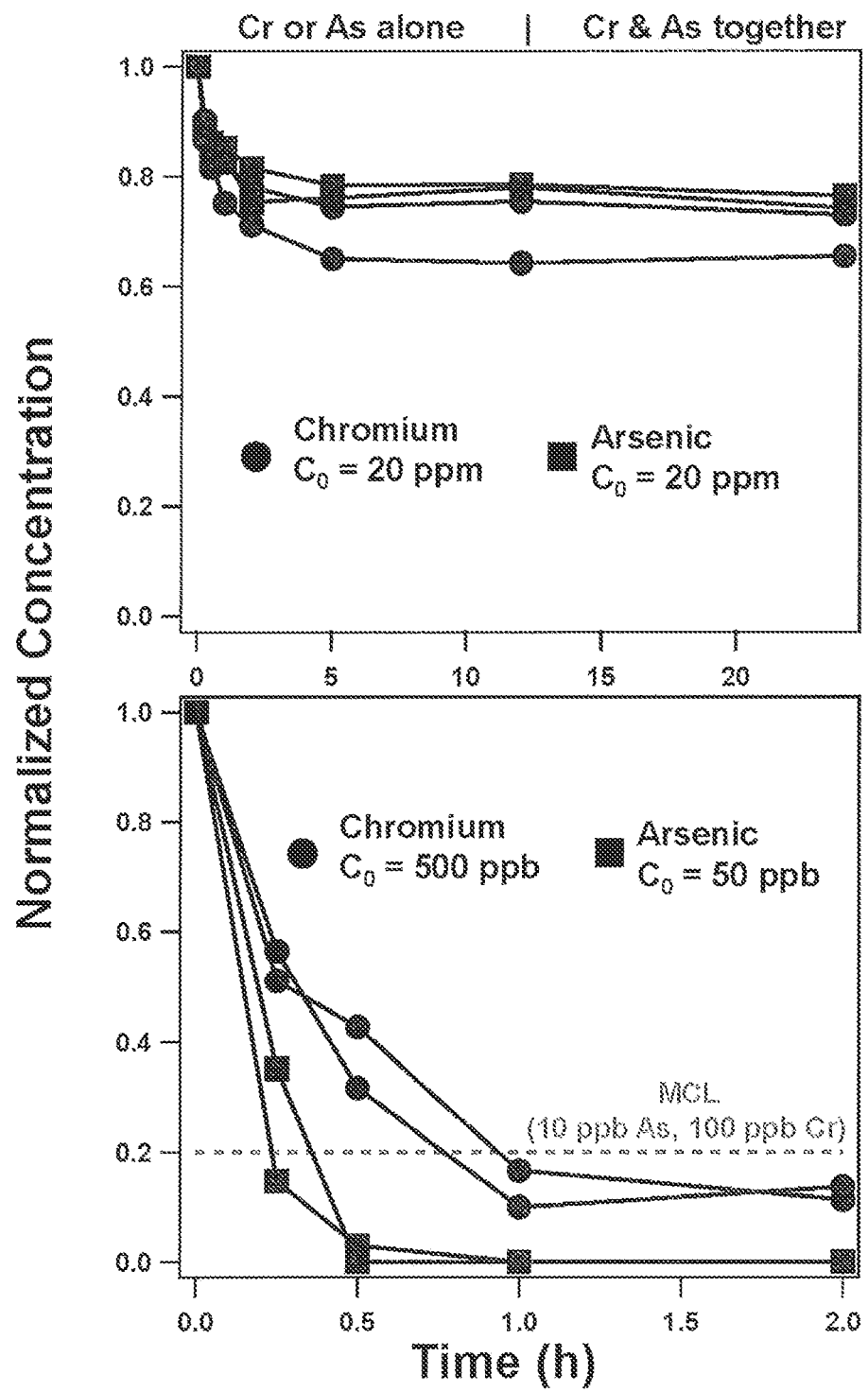
FIGS. 50A-50B illustrate rate of arsenate and chromate uptake by Fh3-TBAB1, shown as normalized concentration change over time, for (a) excess initial concentrations (20 mg As or Cr/L) and (b) environmentally relevant concentrations (500 µg/L Cr and 50 µg/L As). Data shown in blue are for removal of an individual contaminant; data in red are for simultaneous removal of arsenate and chromate.
Figure 51:
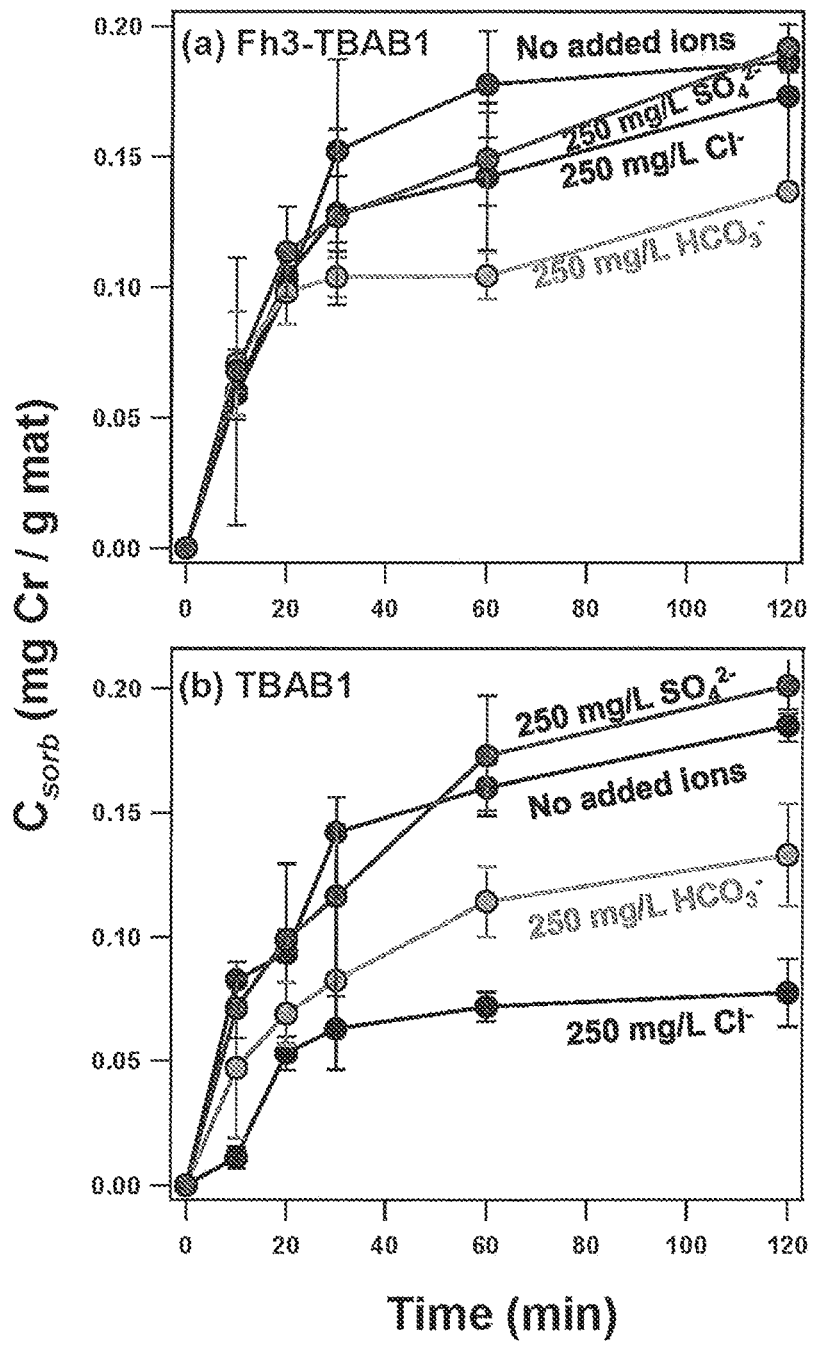
FIGS. 51A-51B illustrate rates of chromate uptake by (a) Fh3-TBAB1 and (b) TBAB1 composites, showing the effect of various ionic co-solutes ($SO_4^{2-}$, $Cl^-$, or $HCO_3^-$), present at high concentrations (250 mg/L). Overall, less inhibition was observed for Fh3-TBAB1 relative to TBAB1, indicating that the iron oxide dampens the inhibitory effect of ionic strength. Further, material application in a semi-batch/semi-continuous flow reactor (i.e., utilizing recirculation of flow) could help to avoid matrix interferences in application of the hybrid composite for chromate removal. Conditions: initial concentration 100 µg/L Cr, 0.5 g/L composite loading, 10 mM HEPES buffer at pH 7.
Figure 52:
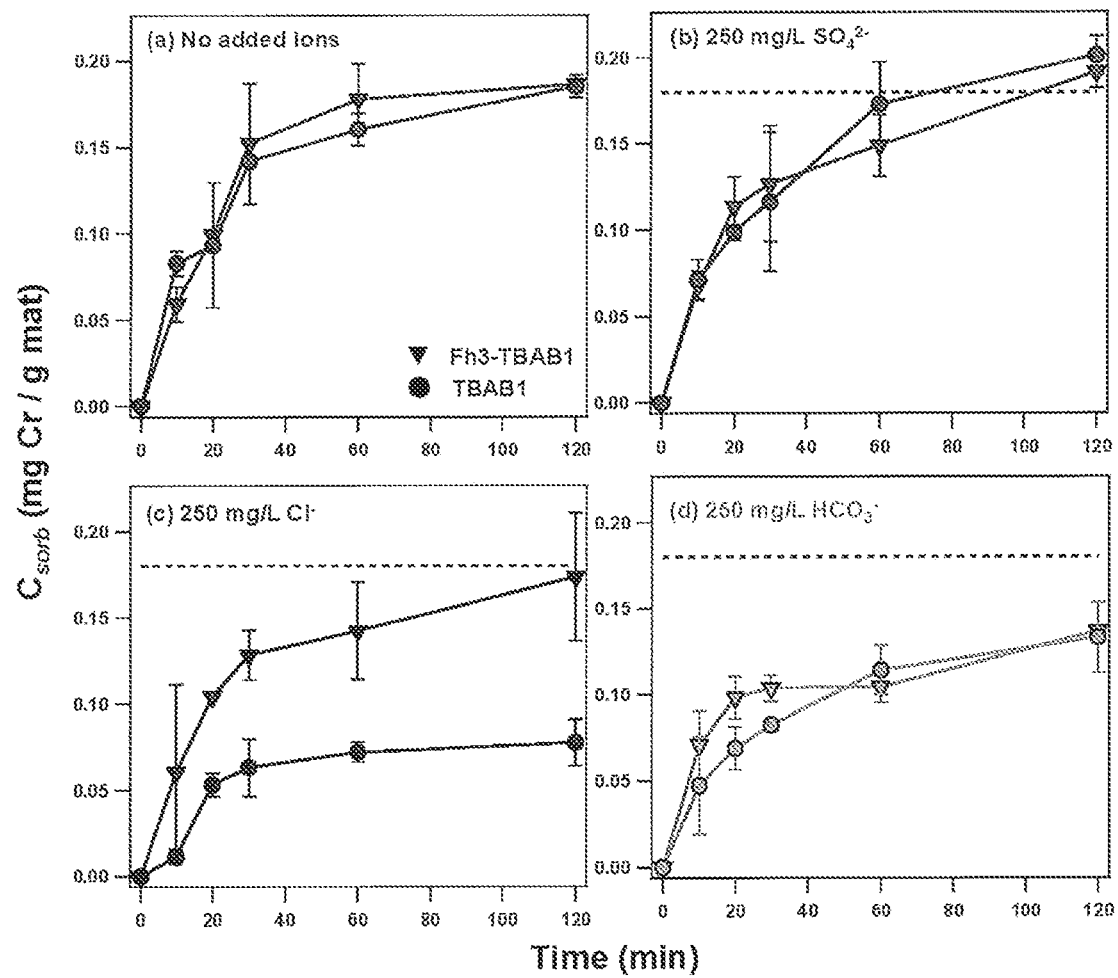
FIGS. 52A-52D illustrate data from FIGS. 50A-50B for the rate of chromate uptake by Fh3-TBAB1 (triangle symbols) and TBAB1 (circle symbols), separated by (a) no added ions, (b) 250 mg/L $SO_4^{2-}$, (c) 250 mg/L $Cl^-$, and (d) $HCO_3^-$. Conditions: initial concentration 100 µg/L Cr, 0.5 g/L composite loading, 10 mM HEPES buffer at pH 7.

The potential for competitive inhibition between arsenate and chromate in dual-target systems (i.e., simultaneous uptake) was examined. Time-dependent uptake experiments were conducted with Fh3-TBAB1 composite at both excess (e.g., 20 mg/L Cr and As) and environmentally relevant oxyanion concentrations (e.g., 5 times the MCL for each target, or 500 µg/L Cr and 50 µg/L As; FIGS. 50A-50B). At high concentrations, removal of chromate in the presence of arsenate was slightly inhibited, indicating that saturation of available Fh sites with arsenate may block accessibility of quaternary ammonium sites for chromate uptake (FIG. 50A). However, this effect was not observed at lower concentrations, where arsenate and chromate were reduced below their respective MCLs (100 µg/L Cr, 10 µg/L As) within 1 h in both single- and multi-target systems (FIG. 50B). Thus, under conditions most representative of point-of-use application (i.e., low oxyanion concentration and relatively short contact times), the specific binding sites for arsenate and chromate work independently of and do not adversely influence one another, highlighting their potential as multi-target sorbents.

As a final practical consideration, batch studies with chromate were also performed in the presence of competitive ionic co-solutes (e.g., chloride, sulfate, bicarbonate) at relatively high concentrations (250 mg/L) to assess their impact on the ion exchange capacity of TBAB-based composites (FIGS. 51A-51B and FIGS. 52A-52D). These studies were conducted at 100 µg/L Cr, a relevant level for drinking water. Sulfate had a negligible effect on performance, while bicarbonate inhibited maximum uptake by ~25% for both composites. In contrast, chloride had a significantly stronger inhibitory effect on the TBAB1 composite (~60% loss in capacity) relative to the Fh3-TBAB1 material, for which its influence is largely negligible. Further, we note that the degree of inhibition for the Fh3-TBAB1 composite was time dependent, as no influence of counter-ion competition was observed during the first 30 minutes. Thus, while both chloride and bicarbonate inhibit chromate removal via ion exchange on TBAB1, the inclusion of the Fh nanoparticles in Fh3-TBAB1 seems to dampen this effect, although the nature of this phenomenon is not well understood.

Performance During Simulated Point-of-Use Filtration Application

Figure 53:
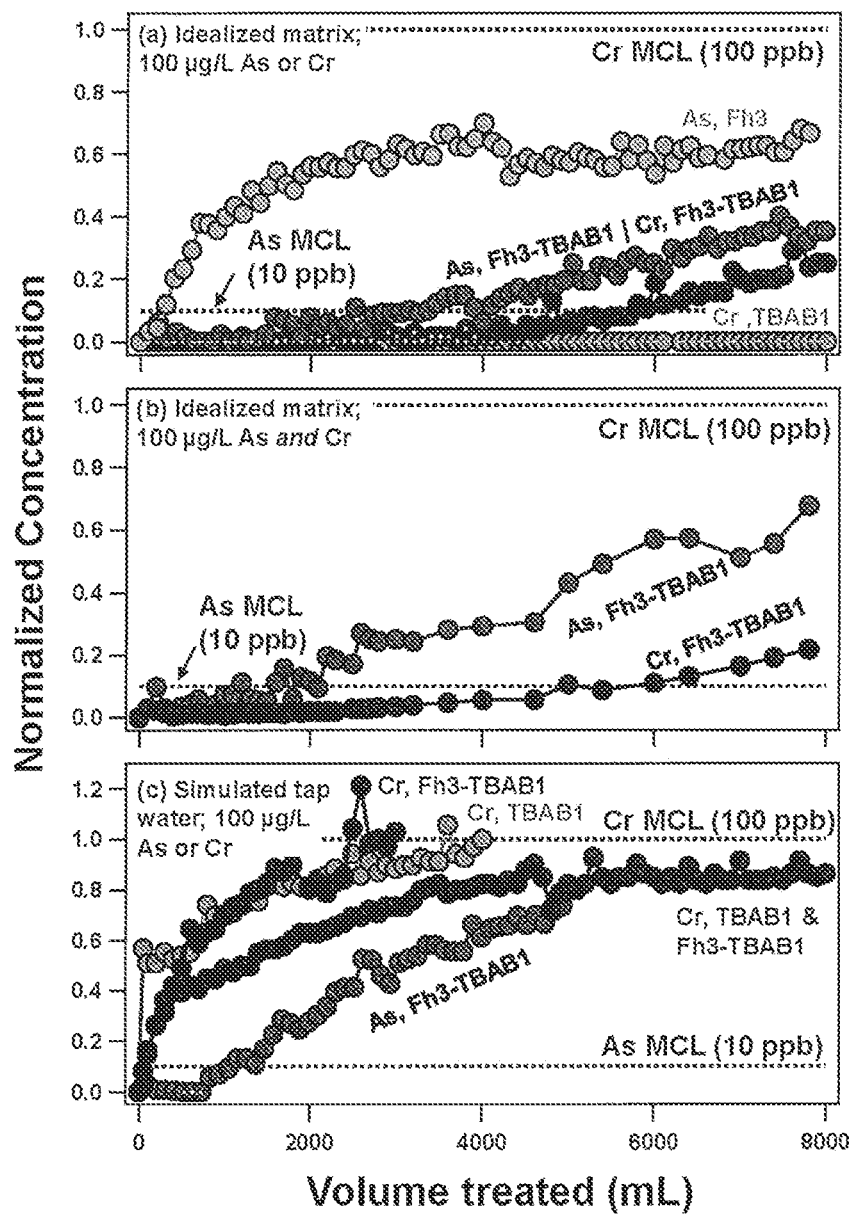
FIGS. 53A-53C are breakthrough curves from flow-through studies using a ~175 mg filter layers, unless otherwise noted, in a 47-mm dead-end filter unit (active area 40-mm, corresponding to 12.6 cm2), with 100 µg/L As or Cr influent concentrations. Matrices are either (a, b) idealized (DI water adjusted to pH ~7) or (c) intended to simulate tap water (70 mg/L $Cl^-$, 100 mg/L $HCO_3^-$, and 120 mg/L $SO_4^{2-}$; pH 7.2) Breakthrough performance is shown for (a) single-contaminant treatment systems in an idealized matrix on Fh3-TBAB1 and corresponding binary composites, (b) simultaneous removal of arsenate and chromate in an idealized matrix on Fh3-TBAB1, and (c) chromate removal in simulated tap water on TBAB1 and Fh3-TBAB1 filters (individually and in combination), and arsenate removal in simulated tap water on Fh3-TBAB1. White dots within symbols indicate samples with concentrations below detection limits (<5 ppb Cr or As). EPA maximum contaminant levels (MCLs) are provided as dashed lines (100 µg/L Cr and 10 µg/L As).
Figure 54:
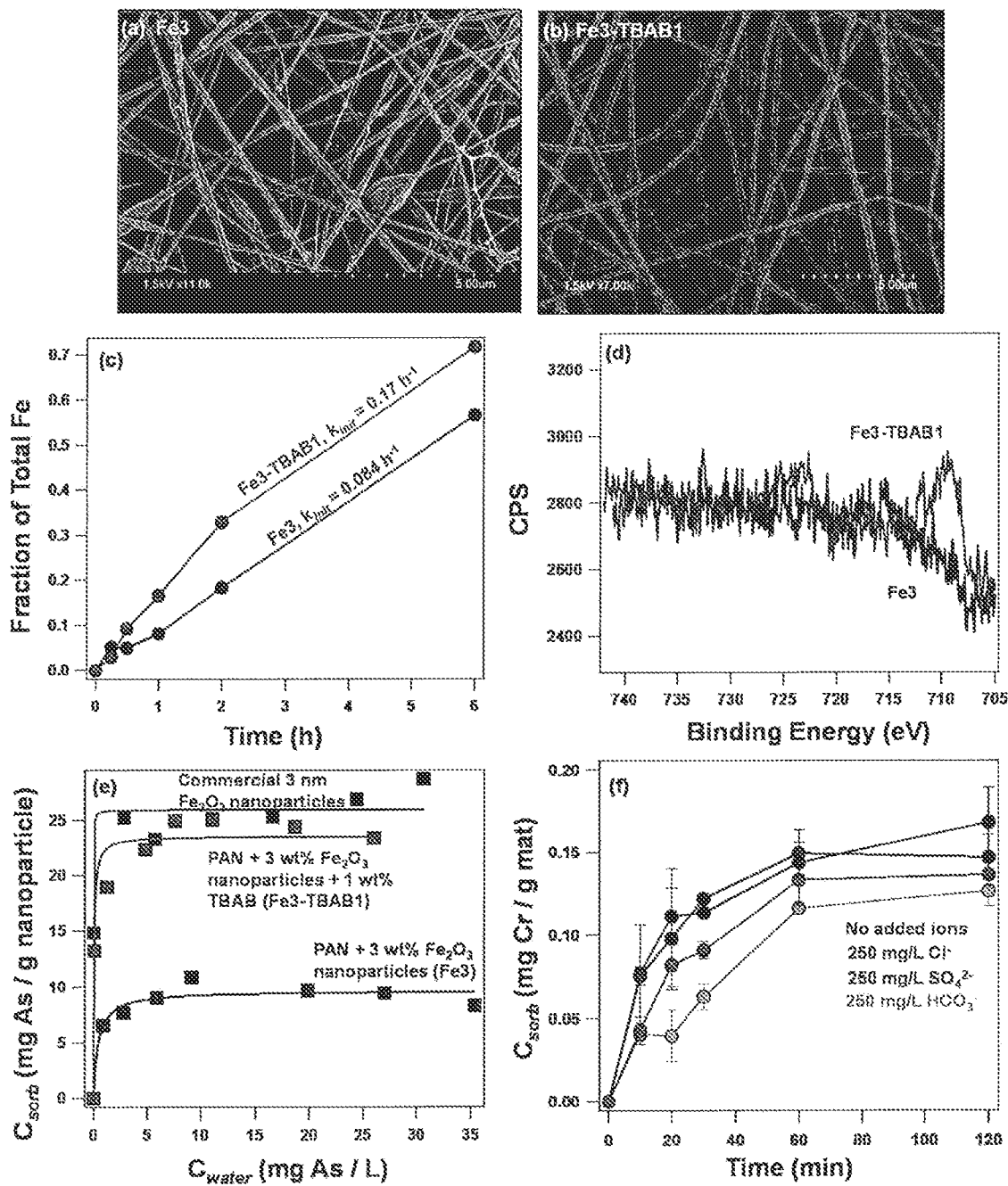
FIGS. 54A-54F illustrate extension of material fabrication to a ternary composite containing a commercial amorphous, ~3 nm, $Fe_2O_3$ nanoparticle (abbreviated "Fe" nanoparticles; Alfa Aesar). Representative SEM images of (a) binary Fe3 and (b) ternary Fe3-TBAB1 composites, showing improved nanofiber uniformity with inclusion of TBAB. Nanoparticles are clearly visible at the nanofiber surfaces as surface roughness. (c) Digestion of composites in dilute acid (0.1 M $H_2SO_4$, 0.125 g/L mat mass loading) again revealed a faster rate of Fe dissolution (normalized to total Fe content) for the ternary Fe3-TBAB1 relative to the binary Fe3. Values for initial rate of Fe release (over the first 2 h of dissolution) are provided. (d) Core Fe 2p XPS spectra, showing enhancement of surface iron due to surfactant inclusion in ternary composite. (e) Sorption isotherms for arsenate uptake by Fe3-TBAB1 and Fe3, normalized to nanoparticle content, and shown relative to capacity of dispersed $Fe_2O_3$ nanoparticles. Lines represent model fits to the Langmuir isotherm model. Inclusion of TBAB improves capacity significantly relative to Fe3, with the nanoparticle-normalized capacity of Fe3-TBAB1 nearly comparable to that of dispersed nanoparticles. (f) Effect of ionic co-solutes ($SO_4^{2-}$, $Cl^-$, or $HCO_3^-$), present at high concentrations (250 mg/L), on chromate uptake (initial concentration 100 µg/L Cr; 10 mM HEPES, pH 7). As for the Fh3-TBAB1 composite, the iron oxide served to dampen the inhibitory effects of ionic strength, and application in a semi-batch/semicontinuous flow reactor could help to minimize matrix effects during application.

The performance of Fh3-TBAB1 (and its binary analogs) during simulated POU treatment was assessed in a dead-end flow-through system at a flux of ~950 LMH (FIGS. 53A-53B). Fh3-TBAB1 filters typically had a mass of ~175 mg within the active area (12.6 cm²). Performance was first evaluated for the removal of a single target [e.g., chromate (100 µg Cr/L) or arsenate (100 µg As/L)] from an idealized influent matrix (e.g., deionized water adjusted to pH 7) to assess performance in the absence of possible interfering co-solutes. Results are shown in FIG. 53A.

For Fh3-TBAB1 filters in these idealized systems, less than 10% breakthrough (i.e., effluent concentration below 10 ppb, which is the EPA MCL for arsenic and the California MCL for hexavalent chromium) was observed for the first 2.5 and 5.5 L of arsenate- and chromate-containing influent, respectively. For both chromate- and arsenate-containing influents, <50% breakthrough (i.e., effluent concentration <50 ppb) was observed for the entire 8 L of influent treated, after which only ~50% of the maximum capacity of the material (based on isotherm data presented above) was saturated.

For comparison, the TBAB1 composite outperformed the Fh3-TBAB1 material for chromate removal in the idealized system, achieving <10% breakthrough for the entire 8 L. Thus, in kinetically constrained (i.e., short contact time) systems, Fh nanoparticles in ternary composites may block access to a portion of the quaternary ammonium sites, thereby hindering performance. In contrast, considerably poorer performance was observed with the Fh3 material for As removal; 10% arsenate breakthrough occurred within 0.2 L and 50% breakthrough occurred after treatment of 1.5 L of arsenate-containing influent. The disparity in performance is greater than might be anticipated from isotherms developed in equilibrium batch systems (see FIGS. 48A-48C), indicating that the influence of both favorable electrostatic interactions imparted by adjacent quaternary ammonium groups and the TBAB-assisted surface-enrichment of Fh nanoparticles is more significant in promoting As uptake under kinetically limited conditions.

To evaluate the influence of competition between chromate and arsenate in a dynamic flow-through system, an identical experiment was performed for treatment of an influent containing both chromate and arsenate (100 µg Cr/L and 100 µg As/L) with Fh3-TBAB1 filters. Results are shown in FIG. 53B, and are nearly comparable to performance for removal of individual contaminants. Chromate breakthrough performance appeared unaffected by the presence of arsenate, while effluent arsenate concentrations >10 ppb were observed after ~1.5 L (approximately 1 L sooner than in the single-target system). This observation is notable, as it is opposite to what we observed in batch competition experiments (i.e., arsenate inhibited chromate in dual-target systems at high concentration; see FIGS. 50A-50B). We suspect that saturation of quaternary ammonium sites with chromate limited their ability to favorably influence the surface charge of adjacent Fh nanoparticles, thus inhibiting arsenate removal in the kinetically constrained flow-through system.

More representative of POU application, we also evaluated oxyanion removal in a matrix of simulated tap water (100 mg/L $HCO_3^-$, 120 mg/L $H_2SO_4^{2-}$, and 70 mg/L $Cl^-$; pH 7.2) containing chromate or arsenate (100 µg/L Cr or As). Results are shown in FIG. 53C. Arsenate breakthrough above the MCL nearly resembled that observed in the idealized matrix experiment with simultaneous chromate removal (FIG. 44B), although chloride, sulfate, and bicarbonate ions were present at several orders of magnitude higher concentration. These counter ions must also be able to offset the positive influence of adjacent quaternary ammonium sites on Fh surface sites for arsenate. Nevertheless, this relatively modest inhibitory effect at such high counter ion concentrations illustrates the promise of this composite for arsenate removal from drinking water. For example, this level of arsenate removal was achieved with ~175 mg of material, indicating that over 5.5 L of tap water containing 100 µg As/L could be treated to a level below the MCL with only 1 g of composite under these flow conditions (or, assuming an average individual drinks 2 L/day, ~130 g (~¼ lb) of material would be required to meet their annual drinking water treatment need).

Significantly earlier chromate breakthrough was observed in the presence of interfering ionic co-solutes, which must significantly outcompete chromate for quaternary ammonium anion exchange sites over the short contact-time in the flow through system. Notably, in the presence of ionic co-solutes, the Fh3-TBAB1 filter outperformed the TBAB1 filter during treatment of the first 0.5 L of chromate-containing influent (FIG. 53C). Thus, as observed in batch studies, the inclusion of Fh in the composite serves to dampen the inhibitory effect of ionic co-solutes on chromate removal. However, only ~5% of the theoretical maximum capacity for chromate uptake was utilized over the 3 L of simulated tap water passed through the system, indicating the much stronger preference of quaternary ammonium sites for the non-target counter ions in the matrix. This is again in contrast to outcomes of batch studies, which indicated little to no inhibition of chromate uptake by non-target co-solutes over the first 20 minutes of contact time. This difference is likely attributable to higher material selectivity for the non-target ions at the extremely limited contact times available in flow-through. Indeed, after complete breakthrough of chromate was observed at ~1 L, chromate underwent partial chromatographic elution (i.e., effluent concentration became higher than influent concentration). This effect has been previously observed for AX resins which exhibit a higher selectivity for anions other than the target of interest as the counter ions displace the previously bound chromate.

To improve composite performance for chromate removal in complex matrices, we evaluated the inclusion of an additional ~175 mg TBAB1 protective layer in the flow-through system (FIG. 53C). Notably, with the inclusion of a TBAB1 "pre-filter" ahead of the Fh3-TBAB1 filter, the dual-layer filter was able to better sustain chromate removal, with effluent concentrations <50 ppb for 1 L, and <100 ppb for the entire 8 L treated. We note that the chromate concentration in initial effluent volumes (<0.5 L) were not affected by inclusion of the additional pre-filter layer, perhaps suggesting that the most reactive (i.e., least kinetically limited) sites for chromate uptake are saturated by counter ions in both systems. Further, we note that initial efforts to regenerate filters after chromate sorption (using dilute base or concentrated salt solutions) achieved <50% recovery of sorbed chromate, such that these are currently best applied as single-use filters. However, we believe these data provide a valuable proof-of-concept in which different nanofiber filters can be layered sequentially to tailor treatment to the quality of the source water.

As a mechanically stable, high capacity material, the functionalized polymer-iron oxide nanocomposite fabricated herein via electrospinning represents a significant practical advance in the deployment of nanomaterials for POU drinking water treatment. The polymer was functionalized with surface-active quaternary ammonium sites via inclusion of the surfactant TBAB. Excellent retention of TBAB within the polymer matrix was observed upon extensive rinsing of the optimized composite (TBAB1), indicating the stability of the composite material during application in a dynamic treatment system. The simple, "single-pot" synthesis method and the highly scalable, nanoscale ion exchange resin produced are advantageous relative to the material processing and/or diffusion limitations encountered with traditional, microporous ion exchange resins and microscale ion exchange fibers.

Building on both our development of a nanoscale ion exchange material, and the work of others in developing supported iron oxide nanoparticle composites, a dual-site composite was fabricated with both surface-active quaternary ammonium sites for ion exchange and embedded Fh nanoparticles as sorbents. Relative to composites containing only the embedded Fh nanoparticles, the dual-site composite exhibited enhanced arsenate uptake due to both the positive influence of adjacent quaternary ammonium groups on the surface charge of Fh nanoparticles and the surfactant-driven surface segregation of Fh nanoparticles. Further, with inclusion of the surfactant, Fh nanoparticles embedded in the composite matrix exhibited capacities comparable to that of the unsupported (e.g., freely dispersed) nanoparticles. Notably, the benefits of surfactant inclusion were more pronounced in kinetically limited flow-through systems, relative to observations in equilibrium batch systems, underscoring the importance of both favorable electrostatics and Fh nanoparticle accessibility at short contact times.

The disclosure herein regarding the benefits of ternary polymer-nanoparticle-surfactant composites are generalizable, based on experimental work with a commercial iron oxide nanoparticle. The inclusion of TBAB with commercial iron oxide nanoparticles again served to enhance solution phase accessibility and surface concentration of iron oxide nanoparticles and improve composite arsenate uptake capacity, relative to a composite fabricated without surfactant, as well as to dampen the inhibitory effect of interfering counter-ions on chromate removal (see FIGS. 54A-54F). Given the well-recognized practical challenges associated with application of unsupported nanoparticles in flow-through systems, this is a substantial advance towards achieving the critical overlap of effective nanoparticle immobilization and effective utilization of nanoparticle reactivity that is necessary for viable nanoparticle deployment in POU drinking water treatment. Thus, for example, the polymer-nanoparticle-surfactant can interact with components of such ternary systems to optimize materials, and explore the extension of this composite platform to other nanoparticle inclusions (e.g., alumina nanoparticles for fluoride removal, silver nanoparticles for antimicrobial applications).

From a practical perspective, iron oxide sites and ion exchange sites in the composite material were selective for arsenate and chromate removal, respectively, in an idealized matrix. Additionally, composite performance for arsenate removal in simulated tap water holds the potential to provide a year's supply of drinking water for an individual with only ~130 g of material (assuming an influent contaminated with 100 µg As/L). For chromate removal, which was more susceptible to interfering counter-ions, we contend that two key results herein provide direction for improving ternary composites for POU drinking water treatment. First, we observed limited inhibition of chromate removal on the ternary Fh3-TBAB1 composite by ionic co-solutes in a batch system, particularly at shorter time-scales before equilibrium was established. We believe these results highlight the potential for composite application for ion exchange in a semi-batch/semi-continuous flow reactor, which is commonly used for ion exchange systems to minimize matrix interferences. Second, via the inclusion of a TBAB1 "pre-filter" to improve performance, we demonstrated the ease of assembly for multi-layer filters that can be tailored to address water quality challenges associated with specific water sources. This highlights the benefits of electrospinning, which represents an industrially viable platform for the fabrication of modular filter units that can be layered in a sequence best suited for optimal performance.

Porous Electrospun Polymer Nanofibers with Surface-Active Iron Oxide Nanoparticles: Composite Filtration Materials for Removal of Metal Cations An electrospun polymer nanofiber composite filter with surface-active iron oxide nanoparticles for removal of cationic heavy metal contamination (lead, copper, cadmium) during water treatment is disclosed. This was accomplished via a single-pot synthesis integrating both commercially available, ~3 nm amorphous iron oxide nanoparticles and a sulfonate surfactant, sodium dodecyl sulfate (SDS), into the electrospinning precursor solution. Characterization results suggested that SDS acts both as a removable porogen (i.e., enhancing composite surface area from $N_2$ BET measurements) and as a surface-segregating agent for iron oxide nanoparticles (i.e., promoting enrichment of iron oxide nanoparticles at nanofiber surfaces as measured by X-ray photoelectron spectroscopy). Copper, lead, and cadmium removal performance was then evaluated for composites containing iron oxide nanoparticles and/or SDS via kinetic, isotherm, and pH-edge sorption experiments, with performance comparisons to unmodified nanofibers and freely dispersed iron oxide nanoparticles. Experiments revealed synergistic performance in materials containing both SDS and iron oxide nanoparticles arising from the ability of SDS to increase composite surface area and concentrate iron oxide nanoparticles at the composite surface. The optimized composite (polyacrylonitrile 7 wt %, iron oxide nanoparticles 2 wt %, SDS 1 wt %) was mechanically robust, and exhibited not only sorption capacity that exceeded all other composites, but also nanoparticle reactivity comparable to that observed for unsupported nanoparticles (i.e., a nanoparticle suspension). The optimized material was tested in a dead-end, flow-through filtration system for removal of lead at relevant concentrations (e.g., μg/L), where performance trends indicate that a minimal amount of material is needed to provide a single users' annual drinking water requirement (~10 g of composite to provide 2 L/day from tap water containing ~300 μg/L Pb), and that effective regeneration can be achieved with small volumes of dilute acid (~0.6 L of 0.1 N $HNO_3$ per gram of composite). This work demonstrates the potential of porogen-assisted fabrication of electrospun hybrid composites to allow practical deployment of nanoparticles within stand-alone reactive filtration devices.

Sorption-based technologies for treatment of heavy metal contamination are promising, based on their simplicity (e.g., limited maintenance requirement), potential for operation at near-ambient pressures, and effectiveness. In particular, nanoscale metal oxide sorbents (e.g. iron oxide, magnesium oxide, aluminum oxide) exhibit high sorption capacities for heavy metals (e.g., lead, copper, cadmium), and provide high external surface areas that overcome diffusion limitations of granular materials and allow application within small physical footprints. However, practical application of nanoscale metal oxides in flow-through systems is limited by high pressure drops and the potential for material release into the treated supply, which could pose human and ecosystem health threats.

For drinking water providers, lead, copper, and cadmium present an ongoing challenge in the United States due to their negative public health effects and their routine release into the finished water supply by corrosion of galvanized, brass, and lead distribution system components, despite corrosion control regulations. This is evidenced both by recent drinking water crises in municipal systems, such as Washington D.C. and Flint, Mich., as well as by studies revealing elevated lead levels in private drinking water systems across the United States. While point-of-use (POU) technologies are promising for protecting both municipal and decentralized users, reverse osmosis and cation exchange are currently the only EPA-approved compliance technologies for POU treatment of lead, copper, and cadmium. Thus, the development of simple, effective, and affordable sorption-based treatment technologies that also harness the potential of engineered nanomaterial sorbents could fill a crucial gap in POU treatment of heavy metal contamination and provide critical protection to public health.

Electrospinning has been disclosed in which can be implemented for a scalable method for immobilization of nanoparticles within a mechanically stable, high-flux nanofiber matrix. Further, electrospun composites, which often exhibit superior material strength relative to pure nanofibers of reactive inorganic phases (e.g., carbon or metal oxides), can be applied as reactive membranes that leverage their high external surface area to volume ratio. As such, electrospun materials are able to avoid the diffusion-limited rates of removal and necessary deployment in large packed beds associated with microporous granular composite supports and sorbents (e.g., sand, zeolite, polymer beads, cation exchange resins, and polymeric ultrafiltration membranes).

Existing electrospun metal oxide-polymer composite sorbents are typically fabricated either by "hierarchical" or "single-pot" approaches. Hierarchical composites are fabricated via post-electrospinning surface functionalization of a polymer support with metal oxide nanostructures, typically via reductive deposition or hydrothermal methods. While these composites tend to exhibit a high degree of surface-available reactive metal oxide sites for contaminant uptake, the multi-step fabrication procedure requires additional material inputs and processing time. Additional processing steps not only may be difficult to accurately reproduce during industrial scale fabrication, but may require additional energy inputs that limit sustainability. In contrast, single-pot composites eliminate such post-processing steps, as nano-scale metal oxides are simply incorporated into the electrospinning precursor solution. However, effective utilization of the metal oxide is often limited by its encapsulation within polymer nanofibers. Previously, we overcame this limitation by the inclusion of a quaternary ammonium surfactant (QAS). The surfactant imparted surface-active quaternary ammonium functionalities, facilitated electrospinning of sol gels containing iron oxide nanoparticles by preventing clogging and spraying during fabrication, and promoted surface-segregation of nanoparticles within polymer nanofibers. Notably, upon inclusion of the surfactant, iron oxide nanoparticles exhibited reactivity at levels comparable to that of freely dispersed nanoparticles.

Herein, building upon our prior work, we present a "single-pot" electrospun polyacrylonitrile (PAN) composite with surface-active iron oxide nanoparticles intended for removal of cationic heavy metal species (e.g., lead, copper, and cadmium). The active binding agent in this composite, a commercially available nanoscale amorphous iron oxide (3 nm $Fe_2O_3$; Alfa Aesar), was chosen for its small size, high surface area, and commercial availability. Composite nanofibers also contained an anionic surfactant, sodium dodecyl sulfate (SDS), which could enhance performance for heavy metal removal, as its charged head group is identical to that in common strong acid ion exchange resins used for removal of cationic heavy metal species. As an alternative benefit of SDS inclusion, Long et al. demonstrated its utility as a removal porogen to promote surface area in electrospun polymer composites. Lastly, prior reports indicate that amphiphilic molecules (e.g., surfactants) may surface segregate within electrospun polymer matrices, where surface segregation is defined as preferential movement to the nanofiber surface (e.g., to the polymer-air/water interface). Thus, interactions between SDS and iron oxide nanoparticles may not only help improve composite sol gel spinnability but may also promote surface-segregation (and thus solution accessibility) of iron oxide nanoparticles.

After assembly, we evaluated composite performance for lead, copper and cadmium removal in the context of material properties, especially across a range of nanoparticle and surfactant loading concentrations in the precursor solution. We assessed nanofiber morphology, composite surface area, and surface chemical composition to determine the role(s) of SDS as a removable porogen and possible promoter of nanoparticle surface-segregation. Then, we quantified batch uptake rates and material capacities for copper, lead, and cadmium as a function of nanoparticle and surfactant concentrations in the composite. Capacities were determined for both unrinsed materials (e.g., prior to SDS removal) and extensively rinsed materials (e.g., after SDS removal) to determine the role of SDS-derived porosity in promoting accessibility of nanoparticle sites for contaminant uptake. Notably, composite performance was benchmarked to two baselines. First, comparisons to the support material (e.g., unmodified PAN and SDS-modified PAN) established the contribution of the iron oxide nanoparticles to overall composite capacity. Second, comparisons to metal removal capacities observed in suspensions of iron oxide nanoparticles allowed evaluation and optimization of the "activity" of embedded nanoparticles (i.e., those within the composite) relative to unsupported nanoparticles.

Practical demonstrations included kinetic and pH-edge experiments, as well as performance testing for treatment of varied water qualities at heavy metal concentrations (e.g., µg/L) relevant to drinking water in a flow-through system. Collectively, we provide evidence that inclusion of SDS enhances composite surface area and promotes surface segregation of iron oxide nanoparticles. Importantly, we also demonstrate that the immobilized iron oxide nanoparticles exhibit no loss in reactivity for lead, copper, and cadmium removal, relative to their freely dispersed counterparts. This represents a key advance towards viable application of reactive nanoparticles in practical drinking water treatment units.

Materials and Methods
Reagents

All reagents were used as received. Electrospinning precursor solutions were prepared with polyacrylonitrile (PAN; MW 150,000, Aldrich), N,N-dimethylformamide (DMF; 99.85%, BDH Chemicals), sodium dodecyl sulfate (SDS; ≥99%, Aldrich), and amorphous iron oxide nanoparticles (~3 nm $Fe_2O_3$; Alfa Aesar). Stock solutions of copper chloride ($CuCl_2$-$2H_2O$; 97%, Aldrich), lead nitrate (Pb $(NO_3)_2$; ≥99%, Aldrich), or cadmium nitrate tetrahydrate ($Cd(NO_3)_2$.$4H_2O$; 98%, Aldrich) were prepared in deionized water (Thermo Scientific Barnstead NANOPure Diamond). Batch experiments were conducted in 10 mM HEPES buffer (≥99%, Aldrich), MES buffer (MES hydrate, ≥99.5%, Aldrich), or AMPSO buffer (≥99%, Aldrich) prepared with deionized water and pH-adjusted as needed with 5 N NaOH. Concentrated nitric acid ($HNO_3$; 70%, Sigma) was used for acidification of samples prior to metals analysis. Reagents for colorimetric determination of iron were prepared with hydroxylamine hydrochloride ($NH_2OH.HCl$; 98%, Aldrich), 1,10-phenanthroline (≥99%, Aldrich), ammonium acetate (≥98%, Aldrich), and glacial acetic acid (≥99.7%, Aldrich). Iron standards were prepared with ammonium iron sulfate hexahydrate (($NH_4)_2Fe(SO_4)_2$.$6H_2O$; 99%, Aldrich).

Electrospinning

Figure 55:
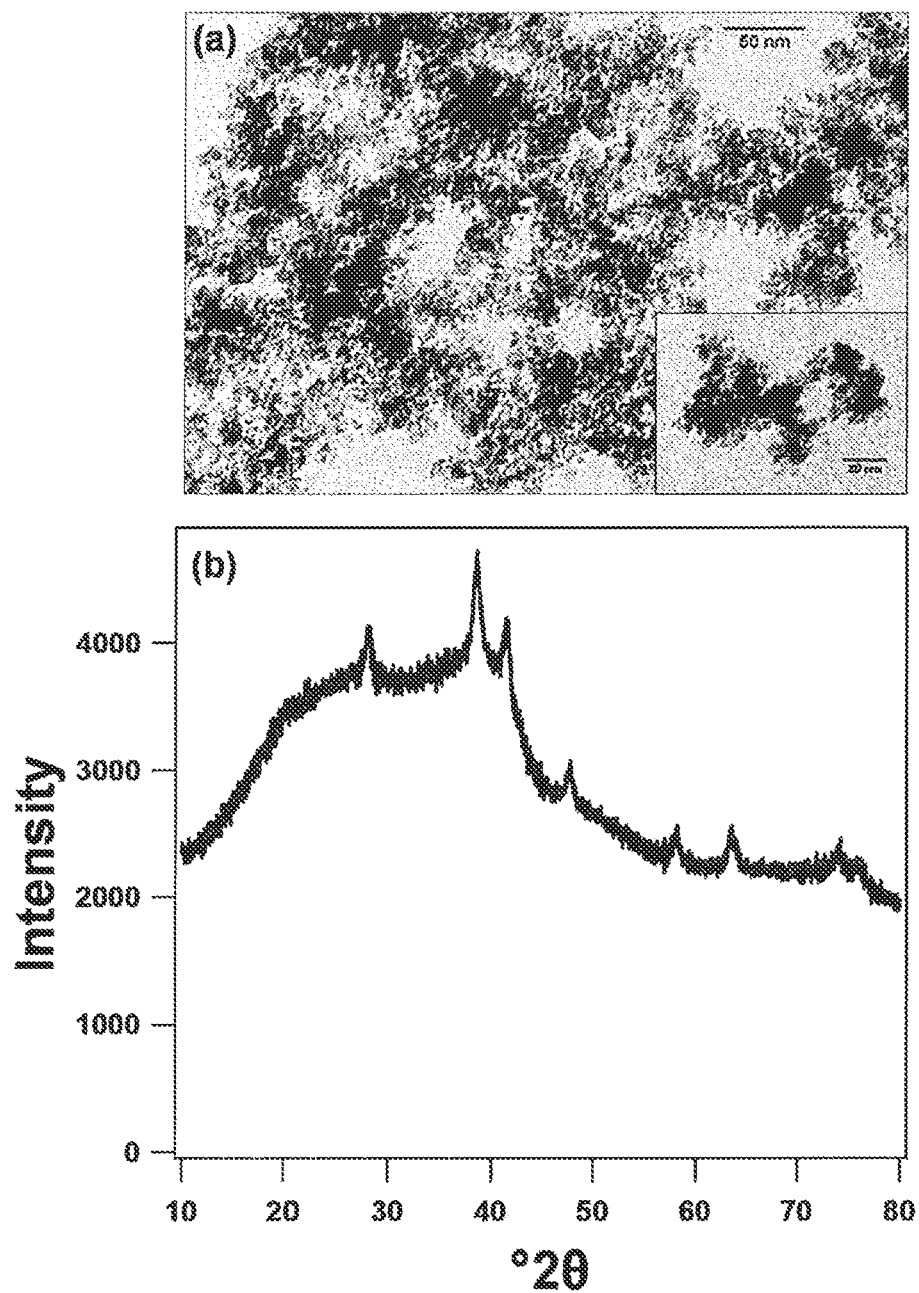
FIGS. 55A-55B are (a) HRTEM image and (b) XRD spectra of ~3 nm $Fe_2O_3$ nanoparticles (Alfa Aesar), which were used as received, showing that nanoparticles are uniformly sized and amorphous.

For mats containing PAN and a surfactant, PAN and SDS were dissolved in DMF at a concentration of 7 wt % PAN and 1-3 wt % surfactant by mixing at 60° C. for 2 h at 1.65 g (HLC Cooling-Thermomixer MKR 13, Ditabis). Amorphous $Fe_2O_3$ nanoparticles (~3 nm; abbreviated Fe np, hereafter) were purchased from Alfa Aesar, and were used as received (see FIGS. 55A-55B for characterization). For Fe np-embedded mats, Fe nps were first dispersed in DMF (at concentrations 0.1-3 wt % relative to the total mass of the precursor solution) via ultrasonication for 5 h, after which PAN and surfactant were added to the Fe np-DMF suspension. Hereafter, the composite mats will be referred to as 'Fex-SDSy' where x and y denote the Fe np and SDS concentrations in the precursor solution, respectively. Precursor solutions were allowed to return to room temperature prior to electrospinning for ~8 h at a temperature and relative humidity of 28° C. and 16%, respectively, pumping rate of 0.3 mL/h (New Era Pump Systems, Inc.), a positive 15 kV voltage applied at the needle tip (Acopian), and a collector rotation speed of 500-rpm (Dingtuo Technology). The electrospinning apparatus has been described previously.

Nanofiber Characterization

The morphology of electrospun nanofiber mats was investigated using a field-emission scanning electron microscope (SEM) (S4800, Hitachi) at an acceleration voltage of 1.5 kV. All samples were sputter-coated with a thin layer of gold/palladium (60:40 Au:Pd) prior to SEM imaging. Average fiber diameters were developed from measurement of >100 nanofibers in ImageJ software. Cross sections of nanofiber composites were examined using transmission electron microscopy (TEM) (JEOL JEM-1230) at an operating voltage of 120 kV, while iron oxide nanoparticle morphology was examined using high resolution transmission electron microscopy (HRTEM) (JEOL JEM 2100 F with Schottky FEG Emission-Zr/W). Nanofiber samples were prepared via embedding in EPON™ resin (Hexion), sectioning at 80 nm on an ultramicrotome (Leica UC6), and placement on a grid for imaging (#01814-F C-B 400 mesh Cu; Ted Pella, Inc.). Nanoparticle samples were prepared via sonication in deionized water, and a droplet was allowed to dry on a grid prior to imaging (#01824 UC-A on holey 400 mesh Cu; Ted Pella, Inc.). Surface area and pore volumes were determined by $N_2$-BET analysis using a Quantachrome NOVA 4200e Analyzer. Nanoparticle samples and nanofiber materials were degassed at 90° C. for 12 h and 35° C. for 12 h, respectively, prior to analysis. Surface chemical composition was analyzed with a custom Kratos Axis Ultra X-ray photoelectron spectroscopy (XPS) system equipped with a monochromatic Al Kα X-ray source. XPS was used to collect full spectrum survey scans, as well as to examine Fe 2p regions. An extensive description of this system can be found elsewhere. Surface Fe concentrations measured via XPS are likely an average across several nanofibers, as the area of the XPS analysis is on the order of ~10 while nanofiber diameters are on the order of ~100 nm. After sorption of lead, copper, and cadmium (10 mg/L initial concentrations; pH 6 for Cu and Pb; pH 7 for Cd) on rinsed Fe2-SDS1 composites, composites were air-dried at room temperature and analyzed via both XPS (survey scans and Pb 4f, Cu 2p, or Cd 3d regions) and X-ray diffraction (XRD; Rigaku MiniFlex II, cobalt X-ray source). Samples were prepared for XRD by placing a ~2 cm by ~2 cm piece of nanofiber mat (or a compact layer of nanoparticles) on a slide with a well depth of 0.2 mm. Samples were analyzed from 10° to 80° with an interval of 0.02°.

Solution phase Fe dissolution studies were also conducted to assess the distribution of iron oxide within nanofiber composites, based on previously described protocols. To assess "surface available iron" in composites (i.e., operationally defined as the iron readily accessible at the composite-water interface), the rate of soluble iron dissolution from iron oxide-containing nanofibers was measured in dilute sulfuric acid (0.1 N $H_2SO_4$; 0.25 g/L mat). Dissolution reactors were well mixed on a rotator (Cole-Palmer Roto-Torque), and 1 mL samples were taken periodically over a 2 h period for colorimetric iron analysis (as described below). To determine "total available iron" in composites, composite nanofibers were placed in well-mixed reactors containing concentrated sulfuric acid (5 N $H_2SO_4$; 0.25 g/L mat or 0.125 g/L nanoparticles) for 24 h. We note that a similar approach (dissolution of 0.125 g/L nanoparticles in 5 N $H_2SO_4$ over 24 h) was used to quantify the total iron content of the commercially available iron oxide nanoparticles.

Batch Sorption Experiments

All batch experiments utilized a piece (~4 $cm^2$) of nonwoven nanofiber mat, and were performed in 20 mL glass vials sealed with butyl rubber stoppers (for copper) or in 15 mL polypropylene centrifuge tubes with polypropylene screw caps (lead, cadmium). Sorption isotherms were evaluated in well-mixed reactors with a constant sorbent mass loading (0.5 g/L for nanofiber mats, 0.2 g/L for iron oxide nanoparticles) and varying concentrations (2-120 mg/L) of lead, copper, or cadmium at pH 6 (buffered by MES) or pH 7 (buffered by HEPES), with samples taken at 0 and 24 h for all materials. Composites containing surfactant were evaluated as-fabricated and after extensive rinsing (rinsing utilized 3 solution exchanges with continuous mixing over 24 h) to assess the stability and influence of SDS on metal uptake. For controls, all metal concentrations were stable in reactors without any nanocomposite. Data for isotherms were collected with at least two batches of nanofibers and isotherm model fits were performed in IGOR Pro (WaveMetrics, Inc., Lake Oswego, Oreg., USA).

Both kinetic experiments and pH edge experiments were performed in reactors identical to those used for batch isotherm experiments, with pre-rinsed nanofiber materials. Kinetic experiments monitored decreases in copper, lead, or cadmium concentrations over time for excess (10 mg/L Pb, Cu, or Cd) or drinking water-relevant (300 µg/L Pb, 3 mg/L Cu, and 50 µg/L Cd) concentrations, and pH-edge experiments (pH 5.5-9, buffered by 10 mM MES, HEPES, or AMPSO, as appropriate) used 10 mg/L initial concentrations. Samples from all batch experiments were analyzed via ICP-OES (additional details below).

Performance Testing in a Flow-Through Filtration System

Optimal composite nanofibers (based on batch performance metrics and qualitative material strength evaluations) were also evaluated in a dead-end, flow-through filtration system representative of point-of-use treatment applications. The filtration set-up has been described previously. Filters were typically ~240 mg (~170 mg within the active area), and were preconditioned (e.g., rinsed) with 500 mL of deionized water. During the treatment run, the last 10 mL of each 100 mL aliquot that passed through the filter was collected for subsequent metals analysis via ICP-OES. Influent levels of lead were representative of levels in water treatment (e.g., 150 or 300 µg/L Pb). The influent matrix was idealized (e.g., 10 mM MES, pH 6) or representative of real drinking water treatment (e.g., University of Iowa tap water, pH 9.9). Filters were operated for 5-10 L, with passage of regeneration solutions (0.1 N $HNO_3$) through the system for 0.2 L between treatment of lead-containing influents.

Analytical Methods

Samples containing iron oxide nanoparticles were centrifuged at 8,000 g for 30 minutes prior to further processing of the supernatant. All samples for metals analysis were acidified to 2% $HNO_3$ and passed through a 0.45 µm Nylon syringe filter prior to analysis via inductively coupled plasma optical emission spectroscopy (ICP-OES; Perkin Elmer Optima 7000 DC), after calibration with single-element copper, cadmium, and lead standards (Inorganic Ventures, Inc.). For all iron dissolution samples, soluble iron concentration was quantified via the phenanthroline colorimetric method, which used 1 mL sample, 30 µL 100 g/L hydroxylamine hydrochloride, 200 µL 1 g/L 1,10-phenanthroline, 200 µL ammonium acetate buffer; 20 minute reaction time; and measurement at 510 nm on UV-vis spectrophotometer. Iron standards were made by dilutions of ferrous ammonium sulfate in 0.1 N $H_2SO_4$.

Nanofiber Characterization

Nanofiber Appearance and Morphology

Figure 56:
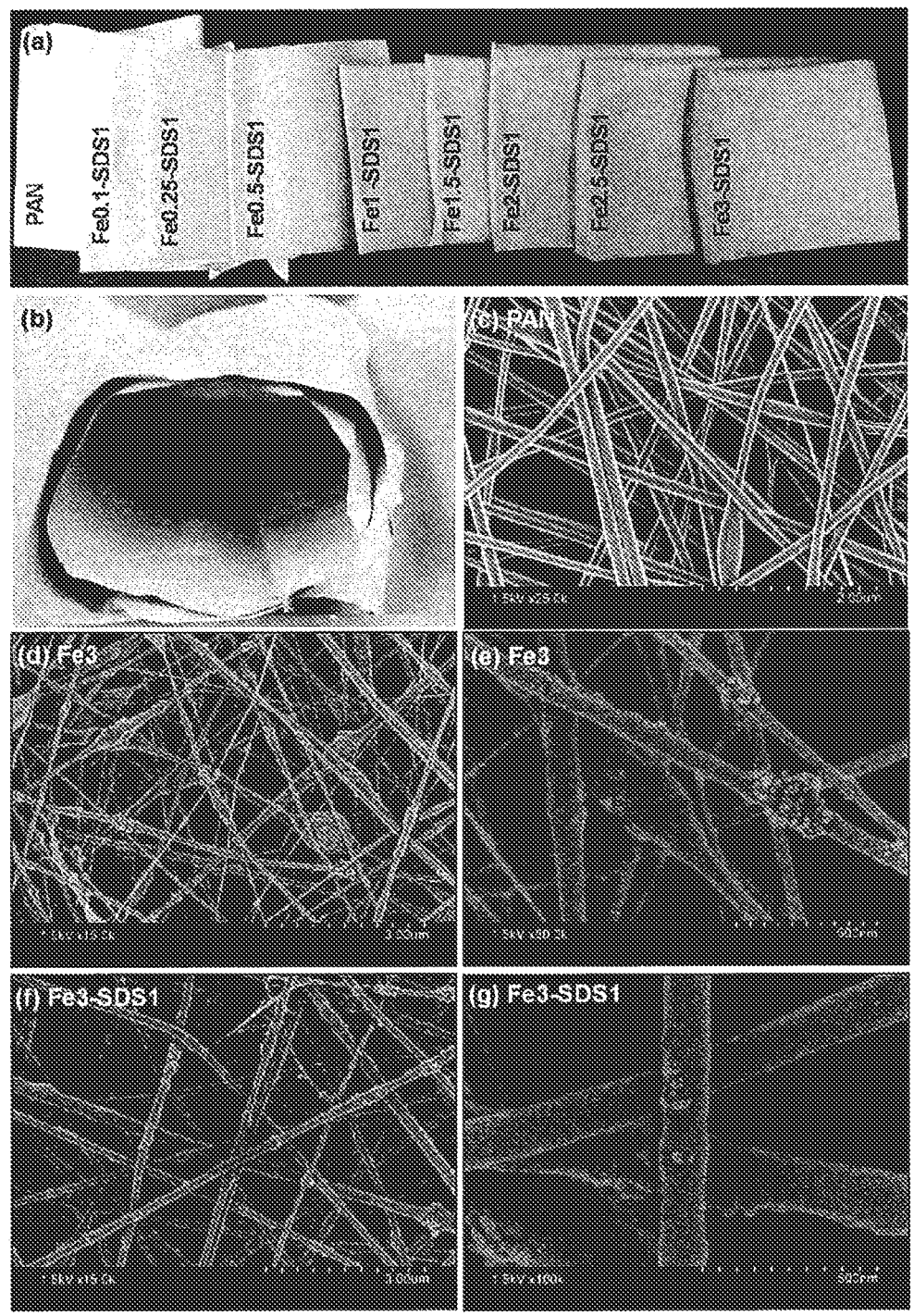
FIGS. 56A-56G are digital images showing (a) the effect of increasing Fe nanoparticle loading on PAN-Fe-SDS composites, relative to unmodified PAN, and (b) flexibility of a representative composite, and representative SEM images of (c) unmodified PAN, (d-e) Fe3, and (f-g) Fe3-SDS1. Nanofibers containing Fe nanoparticles exhibit surface roughness, relative to the smooth surfaces of PAN nanofibers, and nanoparticle aggregates are visible on the nanofiber surfaces.
Figure 57:
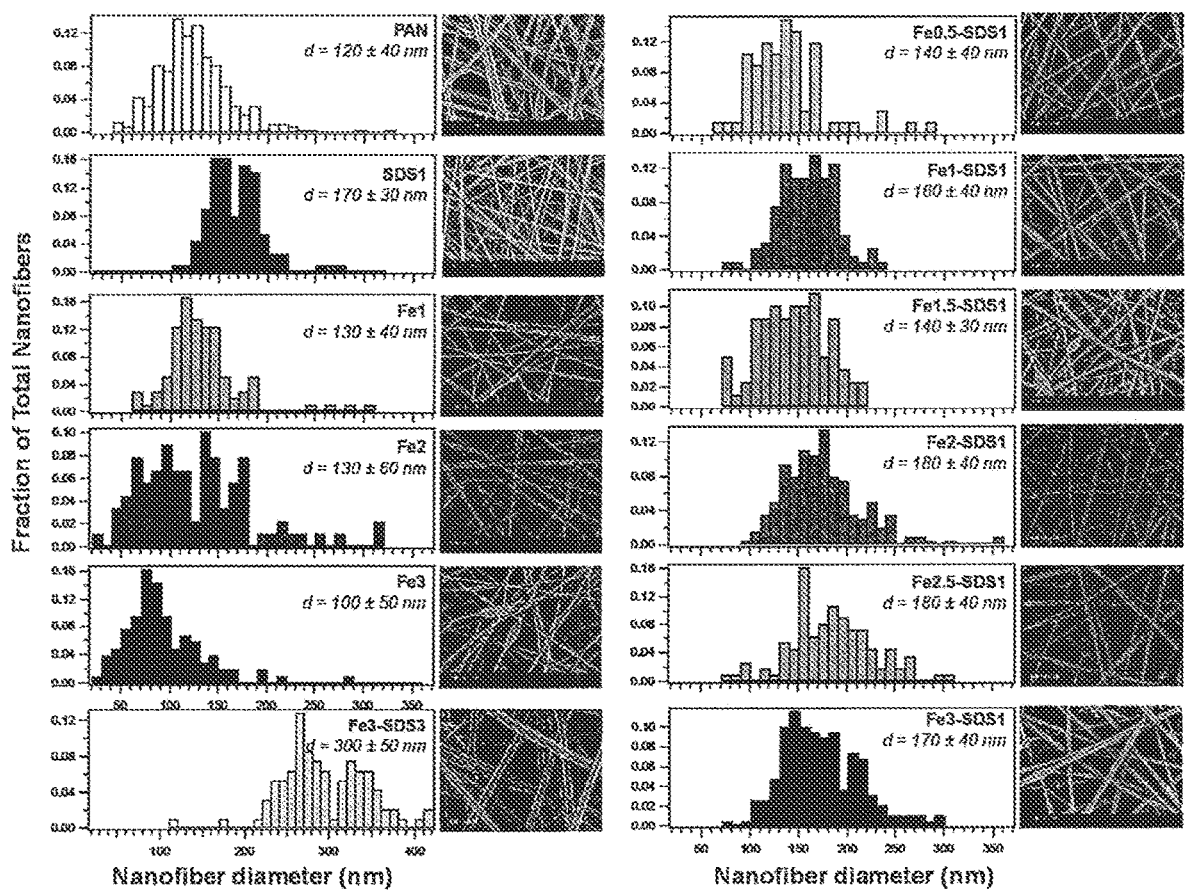
FIG. 57 are nanofiber diameter histograms and representative SEM images of nanofiber composites, including unmodified PAN, SDS1, Fe1, Fe2, Fe3, Fe0.5-SDS1, Fe1-SDS1, Fe1.5-SDS1, Fe2-SDS1, Fe2.5-SDS1, Fe3-SDS1, and Fe3-SDS3. Average nanofiber diameters (from measurement of >100 nanofibers in ImageJ® software) are noted on each histogram. Inclusion of 3 wt % Fe nanoparticles yielded a slight (but not statistically significant) decrease in nanofiber diameter, relative to unmodified PAN, while inclusion of 1 wt % SDS yielded a slight increase in nanofiber diameter. Limited differences relative to SDS1 were observed with inclusion of both Fe nanoparticles and 1 wt % SDS in nanofiber composites, although the inclusion of both 3 wt % Fe and 3 wt % SDS yielded significantly larger nanofiber diameters (presumably due to increased viscosity at the higher SDS concentration).

Digital images of the composites (FIGS. 56A-56G) show that as nanoparticle loading increased, the material becomes an increasingly darker orange tint, indicating successful incorporation of greater amounts of the iron oxide. Further, at the macro-scale, composites were all flexible, "fabric-like," and easily manipulated (FIG. 56B). Nanofiber diameter and morphology were examined via SEM, with average nanofiber diameters calculated via measurement of >100 individual nanofibers in ImageJ® software (see FIG. 57 for diameter histograms and representative SEM images). Generally, moderate differences in nanofiber diameter were observed upon inclusion of Fe nanoparticles and SDS. Inclusion of 3 wt % Fe nanoparticles yielded a slight (but not statistically significant) decrease in average diameter (100±50 nm for Fe3 vs. 120±40 nm for PAN), most likely due to an increase in sol gel conductivity. Conversely, inclusion of 1 wt % SDS yielded a slight increase in average diameter (to 170±30 nm) relative to unmodified PAN, an effect that has been previously attributed to an increase in sol gel viscosity. Composites containing both Fe nanoparticles (at varying concentrations) and 1 wt % SDS generally had nanofiber diameters comparable to that of the SDS1 material.

Figure 58:
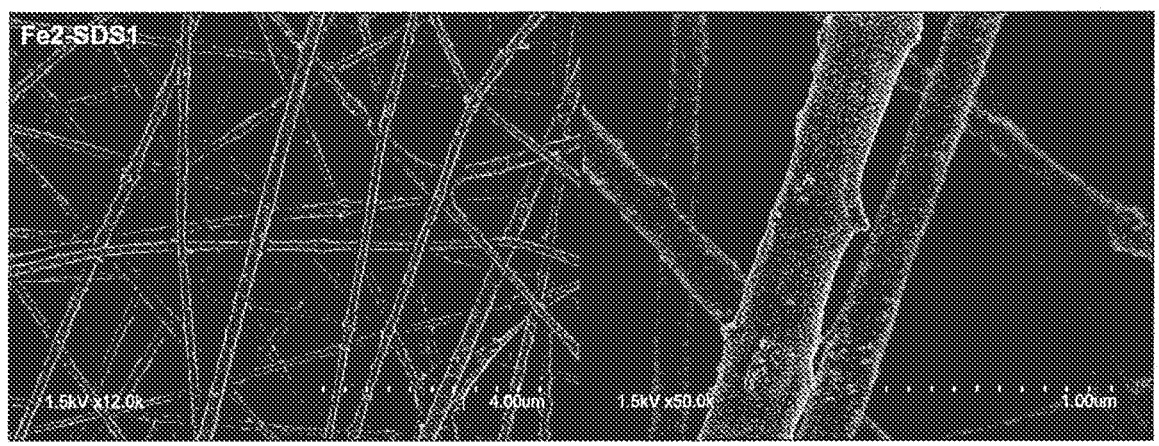
FIG. 58 are representative SEM images of Fe2-SDS1, showing nanofiber uniformity and surface roughness of nanofibers, due to nanoparticle aggregates at or near the nanofiber surfaces.

Relative to unmodified PAN nanofibers (FIG. 56C), the inclusion of Fe nanoparticles yielded nanofiber surfaces that appeared rough in SEM images, suggesting that nanoparticles and their aggregates were located either on or near the nanofiber surface (FIGS. 56D-56G; FIG. 58). Although nanoparticle aggregates were visible on the surfaces of all nanofibers containing Fe nanoparticles, inclusion of both SDS and Fe nanoparticles yielded relatively more uniform nanofibers (e.g., with less beading; see FIG. 56D vs. FIG. 56F). Based on prior reports of surfactant inclusion to minimize bead formation, this is attributed to an increase in the net charge density in the polymer precursor solution, which improves stretching of the polymer during electrospinning. Additionally, Fe2 and Fe3 materials (without SDS) were noticeably weaker (i.e., thinner and could be torn more readily) than their SDS-containing counterparts.

BET Surface Area

Figure 59:
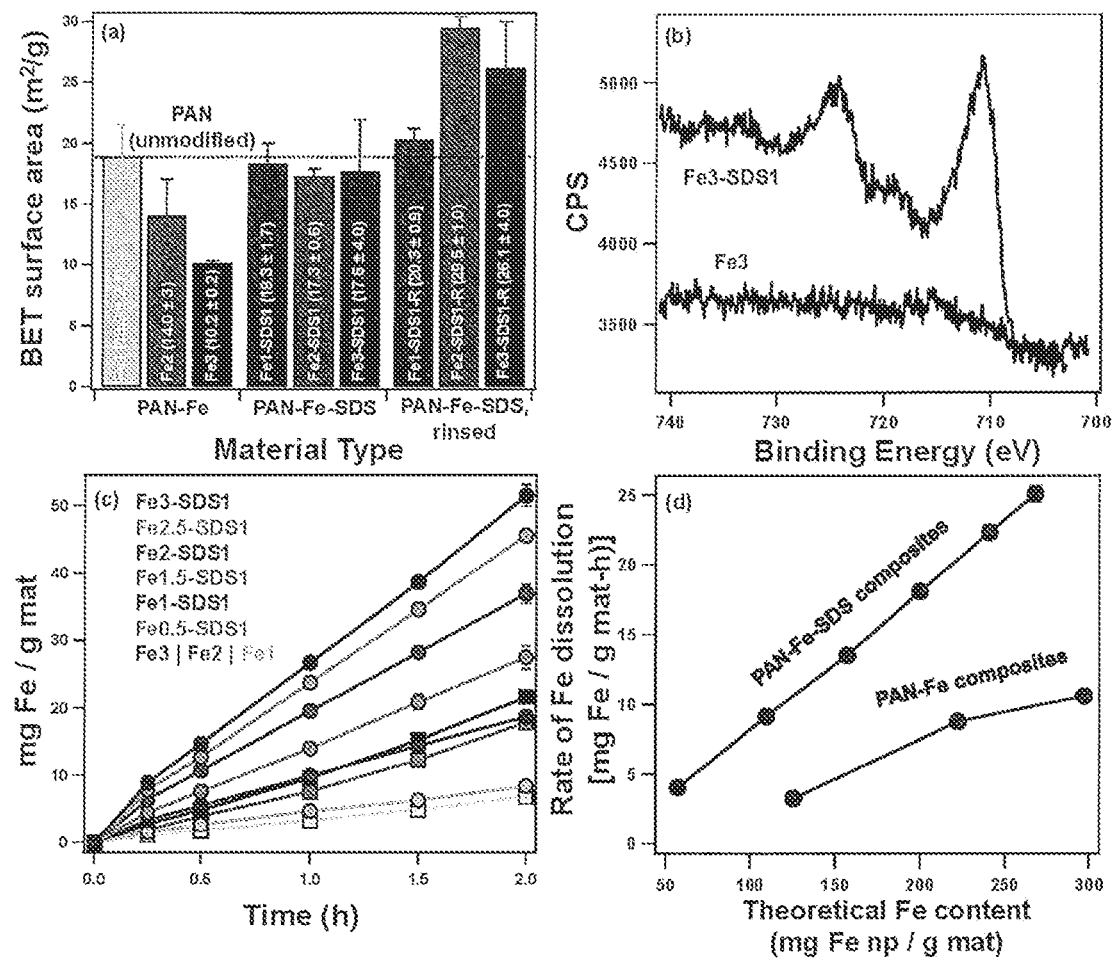
FIGS. 59A-59D illustrate characterization of nanofiber composites. (a) BET surface areas of PAN Fe, PAN-Fe-SDS, and rinsed PAN-Fe-SDS composites, relative to that of unmodified PAN. (b) XPS spectra of the Fe 2p region for Fe3 and Fe3-SDS1 composites. (c) Rate of iron dissolution in dilute acid from PAN-Fe and PAN-Fe-SDS composites, as mg Fe/g mat (0.1 N $H_2SO_4$, 0.25 g/L mass loading). (d) Rates of iron dissolution [as mg Fe/(g mat·h)] from panel (c) for PAN-Fe-SDS composites (red) and PAN-Fe composites (black), plotted against theoretical Fe content (as mg Fe np/g mat, based on Fe nanoparticle loading in the composite material).

Specific surface areas from N2-BET analysis are shown for various composite nanofibers, relative to that of unmodified PAN (18.8±0.3 $m^2/g$; dashed red line) in FIG. 59A. Based on prior reports in which SDS was utilized as a removable porogen, composites containing SDS were rinsed extensively to remove the surfactant (materials will be denoted herein by addition of '-R' after their name, such as SDS1-R). Although not shown in the FIGS., the surface areas of unrinsed SDS1 and SDS1-R were 13.8±1.6 $m^2/g$ and 16.9±0.5 $m^2/g$, respectively. While the lower surface area of SDS1 relative to unmodified PAN is partially attributable to the larger diameter of the SDS1 composite, we hypothesize that the surfactant may also block microporosity of the polymer. The comparable surface areas of SDS1-R and unmodified PAN indicate that the surfactant was effectively removed, but that surfactant removal did not appear to introduce significant additional porosity into the matrix.

Figure 60:
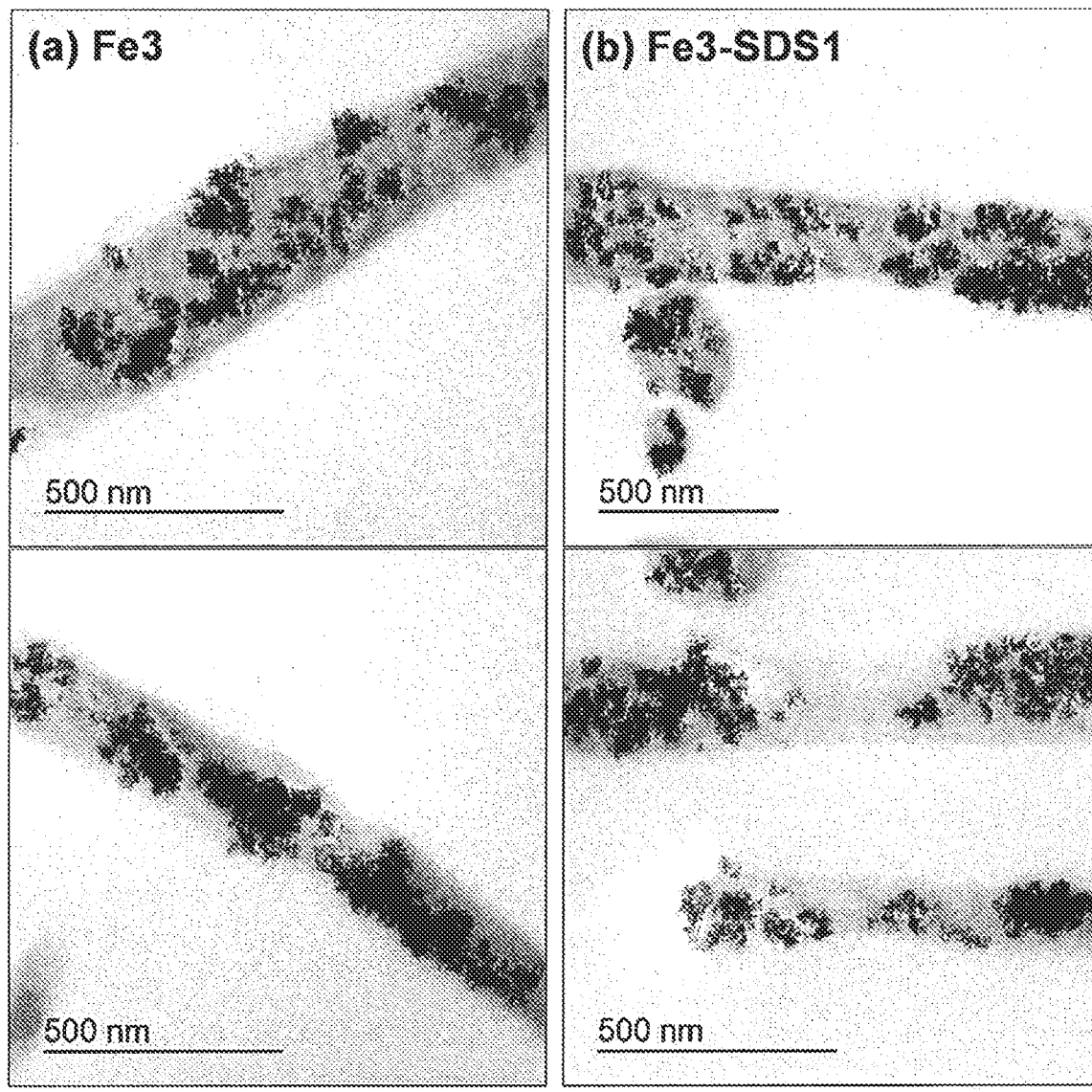
FIG. 60A-60B illustrate representative cross-sectional TEM images of (a) Fe3 and (b) Fe3-SDS1 composites, showing comparable dispersion of Fe nanoparticles, regardless of SDS inclusion.

There are several notable trends in surface area across material types containing Fe nanoparticles. In PAN-Fe composites, we observed a decrease in BET surface area with increasing Fe nanoparticle loading. We note that this is opposite of the trend expected from the observed decrease in nanofiber diameter, indicating that the loss in surface area for Fe nanoparticle composites (without SDS) is likely due to a combination of the beading observed in SEM images (see FIG. 57) and the blocking of nanofiber internal porosity by nanoparticle aggregates. With the inclusion of SDS, all PAN-Fe-SDS composites had surface areas comparable to that of unmodified PAN, where Fe1-SDS1 exhibited a comparable surface area to Fe1, Fe2-SDS1 exhibited a slight (although not statistically significant) increase in surface area relative to Fe2, and the surface area of Fe3-SDS1 increased relative to that of Fe3. Notably, TEM imaging of nanofiber cross-sections did not reveal obvious differences in nanoparticle aggregation state between Fe3 and Fe3-SDS1 (FIGS. 60A-60B). Therefore, we attribute the improvements in surface area for Fe2-SDS1 and Fe3-SDS1 relative to their PAN-Fe analogs to a combination of (i) improved nanofiber uniformity, and (ii) surface segregation of nanoparticles (discussed below), which allows the nanoparticles to directly contribute to the surface area of the composite by their localization at the nanofiber surface.

BET measurements of rinsed PAN-Fe-SDS composites revealed significant increases in nanofiber surface area for composites containing ≥2 wt % Fe nanoparticles, consistent with SDS acting as a porogen in the composite material under these conditions. Notably, the surface area of Fe1-SDS1 was minimally affected by rinsing, as predicted by the SDS1-R composite (recall, SDS1-R had a specific surface area comparable to unmodified PAN). It appears, therefore, that interactions between Fe nanoparticles (when present at higher loadings) and surfactants influence the mechanism of pore formation within the composite, although the nature of these interactions is not fully understood. We speculate that it may be the result of how the presence of the iron oxide surface promotes (or hinders) SDS micelle formation, thereby altering the structure of the SDS lost from the composite during rinsing.

Nanofiber Surface and Bulk Iron Availability

Figure 61:
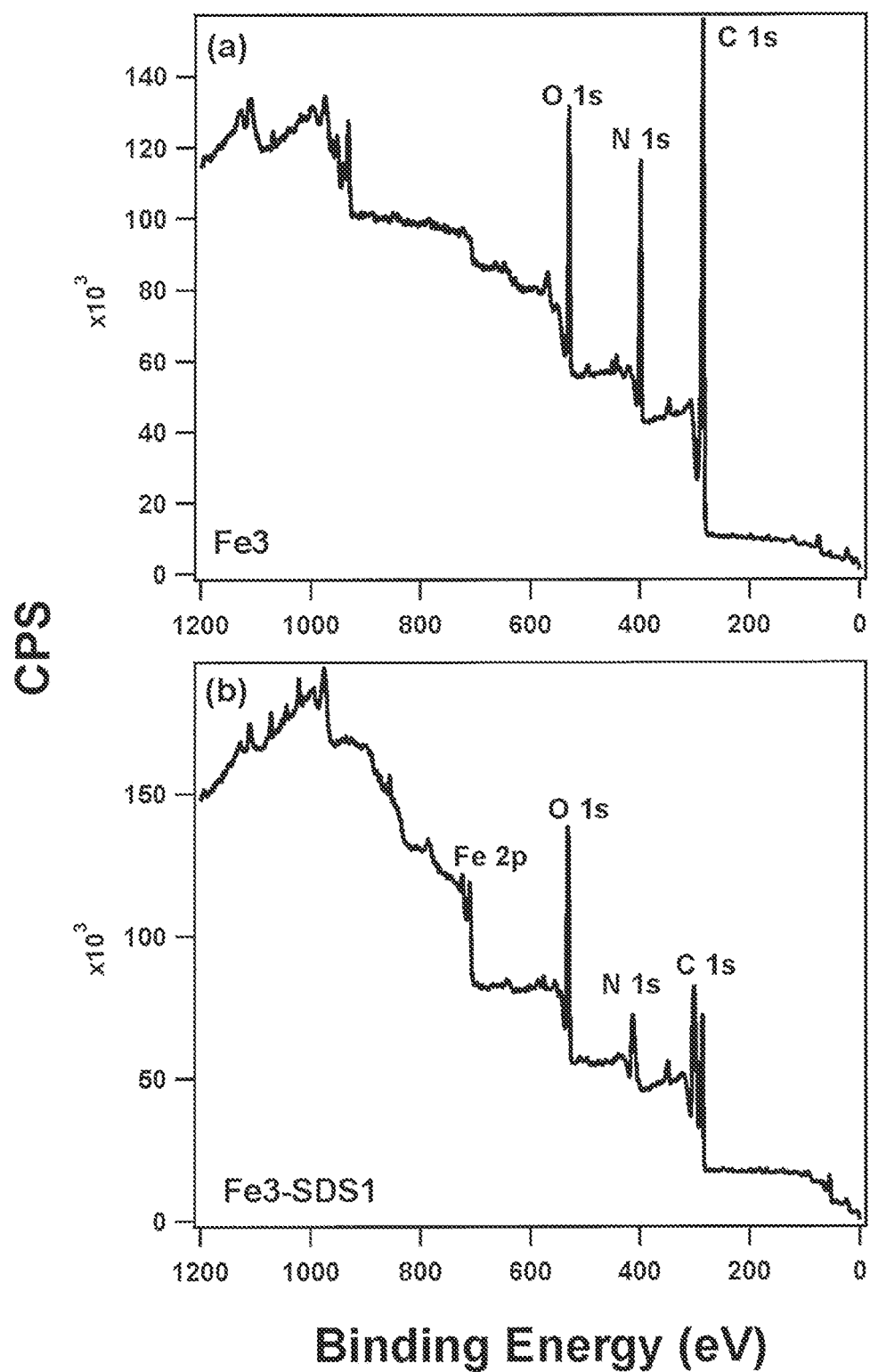
FIGS. 61A-61B are XPS survey scans of (a) Fe3 and (b) Fe3-SDS1 composites, with C 1s, N 1s, O 1s, and Fe 2p peaks labeled.

XPS was used to determine if the rough appearance of Fe-containing nanofiber surfaces correlated with an enrichment of Fe nanoparticles on the nanofiber surface, as previously observed in composites prepared with surface-segregating cationic surfactants and ferrihydrite nanoparticles. Representative spectra of the Fe 2p region are shown in FIG. 59B for materials containing 3 wt % Fe nanoparticles either with or without SDS (spectra were collected at two distinct points on the composite mats and produced comparable results; see FIGS. 61A-61B for survey scans). While survey scans revealed low Fe signals, XPS spectra in the Fe 2p region indicate a significant enhancement in Fe surface concentration for the Fe3-SDS1 composite relative to Fe3. We note that although we also analyzed the Fe 2p region on materials containing 1 and 2 wt % Fe (with and without SDS), low signal intensity prohibited conclusive interpretation of Fe surface enhancement.

Results of XPS analysis, therefore, support the surface enrichment of Fe nanoparticles upon inclusion of SDS into the precursor solution. We attribute such surface segregation of Fe nanoparticles to nanoparticle-SDS interactions; surface segregation of SDS within the polymer nanofibers during electrospinning thereby helps "pull" the Fe nanoparticles to the nanofiber surface. Indeed, previous reports have observed interactions of SDS with iron oxide nanoparticle surfaces, while others have observed surface segregation of amphiphilic molecules (e.g., surfactants) within hydrophilic polymer matrices, driven by the tendency of the hydrophobic chain to minimize energy by migration to the polymer surface. Herein, we propose that these two processes work in complement to achieve surfactant-assisted surface segregation of iron oxide nanoparticles during the single-pot synthesis of electrospun composite nanofibers.

Figure 62:
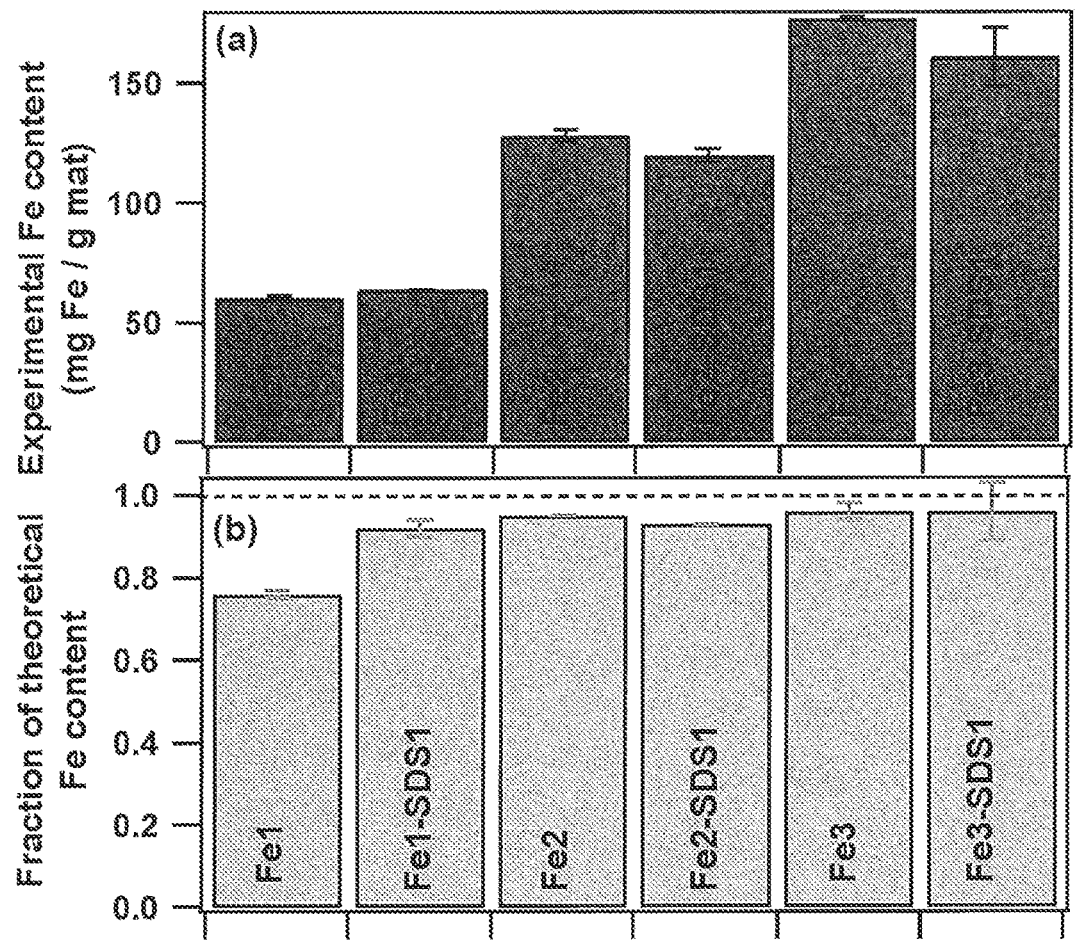
FIGS. 62A-62B are results of composite digestion in strong acid (5N H2SO4; 0.25 g/L composite mass loading) for 24 h, for PAN-Fe and PAN-Fe-SDS composites containing 1, 2 and 3 wt % Fe and 1 wt % SDS. (a) Total experimental Fe content (as mg Fe/g mat) and (b) fraction of theoretical Fe content, based on the theoretical Fe nanoparticle loading in the composite and the Fe content of Fe nanoparticles (625±14 mg Fe/g nanoparticle, determined via 24 h digestion in 5N H2SO4; 0.125 g/L nanoparticle loading).

To further support the synergistic effect of including both Fe nanoparticles and SDS on nanofiber surface composition, the rate of iron dissolution in dilute acid was evaluated as a relative measurement of surface available iron within the composite matrix (FIGS. 59C and 59D). We note that total available iron content (determined via digestion of polymer composites in 5 N $H_2SO_4$) was generally within ~5% of the expected (theoretical) total Fe content, and was calculated using the known Fe nanoparticle loading in the precursor solution and the nanoparticle iron content obtained from their digestion in 5 N $H_2SO_4$ (see FIGS. 62A and 62B). Thus, for simplicity, theoretical Fe content was subsequently used to quantify the total iron content of the nanofiber composites.

Figure 63:
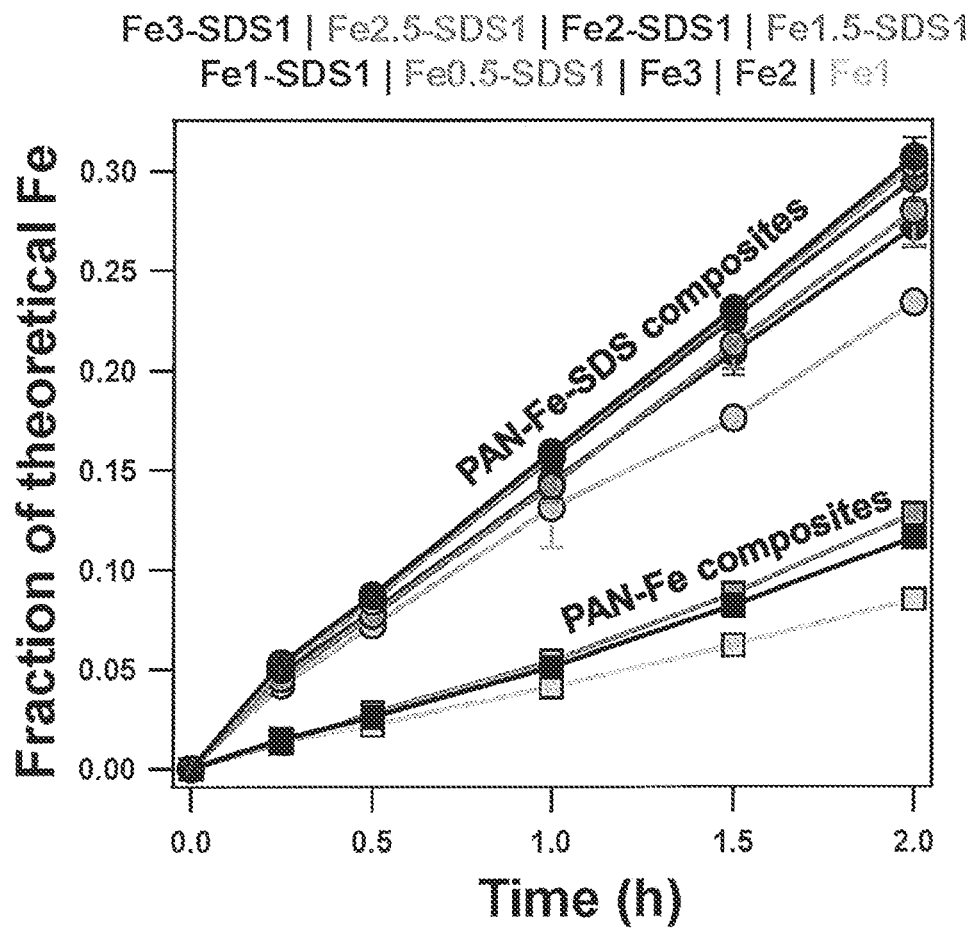
FIG. 63 illustrates rate of dissolution of PAN-Fe and PAN-Fe-SDS composites in dilute acid (0.1N H2SO4; 0.25 g/L composite mass loading), normalized to the theoretical Fe loading in the composite (based on theoretical Fe nanoparticle loading and Fe content of Fe nanoparticles). Rate of dissolution from PAN-Fe-SDS composites is ~2.5 times that from PAN-Fe materials, due to improved solution phase accessibility of Fe nanoparticles upon inclusion of SDS.

The rate of iron release in dilute acid [as mg Fe/(g mat-hour)] is shown for composites containing both Fe nanoparticles from 0.5-3 wt % and 1 wt % SDS (i.e., PAN-Fe-SDS) and their analogs containing only Fe nanoparticles from 1-3 wt % (i.e., PAN-Fe) in FIG. 59C. Also, measured rate constants for iron dissolution (assuming initially linear changes in soluble iron concentration over time) are plotted against theoretical Fe nanoparticle content for both PAN-Fe-SDS composites (red) and PAN-Fe composites (black) in FIG. 59D. Generally, the rate of iron release was faster for PAN-Fe-SDS composites than for their PAN-Fe analogs. Further, diminishing improvements in the rate of iron release from PAN-Fe composites were observed as theoretical iron content increased above 2 wt %. In contrast, the rate of iron release from PAN-Fe-SDS materials scaled linearly with theoretical iron in the nanofiber composite. Thus, the inclusion of 1 wt % SDS promotes the accessibility of embedded iron oxide nanoparticles to solution, even in composites containing Fe nanoparticles at loadings up to 3 wt %. Across Fe nanoparticle loadings, the rate of iron dissolution [as fractional Fe dissolution/hour] for PAN-Fe-SDS was ~2.5 times faster than their PAN-Fe analogs (see FIG. 63, in which data from FIG. 59C are normalized to the theoretical mass of iron (as Fe) in the materials). Thus, evidence from dissolution studies supports improved solution phase accessibility of the iron oxide upon inclusion of SDS, arising from both an increase in the specific surface area of these composites and the surfactant-assisted surface segregation of iron oxide nanoparticles that occurs during their synthesis.

Performance Evaluation: Batch Removal of Copper, Lead, and Cadmium

Figure 64:
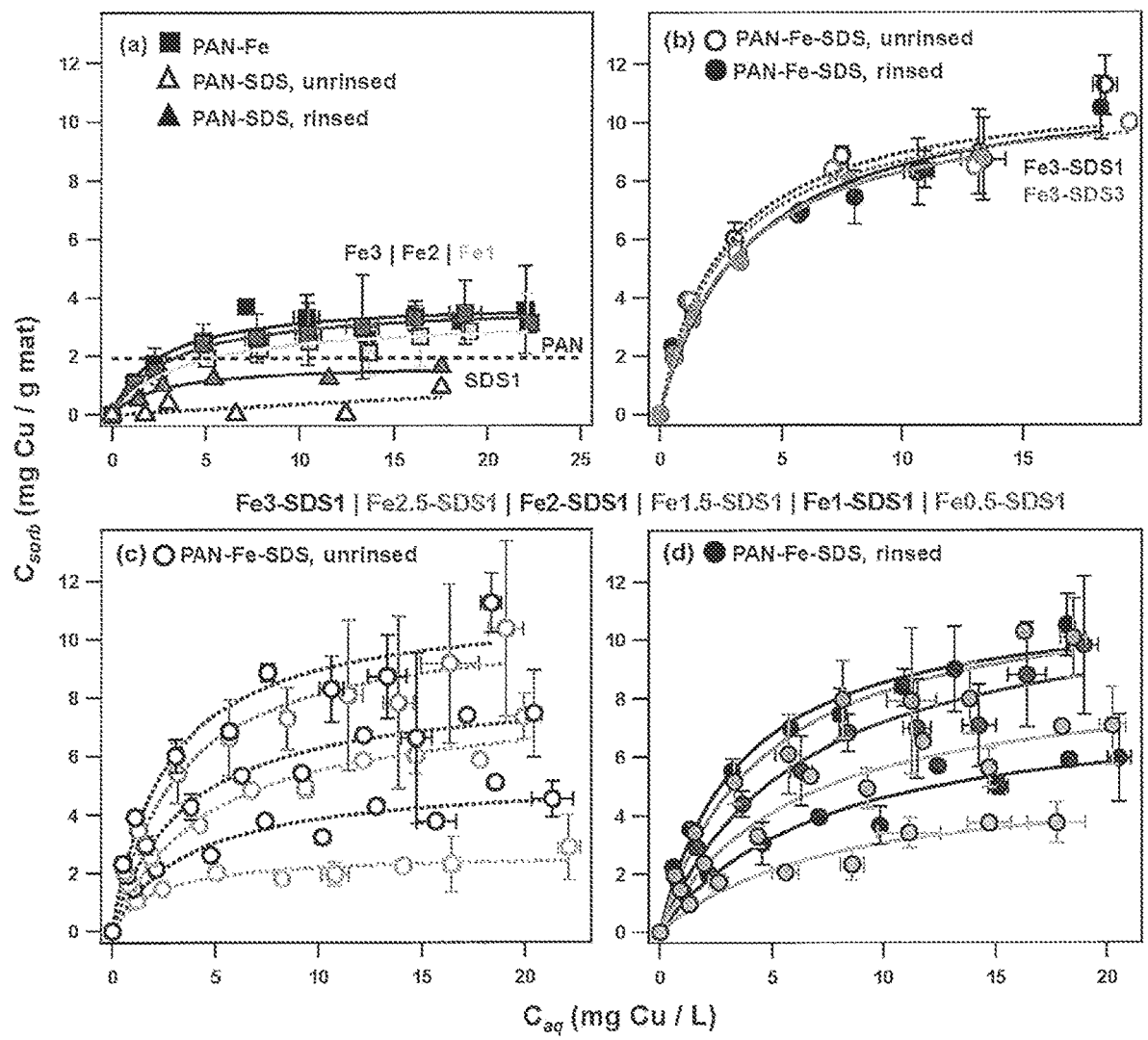
FIGS. 64A-64D are sorption isotherms for copper uptake by nanofiber composites, with Langmuir model fits. (a) Cu isotherms for SDS1 (unrinsed and rinsed) and PAN-Fe composites (Fe1, Fe2, Fe3), relative to the capacity of unmodified PAN. (b) Effect of SDS concentration (1 vs. 3 wt %) on Cu uptake capacity, for unrinsed and rinsed composites with a 3 wt % Fe nanoparticle loading (Fe3-SDS1 vs. Fe3-SDS3). (c) Effect of Fe nanoparticle loading on Cu uptake with unrinsed PAN-Fe-SDS composites. (d) Effect of Fe nanoparticle loading on Cu uptake with rinsed PAN-Fe-SDS composites. Experimental conditions: 0.5 g/L mass loading; 10 mM MES buffer, pH 6; 2-30 mg Cu/L.
Figure 65:
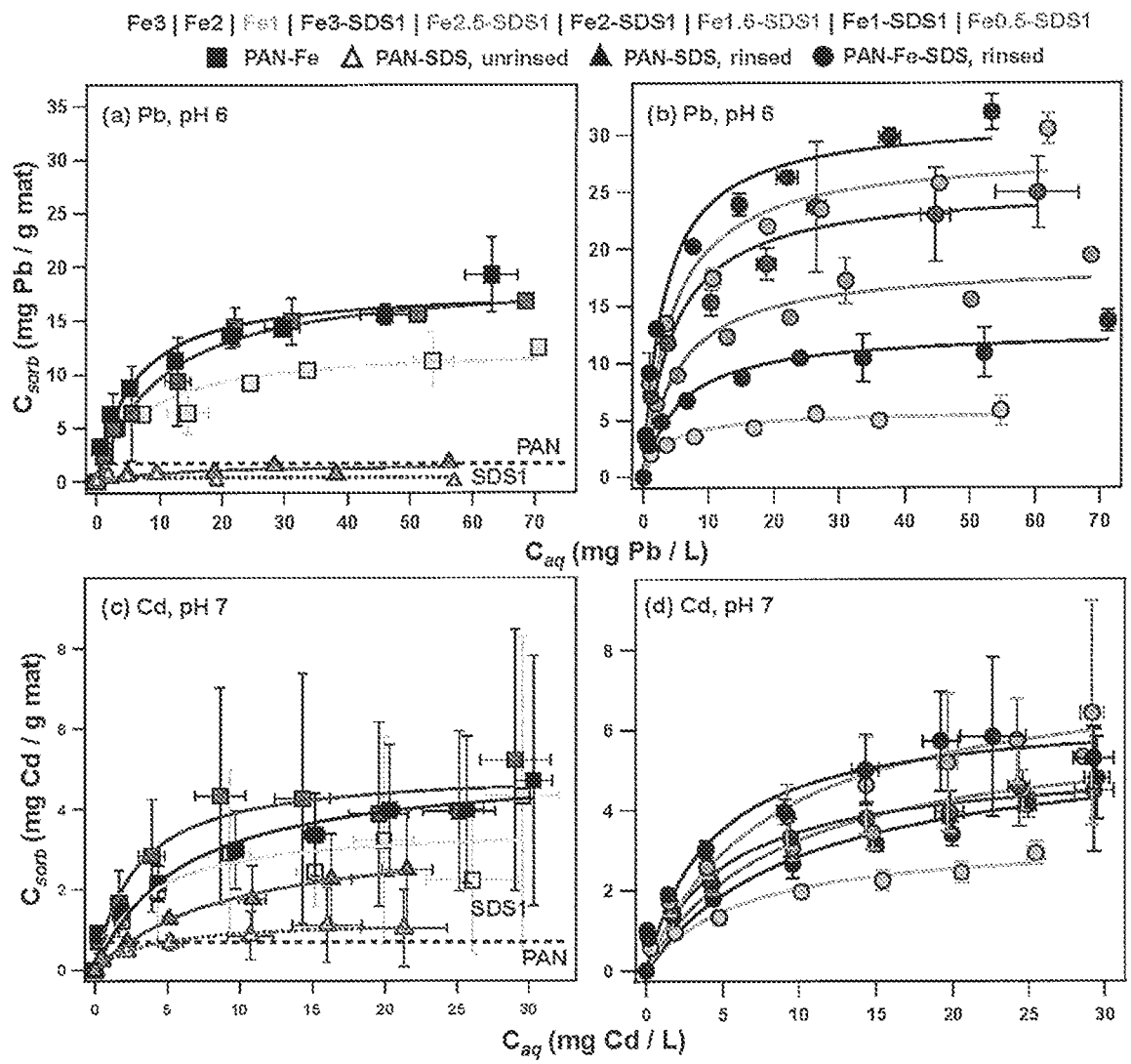
FIGS. 65A-65D are sorption isotherms for (a, b) lead uptake and (c, d) cadmium uptake by nanofiber composites, with Langmuir model fits. (a) Pb isotherms for SDS1 (unrinsed and rinsed) and PAN-Fe composites (Fe1, Fe2, Fe3), relative to the capacity of unmodified PAN. (b) Effect of Fe nanoparticle loading on Pb capacity of rinsed PAN-Fe-SDS composites. (c) Cd isotherms for SDS1 (unrinsed and rinsed) and PAN-Fe composites (Fe1, Fe2, Fe3), relative to the capacity of unmodified PAN. (d) Effect of Fe nanoparticle loading on Cd capacity of rinsed PAN-Fe-SDS composites. Experimental conditions: 0.5 g/L mass loading; 10 mM MES buffer, pH 6 (Pb) or 10 mM HEPES buffer, pH 7 (Cd); 2-100 mg Pb/L or 1-50 mg Cd/L.
Figure 66:
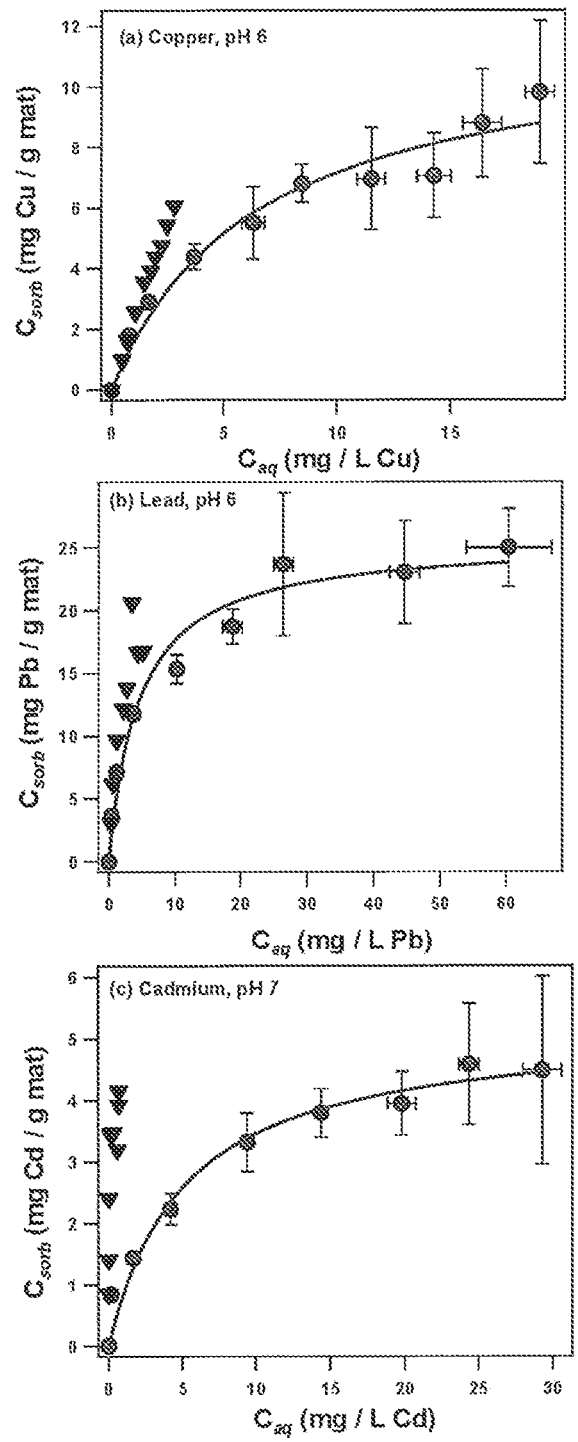
FIGS. 66A-66C illustrate reversibility of rinsed Fe2-SDS1 composites for uptake of (a) Cu (pH 6), (b) Pb (pH 6), and (c) Cd (pH 7), by replacement of solution containing the heavy metal target with fresh buffer after 24 h equilibration, followed by a second 24 h equilibration period. Partial irreversibility was observed for Cu, while composites exhibited near-total irreversibility of uptake for Pb and Cd, likely due to precipitation. Experimental conditions: 0.5 g/L composite mass loading; 10 mM MES for pH 6, 10 mM HEPES for pH 7.

Unmodified PAN, PAN-Fe, PAN-SDS, and unsupported (freely dispersed) Fe nanoparticles were evaluated for removal of copper (FIGS. 64A-64D), lead (FIGS. 65A and 65B), and cadmium (FIGS. 65C and 65D). To ensure metal solubility and minimize precipitation, while still observing sufficient uptake to evaluate trends within the pH range relevant for drinking water, sorption experiments were conducted at pH 6 for copper and lead, and at pH 7 for cadmium (where the dominant species of each metal are $Cu^{2+}$, $Pb^{2+}$, and $Cd^{2+}$, respectively). Isotherms for all sorbent materials were best described by the Langmuir adsorption model [$C_{sorbed}=q_{max} \cdot K_L \cdot C_{aq}/(1+K_L \cdot C_{aq})$], where $q_{max}$ is the maximum sorption capacity at equilibrium, and $K_L$ is the Langmuir adsorption constant. We note that although the Langmuir model assumes reversible sorption, we observed partial irreversibility of Cu and near-complete irreversibility of Pb and Cd on composite sorbents (FIGS. 66A and 66B).

Thus, isotherms represent monolayer sorption that is "Langmuir-type", with model parameters provided in Tables 7, 8, and 9.

Figure 67:
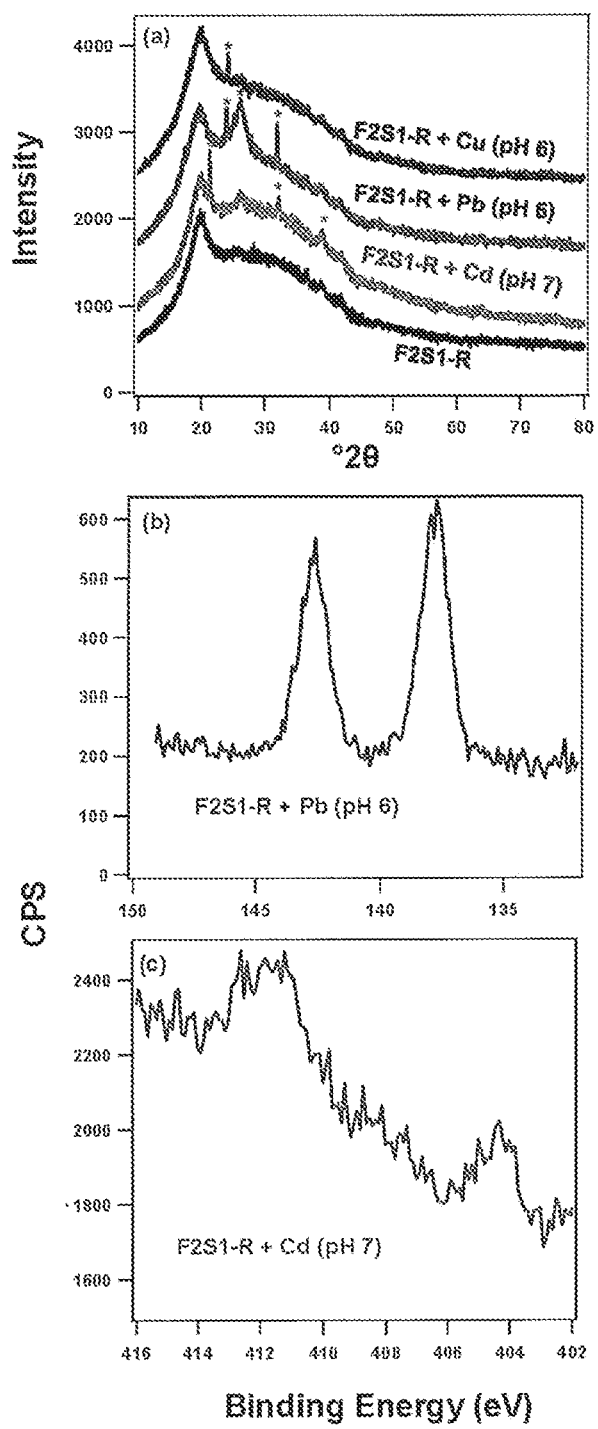
FIGS. 67A-67C illustrate (a) XRD spectra of dried Fe2-SDS1-R after sorption of Cu (blue), Pb (green) or Cd (pink), or after mixing at equivalent conditions in the absence of an added metal (black). XPS spectra of Pb 4f and Cd 3d regions are shown for Fe2-SDS1-R composites after sorption of (b) Pb or (c) Cd, respectively. Sorption of Cu and Pb was performed in 10 mM MES at pH 6; sorption of Cd was performed in 10 mM HEPES at pH 6; 0.5 g/L mat mass loading; 10 mg/L Cu, Pb, or Cd initial concentration.

To determine if metal uptake by surface precipitation played a role in the observed irreversibility, we analyzed a representative material (rinsed Fe2-SDS1) after sorption of Cu, Pb, or Cd (initial concentration 10 mg/L) with both XPS and XRD (FIGS. 67A-67C). XPS analysis after Cu sorption did not yield sufficient signal to interpret the chemical state of Cu on the composite surface. Likewise, XPS analysis after Cd sorption was inconclusive regarding precipitate formation, as negligible binding energy shifts are expected for different chemical species of cadmium (e.g., cadmium oxide). In contrast, co-precipitation of lead oxide is likely, based on a shift in the Pb 4f region of the XPS spectra to higher binding energy (137.7 eV, relative to 137.0 eV for Pb). However, we note that reacted materials were both dried (at room temperature) and then subjected to ultra-high vacuum prior to XPS analysis, which may influence their surface chemistry. To minimize material processing prior to analysis (e.g., eliminate the need for ultra-high vacuum), composites were analyzed with XRD. Although XRD analysis suggested formation of a precipitate for all target metals, due to the appearance of peak(s) not observed in the XRD spectra of a control (e.g., an equivalent material that was exposed to a solution without metal ions), the peaks were not identifiable as known oxides or hydroxides of each metal.

PAN-Fe and PAN-Fe-SDS Composites

FIG. 64A shows isotherms for copper removal with PAN-Fe (Fe1, Fe2, and Fe3) and SDS1 (unrinsed and rinsed), relative to unmodified PAN. Notably, the unrinsed SDS1 composite exhibited a lower Cu removal capacity than both SDS1-R (1.7±0.2 mg Cu/g) and unmodified PAN (1.9±1 mg Cu/g), as expected based on its lower BET surface area. The comparable performance of SDS1-R and PAN indicates that (i) prior to removal via rinsing, SDS molecules likely block access to polymer sites at which Cu binds (presumably electron-rich nitrile groups; C≡N), and (ii) the charged sulfonate groups do not directly participate in Cu removal, as their removal via rinsing enhances Cu uptake. The Fe1 composite (3.3±0.2 mg Cu/g) exhibited limited improvement in Cu removal relative to PAN and SDS1-R, and little to no significant increase in capacity was observed for Fe2 and Fe3 materials. Thus, the majority of the Fe nanoparticles must be primarily encapsulated in the polymer matrix and thus inaccessible as sites for metal uptake. Another shortcoming of Fe2 and Fe3 materials is that they tended to partially disintegrate (e.g., fray at the edges) during sorption experiments, suggesting limited material strength that would likely hinder their practical application.

Comparable isotherms for lead and cadmium are shown in FIGS. 65A and 65C, respectively. Performance of the unrinsed and rinsed SDS1 composites for Pb removal, relative to unmodified PAN, were consistent with trends observed for Cu uptake, indicating that the sulfonate groups also do not provide binding sites directly involved in Pb removal. For Cd, while rinsing of SDS1 again yielded an increase in removal capacity, the capacity of unrinsed SDS1 was comparable to that of unmodified PAN, indicating that sulfonate sites likely participate in Cd uptake prior to their removal via rinsing. Further, because SDS1-R exhibited a higher Cd removal capacity than unmodified PAN, surfactant removal must increase accessibility to polymer sites for binding and/or precipitation of Cd.

Trends in performance of PAN-Fe composites for Pb and Cd removal also provided insights regarding metal binding sites. The Fe1 composite exhibited a significantly higher Pb removal capacity (12.6±1 mg Pb/g) relative to SDS1-R (1.6±0.5 mg Pb/g), indicating that Fe nanoparticle sites dominate removal of Pb. However, due to encapsulation of nanoparticles, Pb removal capacity again did not scale linearly with Fe nanoparticle loading, as Fe2 and Fe3 composites exhibited comparable Pb removal capacities (~19 mg Pb/g). In contrast, the Cd uptake capacities of Fe1 (3.6±0.6 mg Cd/g) and SDS1-R (3.5±0.3 mg Cd/g) were comparable, and increases in the Fe nanoparticle loading to 2 and 3 wt % yielded rather modest improvements in removal capacity (to ~5 mg Cd/g), indicating that C≡N groups of PAN provide the dominant sites for Cd removal. The role of C≡N groups in composite uptake of Cd is consistent with reported values of formation constants for Cd complexation with $CN^-$ in aqueous solution, which are ~2 orders of magnitude larger than for complexation with other common ions (e.g., OFF, $NH_3$). While Cu complexation with $CN^-$ is also important, the first complex [Cu $(CN)_2$] would require two adjacent C≡N groups on the polymer surface, which may limit the degree to which Cu removal is dependent on polymer nitrile groups for uptake. In contrast, consistent with observations above, Pb complexation with $CN^-$ is not expected to be significant.

Effect of SDS and Fe Nanoparticle Loadings in PAN-Fe-SDS Composites

First, the influence of SDS loading was evaluated in terms of Cu capacity for materials with 3 wt % Fe nanoparticles (e.g., Fe3-SDS1 vs. Fe3-SDS3), and no effect on capacity was observed for either unrinsed or rinsed materials (FIG. 64B). Thus, the inclusion of 1 wt % SDS promotes sufficient solution phase accessibility of the Fe nanoparticles, such that the inclusion of a higher SDS loading does not yield further improvements in nanoparticle availability for metals uptake. Accordingly, materials containing 1 wt % SDS were used in the remainder of this study.

Figure 68:
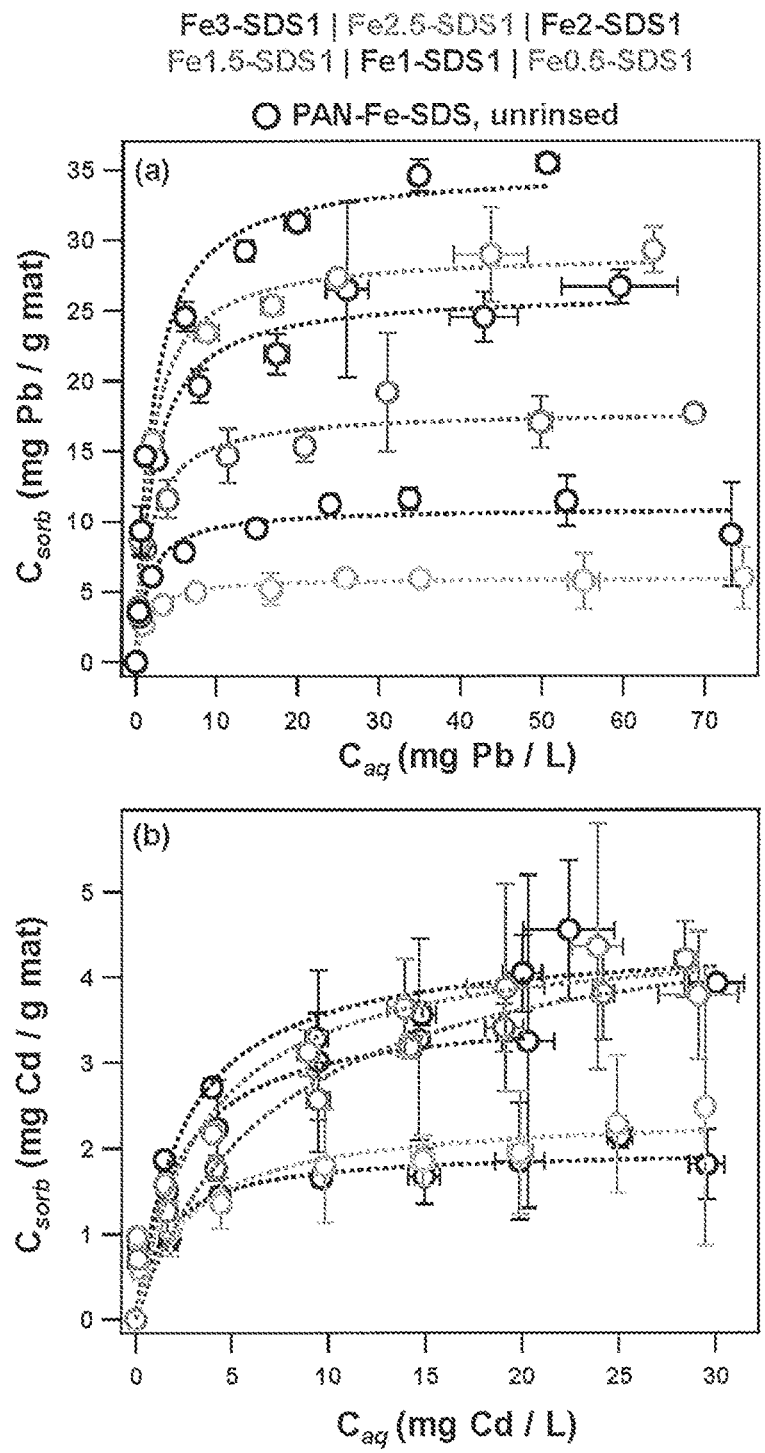
FIGS. 68A-68B are sorption isotherms for (a) Pb (pH 6) and (b) Cd (pH 7) with unrinsed PANFe-SDS composites. Experimental conditions: 0.5 g/L composite mass loading; 10 mM MES for pH 6, 10 mM HEPES for pH 7.

Copper isotherms for unrinsed and rinsed materials containing varying Fe nanoparticle concentrations (0.5-3 wt %) and 1 wt % SDS are shown in FIGS. 64C and 64D, whereas these isotherms for lead and cadmium uptake on rinsed composites are shown in FIGS. 65B and 65D, respectively (see FIGS. 68A and 68B for Pb and Cd isotherms on unrinsed PAN-Fe-SDS composites). Generally, relative to PAN-Fe and PAN-SDS materials, PAN-Fe-SDS composites exhibited significantly higher copper and lead removal capacities, while the increase in capacity was less marked for cadmium removal. Specific details of trends in uptake of each metal are discussed more completely below. From a practical perspective, the inclusion of SDS with Fe nanoparticles appeared to produce stronger, more durable sorbent materials. Only the Fe3-SDS1 composite showed any signs of disintegration during use (visible loss of nanoparticles and/or nanofibers during batch experiments), as was observed with Fe2 and Fe3 composites. Otherwise, SDS-containing composites with lower Fe nanoparticle loadings were visibly more robust, and maintained their material integrity during application.

For both unrinsed and rinsed composites, Cu uptake increased with increasing Fe nanoparticle loading. Generally, after rinsing the composites, we observed lower KL values (although not statistically different across all composites). This change is attributed to the loss of negatively charged sulfonate groups, which likely promote Cu uptake on the iron oxide by making the nanoparticle surfaces more electrostatically favorable for uptake of the cationic target (i.e., $Cu^{2+}$ at pH 6), an effect we previously observed for cationic composites targeting oxyanion species. Rinsing also influenced material maximum capacities ($q_{max}$ values), generally yielding an improvement of ~3 mg Cu/g for composites with Fe nanoparticle loadings ≤2 wt %. In contrast, statistically insignificant improvements in capacity were observed for Fe2.5-SDS1 and Fe3-SDS1 after rinsing (Table 7). This trend in Cu uptake is opposite of that predicted from changes in BET surface area with rinsing, as increases in BET surface area were most clearly observed for rinsed composites with higher nanoparticle loadings. However, a measurable increase in Fe nanoparticle surface segregation was also only observed at the higher nanoparticle loading. Thus, for composites containing Fe nanoparticle loadings >2 wt %, the porosity generated via removal of SDS likely only minimally improved access to additional Fe binding sites embedded within the nanofibers, as the majority of the surface was concentrated with iron oxide nanoparticles. Conversely, although porosity generated via SDS removal in composites with lower Fe nanoparticle loadings did not yield measurable changes in BET surface area, SDS removal facilitated access to a relatively larger percentage of previously less-accessible, embedded iron oxide nanoparticles.

Consistent with performance toward Cu, rinsed PAN-Fe-SDS composites generally exhibited higher Pb and Cd removal capacities than PAN-Fe materials (due to improved accessibility of iron oxide nanoparticles) and significantly lower $K_L$ values relative to unrinsed PAN-Fe-SDS materials (due to the loss of charged sulfonate groups that promote metal cation uptake). Distinct from our findings with Cu, Pb capacities of rinsed and unrinsed composites were comparable. We attribute this difference both to the larger ionic radius of the lead cation, which may limit its transport into and through pores generated via SDS removal, and to the role of co-precipitation in Pb removal, which likely occurs on the nanofiber surfaces, rather than within pores (and may block access to internal binding sites). For Cd removal, rinsing of PAN-Fe-SDS composites improved material maximum capacities by ~2 mg/g, comparable to the capacity increase observed after rinsing the SDS1 material (Table 9). Further, increases in Cd uptake capacity with increasing Fe nanoparticle loading were minimal (e.g., ~2-fold increase in $q_{max}$ for Cd vs. ~5.5-fold increase for Cu and Pb). Given that the SDS1-R support contributes more than half of the total Cd removal capacity for all hybrid composites, the limited dependence of Cd removal on Fe nanoparticle loading is again attributed to the relative importance of the C≡N binding sites on the polymer surface for Cd removal (detailed further below).

Summary of Composite Sorbent Capacity for Cu, Pb, and Cd

Figure 69:
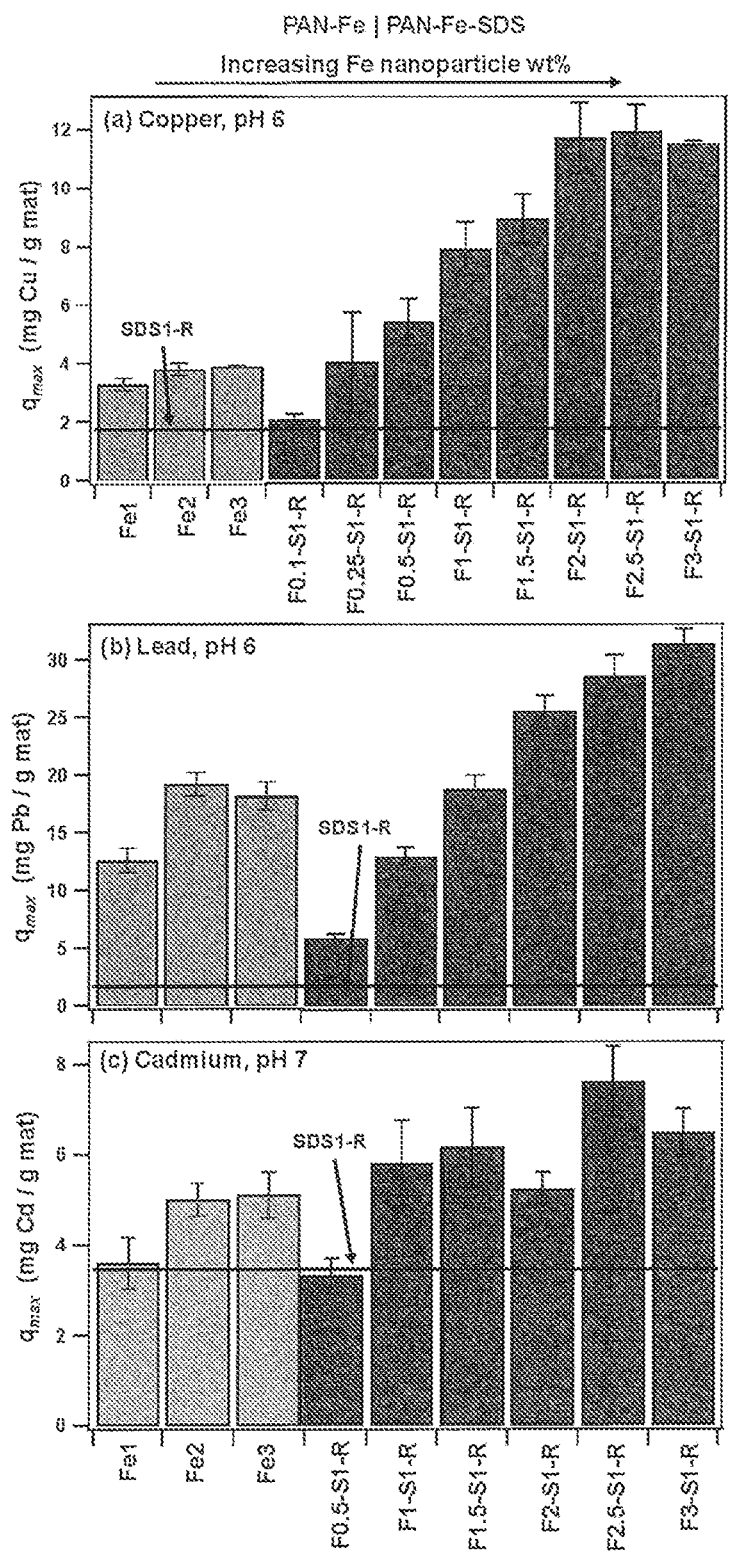
FIGS. 69A-69C are maximum mat-normalized (a) Cu, (b) Pb, and (c) Cd uptake capacities of PAN-Fe (gray) and rinsed PAN-Fe-SDS (blue) composites (as mg Cu/g mat), relative to the capacity of SDS1-R, from Langmuir model fits in FIGS. 64A-64D and FIGS. 65A-65D.

The maximum bulk Cu capacities of both PAN-Fe and rinsed PAN-Fe-SDS composites [i.e., $q_{max}$ (mg Cu/g mat) from Langmuir model fits in FIGS. 64A and 64D] are summarized and shown relative to the capacity of SDS1-R in FIG. 69A. We note that PAN-Fe-SDS composites containing 0.1 and 0.25 wt % Fe nanoparticles (which were not shown in FIGS. 64A-64D) are included. Similar summary comparisons (for composites containing 0.5-3 wt % Fe nanoparticles) are presented for Pb and Cd in FIGS. 69B and 69C, respectively.

For Cu removal, the maximum capacities of PAN-Fe composites (shown in gray) are comparable, while Cu removal capacity of PAN-Fe-SDS composites (shown in blue) clearly increases with Fe nanoparticle loading (up to 2 wt %). The capacity of PAN-Fe-SDS composites ultimately reaches a plateau at Fe nanoparticles loadings ≥2 wt %, indicating that additional nanoparticles become inaccessible as sites for sorption. Although, as noted previously, XPS did not reveal information about the form of Cu on the composite surface, several reports have demonstrated the sorption of Cu on nano-scale iron (hydr)oxides occurs via inner-sphere bidentate surface complexation. Presumably, composites that exhibited the maximum Cu removal capacity possess comparable amounts of surface available Fe nanoparticle sites for complexation of copper, due to nanoparticle aggregation within or at the surface of nanofibers that contain higher Fe nanoparticle loadings.

As described previously, and consistent with Cu removal, PAN-Fe composites containing 2 and 3 wt % Fe nanoparticles exhibited higher Pb and Cd capacities than PAN-Fe-SDS composites with "1 wt % Fe nanoparticle loadings, but did not exhibit increasing capacities with increasing nanoparticle loading. A comparison of the maximum mat-normalized Cd capacities of PAN-Fe-SDS materials again indicated no clear trend in capacity with increasing Fe nanoparticle loading, underscoring the dominant role of nitrile binding sites in Cd removal. In contrast, mat-normalized Pb uptake capacity increased with increasing Fe nanoparticle loading, indicating that additional sites for lead removal (via precipitation as lead (hydr)oxides and/or inner sphere complexation) are made available as the concentration of Fe nanoparticles at the nanofiber surfaces increases.

Figure 70:
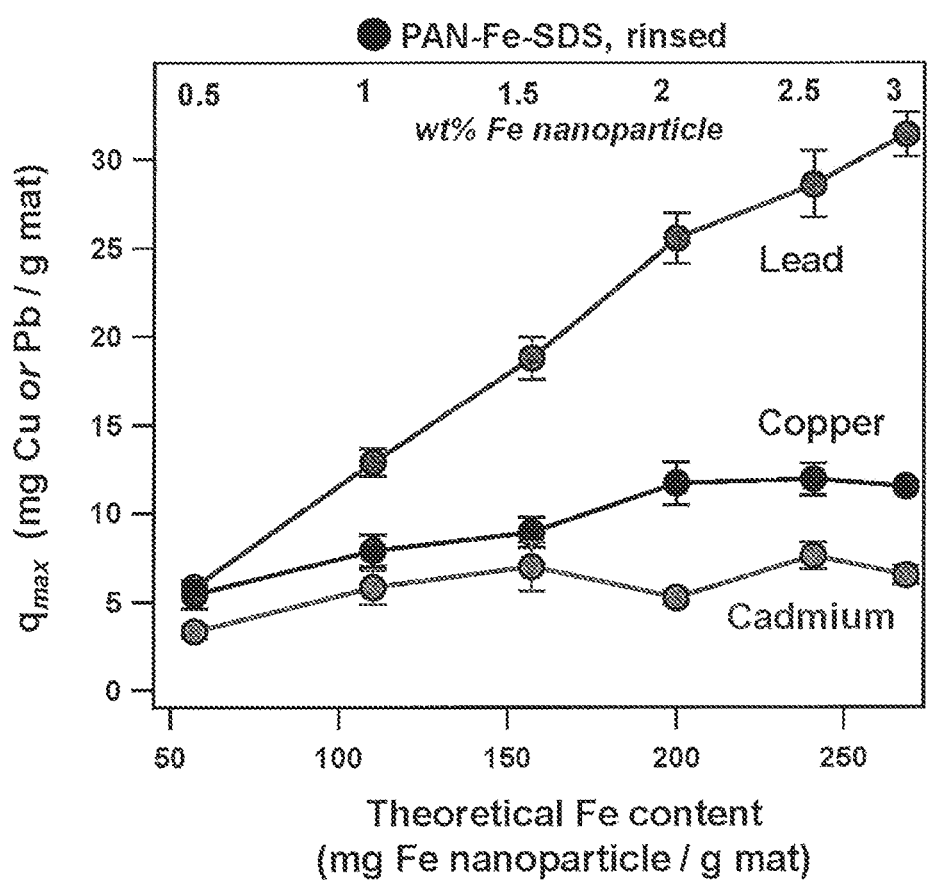
FIG. 70 illustrates a comparison between trends in mat-normalized maximum capacities for Pb, Cu, and Cd with rinsed PAN-Fe-SDS composites, across theoretical Fe content (as mg Fe np/g mat). Notably, Pb uptake continues to increase with increasing Fe nanoparticle loading (due to co-precipitation of lead oxide), while Cu uptake plateaus above 2 wt % Fe nanoparticle loading and minimal differences in Cd uptake are observed across Fe nanoparticle loadings.

The monotonic increase in Pb capacity as a function of iron loading is noteworthy relative to the trends observed for Cu uptake capacity, which plateaued at nanoparticle loadings ≥2 wt % in rinsed PAN-Fe-SDS composites, and for Cd capacity, which is comparable across rinsed PAN-Fe-SDS composites containing nanoparticle loadings ≥1 wt %. This comparison is depicted in FIG. 70, in which mat-normalized capacities of rinsed PAN-Fe-SDS composites for Cu, Pb, and Cd are plotted against composite nanoparticle loading (as mg Fe nanoparticle/g mat). We attribute the different trends for Cu, Cd, and Pb uptake as a function of iron content to the different mechanisms likely responsible for their removal. While surface complexation of Pb may also occur, the increasing Fe nanoparticle loading at the nanofiber surfaces drives concurrent surface precipitation of Pb, enabling additional removal with increasing Fe nanoparticle loading. In contrast, the number of available Fe nanoparticle and C≡N binding sites limit Cu and Cd removal, respectively, throughout the composite (e.g., both within and at the surface of nanofibers).

Assessing Utilization of Fe Nanoparticles in Composites

Figure 71:
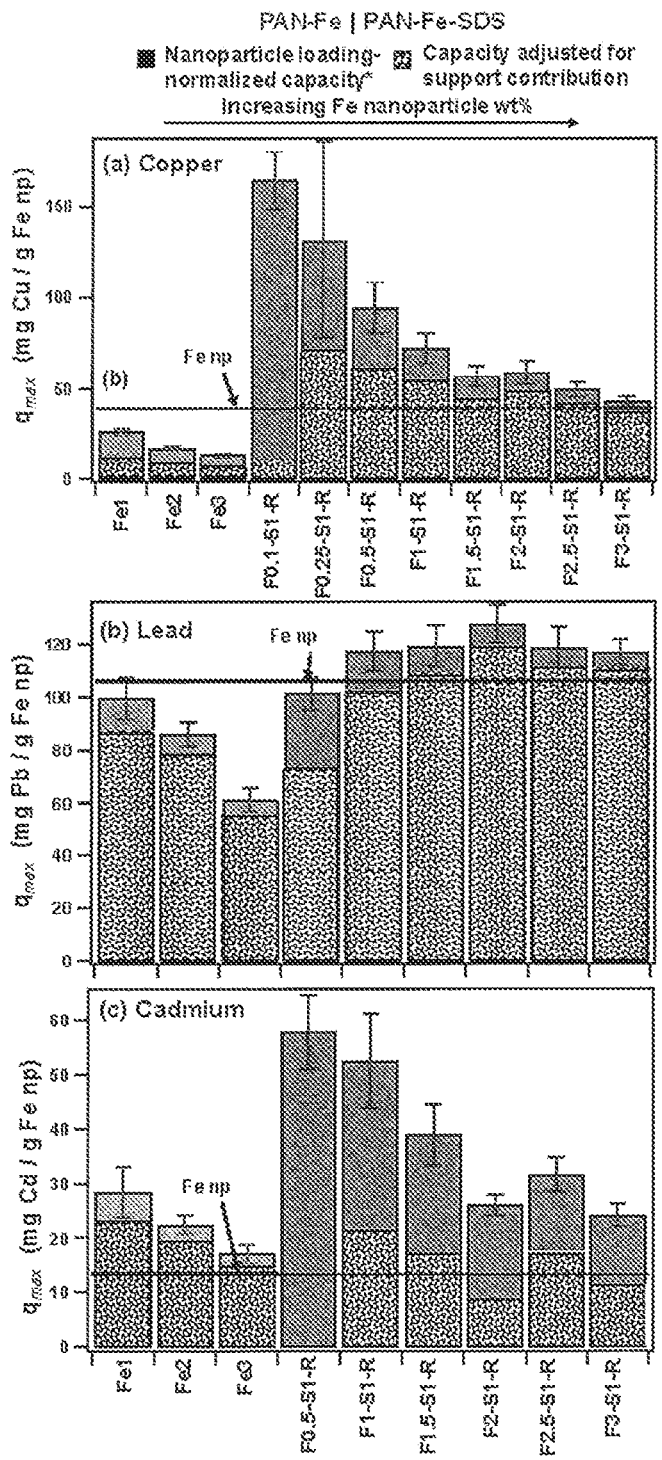
FIGS. 71A-71C illustrate solid gray (PAN-Fe) and solid green (PAN-Fe-SDS) bars show capacities normalized to Fe nanoparticle loading for (a) Cu, as mg Cu/g Fe np; (b) Pb, as mg Pb/g Fe np; and (c) Cd, as mg Cd/g Fe np. Dotted inset bars show nanoparticle loading normalized capacities after adjustment for the contribution of the polymer support.
*Nanoparticle loading-normalized capacities do not represent true capacities, as they do not account for the contribution of the polymer support.

To better understand the activity of Fe nanoparticles embedded within the composites, relative to their unsupported analogs, the maximum capacities of both PAN-Fe and rinsed PAN-Fe-SDS composites (e.g., values shown in FIGS. 69A-69C) were normalized to theoretical Fe nanoparticle loading in each material. These normalized maximum capacities (with units of mg Cu, Pb, or Cd per g Fe np) are shown for composites relative to the capacity of freely dispersed Fe nanoparticles (39±1.4 mg Cu/g; 106±5.8 mg Pb/g; 13.3±0.7 mg Cd/g) as filled green bars in FIGS. 71A-71C, respectively.

For Cu removal, PAN-Fe composites (i.e., Fe1, Fe2 and Fe3) exhibited nanoparticle loading-normalized capacities much lower than that of the dispersed nanoparticles, as expected due to encapsulation of Fe nanoparticles, and thus blocking of binding sites, within the PAN. However, all rinsed PAN-Fe-SDS materials appeared to exhibit Cu uptake at levels comparable to or higher than the unsupported nanoparticles. In particular, for composites with Fe nanoparticle loadings ≤0.5 wt %, nanoparticle capacity appears to be more than doubled relative to the freely dispersed particles, due to the significant contribution of the polymer support relative to the total composite capacity. Thus, all nanoparticle loading-normalized composite capacities were adjusted for the contribution of the polymer support (e.g., PAN or SDS1-R) prior to normalization to the nanoparticle loading. These adjusted capacities are shown as dotted bars in FIGS. 71A-71C.

Our data suggest a minimum loading of 0.25 wt % Fe nanoparticles in the composite is necessary to use any of the incorporated nanoparticles for Cu removal, above which the activity of the embedded nanoparticles (on a per gram nanoparticle basis) is comparable across all composites. This trend extends to composites containing 2.5 and 3 wt % Fe nanoparticles, despite their higher Fe nanoparticle loadings, yet comparable bulk mat-normalized capacities, relative to Fe2-SDS1. This suggests that any loss in available Fe nanoparticle surface area due to immobilization within the polymer composite is comparable to the loss that occurs in aqueous suspension as a result of nanoparticle aggregation. Collectively, these results indicate that the PAN-Fe-SDS composites provide a matrix in which the iron oxide nanoparticles can both be effectively contained and deployed without sacrificing nanoparticle sorbent activity.

For Pb, the removal activity of embedded nanoparticles (on a per gram nanoparticle basis) is comparable across rinsed PAN-Fe-SDS composites containing ≥1 wt % Fe nanoparticles. This is a higher threshold relative to behavior observed for utilization of Fe nanoparticle activity for Cu removal (e.g., ≥0.25 wt %). This comparison supports the hypothesis that Pb uptake is more dependent on surface-available Fe nanoparticles, whereas Cu removal occurs primarily via complexation both on Fe nanoparticles located at the surface and after transport to nanoparticles located within nanofibers.

For Cd removal, we note that the SDS1-R support contributes more than half of the total capacity for all hybrid composites. Therefore, although the Fe nanoparticles do contribute to Cd removal (and their Cd removal activity is well-utilized at loadings ≥1 wt %), we hypothesize that the Fe nanoparticles may also block polymer binding sites, thus limiting improvements in composite capacity as the loading of Fe nanoparticles is increased. We note that our observation that Fe nanoparticle activity is almost fully utilized at loadings >1 wt % suggests that inclusion of a nanoparticle with a higher affinity for binding of Cd could enhance composite performance.

Practical Performance Demonstrations

Based on both the performance metrics discussed above (e.g., near-complete utilization of embedded nanoparticle sorbent activity and high mat-normalized capacity for heavy metal targets) and qualitative material strength metrics (e.g., physically robust during application), the Fe2-SDS1-R composite was selected as the optimal material for use in practical performance demonstrations.

Kinetics

Figure 72:
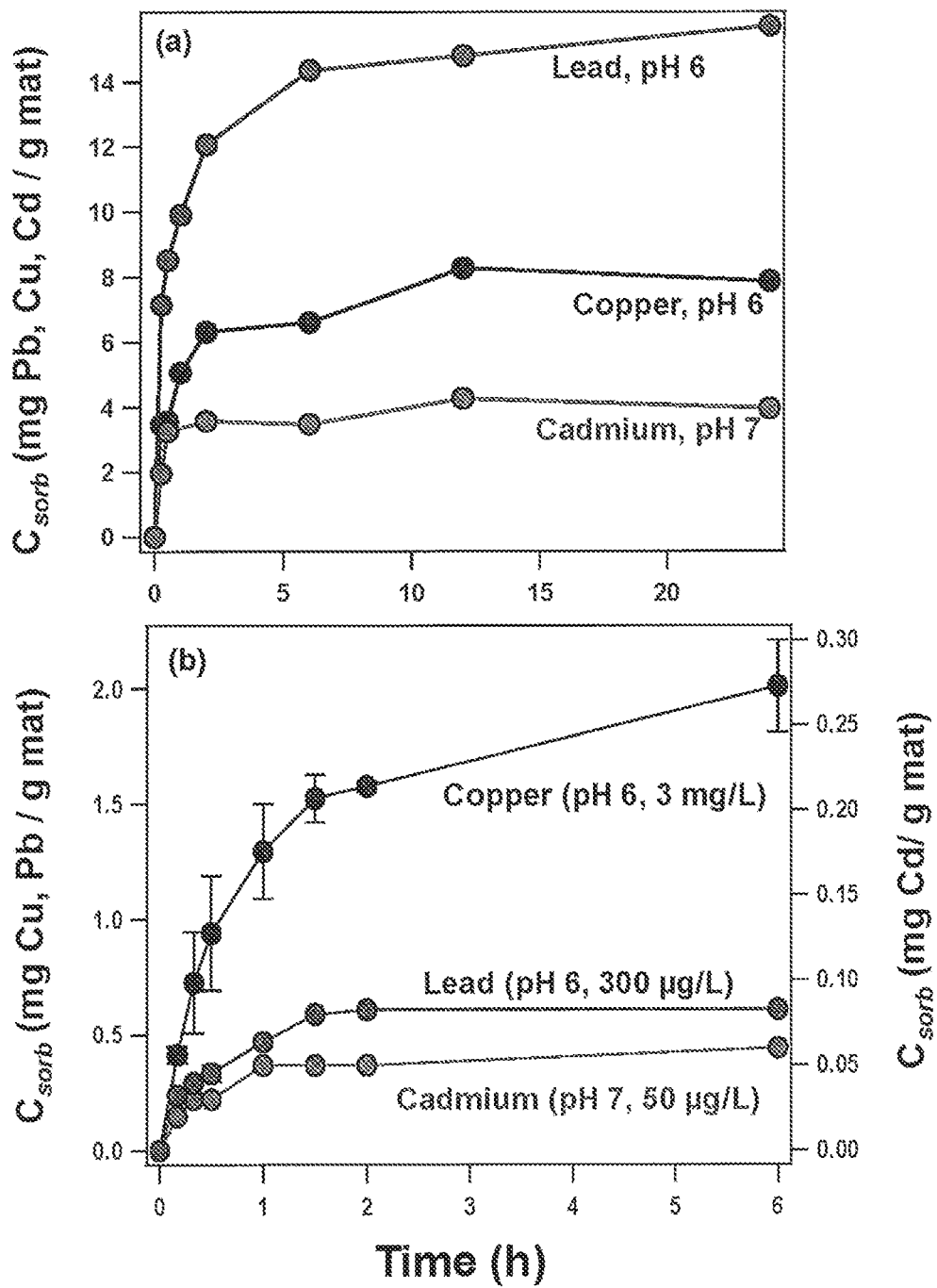
FIGS. 72A-72B illustrate kinetics of removal on rinsed Fe2-SDS1 composites for (a) excess initial concentrations (10 mg/L Pb, Cu, or Cd) or (b) concentrations relevant to drinking water treatment (3 mg/L Cu, 300 µg/L Pb, or 50 µg/L Cd). Experimental conditions: 0.5 g/L composite mass loading (one reactor per time point); 10 mM MES buffer, pH 6 (Pb, Cu) or 10 mM HEPES buffer, pH 7 (Cd).

Result of kinetics experiments are shown in FIGS. 72A-72B. At excess initial concentrations (10 mg/L) of all target metals, the majority of copper and cadmium uptake occurred (and equilibrium was reached) within the first 2 h (FIG. 72A). Two regimes of uptake were observed for lead removal—the majority of uptake occurred rapidly within the first 2 h, with slower rates of removal over the next several hours, reaching equilibrium after ~6 h. We attribute these two regimes to rapid precipitation at external surfaces of the composite, followed by sorption at less accessible, and therefore diffusion-limited, sites within the nanofibers.

At concentrations more relevant to drinking water (3 mg/L Cu, 300 μg/L Pb, and 50 μg/L Cd), the rate of copper uptake mirrored that observed at an excess concentration, while cadmium and lead uptake occurred more rapidly (with all uptake complete within 1 h). These results indicate that composites could be successfully applied for removal of heavy metal targets under conditions relevant to POU application (e.g., low initial concentrations and short contact times), although flow recirculation or application in a semi-batch/semi-continuous reactor may be necessary to provide sufficient contact time for removal of Cu.

pH Edges

Figure 73:
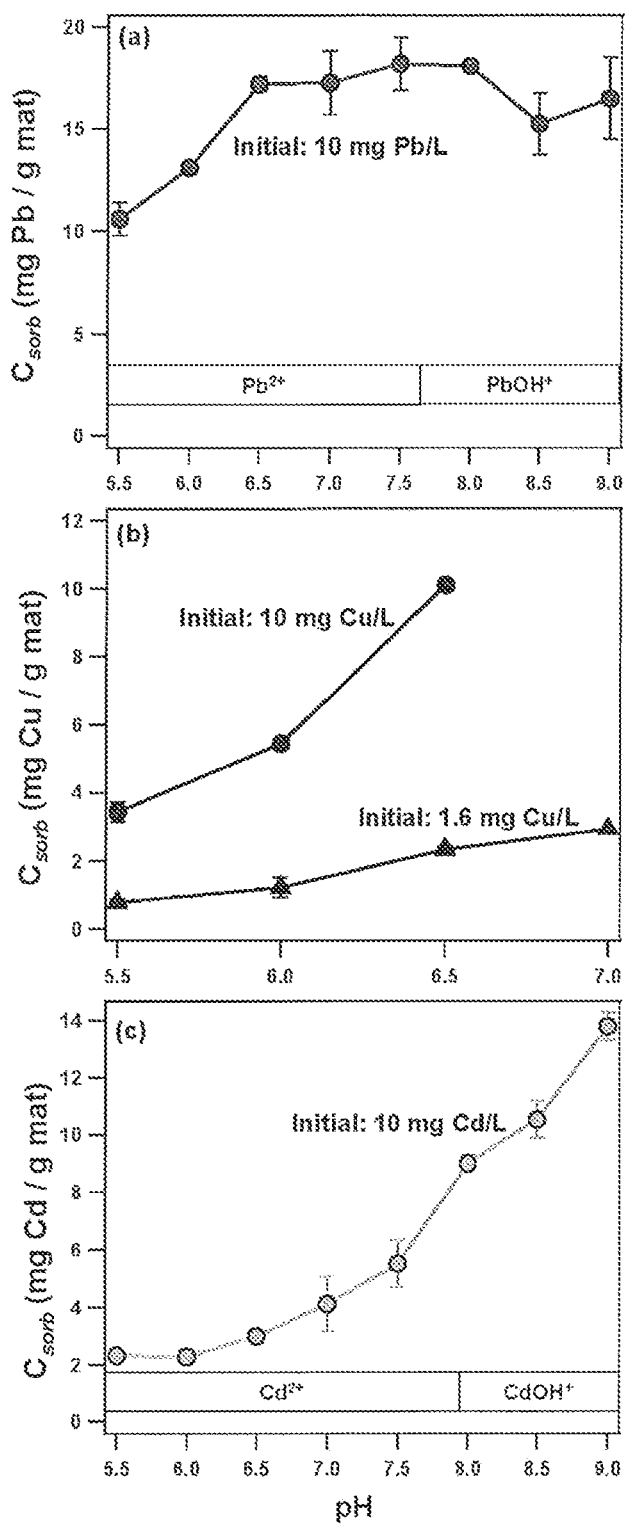
FIGS. 73A-73C illustrate pH-dependent uptake of (a) Pb, (b) Cu, and (c) Cd on rinsed Fe2-SDS1 (initial concentration 10 mg/L), with dominant species shown, as relevant. Dominant copper species is $Cu^{2+}$, and data for an initial concentration of 1.6 mg Cu/L is also shown to allow a point at pH 7 (where solubility is limited).

The results of pH edge experiments with the optimized Fe2-SDS1-R composite for an initial concentration of 10 mg/L Pb, Cu, or Cd are shown in FIGS. 73A-73C. An equivalent pH experiment with an initial concentration of 1.6 mg/L Cu (to allow extension to pH 7 within solubility limitations) is also shown in FIG. 73B. Lead uptake increased >1.5 fold as pH increased from 5.5 to 6.5, maximum removal was observed at a plateau in capacity between pH 6.5 to 8.0, and slightly lower removal was observed at pH>8.0. These trends are attributed to (i) more favorable electrostatic interactions of the positively charged $Pb^{2+}$ ion with the increasingly anionic surface of the iron oxide as pH increases; (ii) precipitation of lead (as lead oxide and/or lead hydroxycarbonate); and (iii) a shift toward the less charged $Pb(OH)^+$ species above pH ~7.5. Similarly, copper removal (at both initial concentrations) increased ~3 fold across the pH range examined. While the increase in capacity was approximately linear at the lower initial concentration, attributable to the increasingly anionic surface of the iron oxide nanoparticles, we observed a non-linear increase in uptake with increasing pH at the higher initial concentration. Thus, although $Cu^{2+}$ is expected to be the dominant species at pH≤7, we attribute this distinction to the onset of copper hydroxide precipitation in the higher concentration solution. Uptake of cadmium increased at an increasing rate for pH>6.0, even beyond pH 8.0, where the less positively charged $Cd(OH)^+$ species is expected. This is in contrast to the slight decrease in removal observed for Pb above pH 8.0, indicating that precipitation of cadmium oxide and/or hydroxide drives removal performance at higher pH.

Simulated POU Treatment of Lead Contamination

Figure 74:
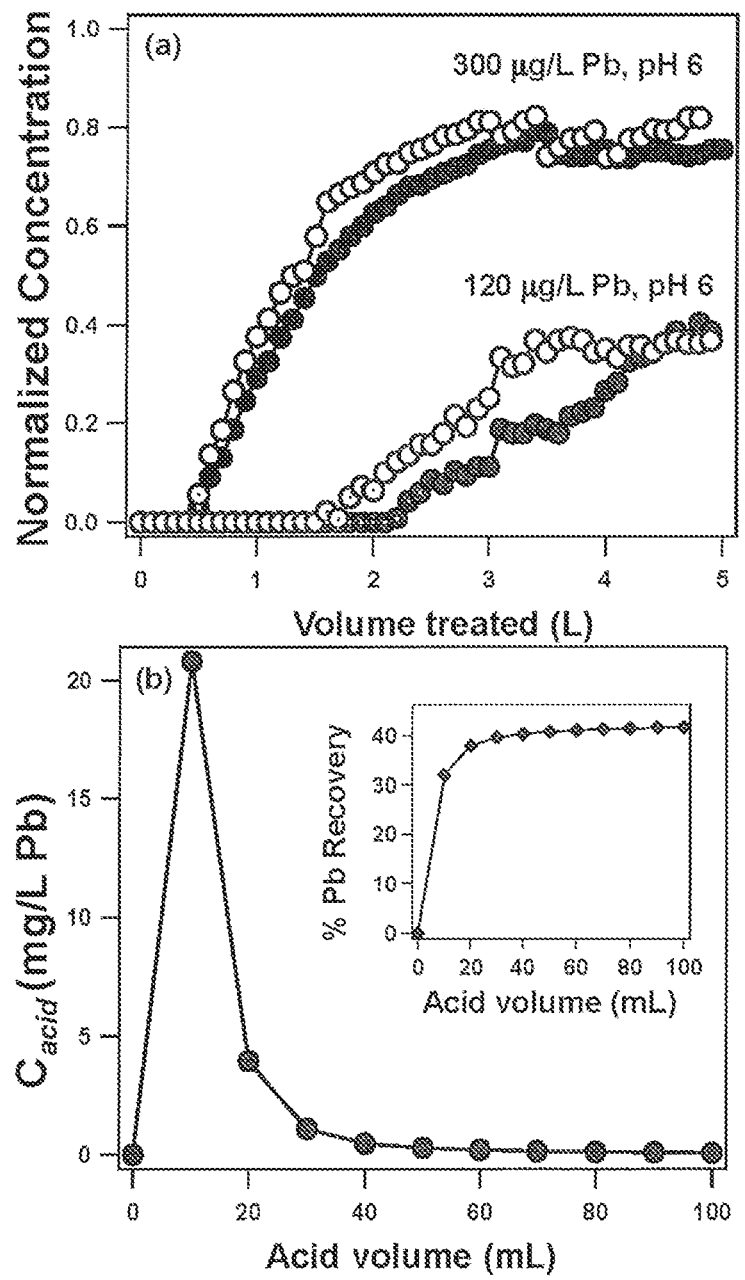
FIGS. 74A-74B illustrate (a) Treatment of influents containing Pb in simulated POU drinking water treatment, for idealized influent matrices containing 120 (green) or 300 (blue) µg/L Pb. Solid symbols show the first pass through the filter, and open symbols show the second pass after regeneration with 100 mL dilute acid (0.1 N HNO3). (b) Lead concentration during regeneration after first-pass treatment of 300 µg/L Pb influent, with inset showing the percent recovery of Pb removed by the filter. Experimental conditions: Dead-end filter holder has a 47 mm outer diameter and 40 mm inner diameter (active area 12.6 cm2). Filters are Fe2-SDS1 composites (~170 mg within the active area), supported on a 0.65 µm PVDF disc filter, and preconditioned with 0.5 L DI water. Flux is ~950 LMH (20 mL/min), and influent is buffered in 10 mM MES to pH 6.

The performance of the Fe2-SDS1 filter in simulated POU treatment of Pb was assessed in a dead-end filtration system at a flux of ~950 LMH (FIGS. 74A-74B). Fe2-SDS1 filters typically had a mass of ~170 mg within the active area (12.6 $cm^2$), and were preconditioned (e.g., rinsed) with 0.5 L of DI prior to introduction of the Pb-containing influent. Performance was first evaluated for removal of Pb from an idealized influent matrix comparable to that used in batch sorption experiments (10 mM MES adjusted to pH 6), with influent concentrations of 120 μg/L or 300 μg/L (e.g., levels 8 or 20 times the EPA action level of 15 μg/L). Filters were operated for 5 L of treatment, the filters were regenerated with dilute acid (0.1 N $HNO_3$), and then a second 5 L of spiked influent solution was treated. Breakthrough curves for these trials are shown in FIG. 74A.

Figure 75:
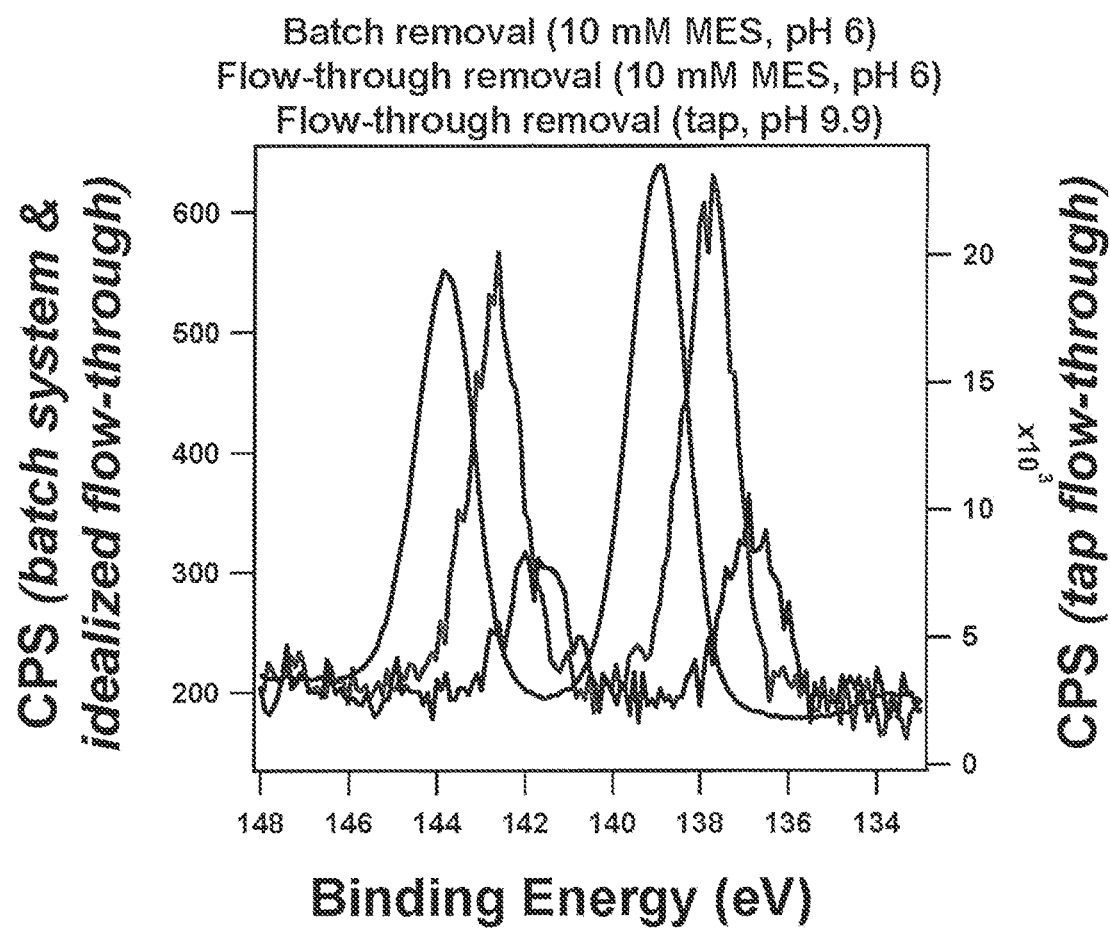
FIG. 75 illustrate XPS spectra of the Pb 4f region for Fe2-SDS1 composites after batch removal of 10 mg/L Pb (10 mM MES, pH 6; green), flow-through removal of 300 ug/L Pb (10 mM MES, pH 6; red), and flow-through removal of 300 ug/L Pb (tap water, pH 9.9; blue). The shifts seen for batch removal and flow-through removal from tap water to binding energies >137.0 eV are indicative of Pb (hydr)oxide/hydroxycarbonate precipitation.

For both influent concentrations, nearly comparable breakthrough performance was observed in the first and second passes through the filter (e.g., before and after regeneration). Effluent concentrations below the EPA action level were observed after 2.2 L and 1.8 L for the first and second treatment passes, respectively, with the 120 μg/L influent. As expected, this breakthrough volume decreased to 0.5 L for both passes with the 300 μg/L influent. Notably, nearly comparable mass loadings of Pb on the composite filter were achieved in each run, regardless of influent concentration (~3.4 mg Pb/g composite). This loading is well below the maximum theoretical loading of Pb on the composite (~25 mg/g, based on isotherm data described above), indicative of kinetically limited uptake due to the extremely short contact time within the filter holder (i.e., slower fluxes and longer contact times may allow more complete utilization of the filter). Notably, XPS analysis of the filter after treatment of the second pass of 300 µg/L influent revealed that lead was not precipitated on the surface of the filter, based on observation of the characteristic Pb 4f peak of the XPS spectra at 137.0 eV (e.g., not shifted to higher binding energies; FIG. 75). This result contrasted with precipitation observed in batch systems at pH 6, indicating that the dominant mechanism for lead removal (e.g., sorption vs. precipitation) is different at more limited contact times with low concentration solutions, relative to treatment of high concentration solutions at equilibrium conditions.

The concentration of Pb in the acid regeneration solution for the 300 µg/L system is shown in FIG. 74B, with the percent recovery of Pb (as a percentage of the total Pb removed in the first treatment pass) shown as an inset. More than 30% of the sorbed Pb was released in the first 10 mL of dilute acid, representing more than 90% of the total recovery achieved. This is encouraging, as rapid contaminant recovery within minimal volumes is critical for both disposal and/or treatment of waste regeneration solutions. Further, although regeneration of POU devices for Pb removal is currently not approved by the EPA, this result indicates that these composites could not only improve the sustainability of POU treatment devices for Pb removal, but could also be applied at larger scales, where regeneration may be requisite for economic viability.

To further evaluate the practical applicability of the Fe2-SDS1 composite, flow-through demonstrations were performed with real tap water (pH ~9.9; tap water collected from in our laboratory after treatment at the University of Iowa Water Treatment Plant), spiked with 120 or 300 µg/L Pb. For both influent concentrations, removal of Pb to <15 µg/L was observed across the entire 12 L experimental trial. As expected, based on the high pH and complex nature of the influent tap water, XPS analysis of the filter revealed precipitation of lead on the composite surface, based on a shift in the Pb 4f region of the XPS spectra to 138.4 eV (relative to 137.0 eV for Pb), indicative of lead oxide and/or hydroxycarbonate formation (FIG. 75). Although primarily attributed to precipitation, the observed removal efficiency indicates that a single user's annual drinking water supply (assuming consumption of 2 L/day, contaminated with ~300 µg/L Pb) could be supplied with only ~10 g of the composite material. This calculation underscores the potential of these composites for practical deployment of nanomaterials for effective POU drinking water treatment, within a minimal physical footprint.

Based the functionalized polymer-iron oxide nanocomposites disclosed herein, the role of a sulfonate surfactant in the single-pot synthesis of a hybrid electrospun polymer nanofiber-iron oxide nanoparticle composite for lead, copper, and cadmium removal is evaluated. We demonstrated that the surfactant, sodium dodecyl sulfate (SDS), which could be removed from the final composite by rinsing with water, played several key roles in composite fabrication. SDS facilitated electrospinning of precursor solutions containing iron oxide nanoparticles, thus improving nanofiber uniformity (e.g., minimizing beading), and improving the mechanical stability of the final composite, particularly at high nanoparticle loadings. Further, SDS acted as both (i) a removable porogen, enhancing composite surface area after its removal from the composite matrix, and (ii) as an "agent" for surface segregation of iron oxide nanoparticles, enhancing the iron concentration at the nanofiber surfaces relative to composites containing only nanoparticles, and improving solution-phase accessibility of embedded nanoparticles.

Synergies of including both SDS and iron oxide nanoparticles in the electrospinning precursor also influenced composite performance as a heavy metal sorbent. Rinsed hybrid composites exhibited significantly higher removal capacities for lead and copper removal, relative to composites containing only embedded nanoparticles. Above a minimum nanoparticle loading threshold in the rinsed hybrid composites (0.25-1 wt %, depending on the heavy metal target), nanoparticles exhibited comparable activity to freely dispersed nanoparticles for lead, copper, and cadmium removal. Further, we demonstrated that above a maximum nanoparticle loading threshold, aggregation of nanoparticles within the polymer matrix likely limits further improvements in composite performance for targets removed primarily by complexation at the nanoparticle surfaces (e.g., copper). These results confirm the generalizability of this surfactant-assisted approach to composite fabrication, with the use of a removable surfactant facilitating extension to other nanomaterial types (e.g., carbon nanotubes, noble metal nanoparticle catalysts) and applications.

An optimized composite (7 wt % polyacrylonitrile, 2 wt % Fe nanoparticles, 1 wt % SDS) was selected on the basis of its durability, high capacity, and utilization of embedded nanoparticle reactivity. Importantly, using the optimized composite, lead removal in batch systems was extended to performance demonstrations in flow-through systems representative of POU drinking water treatment in both idealized and real tap water matrices. We demonstrated the effective regeneration of composite filters with minimal volumes of dilute acid. Further, we established that an individual user's annual drinking water supply could be treated with ~10 g of material (assuming tap water contaminated with ~300 µg/L Pb). The small physical footprint required for treatment of contaminated water, and the rapid recovery of retained Pb, underscore the promise of these composites for deployment of nanomaterials in sustainable, effective drinking water treatment.

Faced with a dwindling supply of pristine drinking water, next-generation drinking water treatment technologies must be developed to facilitate the safe and efficient use of available, albeit compromised, drinking water sources. Further, point of use (POU) treatment systems are increasingly necessary to protect decentralized consumers (e.g., rural Americans reliant on private drinking water wells), as well as centralized users (e.g., urban Americans reliant on an aging, corroding drinking water distribution system). Nanomaterials are ideal candidates for application in such next-generation systems, due to their small sizes and associated high reactivity. We hold that practical application of nanomaterials in drinking water treatment must occur within cohesive, nanostructured networks that can be applied in simple, easy-to-use systems, provide efficacious treatment at high fluxes, and maximize available reactive surface area while preventing nanomaterial release into the treated supply and natural environment. However, to the best of our knowledge, demonstrations of such materials are limited.

This work was motivated by the need for improved drinking water treatment technologies, and the gap between the potential of nanomaterials and their deployment in practical water treatment systems. We believe that electrospinning, a highly scalable fabrication technique that produces cohesive, stand-alone, non-woven nanofiber mats, can be utilized to immobilize nanomaterials while avoiding reactivity limitations due to encapsulation within the support matrix. Accordingly, this work explored the immobilization of carbon nanotubes and iron oxide nanoparticles within porous carbon and polymeric nanofiber networks, and the potential of these nanocomposites as sorbents for removal of organic micropollutants and heavy metal contamination from drinking water.

The disclosure herein presents the development of novel carbon- and polymer-based nanocomposite sorbents. Briefly, the disclosure demonstrates the fabrication of an optimized macroporous carbon nanofiber-carbon nanotube composite sorbent for removal of organic micropollutants. The disclosure further establishes the ability to synthesize, via single-pot synthesis, hybrid iron oxide-ion exchange polymeric composites for removal of metal oxyanions. The disclosure also extends the surfactant-assisted fabrication methodology to development of a porous iron oxide-polymer composite sorbent for removal of cationic heavy metals. A more detailed outline of these findings is provided below.

Collectively, the disclosure establishes new fabrication methodologies that represent a significant contribution to the development and deployment of carbon and iron oxide nanocomposite filters in drinking water treatment. Insights are developed regarding the balance between material strength and reactivity, and methods for improving solution-phase accessibility of embedded nanotubes and nanoparticles. Outcomes of this work should assist practical deployment of carbon nanotubes and iron oxide nanoparticles in next-generation POU drinking water treatment.

Further, and perhaps most importantly, results herein may guide development of a broader range of nanocomposites, and enable greater utilization of nanomaterials within safe, self-contained filtration devices. Nanocomposites could incorporate metal-oxide and noble metal catalysts for energy generation/storage, nano-alumina for fluoride removal, nano-silver for antimicrobial applications, or nano-titanium dioxide for photocatalysis of organic micropollutants. Accordingly, the materials developed herein serve as a basis for next-generation POU treatment technologies that will enable consumption of compromised drinking water sources, while protecting the health of drinking water consumers. There are many potential avenues for further developments that stem from this work, some of which are discussed in greater detail below.

CNF-CNT Composite for Removal of Organic Micropollutants

An electrospun carbon nanofiber-carbon nanotube composite sorbent for removal of organic micropollutants in drinking water, achieving an optimal balance between sorption capacity and material strength is disclosed. Embedded multi-walled CNTs both improved material strength and imparted sorption capacity, while inclusion of a moderate degree of macroporosity (produced via sublimation of the volatile organic, phthalic acid) both improved material flexibility and promoted solution-phase access to embedded CNTs. We found that although unmodified CNFs exhibited negligible sorption capacity for two representative organic micropollutants, atrazine and sulfamethoxazole, composite sorption capacity improved with higher CNT loadings and a greater degree of macroporosity. However, the material with the highest degree of macroporosity (and thus the highest sorption capacity) also exhibited the lowest material strength, limiting its practical applicability in a treatment system. These findings guided selection of an optimized material containing 2 wt % CNTs and 2.4 wt % phthalic acid, which represented a compromise between material strength and reactivity.

Further, we observed distinct behavior of phthalic acid in composites with and without incorporated CNTs, indicating that specific interactions between CNTs and phthalic acid influenced generation of macroporosity. This phenomenon merits further examination, and could be utilized to guide fabrication of macroporous carbon composites that contain active nanomaterials other than CNTs.

Other key outcomes relate to practical demonstrations of CNF-CNT filters, and may drive future development and application of such nanocomposite technologies. First, the optimized composite exhibited surface area-normalized capacities for atrazine and sulfamethoxazole that were comparable to a commercially available granular activated carbon. However, kinetics of uptake on the CNF-CNT composite were significantly faster than that observed for GAC, and instead more closely mirrored uptake rates observed for freely dispersed CNTs. This indicated that the CNTs, as the active sorbent within the composite structure, enable composite application for rapid (e.g., high flux) drinking water treatment. Further, application of the optimized composite in a flow-through system representative of POU drinking water treatment for removal of a suite of 10 diverse organic micropollutants revealed that CNF-CNT composites are generally most effective towards hydrophobic species, or rely on specific interactions with target moieties (such as heterocyclic N groups or acid/base groups) to promote uptake. Removal trends reflected those observed for micropollutant removal in CNT dispersions, even in the presence of interfering co-solutes (e.g., bicarbonate), implying that tailoring CNT surface functionality could yield improvements in the ability of the composite to target specific compounds.

Functionalized Polymer-Iron Oxide Composite for Metal Oxyanion Removal

Single-pot electrospinning techniques developed to fabricate a polymeric iron oxide-ion exchange nanofiber composite for removal of heavy metal oxyanion contamination. The hybrid composites contained both amorphous iron oxide nanoparticles (ferrihydrite; Fh) and a quaternary ammonium surfactant (QAS), which were added to the electrospinning precursor solution. The iron oxide and ion exchange sites on the hybrid composite were selective for arsenate and chromate removal, respectively, in both equilibrium (e.g., batch) and dynamic (e.g., flow-through) systems.

We discovered that the molecular structure of the quaternary ammonium surfactant affected its retention within the polyacrylonitrile nanofiber matrix, with improved retention of tetrabutylammonium bromide (TBAB), which has multiple, short hydrocarbon tails relative to cetyltrimethylammonium bromide (CTAB), which has a single, long hydrocarbon tail. The optimized composite (polyacrylonitrile 7 wt %, TBAB 1 wt %) exhibited excellent retention of the surfactant within the polymer matrix. This represents a novel method for fabrication of ion exchange fibers, requiring significantly less material inputs and processing relative to conventional methods of polymer surface functionalization.

Further, we observed interesting synergies between the surfactant and the embedded iron oxide nanoparticles. First, relative to materials containing only the embedded iron oxide, inclusion of both the quaternary ammonium surfactant and the iron oxide nanoparticles in the electrospinning precursor solution both improved solution phase accessibility of the iron oxide and yielded enrichment of iron oxide nanoparticles at nanofiber surfaces, relative to composites containing only the nanoparticles. Additionally, the optimized composite containing both quaternary ammonium functional groups and embedded iron oxide nanoparticles (polyacrylonitrile 7 wt %, TBAB 1 wt %, iron oxide nanoparticles 3 wt %) exhibited improved arsenate capacity relative to composites containing only the iron oxide. We posit that the cationic quaternary ammonium groups promoted transport of arsenate ions to the iron oxide surfaces at which removal occurred.

Notably, the arsenate capacity of hybrid composites, when normalized to the nanoparticle content of the material, was comparable to the capacity of unsupported (freely dispersed) iron oxide nanoparticles. This result highlights the unique potential of these materials, suggesting that the inclusion of surfactants in electrospun composites can facilitate deployment of immobilized nanoparticles with minimal losses in nanoparticle reactivity. Additionally, we discovered that inclusion of iron oxide nanoparticles in the hybrid polymer-Fh-QAS matrix dampened the inhibitory effect of ionic co-solutes, relative to the polymer-QAS material, both in batch and flow-through systems. Based on batch uptake studies in the presence of interfering co-solutes, we propose that application of the composite in a semi-batch/semi-continuous flow reactor could help to further limit matrix interferences that were observed in kinetically limited regimes for influents with high ionic strength.

The material previously disclosed represents a starting point for development of a suite of comparable nanoparticle-QAS hybrid composites for a range of applications. These included removal/recovery of nutrients (i.e., nitrate and phosphate), inactivation and removal of bacteria and viruses with a nano-silver/QAS composite (in addition to silver, QAS are inherently biocidal), or removal of fluoride with a nano-alumina/QAS composite (activated alumina is commonly used for fluoride removal).

Polymer-Iron Oxide Composite for Treatment of Cationic Heavy Metal Contamination In accordance with an exemplary embodiment, the fabrication methodology and the utility of the anionic surfactant, sodium dodecyl sulfate (SDS), in fabrication of polyacrylonitrile (PAN)-iron oxide nanoparticle composites for lead, copper, and cadmium removal. We discovered that SDS (and synergies between SDS and iron oxide nanoparticles) played several key roles in composite fabrication. SDS acted as a removable porogen, enhancing composite surface area after removal from the composite via rinsing with water. Inclusion of SDS in the electrospinning precursor solution also facilitated electrospinning of solutions containing high concentrations of iron oxide nanoparticles, presumably due to improved dispersion of nanoparticles throughout the precursor solution. Finally, SDS acted as an "agent" for surface-segregation of iron oxide nanoparticles, enhancing the concentration of iron at the nanofiber surfaces relative to composites containing only the iron oxide nanoparticles. This result supported the novel surfactant-assisted surface enrichment of nanoparticles during single-pot syntheses of electrospun nanofiber composites.

Beyond the effect of SDS on material characteristics, we systematically evaluated the influence of SDS and commercially available iron oxide nanoparticle loadings on material performance for heavy metal removal, in terms of composite capacity and the degree of accessibility of nanoparticle reactive surface area. Composite materials that contained SDS in the precursor solution were rinsed to remove the surfactant prior to performance demonstrations.

Performance evaluations for copper and lead removal yielded several notable results. First, inclusion of SDS in the precursor solution improved nanoparticle accessibility within the nanofiber matrix, as evidenced by significantly higher copper and lead uptake capacities for PAN-Fe-SDS composites relative to PAN-Fe materials. This effect was attributed to (i) improved nanoparticle dispersion in the polymer matrix, which enhanced the amount of available iron oxide surfaces for metal uptake; (ii) SDS-promoted surface-segregation of the iron oxide nanoparticles; and (iii) porosity generated via SDS removal, all of which improved solution-phase accessibility of the nanoparticles. Second, we observed diminishing improvements in copper and lead uptake capacities for PAN-Fe-SDS composites with nanoparticle loadings >2 wt %, indicating that at higher nanoparticle loadings, aggregation within the polymer matrix may limit further improvements in composite performance. Additionally, we discovered that upon inclusion of SDS, embedded nanoparticles in composites containing >0.5 wt % nanoparticle loadings exhibited comparable reactivity to unsupported (freely dispersed) nanoparticles across multiple targets (e.g., copper and lead). This was a notable result, and demonstrated that a removable surfactant could assist in the fabrication of composites that both immobilize nanoparticles and allow better utilization of their reactive surfaces and associated uptake capacities. The optimized composite (PAN 7 wt %, iron oxide nanoparticles 2 wt %, SDS 1 wt %) was selected as a balance between utilization of embedded nanoparticle capacity, and bulk composite capacity for copper and lead removal.

Further, we demonstrated application of the optimized composite in a flow-through system for lead removal from both idealized (e.g., MES-buffered, no interfering co-solutes) and complex (e.g., real tap water) matrices. Notably, acid regeneration of the composite (with 0.1 N $HNO_3$) yielded ~40% recovery of retained Pb, with >99% of recovery occurring within the first 100 mL of regeneration solution. Comparable treatment performance was observed during application after regeneration. The rapid recovery of retained Pb is notable, as it facilitates both composite recovery and disposal/treatment of regeneration solutions. Further, based on performance demonstrations that utilized a minimal amount of material (~170 mg) at a high flux (~950 LMH) in real tap water from the University of Iowa, ~10 g of the nanofiber composite would be required for treatment of a single users' annual supply of drinking water (assuming consumption of 2 L/day, contaminated with ~300 ug/L Pb). In combination, these results highlight the unique potential of these composites in enabling deployment of nanomaterials for sustainable, effective drinking water treatment at a range of scales.

Development of Functionalized CNF-CNT Composites

The CNF-CNT composite developed in this study contained non-functionalized CNTs, and exhibited performance trends that echoed removal performance of those CNTs (e.g., the composite was most effective for removal of more hydrophobic species). The CNF-CNT composite could be improved by modifying the composite surface to target removal of more polar micropollutants. Methods for CNT surface functionalization are well-established, and the potential for various CNT surface functionalities (e.g., nitrogen- or oxygen-containing groups) in improving removal of specific pollutants has been extensively evaluated. However, the aggressive chemical conditions (i.e., elevated temperatures, highly acidic solutions) necessary for CNT functionalization could not be applied for functionalization of CNF-CNT composites, as material structural integrity would be sacrificed.

Given that performance of the CNF-CNT composite reflected performance of the embedded CNTs, the inclusion of CNTs with specific surface functionalities (e.g., amine, carboxyl) in the electrospinning precursor solution could yield composites that retain the behavior of those functionalized CNTs. Through preliminary work not included herein, we evaluated the inclusion of CNTs with surface oxygen functional groups (introduced via aqueous phase ozonation of the non-functionalized CNTs utilized). We observed that inclusion of the ozonated CNTs yielded CNFs that were significantly weaker, due to a significantly higher degree of macroporosity. While we hypothesize that loss of surface oxygen groups from the CNT surfaces during carbonization contributed to macroporosity generation, this point is worthy of systematic investigation.

The inclusion of CNTs with different types of oxygen- and nitrogen-containing functional groups and the retention of those functional groups during CNF fabrication would ideally be investigated via energy dispersive x-ray spectroscopy (EDX) and X-ray photoelectron spectroscopy (XPS) analyses of CNTs before and after thermal processing steps identical to those used for CNF fabrication. CNTs that are able to retain their surface functionalities during thermal processing should be incorporated in CNF-CNT composites, with the use of EDX to probe material functionalization (XPS would be less useful for CNF-CNT composites, as CNTs are primarily embedded within nanofibers, thus limiting the contribution of their functional groups to the surface composition of the CNF-CNT composite).

Further, based on the enhanced macroporosity observed for CNF-CNT composites developed using the aforementioned ozonated CNTs, lower carbonization (pyrolysis) temperatures may be useful to achieve a balance between sufficient macroporosity to allow solution-phase accessibility of embedded CNTs and maintaining nanofiber integrity to produce a mechanically stable CNF-CNT composite. This effect may also extend to CNTs with nitrogen-containing surface functionalities.

Of course, beyond effects on material characteristics, both the inclusion of functionalized CNTs in CNF-CNT composites and potential changes to pyrolysis temperatures must be correlated with removal performance toward specific micropollutant targets, with benchmarks to the performance of non-functionalized CNT and CNF-CNT composites. For example, the use of CNTs with amine (—NH2), carboxyl (—COOH), or hydroxyl (—OH) surface functional groups may improve removal of contaminants that were poorly or moderately retained (e.g., cotinine, metoprolol, acetaminophen) through specific interactions, such as hydrogen bonding.

Deployment of CNF-CNT Composites in Energy Applications

Beyond modification of the CNF-CNT composite to improve targeted micropollutant removal, the composite is an advanced nanocarbon platform broadly relevant to energy and electrochemical applications. For example, several groups have demonstrated the utility of electrospun carbon nanofiber networks as supercapacitors, which are a promising energy storage alternative to batteries. Further, the inclusion of CNTs in the flexible nano-carbon network can improve the conductivity and specific capacitance of the material. The mechanical stability of the material developed in this study may enable practical application of such CNF-CNT composites for energy storage, which is a vital component of the transition to renewable (but intermittent) energy sources, such as wind and solar.

Further, the flexible CNF-CNT composite could be modified for application in microbial fuel cells (MFCs), which are a promising technology for recovery (and subsequent conversion to electricity) of the potential energy in wastewater. Although power generation efficiencies currently limit widespread applicability of MFCs, the development of improved anode materials could help to overcome the barrier to application. Conventional anodes, such as carbon paper, cloth, and foam, typically lack either one or more necessary characteristic, such as sufficiently high surface area, porosity, or conductivity. Manickam et al. demonstrated the improved performance of a steam-activated carbon nanofiber nonwoven, relative to carbon cloth and granular activated carbon anodes. However, they noted that material conductivity was significantly lower than that of the commercial materials, indicating that performance could be further improved by enhancing material conductivity. Although the inclusion of CNTs in the composite material could inhibit bacterial growth, given the known antimicrobial properties of CNTs, 62 substitution of carbon nanoparticles for CNTs could produce a flexible, highly conductive anode material that would both allow biofilm formation and yield performance improvements relative to both CNF-based and conventional carbon anodes.

Systematic Evaluation of Polymer- and Nanoparticle-Surfactant Interactions in Hybrid Polymeric Composites Based on the electrospinning knowledge established through development of the CNF-CNT composite, the disclosure previously focused on a polyacrylonitrile support. However, extension of hybrid polyacrylonitrile-surfactant fabrication recipes to other polymers could yield improved understanding of the role of the polymer component in the hybrid system. For example, electrospinning of quaternary ammonium surfactants in both hydrophilic polymers (e.g., poly(vinyl alcohol) or nylon 6,6) and hydrophobic polymers (e.g., poly(methyl methacrylate), polyvinylidine fluoride, or polystyrene) could help to elucidate the role of the polymer support characteristics in retention of the quaternary ammonium surfactant in the polymer matrix. For example, surfactants may exhibit improved surface segregation within hydrophobic polymers due to exclusion of the charged surfactant heads from within the polymer matrix. Such an effect could lower the quaternary ammonium surfactant loading necessary to achieve a certain concentration of surface-active ion exchange sites. Alternatively, such an exclusionary effect in hydrophobic polymers could hinder retention of the surfactant within the polymer matrix. Additionally, particularly for hydrophobic polymers, the inclusion of quaternary ammonium surfactants may influence the water permeability (e.g., flux) through the membrane, which may in turn effect both surfactant retention and composite performance. Evaluation of the fundamental properties of the electrospinning precursor solutions, particularly the solution viscosity and the critical micelle concentration (CMC) of the surfactant in the polymer-solvent mixture, is essential for understanding behavior of the surfactant during electrospinning. While CMC values are typically reported for surfactants in aqueous solutions, the technique of using conductivity measurements to determine the concentration at which micelle formation occurs has been applied to surfactants in polar, non-aqueous solvents, and could be readily extended to mixtures of polymers in such non-aqueous solvents.

Similarly, within the polyacrylonitrile system, inclusion of quaternary ammonium surfactants with systematically varied carbon chain lengths and structures would provide further insights into the mechanism by which surfactant retention and surface segregation occurs. For example, use of a quaternary ammonium compound such as tetraoctylammonium bromide (which has carbon chains that are twice the length of the TBAB used in this study) could facilitate retention of higher surfactant loadings within the polymer matrix, due to enhanced entanglement with the polymer.

Likewise, evaluation of nanoparticle-surfactant interactions could yield insights into the mechanism by which surface segregation of nanoparticles occurs. Although this work focused on the use of iron oxide nanoparticles in polymeric composites, due to their relevance for heavy metal removal, examination of surfactant interactions with other types of nanomaterials (e.g., silver nanoparticles, carbon nanotubes) could facilitate extension of the composites developed herein to other applications. The influence of varying surfactant concentrations on the degree of nanoparticle dispersion in the electrospinning precursor solution solvent could be evaluated by qualitatively by transmission electron microscopy (TEM) and quantitatively by dynamic light scattering (DLS). Although these experiments could not be conducted with inclusion of the polymer, knowledge of the minimum surfactant concentration necessary for nanoparticle dispersion would provide a baseline for understanding nanoparticle dispersion in the system. Simple "settling" tests after nanoparticle sonication in solvent, solvent-surfactant, and solvent-surfactant-polymer solutions could be employed to correlate DLS measurements with behavior in the electrospinning precursor. Further, zeta potential analyses could be used to examine the effect of varied surfactant concentrations on the surface change of nanoparticles. Insights from zeta potential measurements could be correlated with XPS analysis of composite materials to better understand the influence of surfactant-nanoparticle interactions on surface segregation within the polymer matrix.

Extension of Nanoparticle-Ion Exchange Composites to Other Application Platforms Systematic evaluations of polymer-surfactant and nanoparticle-surfactant interactions will strengthen understanding of the polymeric composites previously disclosed, and may lead to variations of the material "recipes" established herein. Several suggestions for material variations, based on substitution of the QAS and/or the iron oxide nanoparticle for suitable alternatives that are relevant to specific end-applications, are presented in the sections that follow.

Nutrient Removal

First, the iron oxide-ion exchange composite could be directly applied for nutrient removal, targeting nitrate and phosphate via ion exchange and sorption, respectively. Nutrient pollution is one of the costliest and most extensive water quality challenges in the United States. Excess nitrate and phosphate loadings in surface waters can lead to eutrophication, damaging both water quality and ecosystem health. Algae in surface waters may produce toxins that can pass through treatment plants, and contaminate drinking water. Further, excess nitrate in groundwater that is used as a drinking water source is particularly dangerous for infants, as nitrate can decrease the oxygen carrying capacity of hemoglobin, which can lead to death. Advanced nutrient removal technologies are relevant both at the tap, for protection of drinking water consumers that utilize groundwater wells, and in the field, for treatment of agricultural runoff (e.g., tile drain runoff).

Ideal nutrient removal technologies must be selective, to prevent interferences from ionic co-solutes, and be easily regenerated, to promote economic viability of nutrient capture. While quaternary ammonium ion exchange resins are typically selective for perchlorate, sulfate, and arsenate over nitrate, there are several commercially available nitrate-selective ion exchange resins on the market that contain triethylamine or tributylamine functionalities. Thus, substitution of a triethylammonium or tributylammonium salt for tetrabutylammonium bromide (particularly due to the similarity in structure) could effectively transform the composite to a nitrate-selective ion exchange polymer. Likewise, phosphate removal performance could be improved by replacement of the iron oxide nanoparticles with nano-hydrotalcite, a layered double hydroxide. Hydrotalcite, when intercalated with chloride, can remove phosphate via an ion exchange mechanism. Additionally, Kuzawa et al. demonstrated (i) that phosphate desorption and resin regeneration can be achieved with sodium hydroxide/sodium chloride and magnesium chloride solutions, respectively, and (ii) that phosphate can be recovered from the phosphate-enriched desorption solution as calcium phosphate, via addition of calcium chloride. These same principles could be applied to a nano-hydrotalcite embedded in a polymeric nanocomposite, with use of the regeneration solution to refresh both nitrate-removing and phosphate-removing sites.

Fluoride Removal

Although low concentrations of fluoride are added to drinking water in the United States to prevent tooth decay, exposure to high concentrations of fluoride can lead to dental and skeletal fluorosis. Such exposure is most common in China and India, and is typically due to consumption of groundwater containing geogenic fluoride. The removal of fluoride via ion exchange is quite challenging, due to the extremely low affinity of traditional ion exchange resins for fluoride. In contrast, fluoride removal via adsorption to activated alumina is well established, although application of activated alumina in granular form suffers from similar limitations as granular ferric hydroxide and granular activated carbon (e.g., need for large packed beds, possible media disintegration over repeated use, backwashing requirements to prevent head loss buildup). Integration of nano-alumina into the established PAN-TBAB composite (in place of the iron oxide) could enable application of nano-scale alumina in drinking water treatment, and facilitate integration of fluoride removal into a POU treatment technology (e.g., via inclusion of a nano-alumina/QAS composite layer in an in-line cartridge filter). Further, we predict that a beneficial charge effect of the positively charged quaternary ammonium groups proximate to the alumina nanoparticle surfaces will enhance fluoride removal, comparable to the observed effect for arsenate removal on embedded iron oxide nanoparticles.

Virus and Bacteria Removal

In contrast to chemical contaminants, removal of bacteria and viruses can be achieved by physical removal (e.g., size exclusion) or inactivation. Due to their small sizes, physical removal of viruses is more challenging than for bacteria, requiring smaller membrane pores and thus higher transmembrane pressures. Silver nanoparticles are commonly used in ceramic water filters, and are known to inactivate both bacteria and viruses. The antimicrobial and antiviral properties of quaternary ammonium groups are also established in the literature; indeed, the use of quaternary ammonium surfactants in this study was based on their use as surface segregating molecules in antimicrobial materials. Accordingly, fabrication of electrospun composites containing quaternary ammonium moieties and (surface segregated) silver nanoparticles is of particular interest for virus inactivation. Such composites are relevant both to drinking water treatment and to air treatment; for example, the composite could be integrated into standard facemasks for worker protection in medical or agricultural settings from aerosolized viruses (i.e., bioaerosols).

Extension of SDS-Assisted Nanoparticle-Polymer Composite to Other Application Platforms Comparable to substitution of different surfactants and nanoparticle types in hybrid nanoparticle-ion exchange composites, the SDS-assisted nanoparticle-polymer composite recipe could be extended to different nanoparticle and polymer combinations. For example, while the composite developed herein was applied for heavy metal removal, either titanium dioxide nanoparticles or carbon nanotubes could be included in composites intended for removal of organic micropollutants via advanced oxidation processes or sorption, respectively. The utility of titanium dioxide as a photocatalyst in advanced oxidation of organic micropollutants is established in the literature. Immobilization of titanium dioxide nanoparticles, which are commercially available as Aeroxide® $TiO_2$ P 25 (Evonik Industries), at the surface of polymer nanofibers would permit their utilization in a photocatalytic membrane reactor. Likewise, surface-functionalized carbon nanotubes could be included in a polymeric support either for catalytic ozonation or sorption of micropollutants. In the case of catalytic ozonation, PVDF must be used in place of polyacrylonitrile to prevent degradation of the polymer during application. While we suggested such a substitution of functionalized CNTs in carbon nanofiber composites, the use of polymer-based CNT composites could overcome material strength challenges associated with use of functionalized CNTs in CNF composites.

Finally, polymer composites with surface-active nanoparticles are relevant to environmental sensing and biomonitoring applications. For example, gold nanoparticles are established substrates for surface-enhanced Raman spectroscopy (SERS). Their incorporation at the surfaces of functionalized polymer nanofibers, in close proximity to functional groups used for sorption of target compounds (e.g., uptake of uranyl species on amidoximated PAN), could permit facile sensing of the target compounds in complex matrices, such as groundwater or urine.

Reactor Design Considerations

Reactor design is a critical consideration in real-world application of drinking water treatment materials. Bench-scale performance testing in this study focused on the use of dead-end filtration to simulate point-of-use application. However, due to the nature of electrospun materials (e.g., high flux, thicknesses on the order of microns), application in dead-end units necessitated extremely limited contact times (e.g., typically seconds or less). The flexibility and "fabric-like" nature of electrospun materials are conducive to their application in spiral-wound or cartridge filter units. Cartridge filters are commonly installed as tap in-line filters in household drinking water treatment. While application in such a unit would naturally produce longer contact times than those in dead-end filtration, the inclusion of spacers between active layers of the filter cartridge, such as 0.45 μm polyvinylidene fluoride (PVDF) membranes, could further slow flux and increase contact times, yielding enhanced contaminant removal.

Life Cycle Assessment of Composite Materials

Material development in this study focused on use of the electrospinning technique to allow simple, single-pot syntheses of nanocomposites. However, although simple one-step fabrication methods can avoid intensive inputs of time and chemicals, it is important to evaluate the sustainability of the materials developed herein through a thorough life cycle assessment (LCA). We recommend a "cradle to grave" LCA, which considers the full scope of the material lifetime, from the origin and acquisition of inputs necessary for material fabrication, through material application, to material disposal and/or recycling. We note that application of the LCA framework to engineering nanomaterials and nanocomposites may be challenging, due to incomplete knowledge in areas such as nanomaterial fate and transport in the environment and nanomaterial toxicity. However, several researchers have provided frameworks for approaching these challenges, that could be used to facilitate evaluation of nanocomposite sustainability.

Reversibility, Regeneration, and Nanomaterial Leaching from Composite Materials

For the materials developed herein, development of an LCA would necessitate the study of composite reversibility and/or regeneration, as well as potential nanomaterial leaching. While preliminary work suggested that sorption of organic micropollutants by the CNF-CNT composite was reversible in batch systems, future work should study reversibility in a kinetically limited (e.g., flow-through) setting. This could be achieved by loading the composite with target pollutants under flow conditions until breakthrough of the influent concentration is achieved, followed by passage of clean water, to determine if the pollutant is desorbed from the carbon composite. Such a study should be performed both in idealized (e.g., DI water) and complex (e.g., simulated and real tap water) matrices, to develop a thorough understanding of the mechanism(s) by which desorption occurs. In the case of polymer-iron oxide composites, reversibility could be evaluated by a similar methodology as employed for carbon materials. Regeneration should be evaluated with salt solutions and dilute acids and/or bases to achieve regeneration of both ion exchange sites and iron oxide nanoparticle sites.

Additionally, our hypothesis of nanomaterial immobilization within nanofiber networks should be verified by conducting studies to evaluate potential nanomaterial leaching from composite filters. Mass losses due to leaching from filters are too small to quantify via simplistic methods, such as comparing the pre- and post-application masses of filter materials. Thus, inductively coupled plasma mass spectrometry (ICP-MS) should be employed to either track iron (from iron oxide nanoparticles) or metal impurities (from CNTs) in the treated effluent.

Functionalized Polymer-Nano-Silver Composite Nanofibers: Anti-Viral Filtration Devices Waterborne viruses, which primarily infect humans, are frequently linked to waterborne disease outbreaks, both in the United States and globally. The most common viruses implicated in such outbreaks include adenovirus, enterovirus, hepatitis A and E, norovirus, rotavirus, and astrovirus. Exposure to viral contamination poses a marked risk to human health, as the risk of illness upon exposure is between 10 and 10,000 times greater than for an equivalent exposure to bacterial contamination. Indeed, between 1971-2002, while only 8% of documented waterborne outbreaks were associated with viral pathogens, 50% were attributed to unknown acute gastrointestinal illnesses, which are often consistent with viral etiology. For example, norovirus is the leading cause of acute gastroenteritis across the world. Although protection of drinking water sources from viral contamination is critical to protecting human health, the aging drinking water distribution system in the United States is susceptible both to pipe breakages and other pressure losses that may lead to pathogen intrusion (for example, in fecal matter from nearby, leaking sewer lines). Additionally, viruses, which are typically 0.01-0.1 µm in size, are rapidly transported in the subsurface, and are able to survive for long periods of time in aqueous environments (weeks to months), presenting a challenge to those reliant on groundwater as a drinking water source.

The use of chemical and UV disinfection for virus removal in drinking water treatment poses significant challenges. Most importantly, viruses are more resistant to both chemical and UV disinfection than bacteria. However, increased disinfectant doses may yield undesirable disinfection byproducts. Additionally, verification of UV systems for a wide range of pathogens is expensive, and thus must rely primarily on validation with model microbes (such as bacteriophages in place of human enteric viruses). Advanced membrane filtration (e.g., ultrafiltration) has been proven as an effective alternative to disinfection, although capital and operation costs may limit applicability in smaller systems. Further, we note that large scale drinking water treatment may not adequately protect municipal users from sources within the distribution system, and excludes groundwater users. While simple, filtration-based technologies (e.g., ceramic and biosand filtration) have been identified as highly relevant to sustainable POU drinking water treatment, achievable levels of virus reduction (0.5-4 log removal) may not be sufficient to adequately protect human health.

Modification of the surfaces of polymeric membranes is a promising approach to improve the biocidal and/or virucidal activity of membrane filtration systems. Such membrane modifications can be achieved by inclusion of antimicrobial nanoparticles into the polymer matrix or by chemical functionalization with antimicrobial moieties. For example, several groups have demonstrated the utility of incorporating silver nanoparticles (nano-Ag), which exhibit both wide-spectrum antimicrobial activity and low toxicity in humans, in both microporous ultrafiltration membranes and electrospun nanofiber membranes. For both microporous and electrospun materials nano-Ag composites, the primary challenges are the need to post-processing steps to load nanoparticles on the composite surface (e.g., grafting, reduction of $Ag(NO_3)$), and achieving a balance between nanoparticle availability and dissolution (i.e., between immediate and long-term effectiveness). Chemical functionalization of membranes is a promising alternative to nano-Ag for achieving long-term material effectiveness. The antibacterial activity of polymer membranes containing N-halamines, quaternized chitosan, and quaternary ammonium salts is well-established. However, fabrication of these functionalization composites often requires chemical- and energy-intensive processing of the polymer (e.g., plasma treatment, quaternization, and cross-linking), and investigations have primarily focused on removal of bacterial contamination, rather than the removal and inactivation of viruses.

Previously, we demonstrated that a quaternary ammonium surfactant (tetrabutylammonium bromide, TBAB) can be immobilized within a mechanically robust, high-flux electrospun nanofiber matrix, providing ion exchange sites on the nanofiber surface. Given the known antimicrobial activity of quaternary ammonium compounds, TBAB could also impart antiviral activity to the nanofiber composite. Further, based on the role of TBAB in promoting surface segregation of iron oxide nanoparticles within polymer nanofibers during single-pot syntheses, TBAB could be used to promote surface availability of Ag nanoparticles incorporated in the polymer composite.

Herein, based on the disclosure, we demonstrate the single-pot synthesis of electrospun polyacrylonitrile (PAN) composites containing TBAB and/or Ag nanoparticles (20 nm Ag; Nanostructured and Amorphous Materials, Inc.) intended for treatment of viral contamination in drinking water. We evaluated the influence of varied concentrations of PAN, TBAB, and Ag in the precursor solution on material characteristics, including nanofiber diameter, morphology, and surface composition. Further, we examined the influence of precursor solution composition and volume on membrane thickness. Then, we examined the influence of material characteristics on membrane performance for MS2 removal, while monitoring changes in membrane permeability during filtration experiments.

Materials and Methods

Reagents

Figure 76:
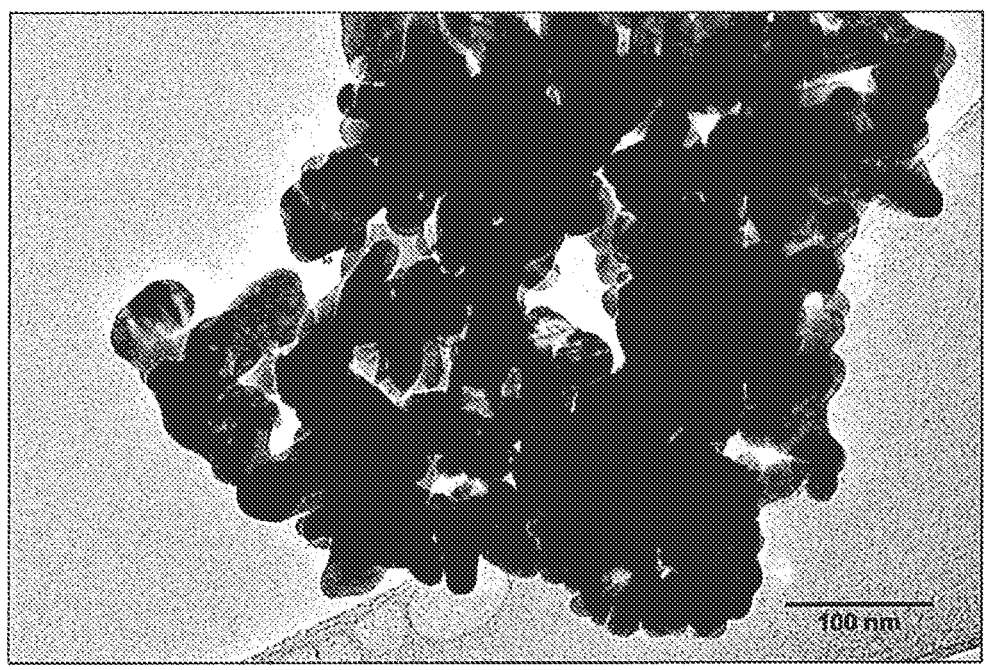
FIG. 76 illustrates a HRTEM image of Ag nanoparticles (Nanostructured & Amorphous Materials, Inc., used as received). Significant aggregation was observed, preventing evaluation of average nanoparticle size (manufacturer reported ~20 nm).
Figure 77:
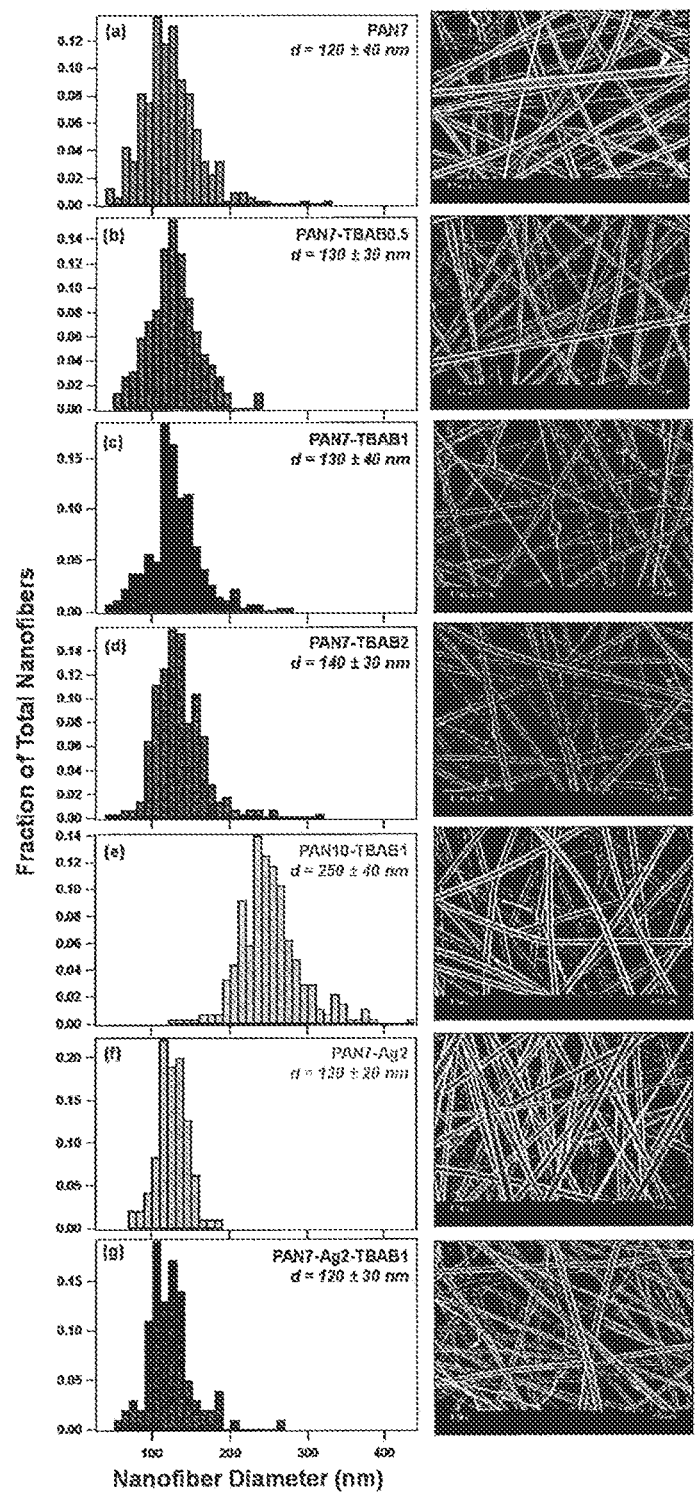
FIGS. 77A-77G illustrate nanofiber diameter histograms (developed from measurement of n>100 nanofibers) for (a) PAN7, (b) PAN7-TBAB0.5, (c) PAN7-TBAB1, (d) PAN7-TBAB2, (e) PAN10-TBAB1, (f) PAN7-Ag2, and (g) PAN7-Ag2-TBAB1 composites, with representative SEM images shown at right. Average nanofiber diameters are provided on each histogram.

All reagents were used as received. Electrospinning precursor solutions were prepared with polyacrylonitrile (PAN; MW 150,000, Aldrich), N,N-dimethylformamide (DMF; 99.85%, BDH Chemicals), and tetrabutylammonium bromide (TBAB; ≥98%, Aldrich). Silver nanoparticles (Ag np; 20 nm, 99.9%) were purchased from Nanostructured and Amorphous Materials, Inc., and were used as received (a representative TEM image is shown in FIG. 76). Descriptions of the MS2 bacteriophage strain and its preparation are provided elsewhere.

Preparation of Electrospinning Precursor Solutions

For mats containing PAN and a surfactant, PAN and TBAB were dissolved in DMF at a concentration of 7 or 10 wt % PAN and 0.5-2 wt % surfactant by mixing at 60° C. for 2 h at 1.65 g (HLC Cooling-Thermomixer MKR 13, Ditabis). For silver nanoparticle-embedded mats, Ag nanoparticles were first dispersed in DMF (at a concentration of 2 wt % relative to the total mass of the precursor solution) via ultrasonication for 5 h, after which PAN and TBAB were added to the Ag np-DMF suspension. Precursor solutions were prepared in volumes of 2, 4, or 6 mL of DMF to vary composite thickness. Hereafter, the composite mats will be referred to as 'PANx-Au-TBABz-n mL' where x, y, and z denote the PAN, Ag np, and TBAB concentrations in the sol gel, respectively, and n denotes the composite thickness, based on the volume of the precursor solution.

Electrospinning

The aforementioned sol gels were allowed to return to room temperature prior to electrospinning at a temperature and relative humidity of 28° C. and 16%, respectively, a pumping rate of 0.3 mL/h (New Era Pump Systems, Inc.), a positive 15 kV voltage applied at the needle tip (Acopian), a 9 5/16"-circumference metal drum collector (SPG Co., Ltd; Korea) coated in Al foil and rotating at 500-rpm (Dingtuo Technology) and using a 25G ½" needle located a distance of 10 cm from the collector surface. Precursor solutions were loaded into a 12 mL plastic syringe (HSW Norm-Ject). The syringe was connected to 2.0 mm ID polyethylene (PE) tubing via a PE 1/16" female luer lock fitting (NanoNC Co., Ltd). The tubing was connected to a metal nozzle adapter (NanoNC Co., Ltd) via a PE 1/16" male luer lock fitting, and a 25G ½" needle was attached to the other end of the nozzle adapter.

Nanofiber Characterization

Silver nanoparticles were examined using high resolution transmission electron microscopy (HRTEM) (JEOL JEM 2100 F with Schottky FEG Emission-Zr/W). Samples were prepared via sonication in deionized water, and a droplet was allowed to dry on a grid prior to imaging (#01824 UC-A on holey 400 mesh Cu; Ted Pella, Inc.). The morphology, average nanofiber diameter, and cross-sectional thickness of electrospun nanofiber mats were investigated using a field-emission scanning electron microscope (SEM; 54800, Hitachi) at an acceleration voltage of 1.5 kV. All samples were sputter-coated with a thin layer of gold/palladium (60:40 Au:Pd) prior to SEM imaging. Average fiber diameters were developed from measurement of >100 nanofibers in ImageJ software. Surface composition was analyzed with a custom Kratos Axis Ultra X-ray photoelectron spectroscopy (XPS) system equipped with a monochromatic Al Kα X-ray source. XPS was used to collect full spectrum survey scans, as well as to examine the Ag 3d region. An extensive description of this system can be found elsewhere.

MS2 Removal Experiments

Nanofiber materials were tested for removal of MS2 bacteriophage in a dead-end filtration cell, which has been previously described by Lu et al. Removal was tested under constant flow conditions (4 mL/min). Membrane permeability and/or membrane resistance were measured during filtration experiments, where membrane permeability is the ratio of flow rate to pressure [as mL/(min-psi)] and membrane resistance (which is representative of the membrane permeability) is calculated by Equation A.1, where ΔP is the transmembrane pressure, η is the dynamic viscosity, and J is the permeate flux.

$$R = \frac{\Delta P}{\eta J} \qquad \text{Equation A.1}$$

Nanofiber Diameter and Morphology

Representative SEM images of nanofiber composites are shown alongside nanofiber histograms in FIGS. 77A-77G. Generally, all nanofiber composites exhibited comparable nanofiber uniformity (i.e., no beading was observed) and relatively smooth nanofiber surfaces. The inclusion of TBAB at varied concentrations (0.5, 1, and 2 wt %) in composites containing 7 wt % PAN did not increase nanofiber diameter relative to unmodified 7 wt % PAN. This was consistent with previous observations of nanofiber diameter for PAN-TBAB composites previously fabricated. Inclusion of Ag nanoparticles (both with and without the inclusion of 1 wt % TBAB) also did not yield any change in average nanofiber diameter relative to unmodified PAN. We again attribute comparable nanofiber diameters across composite types to a balance between increased viscosity and conductivity with inclusion of Ag nanoparticles and TBAB. As expected based on previous reports on the effect of polymer concentration on nanofiber diameter of electrospun composites, the composite fabricated with 10 wt % PAN and 1 wt % TBAB (e.g., PAN10-TBAB1) exhibited a significant increase in nanofiber diameter relative to its PAN7-TBAB1 analog. The observed consistency in average diameter across composites containing 7 wt % PAN is useful for evaluating composite performance, as comparable nanofiber diameters (and presumably, nanofiber surface area) provide confidence that differences observed in material performance may be attributed to composite formulation, rather than surface area.

Figure 78:
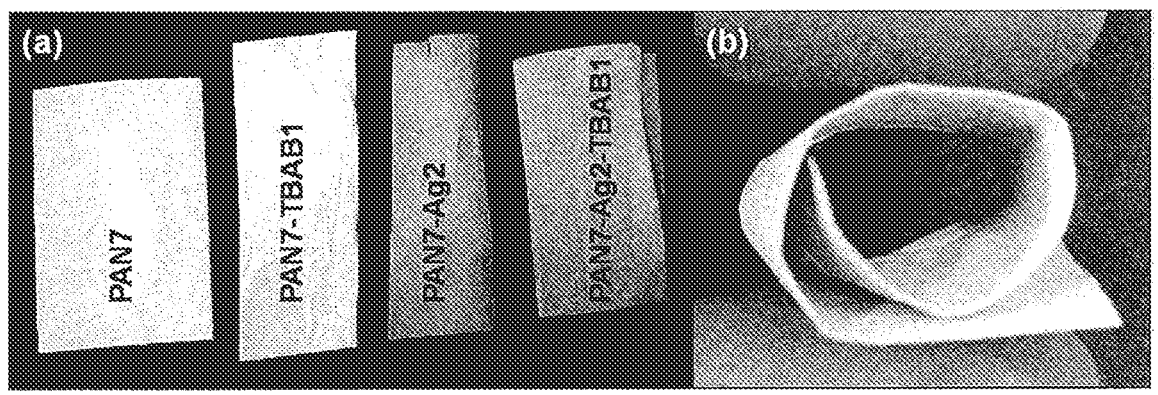
FIG. 78A-78B illustrate (a) Representative digital images of nanofiber composites, showing the white color of unmodified PAN and PAN-TBAB composites, the silver color of PAN-Ag nanoparticle composites, and the green tint of PAN-Ag nanoparticle-TBAB composites. (b) The flexible nature of the composite materials is shown by the rolled PAN7-Ag2-TBAB1 material.

Digital images of the composites in FIGS. 78A-78B show changes in color with changes to the precursor solution composition, and flexibility of the bulk-scale composites. Both unmodified PAN and PAN-TBAB composites are white, while the composite containing Ag nanoparticles is gray. With inclusion of both Ag nanoparticles and TBAB, the composite exhibits a green tint, which we attribute to the interaction of Ag nanoparticles with TBAB in the polymer precursor solution.

Composite Thickness

Composite thickness is an important consideration, particularly for material application in a flow-through system. Both the head loss through the filter and the contact time within the filter are influenced by the composite thickness, material porosity, and the packing density of the nanofibers. As these characteristics are interrelated (e.g., more densely packed nanofibers will result in smaller pores and a thinner material), composite thickness can be used as a representative feature by which to gauge their combined contribution to material performance.

Figure 79:
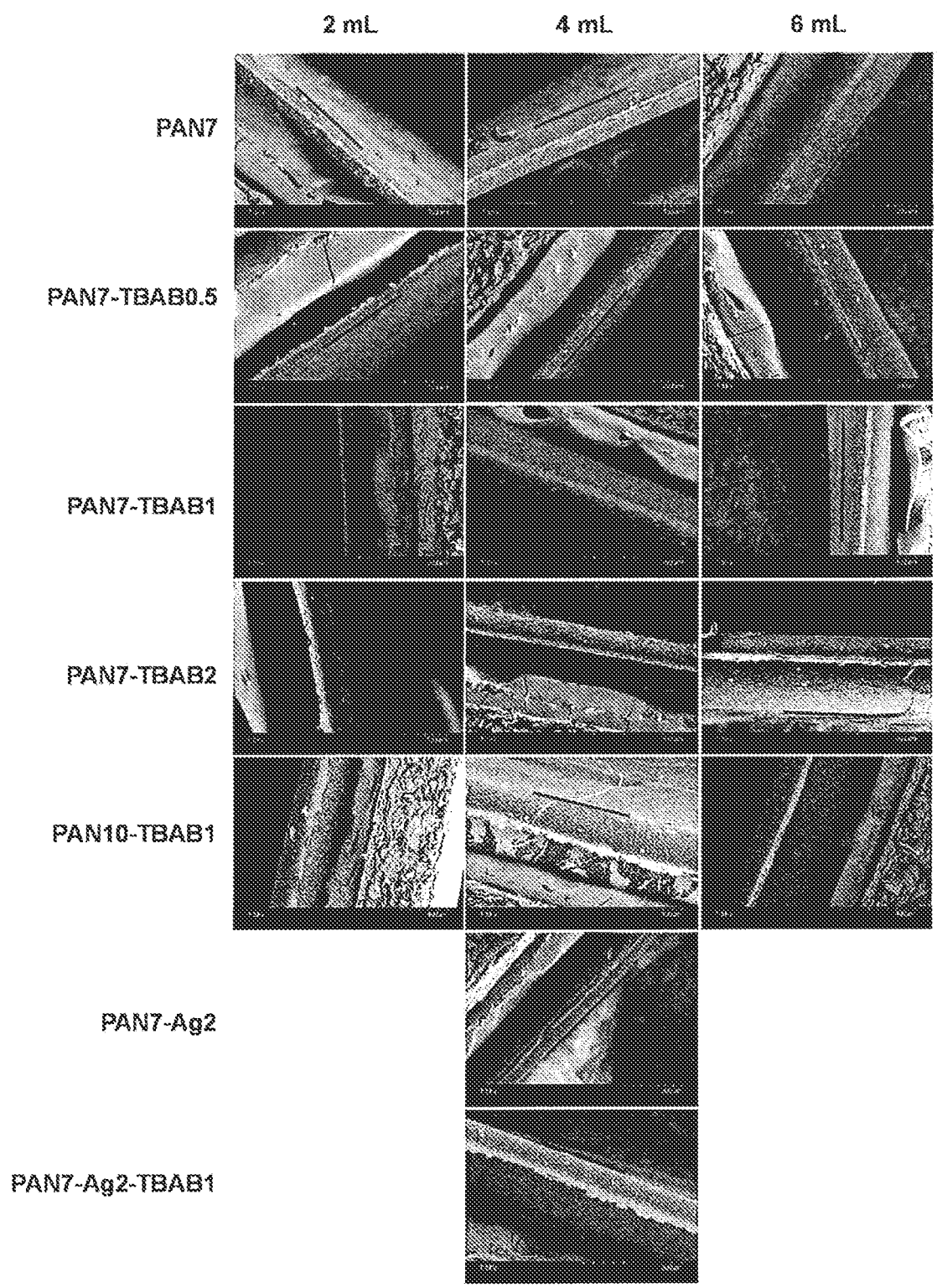
FIG. 79 are representative cross-sectional SEM images of composite materials across precursor solution types for varied precursor solution volumes (2, 4, or 6 mL). Red lines indicate the outer edges of the material thickness (the consistent defect in the middle of each cross-section is due to cutting of the material with scissors).
Figure 80:
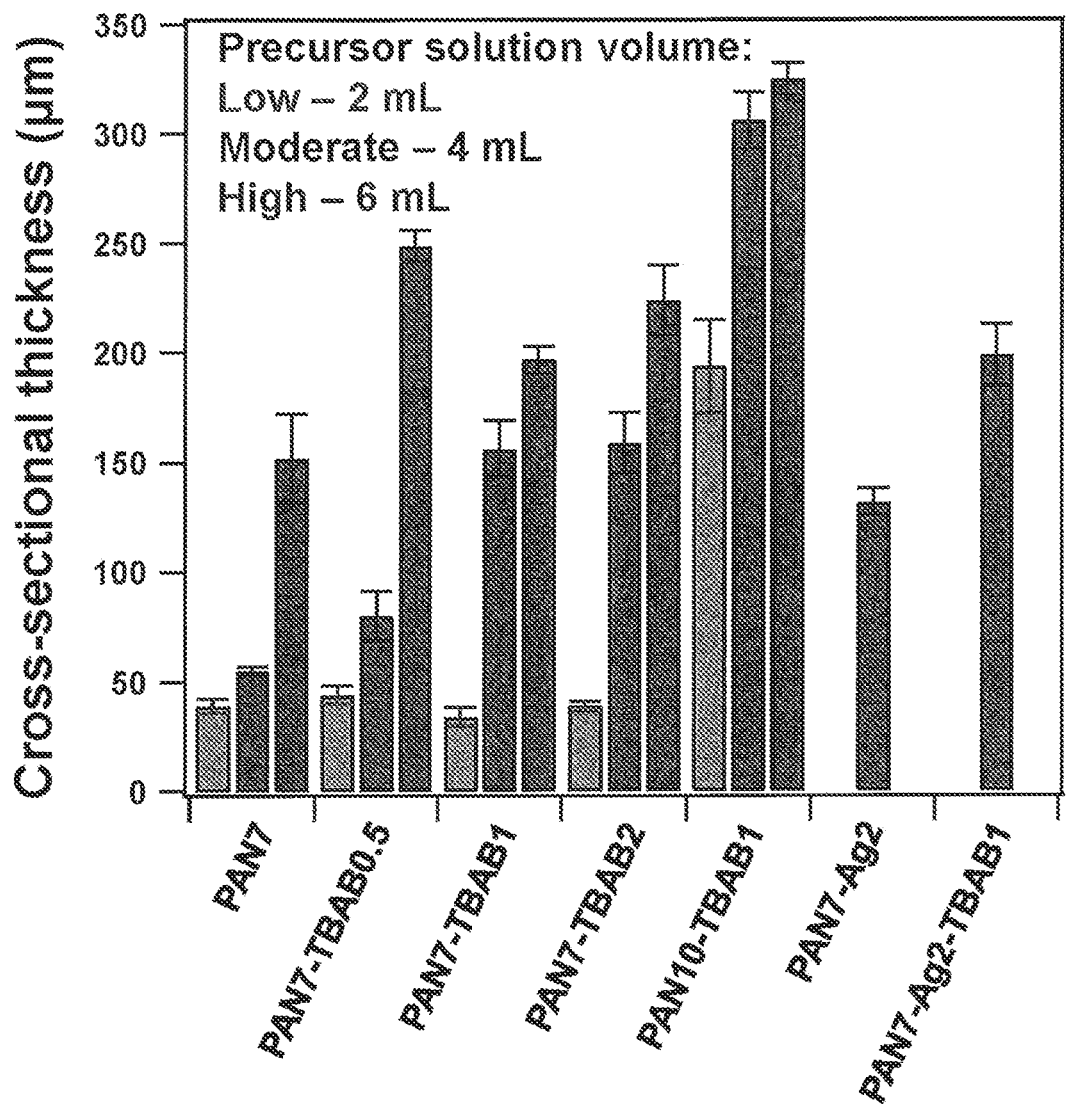
FIG. 80 are cross sectional thicknesses of composite materials, as measured from cross sectional SEM images. Thicknesses for 2 mL precursor volumes are shown in green, 4 mL precursor volumes are shown in red, and 6 mL precursor volumes are shown in blue.

Representative cross-sectional SEM images of nanofiber composites of varying thicknesses are shown in FIG. 79 (red lines denote the outer edges of the composite, for clarity), and values (from measurement of >10 positions on the material) are compiled in FIG. 80. These were obtained by varying the volume of the precursor solution used for electrospinning (i.e., low ~2 mL; moderate ~4 mL; high ~6 mL). For composites fabricated with 7 wt % PAN, composite thicknesses ranged from ~40 μm (for a 2 mL precursor volume) to ~250 μm (for a 6 mL precursor volume). Composites fabricated with 10 wt % PAN exhibited thicknesses between ~200-325 μm. We note that Ag-containing materials were only fabricated at a moderate thickness (e.g., 4 mL of precursor solution), with thicknesses of ~150 μm for PAN7-Ag2 and ~200 μm for PAN7-Ag2-TBAB 1.

We observed several notable trends in thickness across composite types. First, across composites containing 7 wt % PAN and 0.5-2 wt % TBAB, we generally observed increasing composite thickness with increasing volume of precursor solution. Additionally, composites containing TBAB were thicker than the unmodified PAN7 material for 4 and 6 mL precursor solution volumes, likely due to electrostatic repulsion between the charged quaternary ammonium groups of the TBAB molecules, although comparable thicknesses were observed for precursor solutions of 2 mL. Notably, a larger increase in composite thickness was observed upon increasing the precursor solution volume from 2 mL to 4 mL for composites containing 1 and 2 wt % TBAB, relative to both the PAN7 and PAN7-TBAB0.5 materials. This difference is attributed to the relatively higher concentration of charged quaternary ammonium groups in the precursor solution, due to inclusion of higher TBAB loadings. The quaternary ammonium groups are known to surface segregate (e.g., preferentially move to the surface of the nanofibers), and thus influence the surface charge of the nanofibers, causing a greater degree of electrostatic repulsion between nanofibers as they are deposited on the collector. This nanofiber-nanofiber repulsion likely yields more "spacing" between nanofiber layers, and thus a thicker composite. However, after electrospinning 6 mL of precursor solution, composites containing TBAB at 0.5, 1 and 2 wt % exhibited comparable thicknesses, presumably due to the "spreading" (e.g., increase in width) of the deposited material on the rotating drum collector over longer durations of electrospinning. We note, however, that the 6 mL PAN7 material is still thinner than all composites containing TBAB, indicating that although spreading of the deposited material minimizes differences across TBAB loading, it does not counteract the increase in thickness due to electrostatic repulsion between quaternary ammonium-modified nanofibers.

Larger composite thicknesses were also observed with an increase in the concentration of PAN, as the PAN10-TBAB1 composites were thicker than PAN7-TBAB1 analogs by roughly 150 μm. This is likely due to the larger nanofiber diameters of the 10 wt % PAN material. As for the PAN7-TBAB1 material, differences in thickness were again more significant upon increasing the precursor solution volume from 2 mL to 4 mL, relative to the increase from 4 mL to 6 mL.

Finally, the inclusion of Ag nanoparticles increased composite thickness, relative to unmodified PAN (e.g., PAN7-Ag2 vs. PAN7), which is attributed to interactions between the un-capped nanoparticles and the polymer, which may influence interaction of the precursor solution with the applied voltage during electrospinning. The inclusion of both Ag nanoparticles and TBAB yielded a further increase in composite thickness (e.g., PAN7-Ag2-TBAB1 vs. PAN7-Ag2), an effect that is again attributed to electrostatic repulsion between quaternary ammonium-functionalized nanofibers.

Surface Composition

Figure 81:
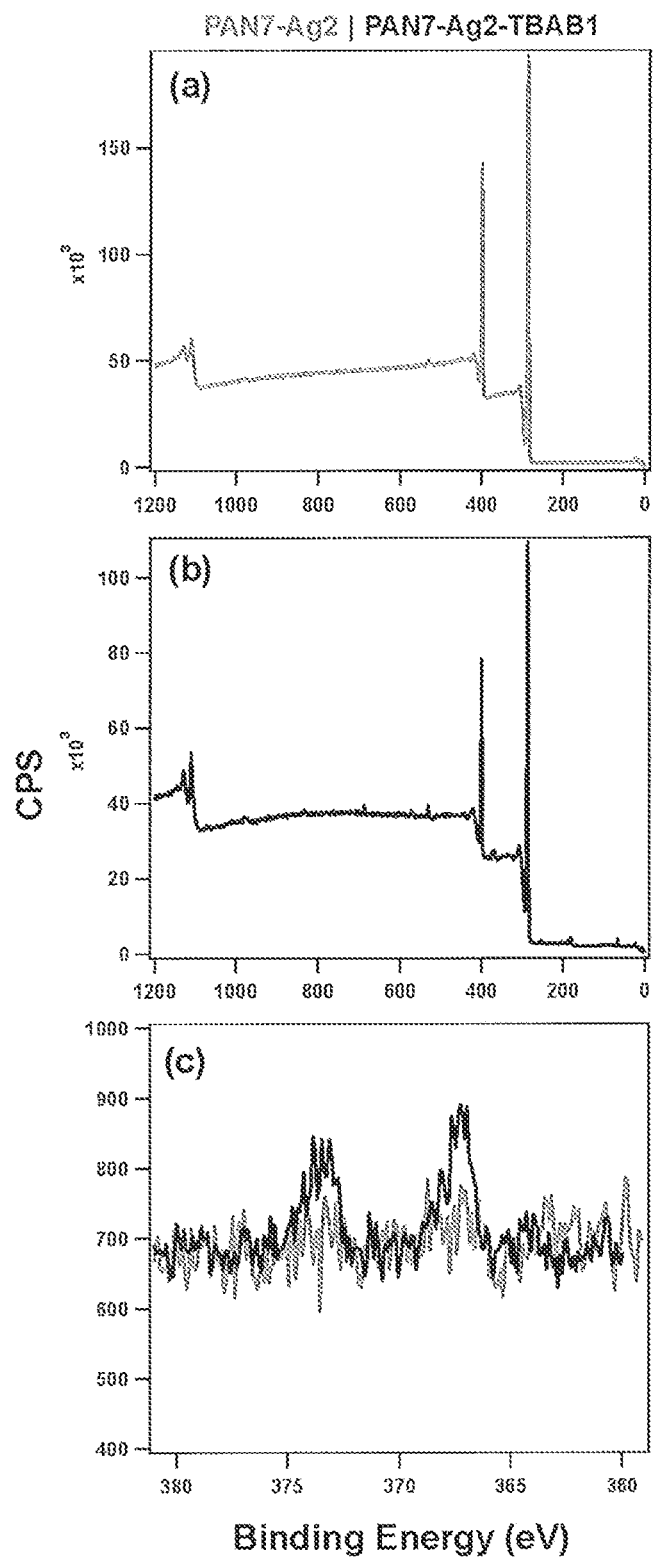
FIGS. 81A-81C are XPS survey scans for (a) PAN7-Ag2 and (b) PAN7-Ag2-TBAB1 composites, and (c) XPS spectra for both composites in the Ag 3d region, showing enhancement in Ag surface concentration due to TBAB-induced surface segregation of Ag nanoparticles.

XPS was used to examine the surface chemical composition of composites containing Ag nanoparticles. Survey scans (and associated values for surface composition) and spectra in the Ag 3d region are shown in FIGS. 81A-81C. Ag was not detected in either the survey scan or Ag 3d region of the PAN7-Ag2 composite. In contrast, a surface concentration of 0.16 at % Ag was detected in the survey scan of PAN7-Ag2-TBAB1, and the spectra in the Ag 3d region indicated that inclusion of TBAB indeed produced a significant enhancement in Ag surface concentration relative to the PAN7-Ag2 composite. This is noteworthy, as it indicates that, as demonstrated previously for composites containing iron oxide nanoparticles, TBAB can indeed be utilized to promote nanoparticle surface segregation.

MS2 Removal by TBAB-Functionalized Membranes

Effect of TBAB on Membrane Performance

Figure 82:
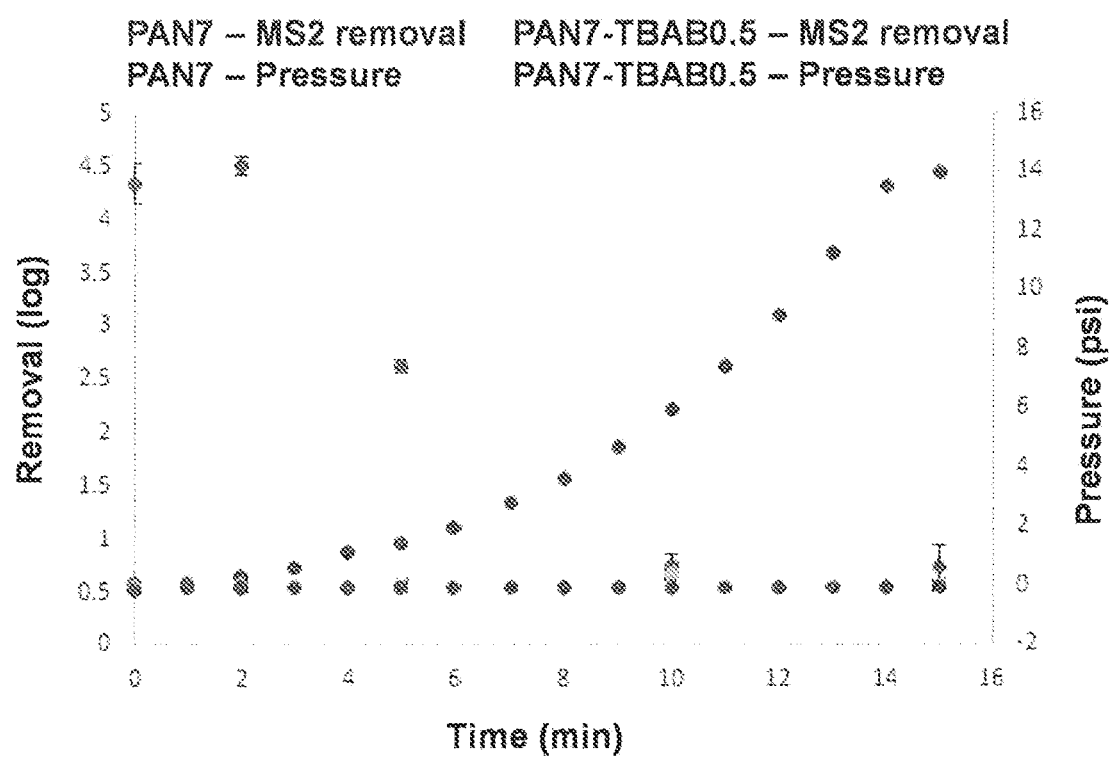
FIG. 82 illustrate MS2 removal experiments with PAN7 and PAN7-TBAB0.5 membranes (both 2 mL thickness), showing log-removal of MS2 and transmembrane pressure.

Results of MS2 removal experiments with PAN7-2 mL and PAN7-TBAB0.5-2 mL membranes are shown in FIG. 82. No removal of MS2 was observed on the unmodified PAN membrane, and no increase in pressure during the course of the experiment was observed, indicating that MS2 freely penetrated the membrane. In contrast, 4.5-log removal of MS2 was observed over the first 2 minutes of filtration with the PAN7-TBAB0.5-2 mL membrane. The degree of removal then decreased over the duration of the experiment, to less than 1-log removal at 15 minutes. Notably, the transmembrane pressure increased during MS2 removal with the TBAB-modified membrane, presumably due to pore blockage resulting from adsorption of MS2 at surface-active quaternary ammonium sites imparted by TBAB. Importantly, these results indicate that inclusion of TBAB effectively introduces anti-viral functionalities to the membrane surface.

Effect of TBAB Loading and Membrane Thickness on MS2 Removal Performance

Figure 83:
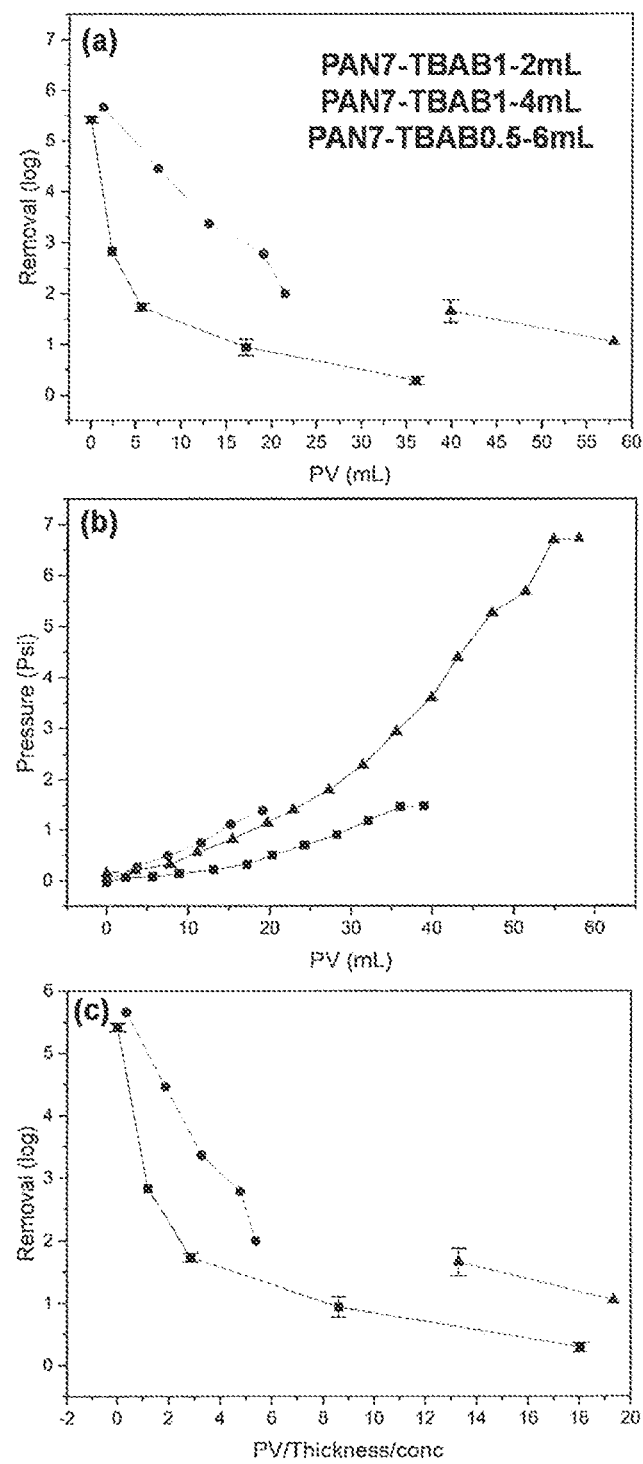
FIGS. 83A-83C illustrates results of MS2 removal experiments for membranes with varied TBAB concentration and thickness (PAN7-TBAB1-2 mL, PAN7-TBAB1-4 mL, and PAN7-TBAB0.5-6 mL). (a) MS2 log-removal as a function of permeate volume (PV). (b) Transmembrane pressure as a function of PV. (c) MS2 log-removal as a function of PV, normalized to composite thickness and TBAB concentration.

To evaluate the effects of both TBAB loading and composite thickness, similar MS2 removal experiments were performed with PAN7-TBAB1-2 mL, PAN7-TBAB1-4 mL, and PAN7-TBAB0.5-6 mL membranes (FIG. 83A). The transmembrane pressure recorded during the experiments is shown in FIG. 83B. Generally, improvements in removal were observed both with increases in TBAB concentration and in composite thickness. Indeed, a loading of 0.5 wt % TBAB was used for the thickest material because the PAN7-TBAB1-6 mL material exhibited >6-log removal for the duration of the experiment, such that effluent MS2 concentrations could not be quantified. With the PAN7-TBAB0.5-6 mL material, effluent MS2 concentrations were only quantifiable at effluent (permeate) volumes >40 mL.

Normalization of the removal data to the membrane thickness and the bulk concentration of TBAB in the composite, as shown in FIG. 83C, improved overlap of the trends in performance during the filtration experiments, indicating that these factors indeed contribute to composite performance. However, the thicker (4 mL and 6 mL) composites exhibit higher normalized removals of MS2 than the 2 mL material. Thus, blocking of pores by adsorbed viruses on the 4 mL and 6 mL filter surfaces (as indicated by the greater increases in transmembrane pressure observed for 4 mL and 6 mL composites during the course of the filtration experiment, relative to the 2 mL filter) is likely a factor in the overall performance of the material.

Effect of Nanofiber Diameter on Composite Performance

Figure 84:
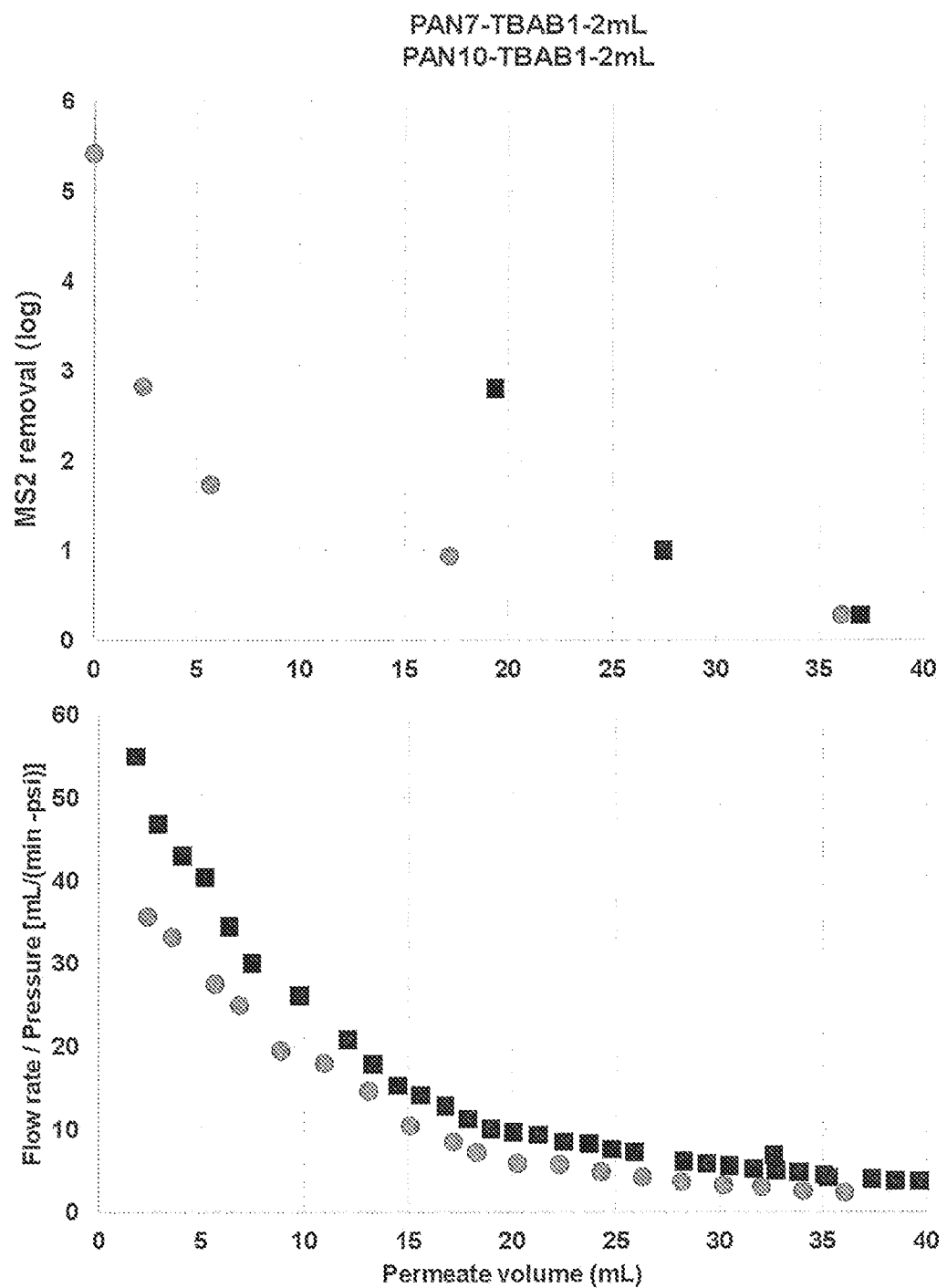
FIGS. 84A-84B illustrate MS2 removal experiments, showing the effect of PAN concentration (e.g., nanofiber diameter and composite thickness) for PAN7-TBAB1-2 mL vs. PAN10-TBAB1-2 mL. (a) MS2 removal and (b) membrane permeability as a function of permeate volume.

To evaluate the effect of nanofiber diameter (and by proxy, composite thickness) on material performance, the MS2 removal performance of a PAN7-TBAB1-2 mL membrane was compared to that of a PAN10-TBAB1-2 mL composite (FIG. 84A). Over the first 30 mL of permeate volume, higher removal of MS2 was observed for the PAN10-TBAB1-2 mL material than for the PAN7-TBAB1-2 mL composite, although differences became negligible after 30 mL of effluent. We note that the removal efficiency of the PAN10-TBAB1-2 mL material is not shown for permeate volumes <20 mL because MS2 concentrations in the effluent were again too low to quantify (indicating >6-log removal of MS2). The permeability of the membrane during the course of the experiment is shown in FIG. 84B, where slightly higher permeability (i.e., less transmembrane resistance) was observed for the PAN10-TBAB1-2 mL composite during the entirety of the experiment. The higher permeability is attributed to larger pore sizes in the composite fabricated with 10 wt % PAN, based on its larger nanofiber diameters. We note that the composite containing 10 wt % PAN was significantly thicker than its 7 wt % counterpart (see FIG. 80). Thus, given the higher permeability of the 10 wt % PAN composite, its improved removal performance is attributed to a longer contact time within the thicker membrane, allowing improved contact between MS2 and the functionalized nanofiber surfaces.

Effect of Membrane Fouling on Composite Performance

Figure 85:
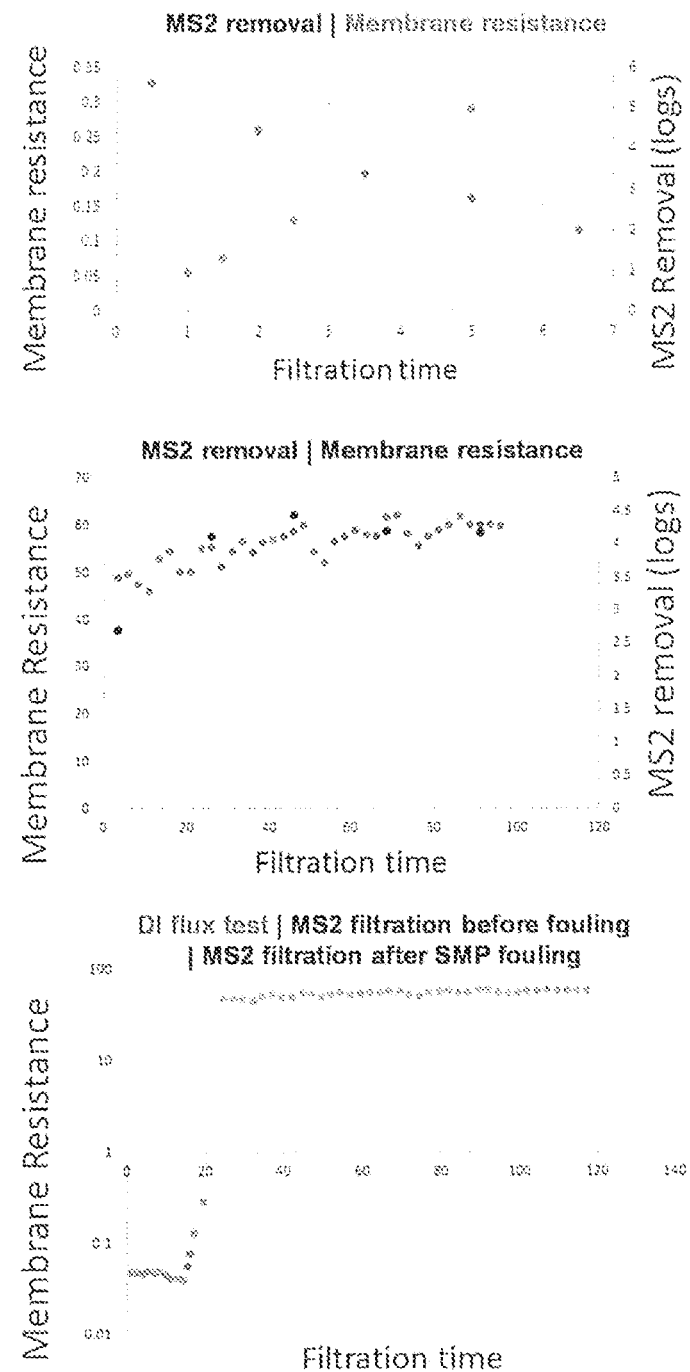
FIGS. 85A-85C illustrate (a) MS2 removal and membrane resistance with PAN7-TBAB1-4 mL membrane in the absence of foulants. (b) MS2 removal and membrane resistance with PAN7-TBAB1-4 mL membrane after fouling with SMP. (c) Membrane resistance over time, for flux testing with deionized water, MS2 filtration in the absence of SMP, and MS2 filtration after SMP fouling.

Based on the decrease in MS2 removal performance over time (as MS2 adsorbed to the membrane surface), the influence of foulants on MS2 removal performance was preliminarily evaluated with soluble microbial products (SMP) extracted from a full-scale membrane bioreactor. A comparison between the influence of MS2 and SMP adsorption to the membrane surface on MS2 removal is shown in FIGS. 85A-85C for the PAN7-TBAB1-4 mL membrane. FIG. 85A shows a decrease in MS2 removal over time, as the membrane resistance increases (due to adsorption of MS2 on the membrane surface). In contrast, FIG. 85B shows membrane performance for MS2 removal after SMP fouling, where MS2 removal initially increases, and then reaches a maximum, sustained 4.5-log removal after 20 minutes. A summary of the membrane resistance during a preliminary flux text (using clean, deionized water), during MS2 filtration in the absence of SMP, and during MS2 filtration after SMP fouling is provided in FIG. 85C. The increase in MS2 removal after SMP fouling, which reflects the behavior of traditional (i.e., non-functionalized) ultrafiltration membranes, indicates that the membrane surface properties were changed by adsorption of the negatively charged SMP. We attribute the distinct effects of MS2-induced and SMP-induced membrane resistance to the degree to which the membrane pores were blocked, as the membrane resistance due to SMP fouling was ~2 orders of magnitude larger than that caused by MS2 adsorption. To prevent buildup of pressure over time during application of these membranes, methods to prevent material fouling (such as inclusion of a filter layer containing negatively charged surface moieties) are likely necessary.

In accordance with an exemplary embodiment, polymer nanofiber composites with surface-active quaternary ammonium functionalities (via inclusion of TBAB) are disclosed, which can be effectively applied for virus removal from aqueous solutions. Increases to the TBAB loading in the composite material improved MS2 removal performance, presumably due to the provision of higher concentrations of surface-active quaternary ammonium sites at which viruses are adsorbed and/or inactivated. Further, increases in the composite thickness, produced by increases in the precursor solution volume and/or polymer concentration, improved membrane performance for MS2 removal by promoting longer contact times between viruses and active nanofiber surfaces.

The detailed description above describes surfactant-assisted synthesis of surface-functionalized nanoparticle electrospun composites, and more particularly to a functionalized polymer-metal oxide nanofiber for point of use (POU) water treatment of metal oxyanions, for example, arsenate and chromate. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A method for synthesizing nanofilters for water treatment, the method comprising:

dispersing amorphous Ferrihydrite (Fh) nanoparticles in an organic solvent solution to create a suspension of the amorphous Ferrihydrite (Fh) nanoparticles and the organic solvent solution;

dissolving an organic polymer resin and a quaternary ammonium surfactant in the suspension of the amorphous Ferrihydrite (Fh) nanoparticles and the organic solvent solution to create a sol gel, wherein the quaternary ammonium surfactant is cetyltrimethylammonium bromide (CTAB) or tetrabutylammonium bromide (TBAB); and electrospinning the sol gel to form electrospun nanofiber composites with embedded, surface-active nanoparticles.

2. The method of claim 1, wherein the organic solvent comprises dimethylformamide (DMF), and the organic polymer resin comprises poly-acrylonitrile (PAN).

3. A method for removing contaminants using the synthesized nanofilters for water treatment of claim 1, the method further comprising:

removing lead (Pb), Copper (Cu), Cadmium (Cd), Chromium (Cr) and/or Arsenic (As) from a water source with the electrospun composite with surface-active nanoparticles.

4. A method for removing contaminants using the synthesized nanofilters for water treatment of claim 1, further comprising:

inactivating viruses from a water source with the surface-active nanoparticles.

5. A method for removing contaminants using the synthesized nanofilters for water treatment of claim 1, further comprising:

removing arsenate and chromate in a flow-through filtration system with the electrospun nanofiber composites with embedded, surface-active nanoparticles.

6. The method of claim 1, wherein the electrospun nanofiber composites with surface-active nanoparticles forms nanoparticles having a diameter of approximately 100 nm.

7. The method of claim 1, further comprising:

placing the electrospun nanofiber composites with surface-active nanoparticles in a flow-through filtration system for point-of-use (POU) water treatment.

8. The method of claim 1, wherein the electrospinning of the sol gel further comprises:

a single-pot synthesis, wherein the electrospun nanofiber composites with embedded, surface-active nanoparticles do not undergo a post-processing step.

9. An electrospun polyacrylonitrile (PAN) nanofiber composite with embedded, surface-active nanoparticles that is prepared by the method of claim 2.

10. An electrospun polyacrylonitrile (PAN) nanofiber composite with embedded, surface-active nanoparticles, the PAN nanofiber composite comprising:

Amorphous Ferrihydrite (Fh) nanoparticles;

dimethylformamide (DMF);

poly-acrylonitrile (PAN); and cetyltrimethylammonium bromide (CTAB) or tetrabutylammonium bromide (TBAB).

11. The PAN nanofiber composite of claim 10, that the nanofilter is configured to remove lead (Pb), Copper (Cu), Cadmium (Cd), Chromium (Cr) and/or Arsenic (As) from a water source.

12. The PAN nanofiber composite of claim 10, further comprising:

a flow-through filtration system configured to remove arsenate and/or chromate from a water source.

13. The PAN nanofiber composite of claim 10, wherein the electrospun polyacrylonitrile (PAN) composite with surface-active nanoparticles forms nanoparticles having a diameter of approximately 100 nm.

14. The PAN nanofiber composite of claim 10, further comprising:

a flow-through filtration system for point-of-use (POU) water treatment, and wherein the electrospun polyacrylonitrile (PAN) composite with surface-active nanoparticles are placed in the flow-through filtration system.

15. A method for removing metal contaminants from a source of water, the method comprising:

exposing a source of water to electrospun polyacrylonitrile (PAN) nanofiber composites with embedded, surface-active nanoparticles, wherein the electrospun polyacrylonitrile (PAN) nanofiber composites with embedded, surface-active nanoparticles comprise:

amorphous Ferrihydrite (Fh) nanoparticles, dimethylformamide (DMF), poly-acrylonitrile (PAN), and a quaternary ammonium surfactant selected from cetyltrimethylammonium bromide (CTAB) and tetrabutylammonium bromide (TBAB); and removing the metal contaminants from the source of the water with the electrospun polyacrylonitrile (PAN) nanofiber composites with the embedded, surface-active nanoparticles.

* * * * *